United States Patent
An et al.

(10) Patent No.: US 9,143,358 B2
(45) Date of Patent: Sep. 22, 2015

(54) ELECTRONIC DOCUMENT COMMUNICATION SYSTEM AND ELECTRONIC DOCUMENT COMMUNICATION METHOD

(75) Inventors: Dae Seob An, Seoul (KR); Jung Gu Lee, Seoul (KR); Seong Pil Kong, Seongnam-si (KR); Yeong Cheol Lim, Seoul (KR)

(73) Assignee: NATIONAL IT INDUSTRY PROMOTION AGENCY, Seoul (KR)

(*) Notice: Subject to any disclaimer, the term of this patent is extended or adjusted under 35 U.S.C. 154(b) by 224 days.

(21) Appl. No.: 13/808,576

(22) PCT Filed: Jul. 8, 2011

(86) PCT No.: PCT/KR2011/005027
§ 371 (c)(1),
(2), (4) Date: Jan. 4, 2013

(87) PCT Pub. No.: WO2012/005546
PCT Pub. Date: Jan. 12, 2012

(65) Prior Publication Data
US 2013/0117400 A1    May 9, 2013

(30) Foreign Application Priority Data

Jul. 8, 2010 (KR) .................. 10-2010-0065985
Dec. 21, 2010 (KR) .................. 10-2010-0131935
Dec. 21, 2010 (KR) .................. 10-2010-0131936
Jul. 7, 2011 (KR) .................. 10-2011-0067185

(51) Int. Cl.
*G06F 15/16* (2006.01)
*H04L 12/58* (2006.01)
(Continued)

(52) U.S. Cl.
CPC .............. *H04L 12/581* (2013.01); *G06Q 10/10* (2013.01); *H04L 12/5855* (2013.01); *H04L 51/14* (2013.01); *H04L 63/0823* (2013.01); *H04L 69/40* (2013.01)

(58) Field of Classification Search
CPC ..... H04L 12/58; H04L 63/0823; H04L 51/00; H04L 51/14
USPC .................. 709/200–206, 217–227, 228
See application file for complete search history.

(56) References Cited

U.S. PATENT DOCUMENTS 6,775,771 B1   8/2004   Shrader et al.
8,255,685 B2 * 8/2012   Truskovsky et al. .......... 713/156
(Continued)

FOREIGN PATENT DOCUMENTS

JP   H03-076452 A   4/1991
JP   H05-035562 A   2/1993
(Continued)

OTHER PUBLICATIONS

International Search Report for PCT/KR2011/005027 filed on Jul. 8, 2011.
(Continued)

*Primary Examiner* — Moustafa M Meky

(57) ABSTRACT

The present invention relates to an electronic document communication system and to an electronic document communication method, which can construct an electronic document communication system for providing not only enterprise/institutions with reliability, but also individuals and small companies.

13 Claims, 112 Drawing Sheets

(51) Int. Cl.
*H04L 29/06* (2006.01)
*G06Q 10/10* (2012.01)
*H04L 29/14* (2006.01)

(56) References Cited

U.S. PATENT DOCUMENTS

| | | | |
|---|---|---|---|
| 8,739,292 B2* | 5/2014 | Adler et al. | 726/26 |
| 8,826,007 B2* | 9/2014 | Truskovsky et al. | 713/156 |
| 2008/0168536 A1* | 7/2008 | Rueckwald | 726/4 |
| 2009/0228986 A1* | 9/2009 | Adler et al. | 726/26 |
| 2009/0319781 A1 | 12/2009 | Byrum et al. | |
| 2010/0241851 A1* | 9/2010 | Truskovsky et al. | 713/156 |
| 2012/0290835 A1* | 11/2012 | Truskovsky et al. | 713/156 |

FOREIGN PATENT DOCUMENTS

| | | |
|---|---|---|
| JP | H07-250058 A | 9/1995 |
| JP | H07-297822 A | 11/1995 |
| JP | H09-008842 A | 1/1997 |
| JP | 2000-183951 A | 6/2000 |
| JP | 2001-306368 A | 11/2001 |
| JP | 2002-082880 A | 3/2002 |
| JP | 2003-281227 A | 10/2003 |
| JP | 2005-108063 A | 4/2005 |
| JP | 2007-179145 A | 7/2007 |
| JP | 2008-512011 A | 4/2008 |
| KR | 1020050078402 A | 8/2005 |
| KR | 10-0653512 B1 | 11/2006 |
| KR | 1020080014194 A | 2/2008 |
| KR | 10-2009-0027555 A | 3/2009 |
| KR | 1020090027554 A | 3/2009 |

OTHER PUBLICATIONS

Une Masashi, "Research Trends and safety assessment protocol for transmitting and receiving proof of the electronic document", Financial Research, Apr. 2001, pp. 1-47, vol. 20, No. 1.

* cited by examiner

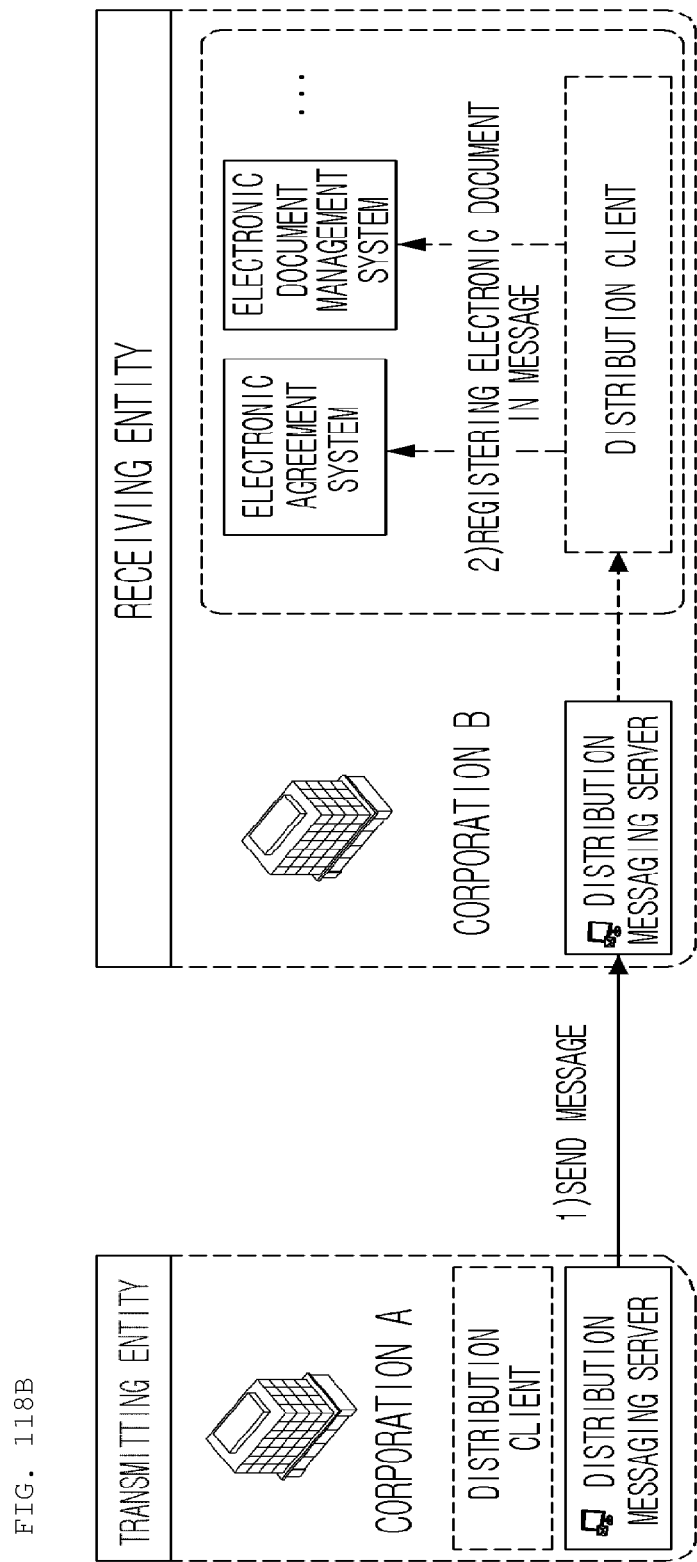

ELECTRONIC DOCUMENT COMMUNICATION SYSTEM AND ELECTRONIC DOCUMENT COMMUNICATION METHOD

TECHNICAL FIELD

The present invention relates to an electronic document communication system and an electronic document communication method that can construct an electronic document communication system for providing not only enterprise/institutions, but also individuals and small companies with reliability.

BACKGROUND ART

Generally, the electronic document communication has been restrictively performed only in a specific industrial group or community based on an individual unique regulation of corporations/institutions.

Further, there are problems in that an email is used as an assistant means between general individuals or between an individual and an enterprise/institution without considering a concept of a reliable electronic communication, or online communication is performed only when the individual, an individual business, or a small company access to an web site of the enterprise.

Therefore, it is expected that not only the enterprise that can possess a predetermined size of communication system, but also the individuals, the individual business, or the small company may build an electronic document communication based infra that guarantees the reliability of the communication.

DISCLOSURE

Technical Problems

The present invention makes an effort to provide an electronic document communication system and an electronic document communication method that allow not only the corporation/institution that can possess a predetermined size of communication system, but also the individuals and the small company to establish reliability.

Technical Solution

An electronic document communication system according to an exemplary embodiment of the present invention includes: a transceiving entity that transmits and receives a message based on an electronic mailing address and communicates the electronic document through a communication messaging server that issues and manages a communication certificate for message transmission/reception, a communication hub that registers/manages the electronic mailing address of the transceiving entity, sets an electronic document communication route between the transceiving entities, provides a standard form of the electronic document to the transceiving entity, transmits the message by proxy when an error occurs in the process of communication the electronic document between the transceiving entities and issues a communication certificate; and a reliable third party storing institution that receives and stores the communication certificate.

In an electronic document communication system according to an exemplay embodiment of the present invention, a method of communicating an electronic document in an electronic document communication system including a transceiving entity and a communication hub include: (a) a step of allowing a transmitting entity to acquire physical address information corresponding to address information of a receiving entity and then transmit a message with an attached electronic document to the physical address, (b) a step of allowing the receiving entity that receives the message to issue a reception certificate or an error certificate in accordance with compatibility verification result for a received message and the transmitting entity and deliver the certificate to the transceiving entity; and (c) a step of allowing a transmitting entity that transmits the message to the receiving entity but fails the transmission to request the communication hub to transmit the message by proxy and allowing the communication hub that receives request to transmit a message by proxy to issue the transmission certificate to deliver the certificate to the transmitting entity and transmit the message to the receiving entity and then perform the step (b).

Advantageous Effects

The present invention with the above-mentioned configuration and method may build an electronic document communication system that allows not only the corporation/institution, but also the individuals and the small company to establish reliability.

DESCRIPTION OF DRAWINGS

FIG. 63 is a view illustrating a process that authenticates the communication messaging server system so as to be registered as a certified electronic mailing address according to another exemplary embodiment of the present invention.

FIG. 118A is a view illustrating an automatic processing method of Table 38 and FIG. 118B is a view illustrating a semi-automatic processing method of Table 38.

BEST MODE

Hereinafter, an electronic document communication system and an electronic document communication method according to an exemplary embodiment of the present invention will be described with reference to the accompanying drawings and Tables.

Figure 1A:
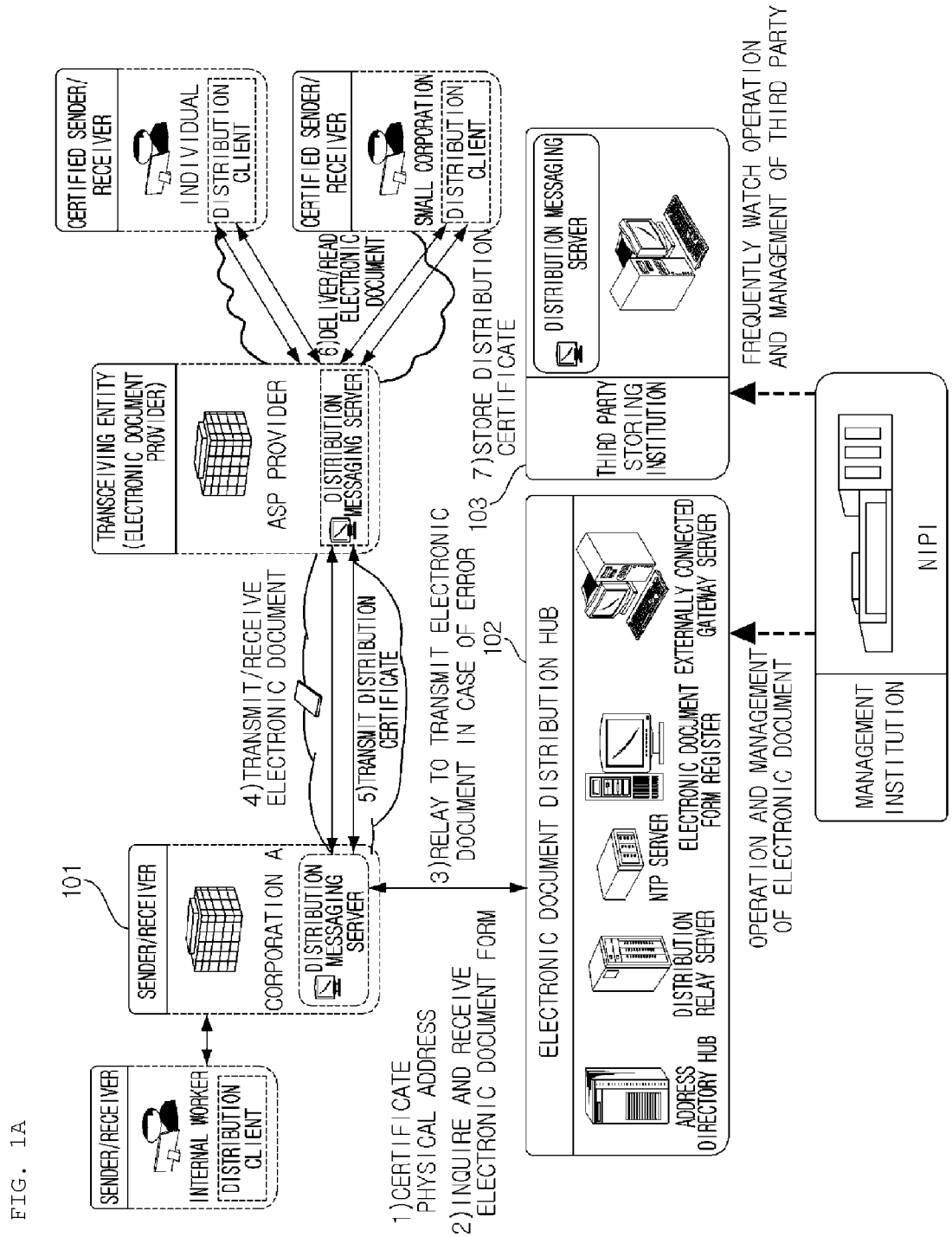
FIGS. 1A and 1B are a view illustrating a configuration example of an electronic document communication system according to an exemplary embodiment of the present invention.
Figure 1B:
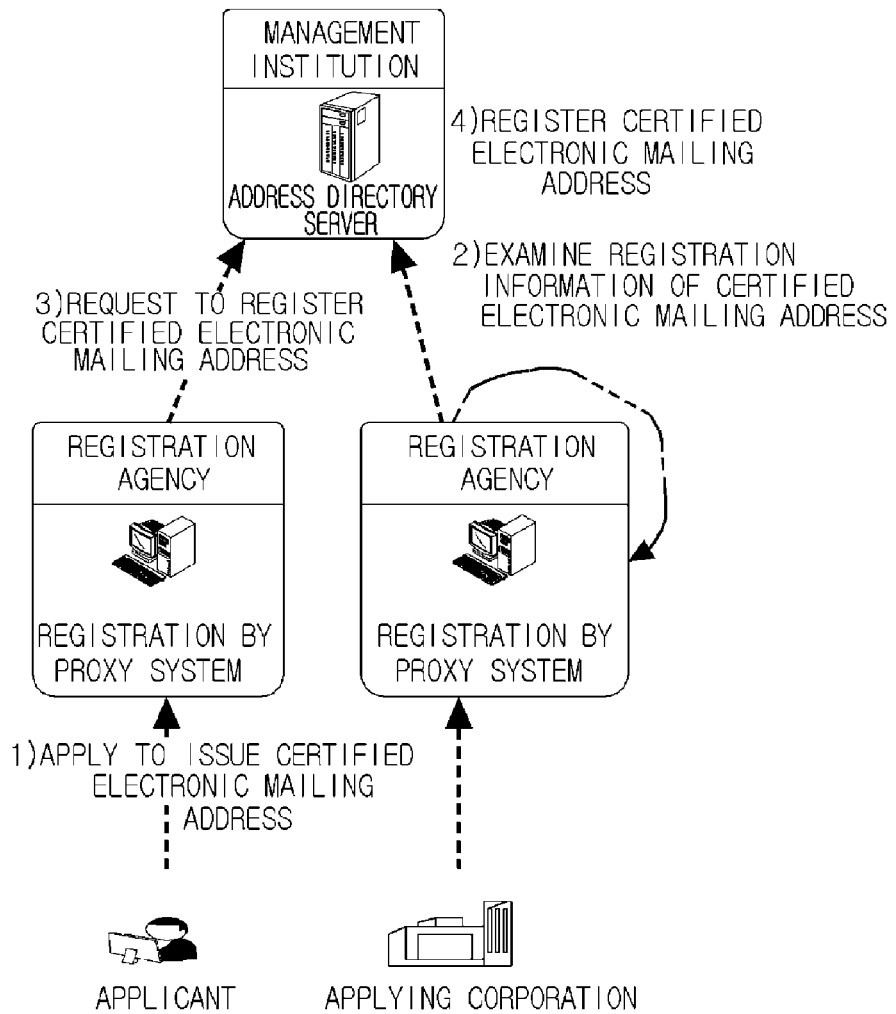

FIGS. 1A and 1B illustrate a configuration example of an electronic document communication system according to an exemplary embodiment of the present invention.

Referring to FIGS. 1A and 1B, an electronic document communication system according to an exemplary embodiment of the present invention includes a transceiving entity 101 that communicates an electronic document through a communication messaging server that transmits/receives a message based on an electronic mailing address and issues and manages a communication certificate for the message transmission/reception, an electronic document communication hub 102 that registers/manages the electronic mailing address of the transceiving entity 101, sets a communication path of the electronic document between the transceiving entities 101, provides a standard form of the electronic document to the transceiving entity 101, and sends a message by proxy for the transceiving entity and issues a communication certificate when an error occurs in a process of the communication of the electronic document between the transceiving entities 101, and a reliable third party storing institution (certified electronic document storage) 103 that receives and stores the communication certificate.

The communication messaging server of the transceiving entity 101 stores the transmitted/received message in a message box together with state information for every user and store the message transmission and reception record in a media which cannot be edit and deleted for a predetermined period and issues a communication certificate for the transmission and reception of the message to request the third party storing institution to store the communication certificate. The communication messaging server is connected with the address directory server to allow the transceiving entity 101 to use functions of registering, searching, editing, and deleting the electronic mailing address. Further, the communication messaging server transfers messages which have been stored for a predetermined time or longer to an external storage device so as to be stored.

The electronic mailing address includes a user identification mark of the transceiving entity 101 which is issued through the address directory server of the electronic document communication hub 102, an additional identification which is a unique value autonomously given by the transceiving entity 101 if necessary and a unique value in the transceiving entity 101, and a separation symbol which is located between the user identification mark and the additional identification mark.

The electronic document communication hub 102 includes an electronic document form register. The electronic document form register performs the management including registration, deletion, and edition of information of the electronic document standard form. Further, the electronic document form register additionally classifies the electronic document standard form in accordance with a context and performs management including registration and edition of a context in which the electronic document standard form is used.

The electronic document communication hub 102 includes a communication relay server that sends a message by proxy and issues a communication certificate when error occurs during the process of communicating the electronic document between the transceiving entities 101. When the communication relay server is requested by the transceiving entity 101 to send the message, the communication relay server issues a transmission certificate to the transceiving entity 101 that requests to send the message after sending the message by proxy. If the requested message sending is failed, the communication relay server sends an error message to the transceiving entity 101 that requests to send the message.

The electronic document communication hub 102 includes an externally connected gateway server for connection with an external system. The externally connected gateway server includes a communication messaging server that transmits/receives a message based on an electronic mailing address. The externally connected gateway server provides an transmission/reception electronic mailing address verifying/transforming function between the connected external system and the electronic document communication system, a message verifying/transforming function between the connected external system and the electronic document communication system, a verifying/transforming function of security which is applied to an electronic document between the connected external system and the electronic document communication system, and a function that verifies and transforms a compatibility of the electronic document between the connected external system and the electronic document communication system.

An electronic document communication system with the above-described configuration and an electronic document communication method using the same according to exemplary embodiments of the present invention will be described in detail with reference to FIGS. 1 to 121B. In the detailed description of the present invention, reference numerals of FIGS. 1A and 1B will be omitted.

[Structure of Electronic Document Communication System]

In order to guarantee reliability and stability in communication of an electronic document, the electronic document communication system according to the present invention communication needs to satisfy the following requirements (1) to (7).

(1) A transceiving entity and a sender/receiver that participate in the communication system need to transmit/receive an electronic document using a predetermined method and agree with a service level agreement (SLA) of a management institution or an electronic document provider.

(2) Identification of the transceiving entity and a certified sender/receiver that participates in the communication system is allowed and denial of the electronic document communication action needs to be prevented.

(3) A certified electronic address which is information for discriminating the transceiving entity and a certified sender/receiver in the communication system needs to be given in the unit of a corporate or an individual and registered and managed by a registered institution.

(4) When the electronic document is communicated in the communication system, the communication certificate needs to be generated and sent and stored into a transmitting entity which participates in the communication action and a third party storing institution.

(5) Even though all electronic document communication actions are performed based on a P2P (peer to peer) communication, a system that supports the communication when the communication is failed due to various environmental factors needs to be provided.

(6) Not only the exchange of the electronic documents between the parties in the communication system, but also various additional services such as an electronic document reading service need to be supported.

(7) A gateway that supports to connect with an external system other than the communication system needs to be provided.

The electronic document communication system according to the present invention is performed based on a certified electronic mailing address and P2P communication that transmits/receives the electronic document between the transceiving entities having a communication messaging server.

A structure of the electronic document communication system according to the present invention is illustrated in FIGS. 1A and 1B and components in the system will be described in the following Tables 1 and 2. Further, a main process will be described in the following Table 3.

TABLE 1

| No. | Name of entity | Description |
|---|---|---|
| 1 | transceiving entity | A corporate or an institution that includes a system required to communicate an electronic document such as a communication messaging server to participate in the communication of the electronic document in a communication system in accordance with a predetermined method. This is a general concept including an electronic document provider. |
| 2 | Electronic document provider | A third party institution which is authenticated in order to provide an electronic document communication service to a sender/receiver that does not have a system required to communicate an electronic document such as a communication messaging server |
| 3 | electronic document communication hub | Which commonly refers to a system that supports the communication of the electronic document between the transceiver entities and performs the address management, a path setting, an error or security processing, and connection to the outside. |
| 4 | Sender/receiver | Which is a basic unit of the communication of the electronic document and is a general concept including an end user who actually transmits and receives an electronic document. General concept including a certified sender/receiver. |
| 5 | Certified sender/receiver | A sender/receiver who becomes a member of the electronic document provider and gets a certified electronic mailing address to use the electronic document communication service. |

TABLE 1-continued

| No. | Name of entity | Description |
|---|---|---|
| 6 | Third party storing institution | A corporate body which is designated by a secretary of The Ministry of Knowledge Economy to store or verify an electronic document on behalf of the other party or performs a job related with the electronic document |

TABLE 2

| No. | Name of entity | Description |
|---|---|---|
| 1 | communication messaging server | A messaging system that communicates the electronic document by proxy for a sender/receiver in a predetermined method and is provided in a transceiving entity or an electronic document provider. |
| 2 | Communication client | Which commonly refers to an application which is used by the sender/receiver to communicate the electronic document and provides a function of editing a message and transceiving a message through a communication messaging server (for example, outlook or a web mail client) |
| 3 | Address directory server | A system that registers and manages a certified electronic mailing address of a transceiving entity and a sender/receiver who participate in the certified electronic mailing address based electronic document communication system and provides address information required for transceiving. |
| 4 | Electronic document form register | A system that registers, manages, and provides a standard form of an electronic document to be structuralized such as an order sheet, an invoice, or a tax voucher so that the transceiving entity may openly use the standard form. |
| 5 | communication relay server | A system that transmits a message by proxy instead of the transceiving entity when an error occurs during the process of communicating the electronic document between the transceiving entities |
| 6 | Externally connected gateway server | A system that serves as a reliable path to connect the communication system to the external system |
| 7 | NTP server | Which is a Network Time Protocol server that serves to send a time to a system that requests a time in the communication system |
| 8 | Registration agency system | A system that allows a registration agent to apply and register a certified electronic mailing address |

TABLE 3

| No. | Name of process | Description |
|---|---|---|
| 1 | Transceiving of Message | An action that transmits and receives a message (including an electronic document) between the transceiving entities and transmits and receives a message through a communication messaging server in the transceiving entity and a communication certificate including communication certified information |
| 2 | Acquiring of Physical address | An action that inquires an address directory server in an electronic document communication hub in order to obtain a physical address corresponding to a certified electronic mailing address of a receiver and receives a physical address prior to sending the electronic document |

TABLE 3-continued

| No. | Name of process | Description |
|---|---|---|
| 3 | Supporting of communication relay | A process that is performed by a communication relay server to send an electronic document by proxy when the communication of the electronic document is not good between the transceiving entities due to various errors such as a network error or a receiver system error |
| 4 | Storing of communication certificate | An action that stores the communication certificate received by a transmitting entity in a predetermined determined third party storing institution (storing a message if necessary) |
| 5 | Management such as registration of certified electronic mailing address | A process that registers and changes the certified electronic mailing address of the transceiving entity or a certified sender/receiver |
| 6 | Applying of electronic document form | A process that uses an electronic document registered in an electronic document form register by a communication client |
| 7 | Processing of spam message | A process that reports and processes an improper behavior of a specific sender/receiver in the communication system such as spam mailing |
| 8 | Processing of error | An action that analyzes causes of various failures of the electronic document communication in the communication system and copes with and supplements the failures |

[Component of Electronic Document Communication System]

(1) Communication Messaging Server

The communication messaging server is a messaging system provided in the transceiving entity and plays a core role in the electronic document communication. The communication messaging server needs to physically have one electronic mailing address (IP address), but issue and manage a plurality of user accounts for a lower-level user. In order to manage the user accounts, the communication messaging server needs to manage a message box for every user account. The communication messaging server has a responsibility to safely and reliably manage the accounts and the message boxes of the users.

Figure 2:
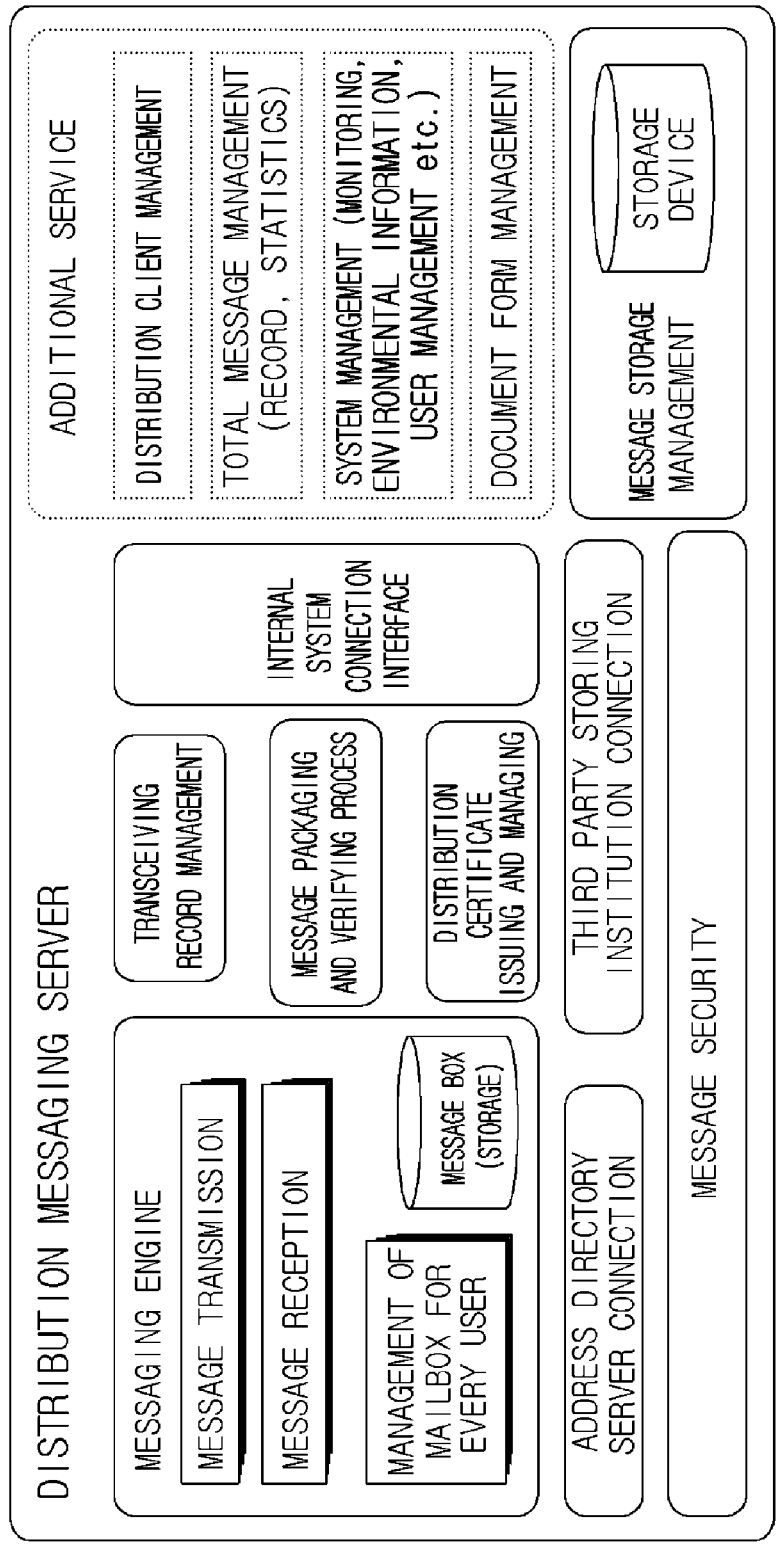
FIG. 2 is a view illustrating a communication messaging server of FIGS. 1A and 1B.

A functional concept of the communication messaging server is as illustrated in FIG. 2 and the functions thereof will be described in the following Table 4.

TABLE 4

| No. | Name of function | Description |
|---|---|---|
| 1 | Transmitting and receiving of message | transmits and receives a message in accordance with a communication protocol |
| 2 | Managing of message box for every user | stores a transmitted/received message in a message box in accordance with a user account or an internal identifier manages the transmitted document stored in the message box as status information in the following six steps 1) in the process of transmitting: a state when no reply is received from a receiver after sending a document 2) completely transmit: a state when a "reception certificate" has been received from the communication messaging server of the receiver |

TABLE 4-continued

| No. | Name of function | Description |
|---|---|---|
|  |  | 3) commissioned transmission: a state when the transmission is commissioned to the communication relay server after the failure of the transmission<br>4) transmission failure: when a SOAP Fault message is returned due to an error occurring in the communication messaging server of the receiver or a network error occurs in the transceiving process.<br>5) reading failure: when an error occurs while a receiver reads the message<br>6) completely read: a state when a "read certificate" has been received from the communication messaging server of the receiver manages received document stored in the message box as state information in the following four steps<br>1) verification error: an error occurs while verifying a basic structure of the received message<br>2) before the reception confirmation: before a receiver of the document reads a list of received documents<br>3) reception confirmation: a receiver of the document reads the list of the received documents<br>4) reading confirmation: a receiver of the document reads the details of the received documents<br>if the receiver requests the deletion, the corresponding received document needs to be physically deleted.<br>the transmission message, reception certificate, and reading certificate in the message box need to have related information so as to be related with each other. |
| 3 | Managing of transmission/ reception record | communication messaging server needs to store the transmission/reception record in a medium, which is not allowed to edit and delete the transmission/reception record for a predetermined period of time.<br>transmission/reception record information to be stored<br>1) transmission record: message id, connected message id, transmitter, receiver, transmission time, hash value for the transmitted document<br>2) reception record: transmitter, receiver (including a user account), reception time, hash value for the received document |
| 4 | Supplementing of message | needs to perform message security functions (digital signature, signature verification, encryption/decoding) which are suggested by the communication protocol |
| 5 | Message packaging and verification processing | a document to be transmitted needs to be packaged in a message structure defined by the communication protocol before transmitting the document.<br>a received document needs to be verified and parsed by a message structure defined by the communication protocol after receiving the document and required information needs to be extracted. |
| 6 | Issuing and managing of communication certificate | the communication messaging server should issue a communication certificate in order to evidence the transmission/reception of the document and manage the communication certificate.<br>request the third party storing institution to store the communication certificate as soon as the issued communication certificate is received.<br>record information of communication certificate: communication certificate id, issuance time, related message id, an original of the communication certificate (optional), or registration certificate of the third party storing institution received after storing the communication certificate in the third party storing institution<br>see a technical standard of "electronic document communication certificate" |
| 7 | Connecting with address directory server | needs to register address information supplied from the address directory server and manage the address information in accordance with a searching process<br>needs to have a client function which can call a service provided by the address directory server<br>needs to provide a service client function that remotely calls a function of registering, editing, deleting the address information provided by the address directory server |
| 8 | Connecting with third party storing institution | the communication messaging server sends a storing request message to the communication messaging server which is provided outside the third party storing institution in order to request to store the communication certificate.<br>communication messaging server of the third party storing institution calls a storing request client to the third party storing institution in order to store the communication certificate in the third party storing institution<br>calls the storing request client at the time when the communication messaging server of the third party storing institution directly generates the communication certificate<br>the storing request client requests the third party storing institution to store the communication certificate in accordance with a connection interface standard of the third party storing institution. |
| 9 | Internal system connection interface | needs to provide functions which are directly connected to a corporate internal system if the communication messaging server is the corporate internal system rather than the communication client |
| 10 | Managing of communication client | manages a user account related with the communication client or manages a user authentication or environmental information |
| 11 | Managing of additional function | records and statistic information related with the message communication<br>system management: system monitoring environmental information management: needs to provide environmental information for entire communication messaging server and environment<br>setting function for individual users<br>manages a document form |
| 12 | Storing and managing of message | functions as a system that transfers messages which have been stored for one year or longer to an external storage device in order to automatically store the messages |

In addition to the functions described in Table 4, the following (1) to (4) principles need to be observed in the server system management in order to improve the reliability of the communication messaging server.

(1) A system manager cannot see or voluntarily delete a message box of an individual.

(2) The record information related to the server system management cannot be voluntarily deleted and stored in a unchangeable medium for 10 years or longer.

(3) The system manager cannot voluntarily change a basic function of an authenticated communication messaging server solution.

(4) An operation guideline related with the system management needs to be created and the management needs to be performed in accordance with the guideline.

(2) Communication Client

The communication client is an application that provides an UI (user interface) such as transmission and reception of a message, read and management of a received electronic document on behalf of the senders/receivers who participate in the communication system. The communication client cannot independently transmit/receive the document and needs to be inevitably connected with the communication messaging server.

The communication client requests to send a message through the communication messaging server or inquires the message received through the communication messaging server. The communication messaging server manages the message box for every user account. The communication client needs to access to only a message which is stored in its own account among the received documents by checking the user account information.

The communication client may be implemented as a C/S type application or a web type screen in accordance with a request of the transceiving entity.

Figure 3:
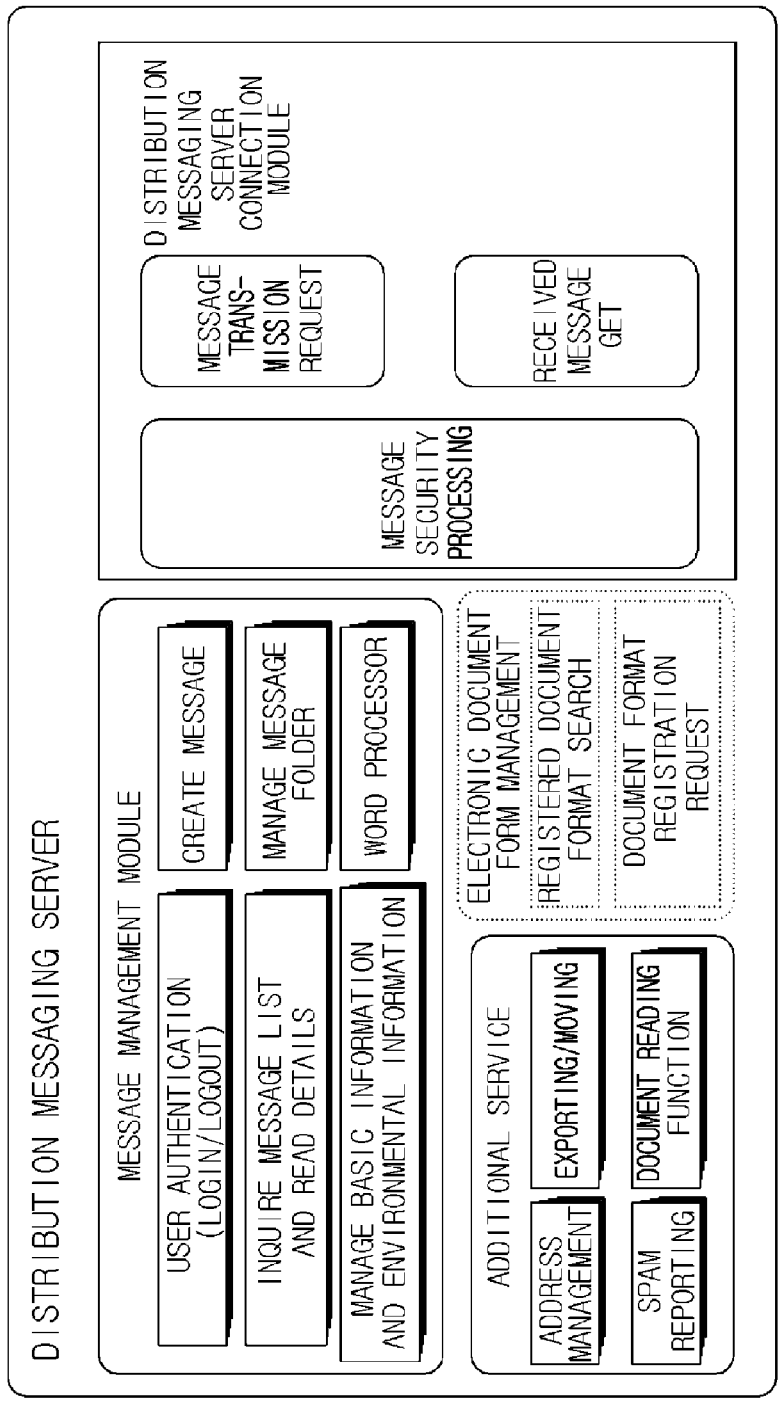
FIG. 3 is a view illustrating a communication client of FIGS. 1A and 1B.

A functional concept of the communication client is as illustrated in FIG. 3 and the functions thereof will be described in the following Table 5.

TABLE 5

| No. | Name of function | Description |
|---|---|---|
| 1 | User authentication | the communication client needs to receive login session information from the communication messaging server after checking a user account. a user authentication method of the communication client includes 1) user authentication based on a certificate and 2) user authentication based on ID/PW. when the authentication is operated based on ID/PW, a security policy for the password needs to be enforced. For example, changing a password in the unit of a week, combination of difficult character/number, prohibition of changing IP address |
| 2 | Generating of message | the communication client needs to provide a user interface that is capable of creating a new message items other than a value which is set in advance by the environmental information among basic information required to send a message so as to be input a main text of the message is not a critical item and the main text can be selectively and additionally created. |
| 3 | Inquiring of message list and reading of detailed contents | the communication client needs to provide a function of inquiring a list of the messages corresponding to the user account. needs to provide a function of reading detail information of the message including an attached document |
| 4 | Managing of message folder | the communication client needs to notify a status of the transmitted/received message based on the message box of the communication messaging server to the user in accordance with the status information provided by the communication messaging server. a function that provides temporary storage box or a deleted message box or a function of allowing a user to directly define and manage a message folder is optionally provided. |
| 5 | Managing of basic information and environmental information | the communication client needs to provide a function of managing necessary environmental information related with the message transmission/reception. the communication client needs to be synchronized with the environmental information which is managed by the communication messaging server. Additionally, the communication client provides a function of setting and managing individual environmental information of the communication messaging server. management of additional information on a system environment of the communication client is defined in accordance with the development range of the application to be provided. |
| 6 | Creating of document | a function of calling a registered electronic document form to create an electronic document |
| 7 | Request to transmit message and get received message | the communication client performs a message transmitting function and a received message importing function through a connected interface with the communication messaging server based on user account information. |
| 8 | Security processing of message | need to perform a security processing for a message such as digital signature or encryption/decoding |
| 9 | Registering and searching of document form | a function of registering an electronic document form disposed in the electronic document form register or the outside as a communication client a function of searching an electronic document form in the communication client |
| 10 | Managing of address book | a function of managing a frequently used certified electronic mailing address selectively perform a function of automatically registering and managing the certified electronic mailing address through a received message |
| 11 | Connecting with in-corporate system | a connection function such as a function of registering the electronic document in the message in a group ware or job related system in the corporate |
| 12 | Storing and managing of message | a function of transferring a message whose politically set storage time limit has been passed to an external storage device in order to store the message in this case, related information such as communication certificate and log information needs to be comprehensively stored in order to understand a context related with the message. |
| 13 | Reporting of spam | a function of reporting a message which is received with an improper purpose such as spam |
| 14 | Supporting to read document | selective function of sending only an authority to store and read the electronic document in a system of the transmitting entity or the third party storing institution the receiver has only a reading authority and cannot download the electronic document but can only read the electronic document |

(3) Address Directory Server

The address directory server is a system that manages the transmitting/receiving entity and address information of certified sender/receiver and provides a physical address.

The address directory server provides the basic functions such as the following functions (1) and (2):

(1) managing and providing a physical address (IP address) of the communication messaging server of a receiving entity (2) managing function such as registering and editing information of certified electronic address Additionally, the address directory server basically has a function of managing white-list information and accepts a report on a spam message from the user and manages blacklist information based the report.

The address directory server provides information related to the certified electronic address to the transceiving entity or the certified sender/receiver through a web portal screen and the communication messaging server and the related applications may use the services provided by the address directory server through the connected interface.

Figure 4:
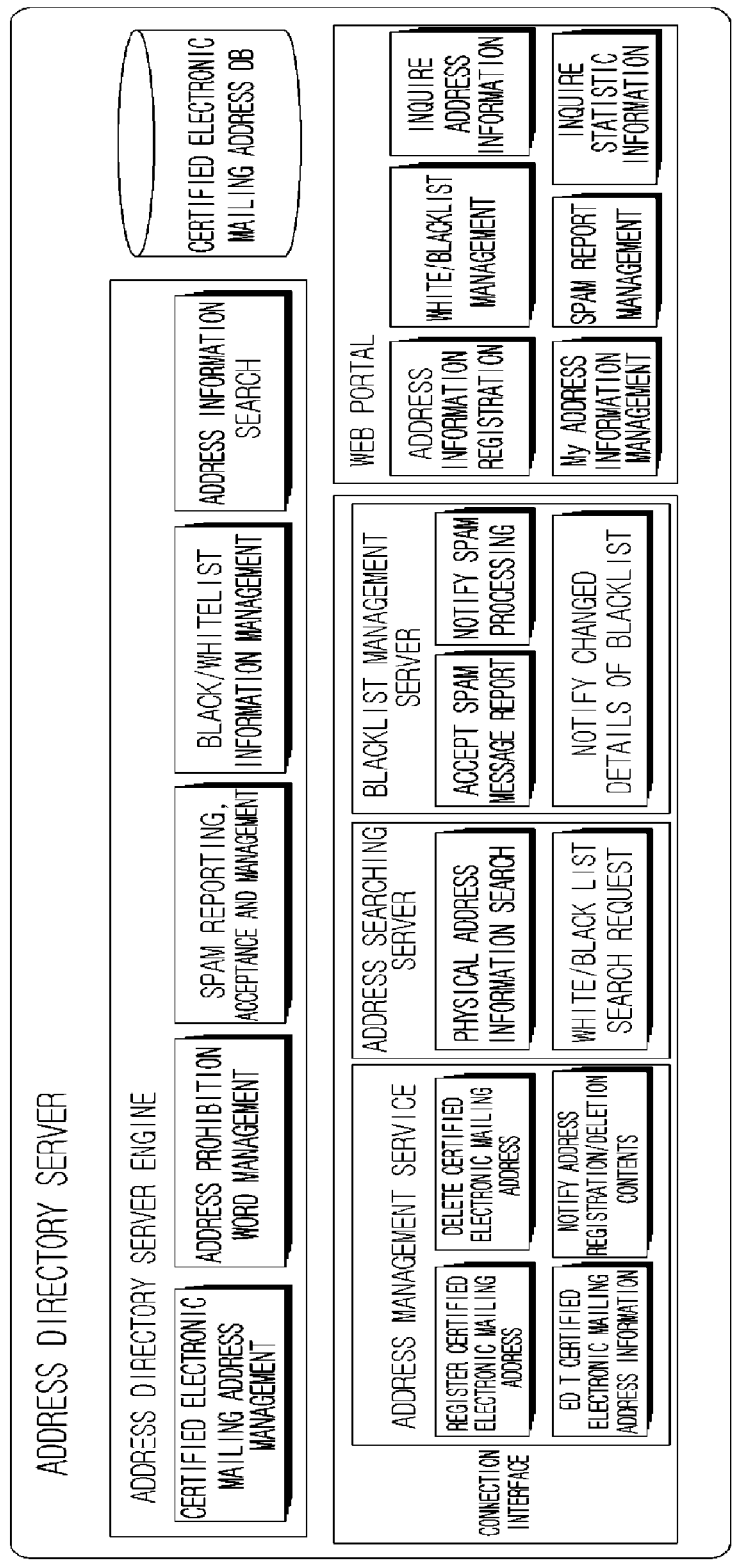
FIG. 4 is a view illustrating an address directory server of FIGS. 1A and 1B.

A functional concept of the address directory server is as illustrated in FIG. 4 and the functions thereof will be described in the following Table 6.

TABLE 6

| No. | Name of function | Description |
|---|---|---|
| 1 | Managing of certified electronic mailing address | managing such as new registration and change of certified electronic mailing address of the transceiving entity and certified sender/receiver read information of transceiving entity having certified electronic mailing address and record information |
| 2 | Managing of spam report | a function of accepting a report of a spam received from the communication client and notifying the result |
| 3 | Managing of white/black list | creating and managing/storing white-list which is a list of certified electronic mailing addresses a function of accepting and processing a request to search the whitelist management such as creating and editing a black list for the certified electronic mailing address which is improperly used such as a spam a function of searching the blacklist |
| 4 | Searching address information and communicating physical address | a function of accepting and returning a physical address request of the certified electronic mailing address requested by the communication messaging server a function of searching record information related therewith |
| 5 | Managing of web portal | provides a user interface related with the address management provides a system manager interface related with the address management manages system environmental information of the address directory server manages various statistic information related with the address |

(4) Electronic Document Form Register

The electronic document form register is a system that is provided by the electronic document communication hub so as to be automatically processed or utilize an e-Form type electronic document using a predetermined standard electronic document between the transceiver entities.

The electronic document form register provides a server engine that manages the electronic document form, an interface that provides a function that allows the communication client to search and download the electronic document form, and a web portal interface.

Figure 5:
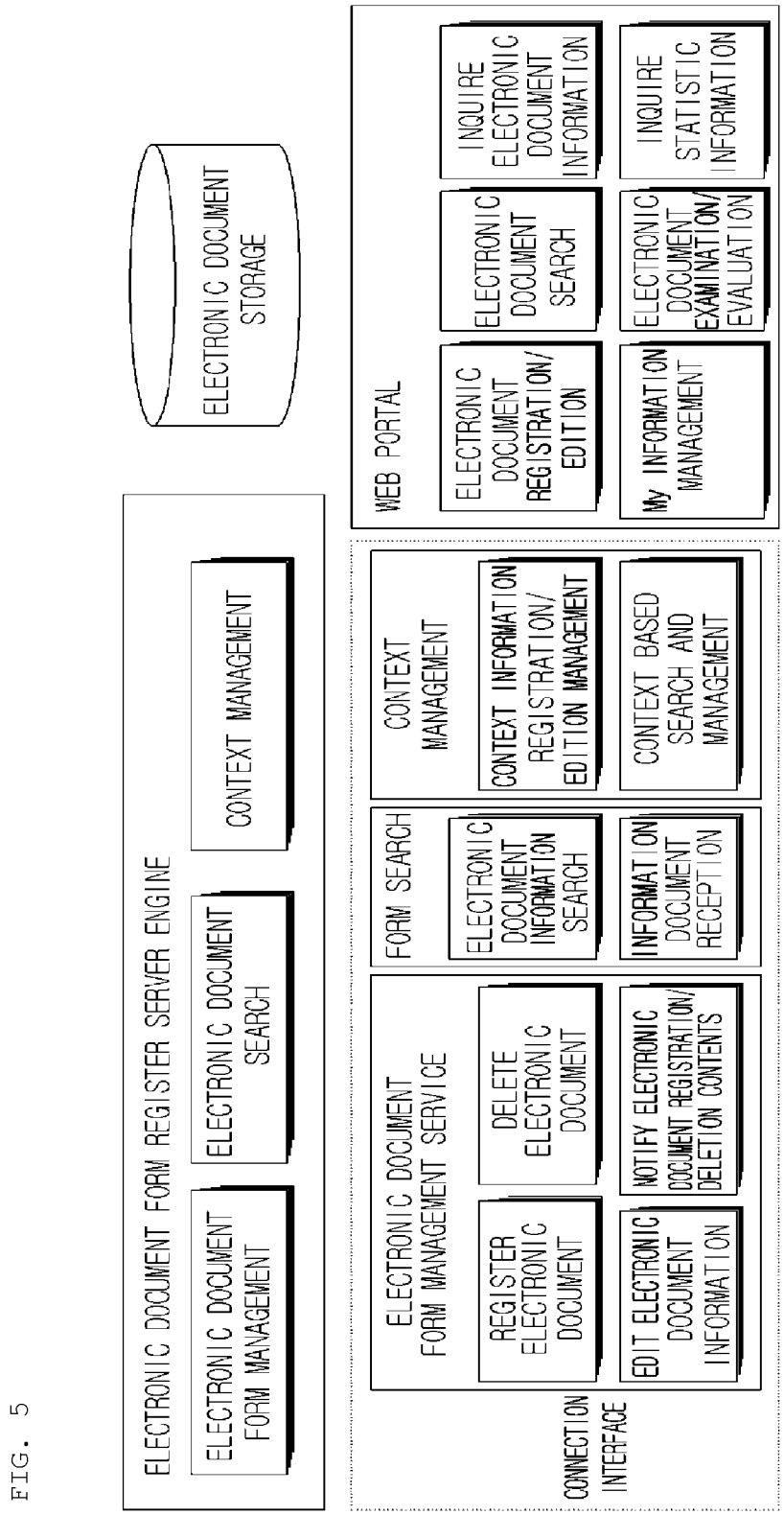
FIG. 5 is a view illustrating an electronic document form register of FIGS. 1A and 1B.

A functional concept of the electronic document form register is as illustrated in FIG. 5 and the functions thereof will be described in the following Table 7.

TABLE 7

| No. | Name of function | Description |
|---|---|---|
| 1 | Managing of electronic document form | manage to register and delete the electronic document form and edit information notifies details related with the registration/deletion of the electronic document |
| 2 | Managing to search and receive electronic document | provide a function of searching an electronic document form receive or download the searched electronic document form |

TABLE 7-continued

| No. | Name of function | Description |
|---|---|---|
| 3 | Electronic document form connection interface | provide a function of searching and downloading the electronic document while being directly connected with the communication client |
| 4 | Managing of context | additionally classify the electronic document forms in accordance with the context because different forms may be used in accordance with the context of the country or the industry even though the name of the corresponding electronic document form is same manages to register and edit the context of a country, a region, an industry, a corporate, or a process in which the electronic document form may be used |
| 5 | Function of examining and evaluating electronic document form | standby after the user submits the electronic document form for registration a process that formally registers or returns the electronic document form after evaluation of an evaluator additionally notify an electronic document form and a submitting method |
| 6 | Managing of web portal | provide a user interface related with the electronic document management provide a system manager interface related with the electronic document management manage the system environmental information of an electronic document form register server manage various statistic information of the electronic document form register |

(5) Communication Relay Server

The communication relay server is a system which is provided in the electronic document communication hub to send a message by proxy for the transmitting entity when an error occurs during the electronic document communication process between the transceiving entities in the communication system.

The communication relay server has a function therein as a communication messaging server so as to provide a basic electronic document transceiving service. Further, the communication relay server provides the communication messaging server with a unique service of the communication relay server such as relay request accepting and error message transmission through a connection interface in the case of final failure.

Figure 6:
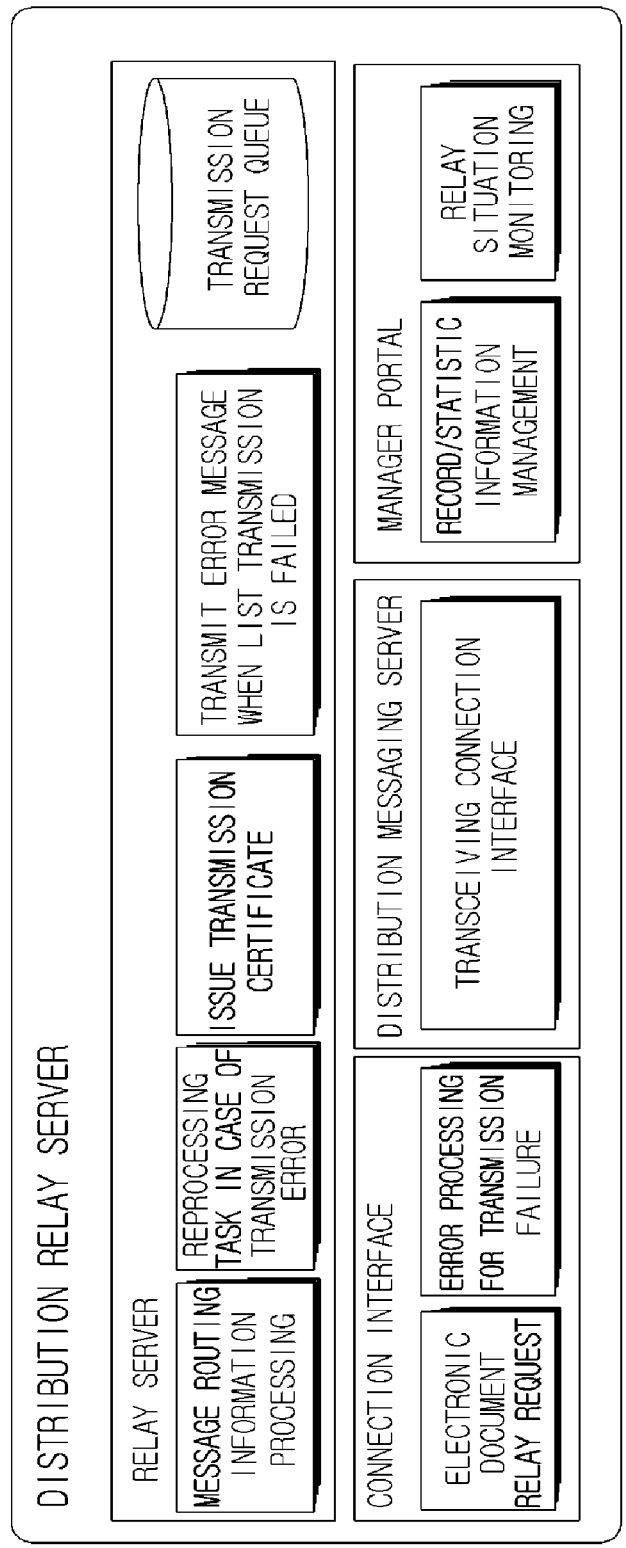
FIG. 6 is a view illustrating a communication relay server of FIGS. 1A and 1B.

A functional concept of the communication relay server is as illustrated in FIG. 6 and the functions thereof will be described in the following Table 8.

TABLE 8

| No. | Name of function | Description |
|---|---|---|
| 1 | Message routing information processing | A function of setting a route for the communication messaging server in the transceiving entity |
| 2 | Reprocessing operation in the case of transmission error | A function of resending a message if an error occurs when the message is sent to the receiving entity |
| 3 | Issuing of transmission certificate | A function of issuing the transmission certificate to a transmitting entity that requests to send a message |
| 4 | Transmitting of error message at the time of transmission failure | A function of sending an error message to the transmitting entity when the requested message sending is failed |

TABLE 8-continued

| No. | Name of function | Description |
|---|---|---|
| 5 | Requesting to relay electronic document | A function of receiving a request to relay a message in a state connected with the communication messaging server |
| 6 | Managing of records/statistic information | A function of storing and processing record or statistic information related with the message communication relay |
| 7 | Monitoring of relay situation | A function of providing a communication relay situation for the transceiving entity and monitoring a relay situation by a system manager |

(7) Certified Electronic Mailing Address

The transceiving entity and a certified sender/receiver that participate in the communication system need to receive a unique certified electronic mailing address.

The certified electronic mailing address is configured by combination of sharp [#], numbers [0 to 9], hyphen [-], and period [.].

The principles related with the configuration system of the certified electronic mailing address are as the following (1) to (3):

(1) As a front part of "#", an additional user identification configured by the combination of characters [A-Z][a-z], Korean alphabet [completed Korean alphabet, 2,350 letters], numbers [0-9], hyphen [-], and period [.] may be selectively used for the convenience of the user. In this case, the additional user identification may be managed by the electronic document communication messaging server.

(2) The additional user identification of the certified electronic mailing address should not start or end with the hyphen or the period and the length thereof is set to be 30 byte or shorter.

(3) As the additional user identification of the certified electronic mailing address, combination of characters and numbers which may destroy social customs or public morals or the other restricted symbols determined by a head of a management agency may not be used.

A correlation relationship between the certified electronic mailing address and an IP address which is an actual physical address (actual physical address of the communication message server) is managed only by the address directory server. The certified electronic mailing address and the actual physical address of the communication message server have the relationship of 1:1 or N:1. Therefore, one certified electronic mailing address does not have plural physical addresses.

A corporate/organization/personal next to "#" should have a legal responsibility of receiving the information (document) of the certified electronic mailing address. Further, the communication according to the additional user identification is divided for the convenience of the corporate/organization/personal. Therefore, the transceiving entity should have the responsibility of the communication according to the additional user identification. In this case, the transceiving entity needs to prepare a policy and management know-how of the user authentication corresponding to the additional user identification and thoroughly manage the user authentication in accordance with the know-how. Further, the transceiving entity needs to include the contents of the certified electronic mailing address with an internal identifier when the transceiving entity enters into an agreement with the management agency about the SLA before participating in the communication system.

Figure 8:
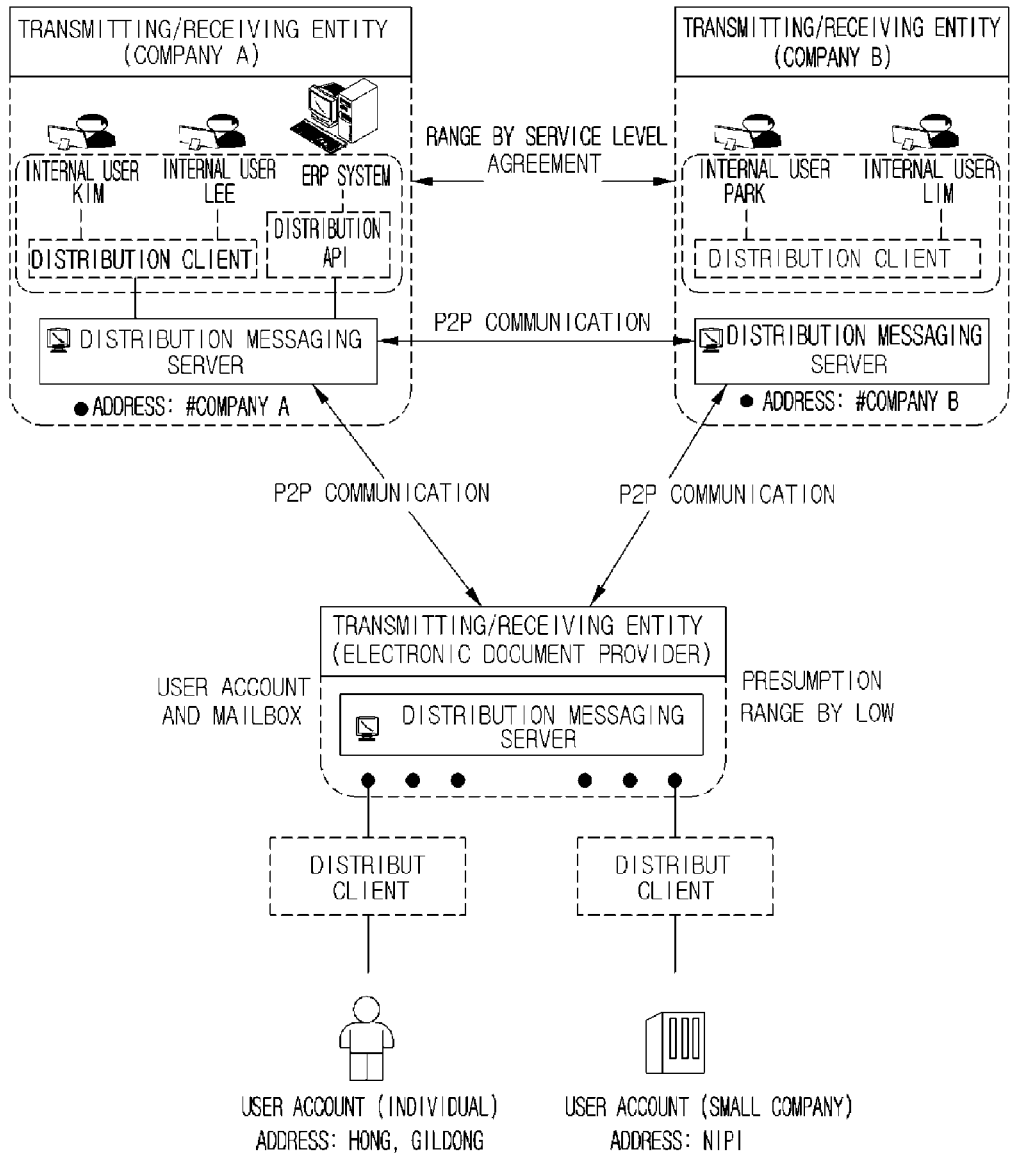
FIG. 8 is a view illustrating an effective range of a certified electronic mailing address in the electron document communication system of FIGS. 1A and 1B.

An effective range of the certified electronic mailing address in the communication system will be illustrated in FIG. 8.

The additional user identification needs to be a unique value in the transceiving entity. The individual transceiving entity is basically responsible for applying the additional user identification. Further, the transceiving entity is responsible for communication of the electronic document in accordance with the additional user identification. Therefore, if a problem occurs, the transceiving entity needs to solve the problem. The additional user identification is not included in the effective range of the communication system, but may be defined by the SLA with the management agency.

The additional user identification is used to communicate the electronic document for the convenience of the operation of the corporation and is used only for internal information of the corporation without being registered in the address directory server.

As other example of the certified electronic mailing address as described above, the following structure may be allowed.

Certified electronic mailing address=ID+separation symbol+registrant

Here, the "ID" is configured by the combination of English (or Korean alphabet or numbers), hyphen [-], and period [.], the "separation symbol" is #, and the "registrant" is configured by the combination of English (or Korean alphabet or numbers) and period [.].

"swconvergence#mke.go.kr" is an example of the certified electronic mailing address. In the above example, "swconvergence" indicates a name of the department of a government agency, "mke" indicates the government agency, "go" indicates an attribute, and "kr" indicates a country.

Figure 9A:
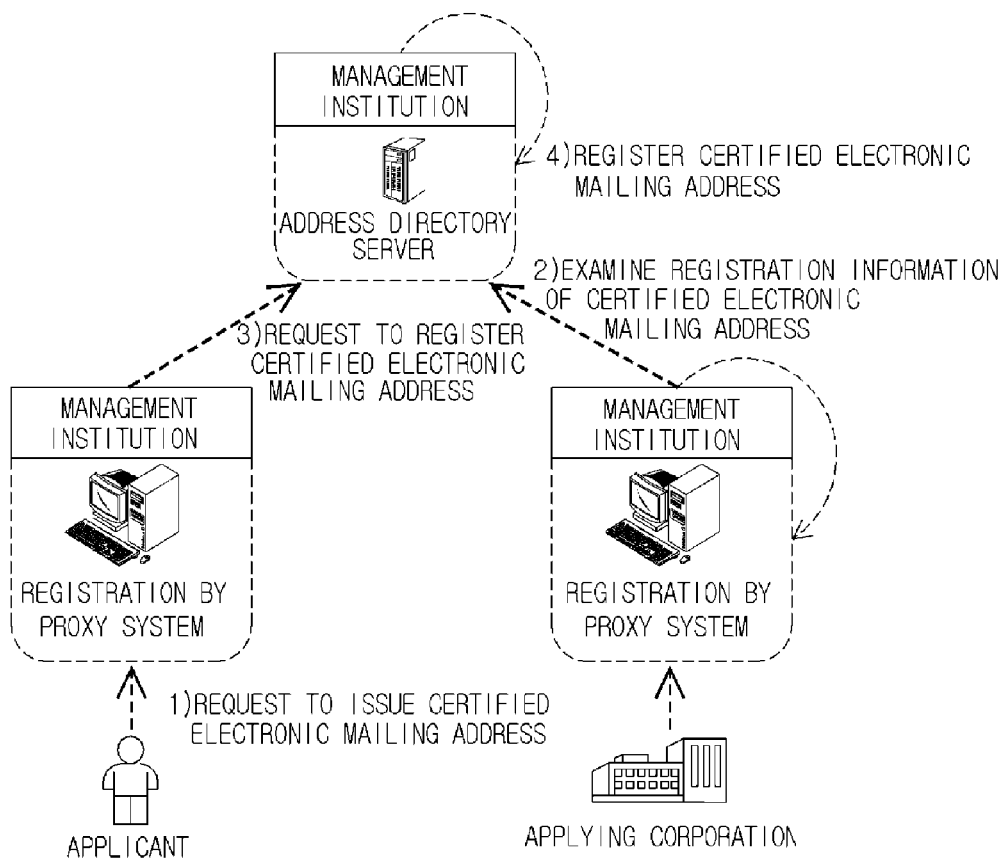
FIGS. 9A and 9B are a view illustrating an application/issuance, and operation system of the certified electronic mailing address according to an exemplary embodiment of the present invention.
Figure 9B:
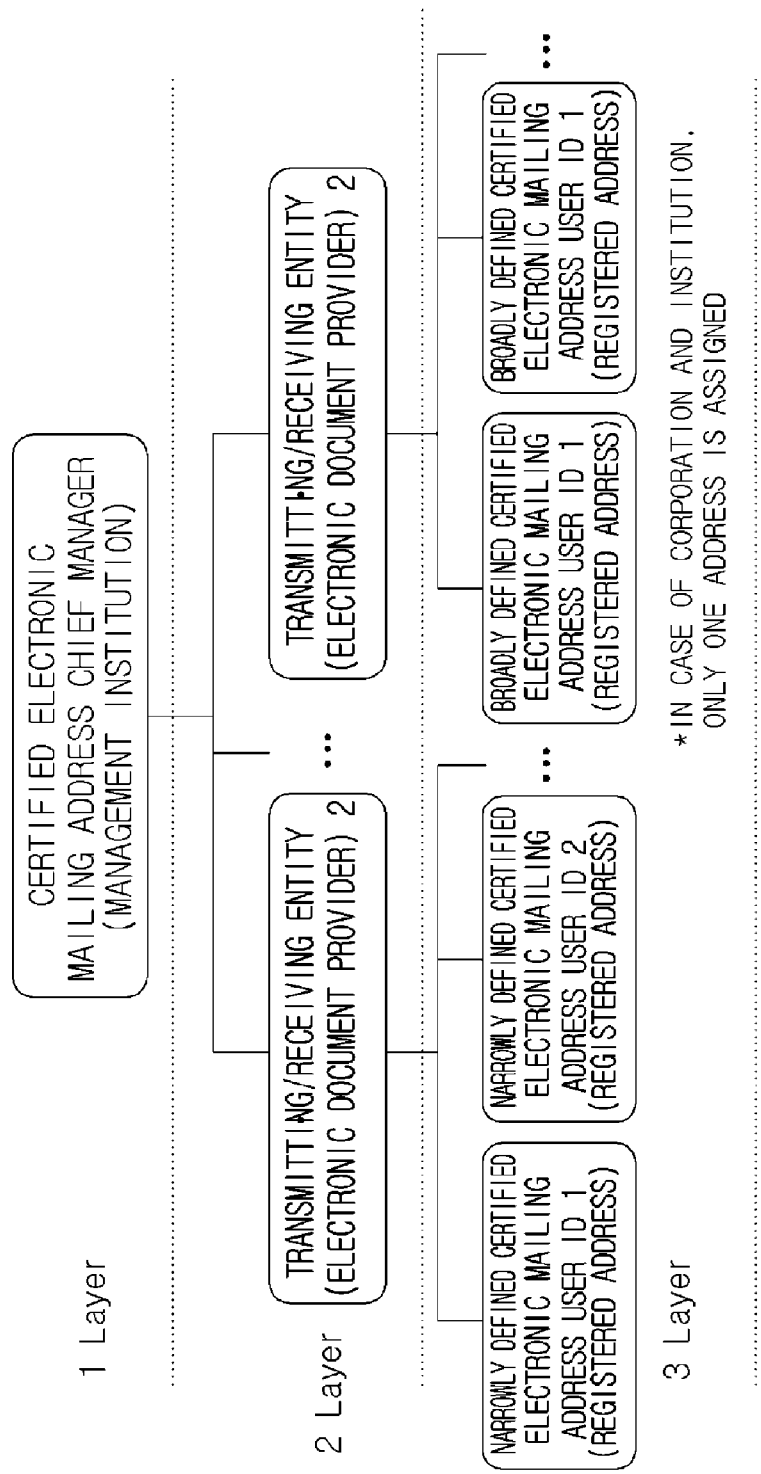

An application/issuance and operation system of the certified electronic mailing address is illustrated in FIGS. 9A and 9B and configuration related thereto will be described in the following Table 11.

TABLE 11

| configuration | Role |
|---|---|
| Management agency (comprehensively manage certified electronic mailing address) | the management agency manages the information of the certified electronic mailing address in a restricted sense as a supreme main agent of management of the certified electronic mailing address manage to issue and change a unique certified electronic mailing address ID for the transceiving entity and the certified sender/receiver |
| Registration agency | an agency that is commissioned by a management institution to apply and examine the certified electronic mailing address |
| transceiving entity | most basic unit of the certified electronic mailing address (registration address) in a restricted sense in the case of corporate/organization, issues and manages a user account or additional user identification for a plurality of users as a lower level of one certified electronic mailing address and guarantees the exclusiveness |
| (certified or internal) sender/receiver | an actual user who participates in the electronic document communication the certified sender/receiver has the certified electronic mailing address with the user account which is opened through the electronic document provider and is a transceiving unit having a legal responsibility an internal sender/receiver is a transceiving unit which is managed by the additional user identification in the transceiving entity having a legal responsibility for the transmission and |

TABLE 11-continued

| configuration | Role |
|---|---|
| | reception but does not have a legal responsibility and is not registered in the electronic mailing address directory server |

[Message Security]

One of the most important parts in the communication system is security of the sending message which requires (1) prevention of denial of the transmission/reception, (2) guarantee of integrity for the sending message, (3) authentication for a sending party, and (4) guarantee of confidentiality for the sending message. Among these, (1) to (3) are supported by the digital signature of the sender for the sending message and (4) is provided by encrypting the transmission message.

Figure 10:
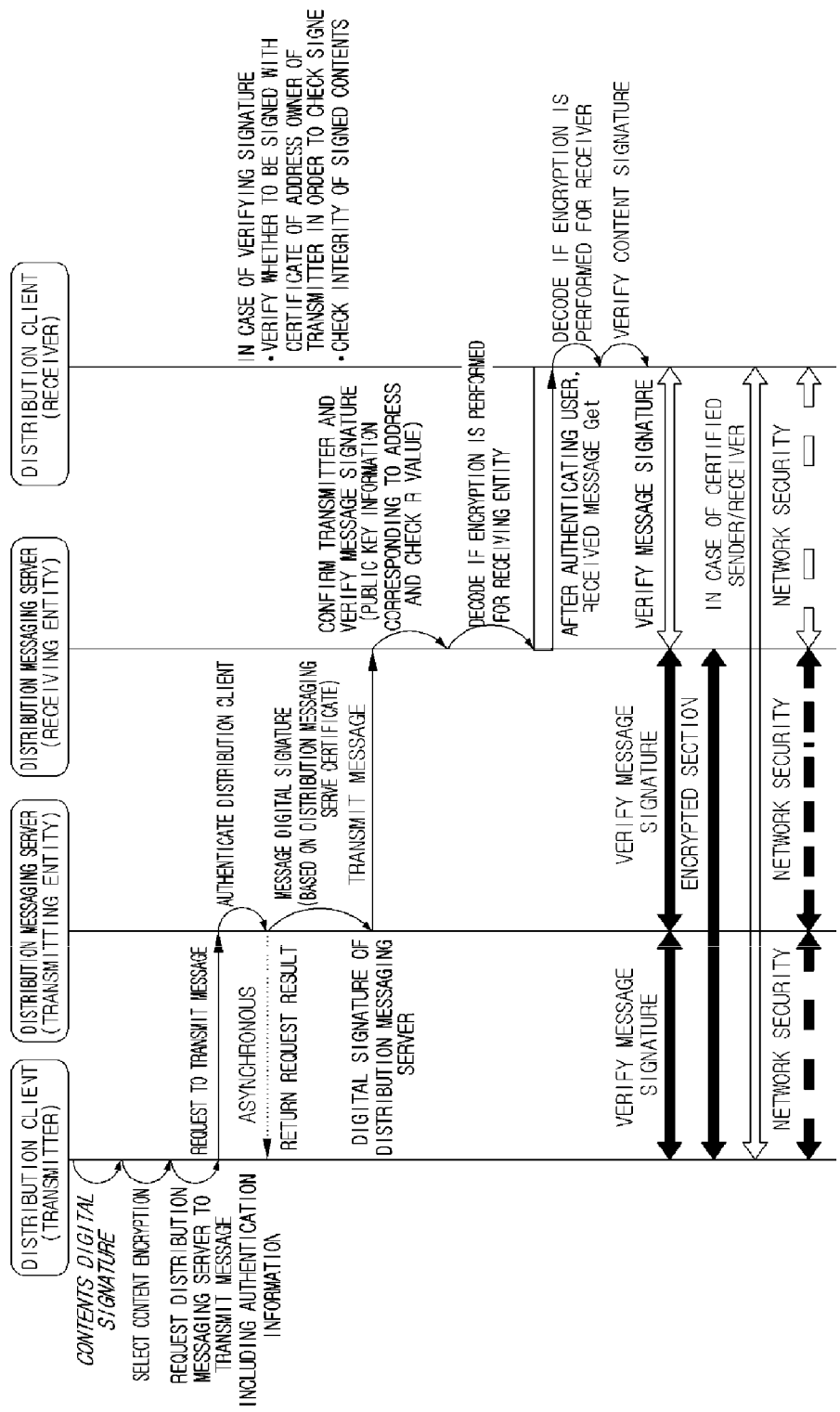
FIGS. 10 to 12 are views illustrating a message security when the electronic document is communicated in the exemplary embodiment of the present invention.

A security which is applied when the electronic document is communicated between the communication messaging servers, which is the basic of the communication system, supports the message digital signature and the encryption as illustrated in FIG. 10. The network encryption needs to be applied to each section in order to secure the sending.

The digital signature for the contents is a unique part for every application. The description thereof will be omitted. In this invention, basically, the encryption is performed with a public key of a receiver. If there is no authentication certificate of the receiver, or the receiver is an internal receiver, only the encryption of the receiving entity may be selected. Further, during the message sending, the message is sent to the communication messaging server together with the authentication information on the message. In this case, the communication messaging server mainly uses authenticate information to authenticate the client. Further, the communication messaging server adopts various authenticating methods such as IP/PW based authentication, token information based authentication by SSO (single sign on) in addition to the authentication certificate based digital signature in order to authenticate the communication client.

Hereinafter, a digital signature method will be described in detail.

When the communication messaging server is connected with the other system (other communication messaging server, the address directory server, or the communication relay server), the digital signature needs to be performed based on its own certificate. All communication messages for connecting the components in the communication system are basically digitally signed. However, the digital signature between the communication client and the communication messaging server is optional and the digital signature is applied to only a user authentication method based on the certificate. In this case, the communication messaging server is responsible for the user authentication, the integrity, and the prevention of the denial of the transmission/reception for the communication message with the communication client.

Hereinafter, the encryption method will be described in detail.

An attached document in the communication system may be sent after the sender selects the encryption in order to secure the document, which is performed for the confidentiality of the document but is different from the network encryption. Therefore, after applying the network encryption, the communication document may be additionally encrypted.

Sections to be encrypted may be (1) from the communication client of the transmitter to the communication messaging server of the receiver or (2) from the communication client of the transmitter to the communication client of the receiver as illustrated in FIG. 10. If the receiver is a certified sender/receiver and the certificate is registered in the address directory server, the encryption is performed in the section (2) from the transmitter to the receiver. Otherwise, the encryption is performed in the section (1) from the transmitter to the receiving entity.

When the attached document is encrypted, the transmitter needs to encrypt the document so as to decode the document in three steps of the communication messaging server of the transmitter, the communication messaging server of the receiver, and the communication client of the receiver if the encryption is maintained in the section (1) from the transmitter to the receiving entity. If the encryption is maintained in the section (2) from the transmitter to the receiving entity, the transmitter needs to encrypt the document so as to decode the communication messaging server of the transmitter and the communication messaging server of the receiver.

If the attached electronic document is encrypted, the communication messaging servers of the transmitting entity and the receiving entity store the electronic document in an encrypted state in order to manage the record. Therefore, if the sender/receiver wants to verify the communication certificate based on the decoded document, the electronic document is decoded to verify the communication certificate. For this reason, the communication messaging server needs to continuously manage a private key of a revoked certificate and a password for accessing to the private key.

Hereinafter, an outline of the encryption in the encryption method will be described.

If the transmitter determines that the confidentiality of the message which is communicating in the communication is assured, the following encrypting process needs to be observed.

As a ciphertext, an Enveloped-data content type which is represented by a ContentInfor structure which is suggested by IETF RFC 3852 "CMS(Cryptographic Message Syntax)" which are used in and outside the country as a standard is used.

※ RFC 3852 CMS

1) IETF is a main agent which defines a standard of an internet operation protocol such as TCP/IP. IETF is supervised by IAB (Internet Architecture Board, a surveillance body of the internet society for technical improvement of Internet). The members of IETF are selected from individuals or members of an organization of the Internet Society. The standards created in IETF are represented in a RFC type and many PKI based solutions (various authenticating systems, a time stamp, or a size of a third party storing institution) in and outside the country are made based on the RFC standard document.

2) The CMS(Cryptographic Message Syntax) is created based on "PKCS#7 v1.5" first created by RSA corporation. RFC2630 is created with the RFC standard standardized by IETF. In the first PKCS#7, only key transfer (a symmetric key used for encryption is delivered to the other party using the RSA) method is provided. In contrast, in the CMS of RFC2630, key agreement (a method that delivers the key using a DH algorithm) is added.

3) Thereafter, RFC3369 in which the algorithm part is separated and various key management methods are applied is established in 2002. However, various problems of RFC3369 are reported and thus a finally corrected version is RFC3852 which is applied in this invention.

As an additional application standard, an algorithm which is used in Content Encryption (an electronic tax invoice package which will be actually transmitted) at the time of creating the ciphertext or a parameter corresponding to the algorithm follow IETF RFC 3370 "Cryptographic Message Syntax (CMS) Algorithm" and IETF RFC 4010 "Use of the SEED Encryption Algorithm in Cryptographic Message Syntax (CMS)".

Hereinafter, encryption target data in the encryption method will be described.

Figure 11:
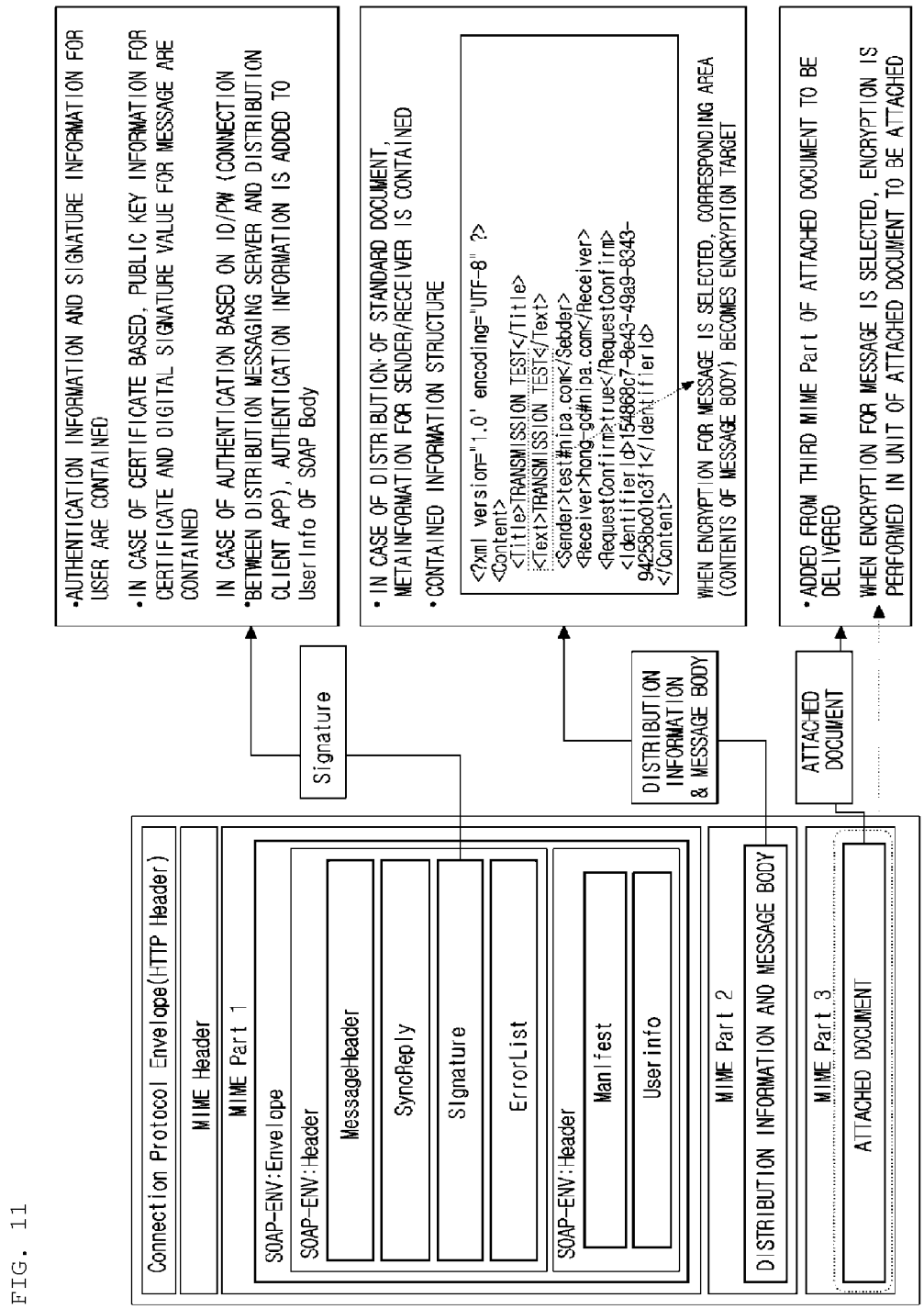
Figure 12:
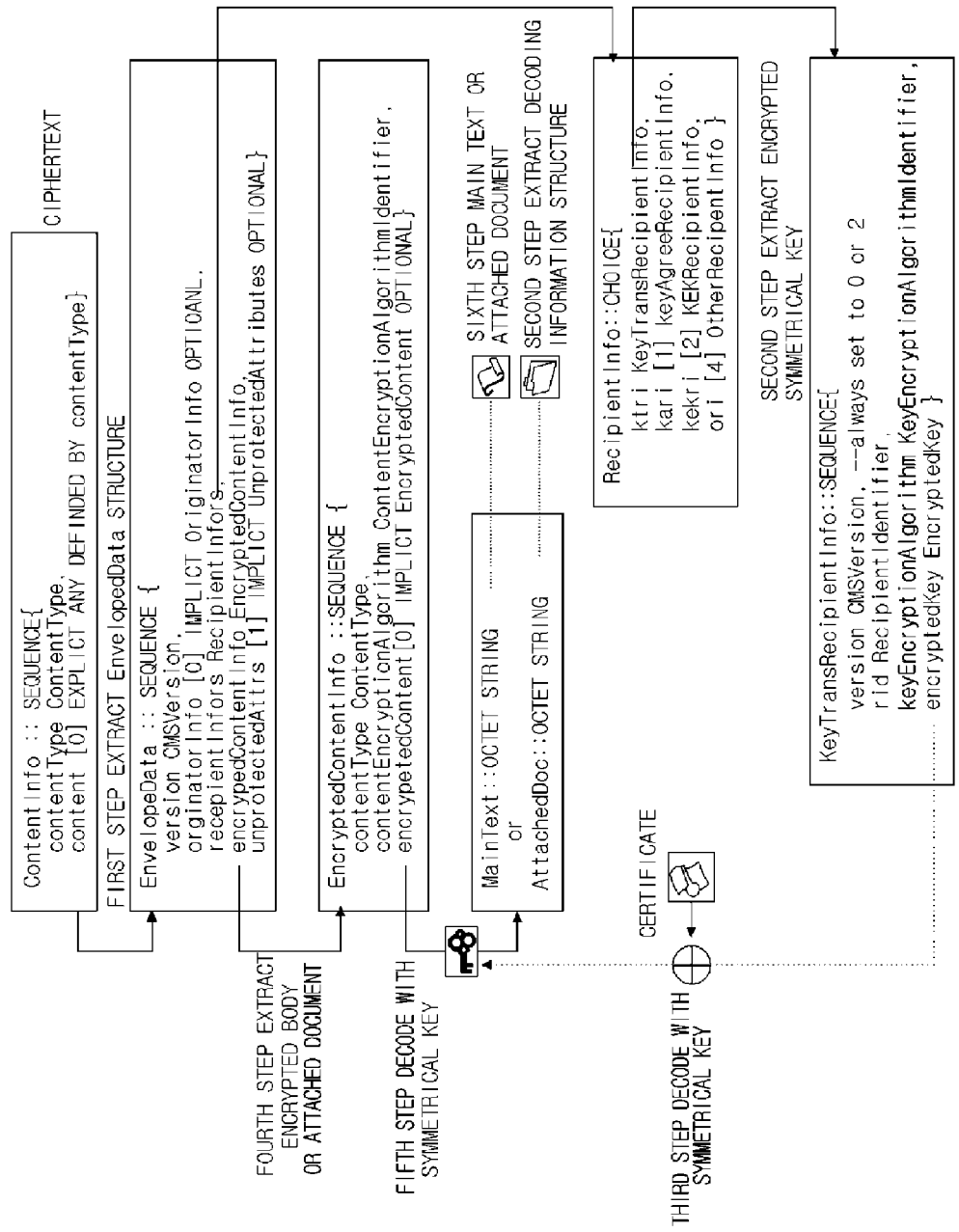

Referring to FIG. 11, the encryption target of a message to be delivered are the following (1) and (2).

(1) Communication information which is input in a second MIME (2) A <text> region of the message body in which an actual content of a main text is input and an attached document The Text in the message body and the attached document are separately encrypted and included in a corresponding position.

A first encryption target is the content of the main text which will be delivered to the receiver and has a value in the <Text> section in the XML body.

Next, a configuring method of the target data will be described. The data follows ASN.1 Basic Encoding Rules (BER) and observes Distinguished Encoding Rules (DER).

Hereinafter, acquisition and verification of encryption certificate in the encryption method will be described.

In order to create a ciphertext, a certificate of a receiver side that decodes actual data needs to be acquired. In order to acquire the certificate, the transmitter needs to be connected to the address directory server so as to acquire a certificate for a receiver (or receiving entity). In this case, depending on whether the acquired certificate is a certificate of the receiving entity or a certificate of a certified receiver, a section in which the confidentiality is maintained is varied.

If the transmitter selects the encryption for the transmission message, the transmitter performs the encryption based on the acquired receiver (or receiving entity) certificate and transmits a message to the receiver. Even when an error occurs during the message transmission so that the communication relay hub is requested to transmit the message, the message is transmitted without changing the encrypted contents.

[Network Security]

In order to keep a confidentiality of the message communicated between the transmitter and the receiver, SSL (Secure Sockets Layer) is applied to all sections of the electronic document communication (between the communication client and the communication messaging server of the messaging transmitter, between the communication messaging servers of the transmitter and the receiver, and between the communication messaging server and the communication client of the receiver) for the network security.

[Message Transceiving Process]

Various task processes are present between the interested parties in the communication system and between the systems. There is a most basic message transceiving process in the communication system and various processes are provided to support the basic message transceiving process.

The message transceiving process is a process that directly sends and receives a message between the transmitter and the receiver and exchanges the document with the other party likes mail or e-mail.

Figure 13:
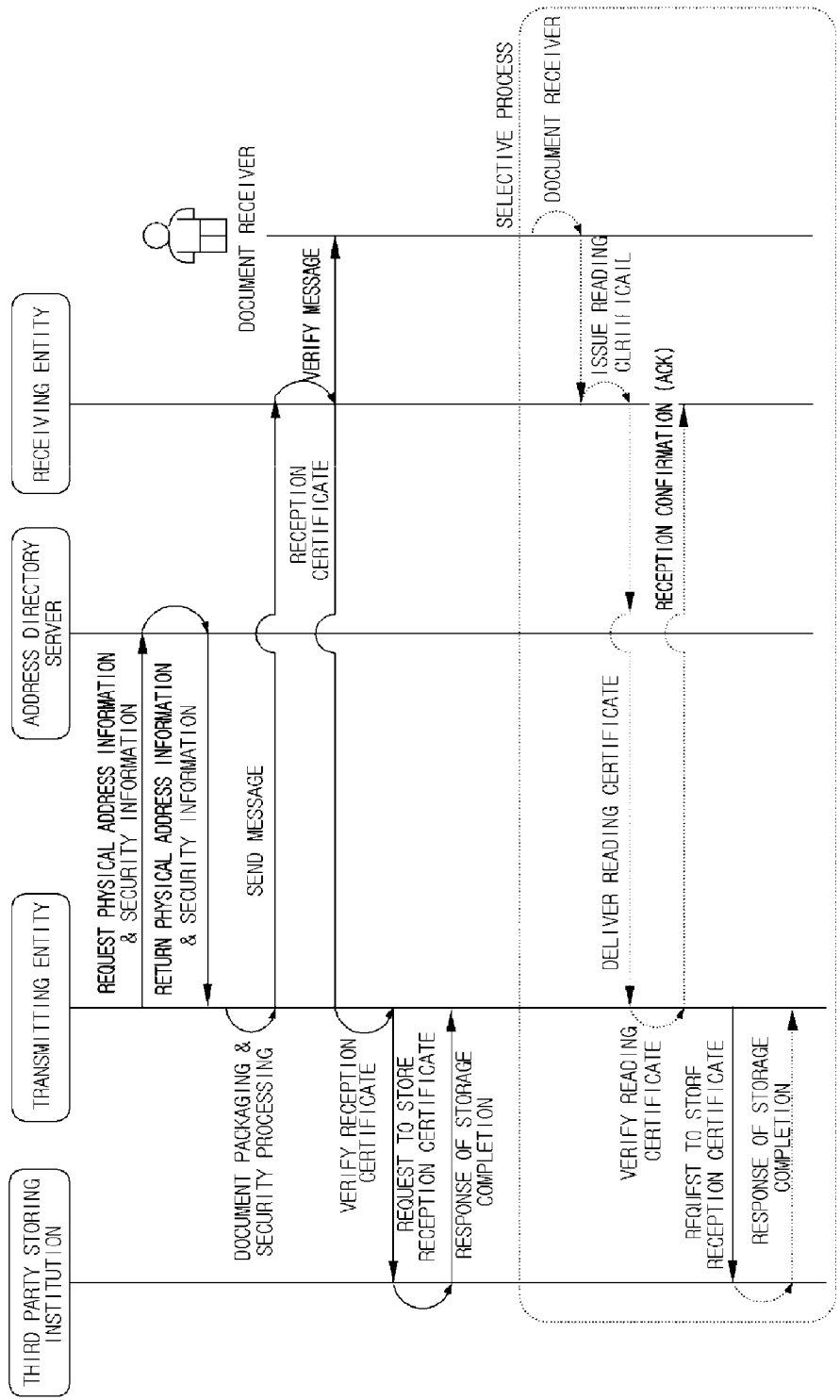
FIGS. 13 to 16 are views illustrating a message transceiving processor in the exemplary embodiment of the present invention.

In order to transmit/receive the message between the transmitter and the receiver, a process in four steps of (1) acquiring a physical address and security information for the receiver, (2) sending the message and confirming the sending, (3) confirming the reception of a receiver of a task, and (4) issuing and storing a communication certificate are provided. In this case, in the process for the communication certificate, a flow of the detailed process may be changed depending on a content to be evidenced. A basic flow thereof is illustrated in FIG. 13 and described in detail in the following Table 22.

TABLE 22

| No. | Name of process | Description |
|---|---|---|
| 1 | Acquiring physical address and security information for receiver | the transmitting entity requests the address directory server for physical address information to which a message is actually delivered and security information (if a reception encryption for the transmission message is necessary) based on the address information of an opposing party and acquires the information<br>in this process, the address directory server checks whether a requested certified electronic mailing address of the receiving entity is on the blacklist or the white-list (if the electronic mailing address is on the blacklist, message sending error is notified to the transmitting entity)<br>the communication messaging server of the transmitting entity requests the address directory server for the physical address and the security information of the receiver and then receives the physical address and the security information |
| 2 | Transceiving message and confirming sending | the transmitting entity packages the message in accordance with the technical standard and then performs digital signature based on the certificate of the communication messaging server<br>the communication messaging server sends a packaged and digitally signed message to the physical address which is acquired in advance<br>the communication messaging server of the receiving entity who receives the message verifies a basic packaging structure of the message, a validity of the digital signature, and the compatibility to the transmitter and then creates a reception certificate or an error message for confirming the reception the communication messaging server of the receiving entity sends a created reception certificate to the transmitting entity<br>the communication messaging server of the transmitting entity receives the reception certificate and 1) verifies a compatibility of the reception certificate, 2) attaches the verified information to the reception certificate, and 3) autonomously stores the reception certificate and requests the third party storing institution to store the reception certificate<br>the sending and the confirmation of the sending are performed by synchronous message processing |
| 3 | Confirming reception of receiver of task | if the transmitter requests a reading certificate of the receiving entity at the time of sending the message, the receiving entity creates a reading certificate that evidence the reading confirmation at the time of reading the message and sends the reading certificate to the transmitting entity<br>if the receiving entity transmits the reading certificate to the transmitting entity, the transmitting entity that receives the reading certificate 1) verifies a compatibility of the reading certificate, 2) attaches the verified information to the reading certificate, and 3) autonomously stores the reading certificate and requests the third party storing institution to store the reading certificate |
| 4 | Issuing and storing communication certificate | when the communication is evidenced in every step, the transmitting entity receives certificates for the reception, reading, and transmission in accordance with the steps from the receiving entity or the communication relay server and stores the certificates in the third |

TABLE 22-continued

| No. | Name of process | Description |
|-----|----|----|
| | | party storing institution to establish a legal basis |

The message transceiving process is divided into a transmitting process and a receiving process. Further, the transmitting process is divided into a synchronous transmission and an asynchronous transmission depending on the connection method between the communication client and the communication messaging server.

Figure 14:
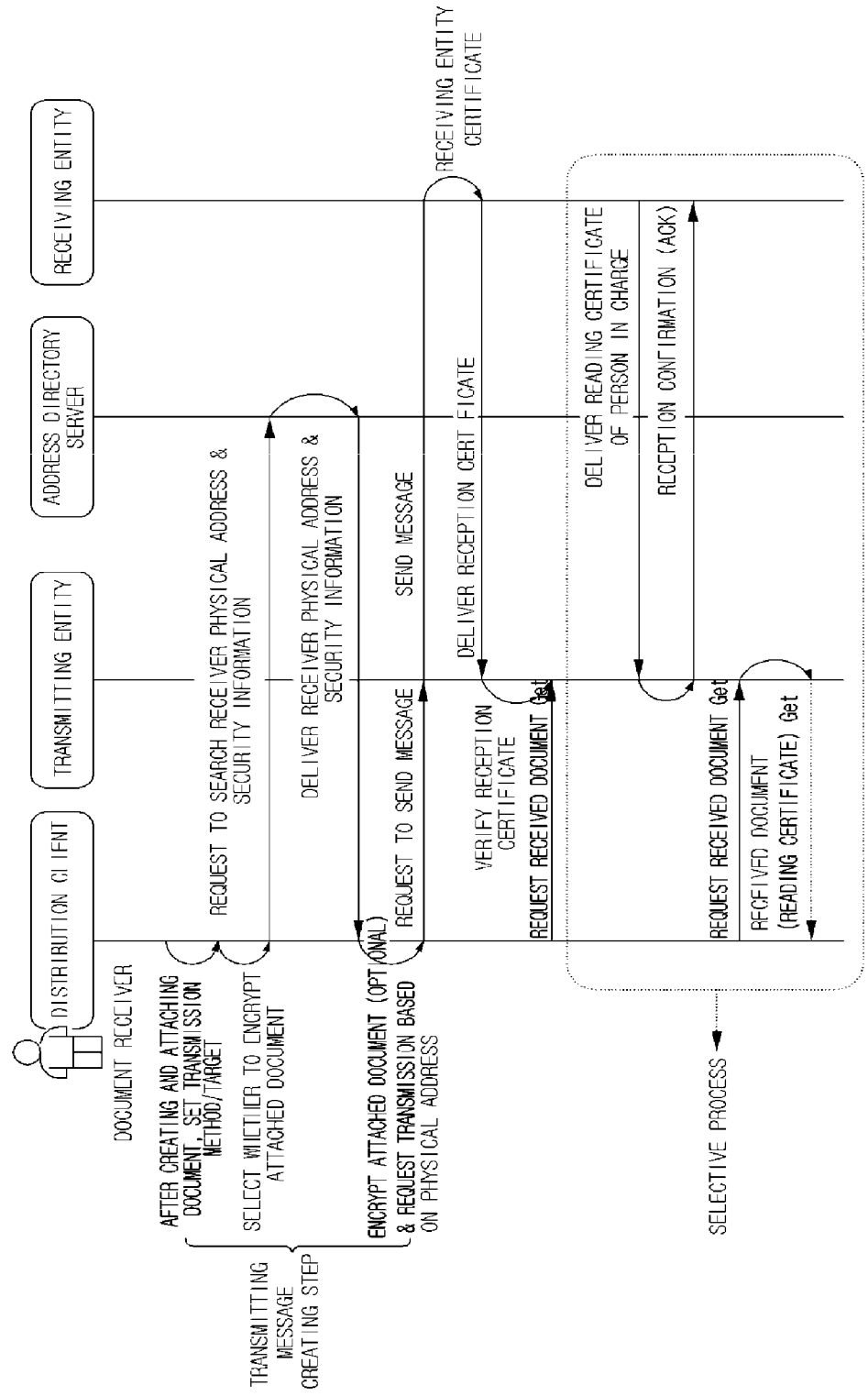

Hereinafter, the synchronous message transceiving process will be described with reference to FIG. 14 and Table 23.

When the communication client of the transmitting entity requests the communication messaging server to transmit a message, the synchronous message transceiving process is a process that transmits a message to the communication messaging server of the receiving entity in real time basis and synchronously receives a reply therefor from the communication messaging server of the transmitter. According to the synchronous process, the communication client instantly checks the result of the transmission so that the definition of the task process may be simplified.

The synchronous message transceiving process will be described in detail in the following Table 23.

TABLE 23

| No. | Name of process | Description |
|-----|----|----|
| 1 | Acquiring physical address and security information for receiver | similar to the above-described message transceiving process. See a physical address acquiring process as for the detailed process. |
| 2 | Transceiving message and confirming transmission | the communication client of the transmitting entity cerates and attaches a document, sets a transmitting target and transmitting method (encryption or reception of the reading certificate), and requests the communication messaging server of the transmitting entity to transmit the message. The communication client waits the response without disconnecting the communication<br>the communication messaging server of the transmitting entity receives the message and then transmits the message to the communication messaging server of the receiving entity<br>the communication messaging server of the transmitting entity receives a response message for the transmission from the receiving entity (for this process, see the process of transmitting a message and confirming the transmission in the above-described message transceiving process)<br>the communication messaging server of the transmitting entity synchronousely returns the received response message through the communication section connected to the communication client. |
| 3 | Confirming reception of receiver of task | similar to the above-described message transceiving process |
| 4 | Issuing and storing communication certificate | similar to the above-described message transceiving process |

Figure 15:
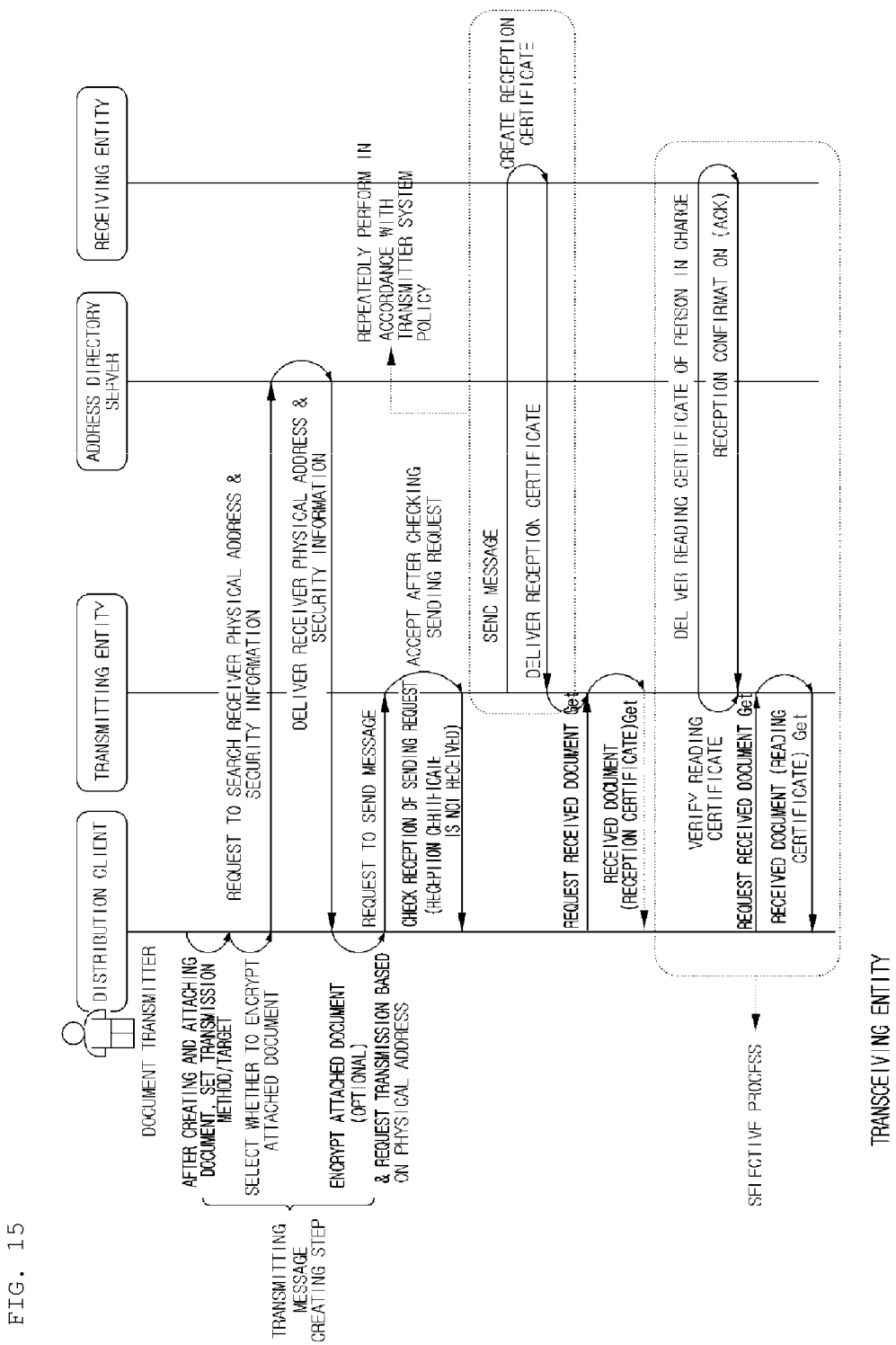

Hereinafter, the asynchronous message transceiving process will be described with reference to FIG. 15 and Table 24.

When the communication client of the transmitting entity requests the communication messaging server to transmit a message, the asynchronous transmitting process verifies only the validity of the transmission request to the communication messaging server and then returns a reception confirming message for the request to the communication client. The message is transmitted to the communication messaging server of the receiving entity in real time basis and the response therefor is synchronously received through the communication messaging server of the transmitting entity.

The asynchronous process is used when it takes time to transmit the message so that the client cannot wait the response for example, when a quantity of the message to be transmitted is large or a plurality of receivers are designated for one message.

The asynchronous message transceiving process will be described in detail in the following Table 24.

TABLE 24

| No. | Name of process | Description |
|-----|----|----|
| 1 | Acquiring physical address and security information for receiver | similar to the above-described message transceiving process. See a physical address acquiring process as for the detailed process. |
| 2 | Request to transmit message | the communication client of the transmitting entity cerates and attaches a document, sets a transmitting target and transmitting method (encryption or reception of the reading certificate), and requests the communication messaging server of the transmitting entity to transmit the message.<br>the communication messaging server of the transmitting entity receives the message and verify the validity of the transmitting request, synchronously returns the reception confirmation for the transmitting request and then completes the communication |
| 3 | Transmit message to receiver | the communication messaging server of the transmitting entity searches the transmitting request message received from the communication client and then transmits the transmitting request message to the receiver<br>the communication messaging server of the transmitting entity synchronously receives the response message (reception certificate or error message) for the transmission from the receiver and then stores the response message in a receiving box of the communication client which requests the transmission at first |
| 4 | Receives transmission result | the communication client accesses to the communication messaging server and requests received message Get in order to get the received message thereto<br>if a response message is transmitted from the receiving entity, the communication client receives the response message |
| 5 | Confirming reception of receiver of task | similar to the above-described message transceiving process |
| 6 | Issuing and storing communication certificate | similar to the above-described message transceiving process |

Hereinafter, a message receiving process will be described in detail.

Figure 16:
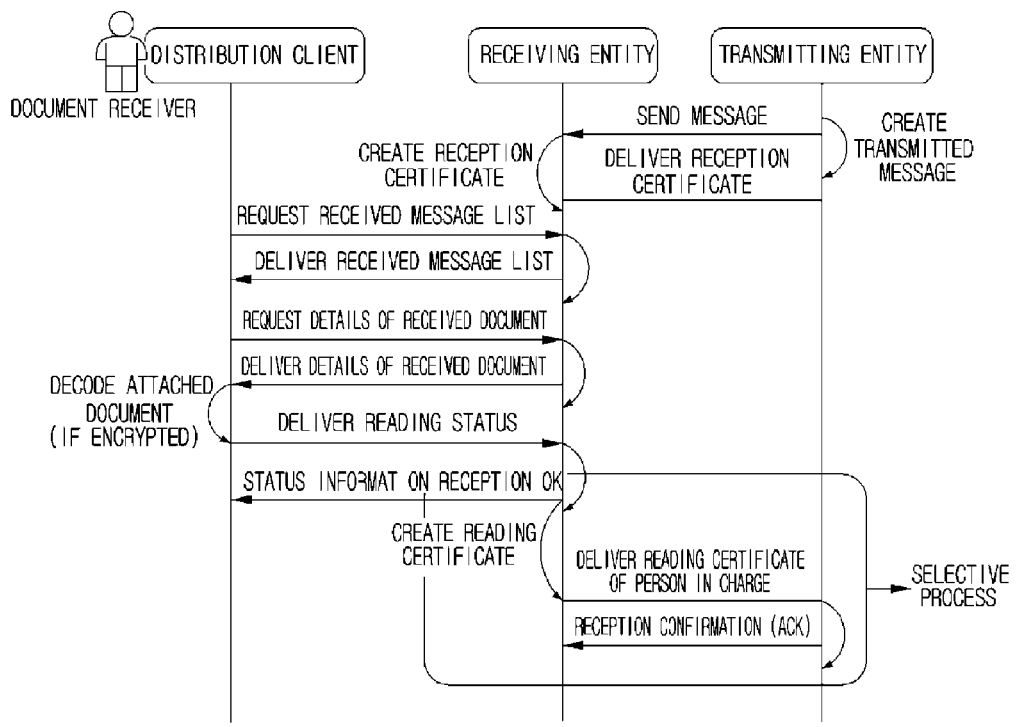

A process in which a document receiver receives a message through the communication client is illustrated in FIG. 16 and the process will be described in the following Table 25. When the communication messaging server of the receiver receives the message from the transmitter, the communication messaging server sends a reception certificate as a response thereof and stores the document in a message box of a final receiver.

The communication client frequently requests a list of the received messages to the communication messaging server. If there is a newly received message, the communication client receives a list of the received message as a response message and gets the received document through a message that requests detained information.

TABLE 25

| No. | Name of process | Description |
| --- | --- | --- |
| 1 | Receive message | when receiving a message, the receiving entity returns a response message for the received message to the transmitting entity, and stores the received message in a mail box of the corresponding user |
| 2 | Get list of received messages | the communication client of the receiving entity passes through the authentication and requests the received document to the communication messaging server the communication messaging server of the receiving entity delivers the list of the received documents stored in the mail box of the user who requests the received document to the communication client as a synchronous response |
| 3 | Get received document | if the receiver requests to read detailed information of the message from the list of the received messages, the communication client requests the communication messaging server system to deliver the detailed information including the attached document of the corresponding message the communication messaging server of the receiving entity delivers the detailed information of the received document stored in the mail box and the original of the attached document to the communication client as a synchronous response |
| 4 | Send reading certificate (optional process) | if an initial transmitter requests the reading confirmation of a person in charge of reception, the communication messaging server of the receiver transmits a message including the reading certificate to the transmitter of the corresponding message at the time when the user request the detailed information for the received document if the attached document is encrypted, the reading certificate is generated at the time when the user decodes the attached document and then delivers the read status to the communication messaging server rather than at the time when the detailed information is received and then transmitted to the communication messaging server of the transmitter. In this case, if an error occurs in the process of the decoding, the status information on the error is delivered and the communication messaging server of the receiving entity delivers a decoding error message to the sender instead of the reading certificate the communication messaging server of the receiving entity receives a reception response message for the sent reading certificate message (or error message) from the communication messaging server of the transmitting entity |

[Physical Address Acquiring Process]

The transmitting entity which participates in the communication system needs to know physical actual address information based on the certified electronic mailing address before sending a message to the other party. Further, in order to encrypt a document to be additionally attached, the transmitting entity needs to know public key information of the receiver in the address directory server.

Essential steps of acquiring a physical address of the certified electronic mailing address are as follows 1) to 4):

1) the transmitting entity inquires the address directory server in order to obtain physical address information and security information based on the address information of the receiving entity 2) the address directory server receives/verifies the inquiry of the transmitting entity and then processes the inquiry 3) the transmitting entity set a route based on the received physical address to transmit a message to the receiving entity 4) the communication messaging server of the receiving entity receives the message to internally communicate the message in accordance with the user account or the internal identifier Further, a method of acquiring the physical address of the certified electronic mailing address in the communication system are classified into the following two methods (1) and (2).

(1) a method that requests the address directory server to search to get the physical address and the receiver public key at a time when the communication client inputs the address information of the receiver: 1) in order to check previously the validity of the certified electronic mailing address, 2) when the message encryption is required between the communication client and the communication messaging server (transmitting entity)

(2) a method where the communication messaging server gets the physical address from the address directory server after the communication client requests the communication messaging server to transmit the message.

Figure 17:
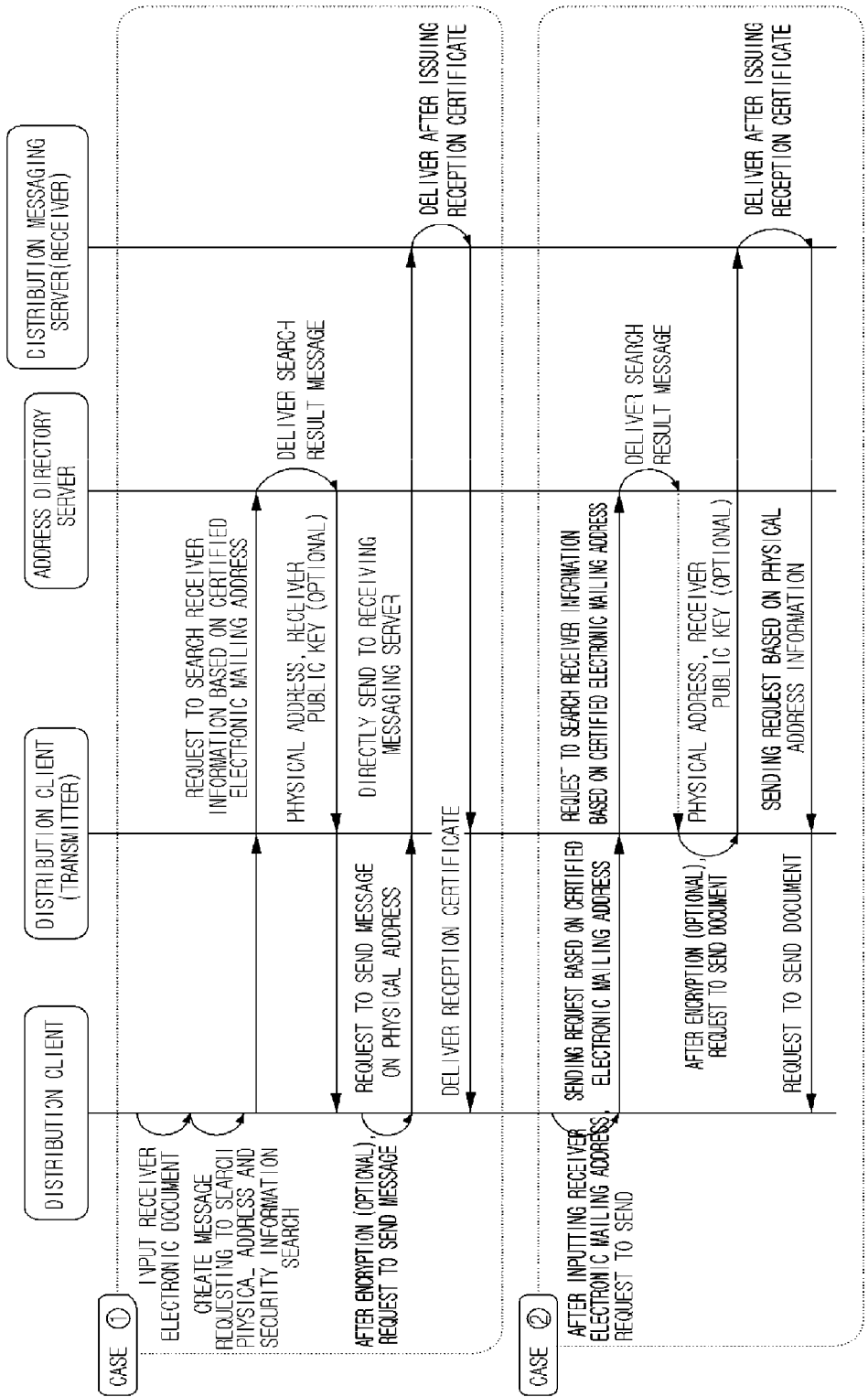
FIG. 17 is a view illustrating a physical address obtaining process according to an exemplary embodiment of the present invention.
Figure 18:
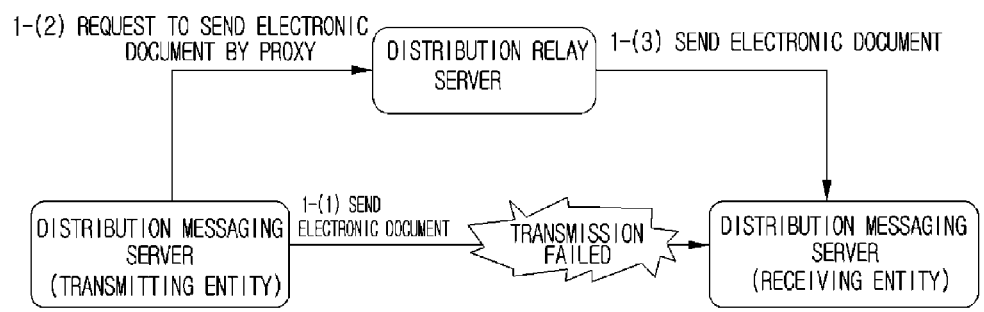
FIGS. 18 to 20 are views illustrating a communication relay supporting process according to an exemplary embodiment of the present invention.
Figure 19:
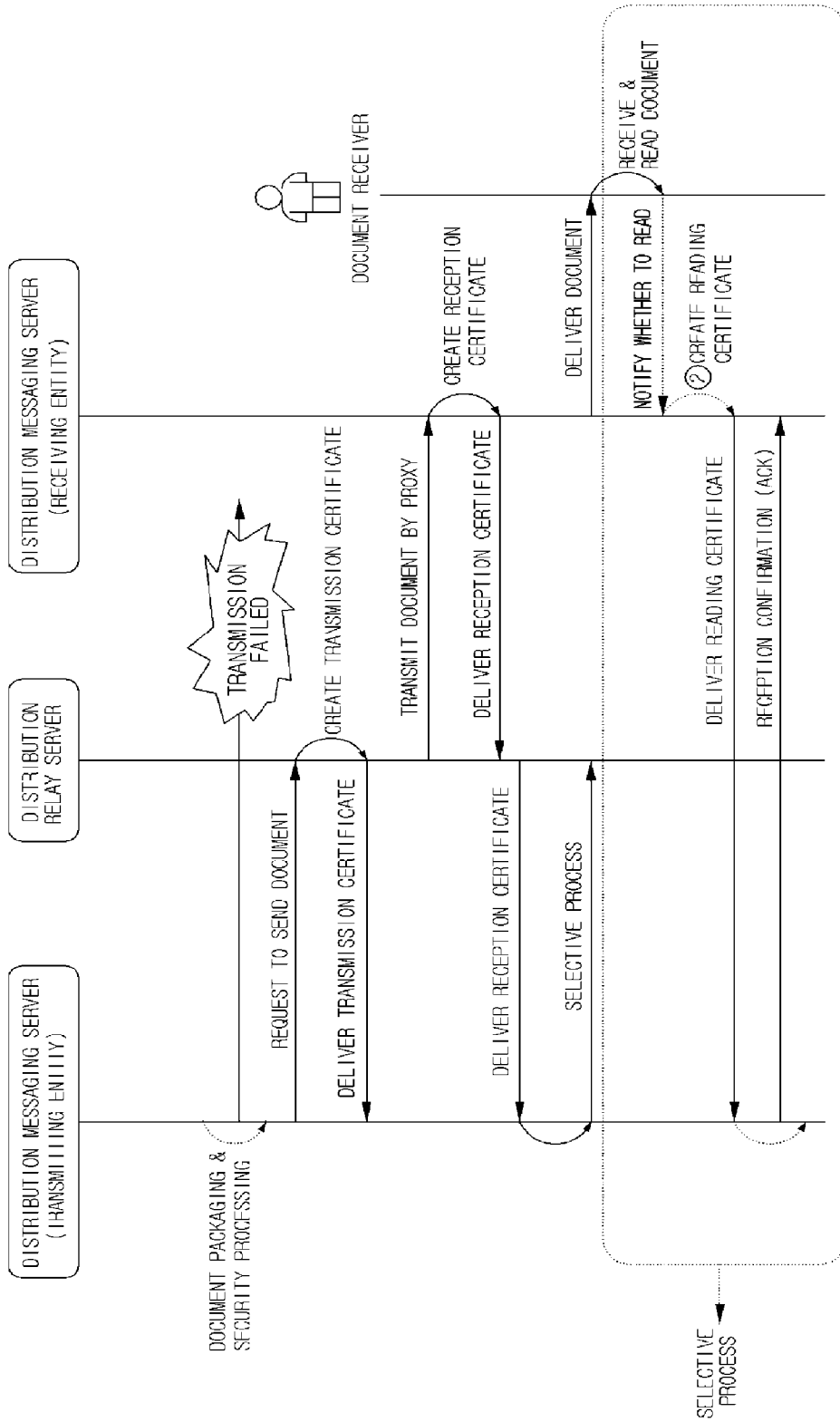
Figure 20:
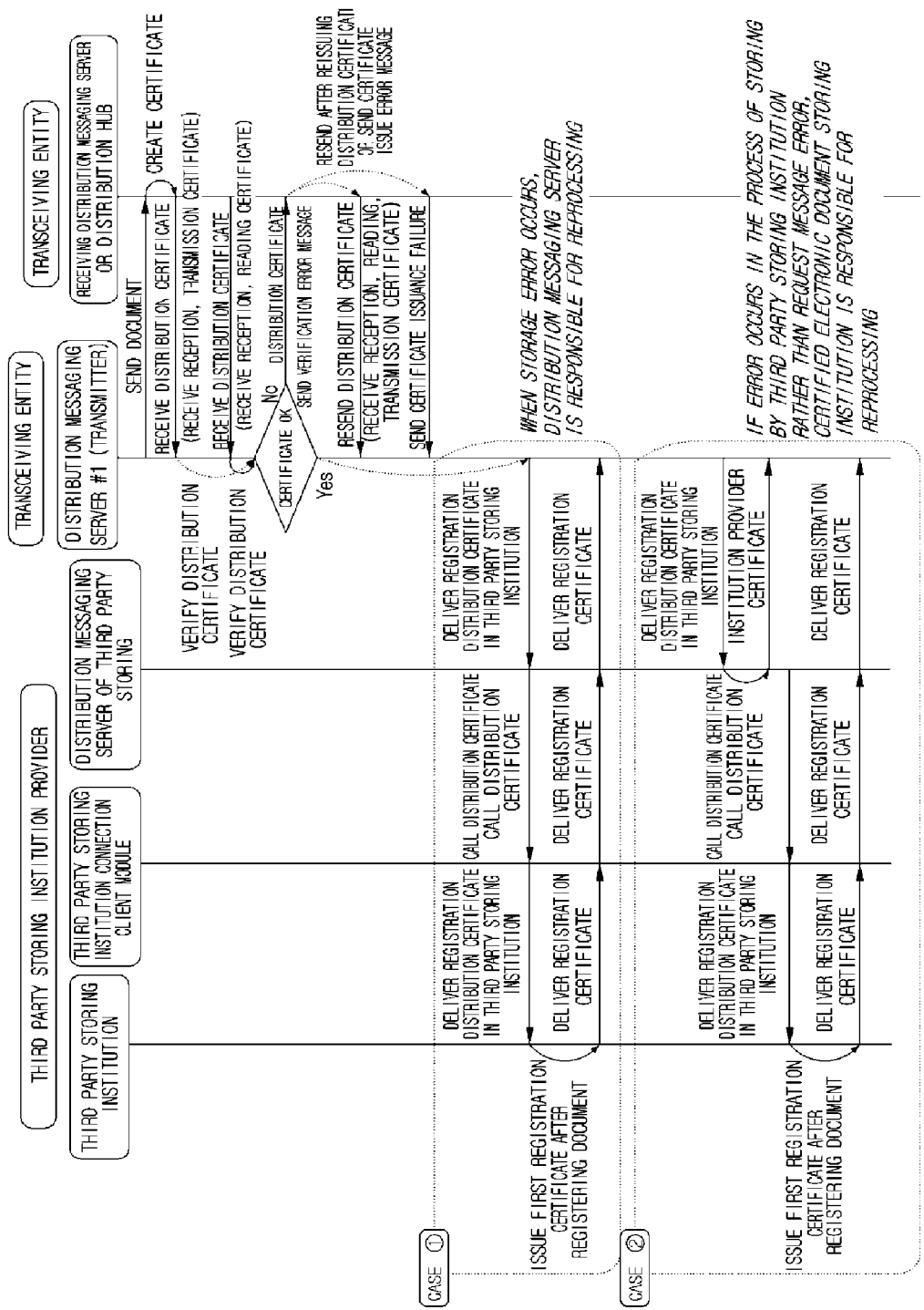

A process of acquiring the physical address of the certified electronic mailing address and the security information is illustrated in FIG. 17.

[Communication Relay Supporting Process]

The communication system basically performs the direct communication (P2P) between the transmitting entity and the receiving entity. However, additionally, if failure occurs in the message communication due to the error of the network and the communication messaging server of the receiving entity, a relay process that relays/performs by proxy the communication for the purpose of the convenience of the user and the smooth support of the communication is provided.

When the sending is failed due to the error occurring in the process of sending the message from the transmitting entity to the receiving entity, the communication relay server in the electronic document communication hub commissions/sends the message by proxy for the transmitting entity to evidence the sending of the transmitting entity and lessen the systematic load of the transmitting entity.

Figure 22:
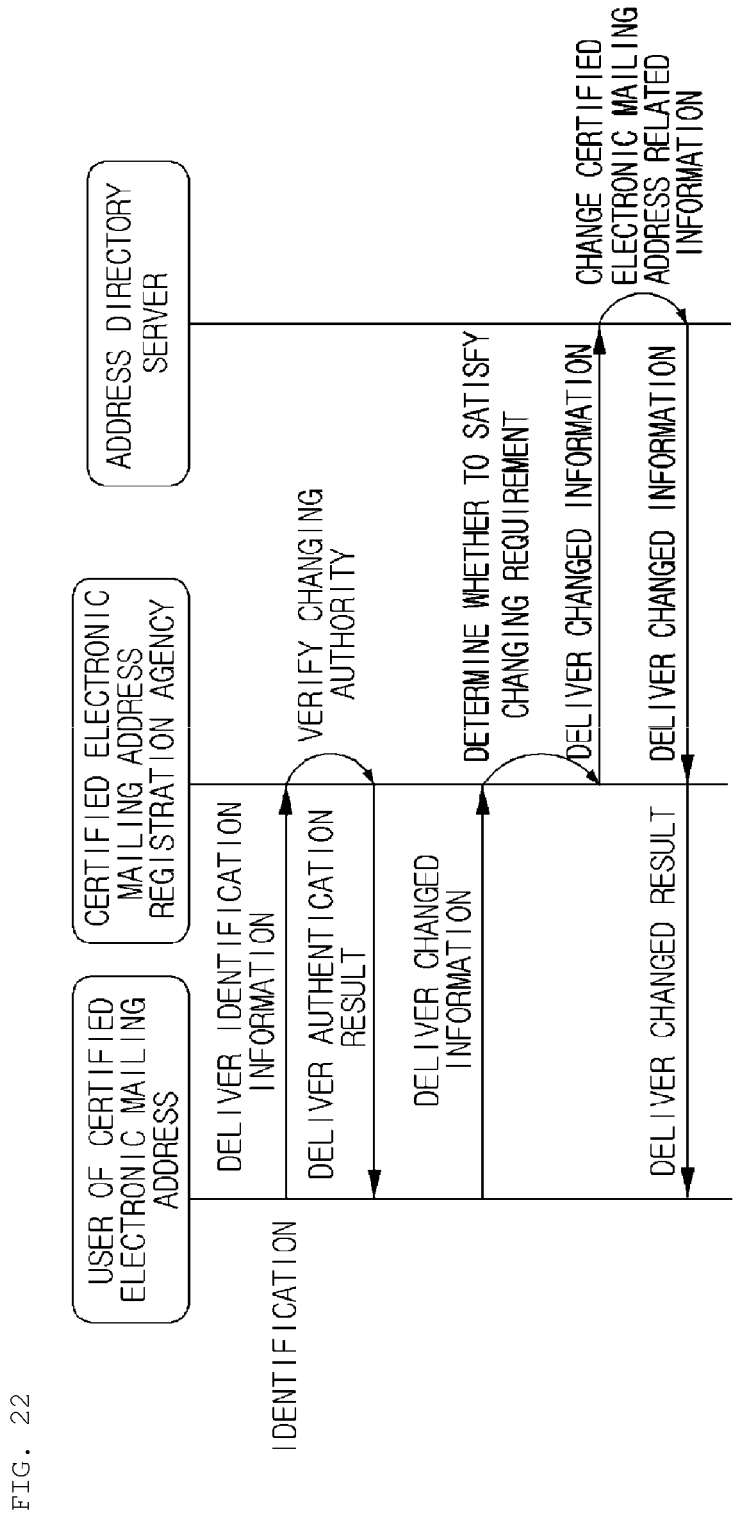
Figure 23:
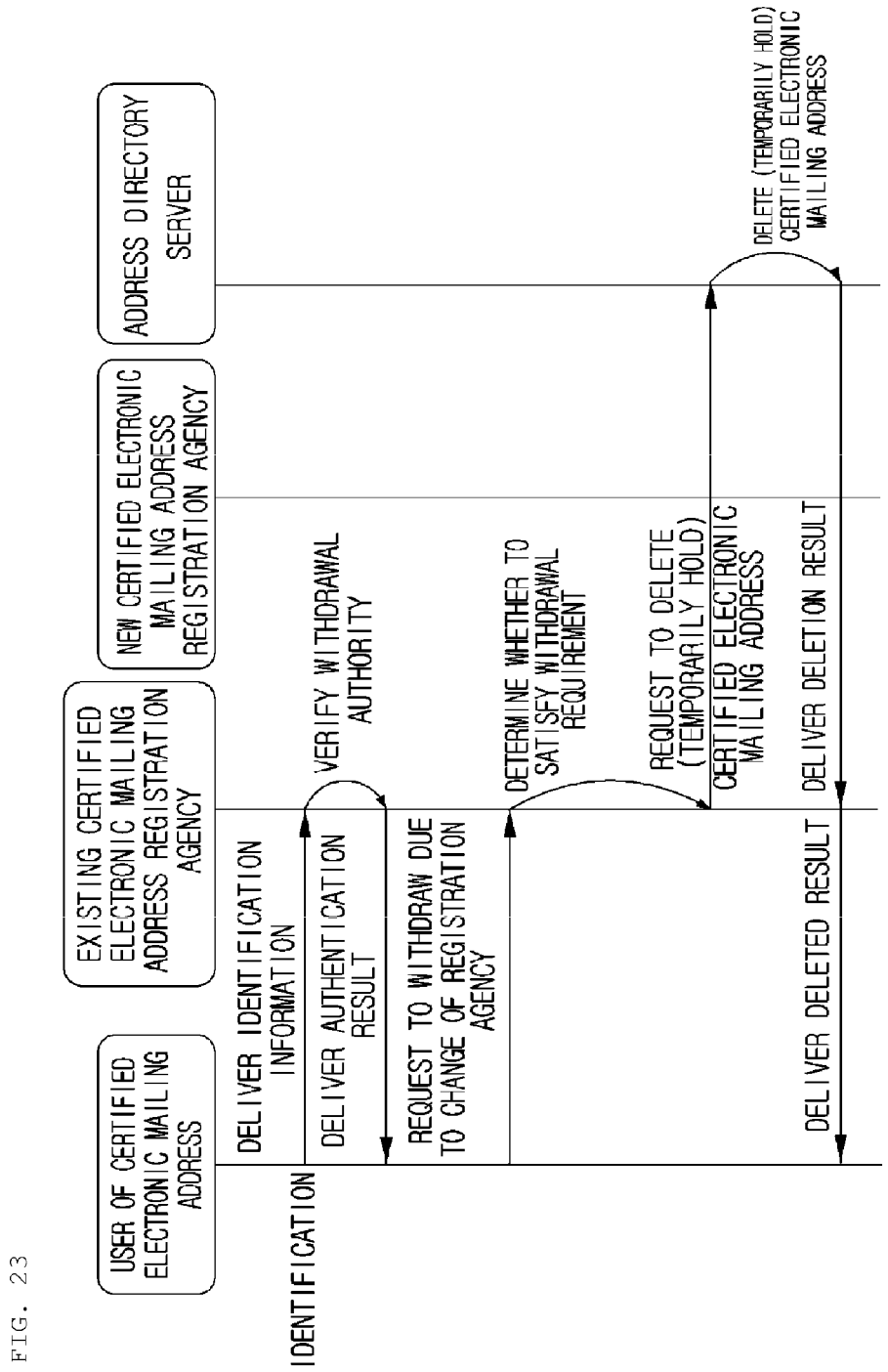

FIG. 22 illustrates a basic flow thereof and FIG. 23 illustrates a process where the communication relay server relays the message.

The following Table 26 describes the steps of the communication relay process.

TABLE 26

| No. | Name of process | Description |
|---|---|---|
| 1 | Requesting to transmit message by proxy | transmitting entity sends the message to the receiving entity after packaging and security processing when the sending is finally failed due to the error occurring during the transmission, the transmitting entity requests the communication relay server to send the message by proxy the communication relay server that accepts the sending request synchronously issues and sends the transmission certificate to the transmitting entity |
| 2 | Relaying message commission | the communication relay server transmits the message which is requested to be relayed. When the transmission is failed, the communication relay server tries to retransmit at a predetermined interval (the resending time and interval are determined in accordance with the policy of the communication relay server) if the communication relay server finally fails the transmission, the communication relay server transmits the transmission failure message to the transmitting entity that requests the relay of the message. |
| 3 | Issuing reception and reading certificate | after the receiving entity successfully receives the message, the receiving entity transmits the reception certificate to the communication relay server after the receiver reads the electronic document, the receiving entity directly transmits the transmitting entity not through the communication relay server |

[Storing Process of Communication Certificate]

As a result related with all communicating actions performed in the communication system, the communication certificate is inevitably created to be stored in the third party storing institution. This is because it is possible to establish legal presumption by storing the communication certificate having communication evidence in the third storing institute which is legally recognized.

The process of storing the communication certificate is a separate process from the electronic document communication but is a supporting process that evidences the fact of the communicating action. Therefore, all the communication messaging servers need to become a member of a specific third party storing institution that is capable of receiving and storing the communication certificate in advance.

Further, if the transmitting entity wants the certification for contents of the electronic document, the entity message in addition to the communication certificate may be stored in the third party storing institution.

The third party storing institution needs to include the following two additional systems (1) and (2) in order to receive and store the communication certificate.

(1) communication messaging server of third party storing institution provider: a system required to transceive the communication certificate with the communication messaging server in the communication system (2) third party storing institution connected client module: a module that communicates with a third party storing institution connection interface in order to store the communication certificate received in the third party institution through the communication messaging server of the third party storing institution provider However, if the third party storing institution provider also serves as the electronic document provider, the communication messaging may not be additionally necessary.

Figure 27:
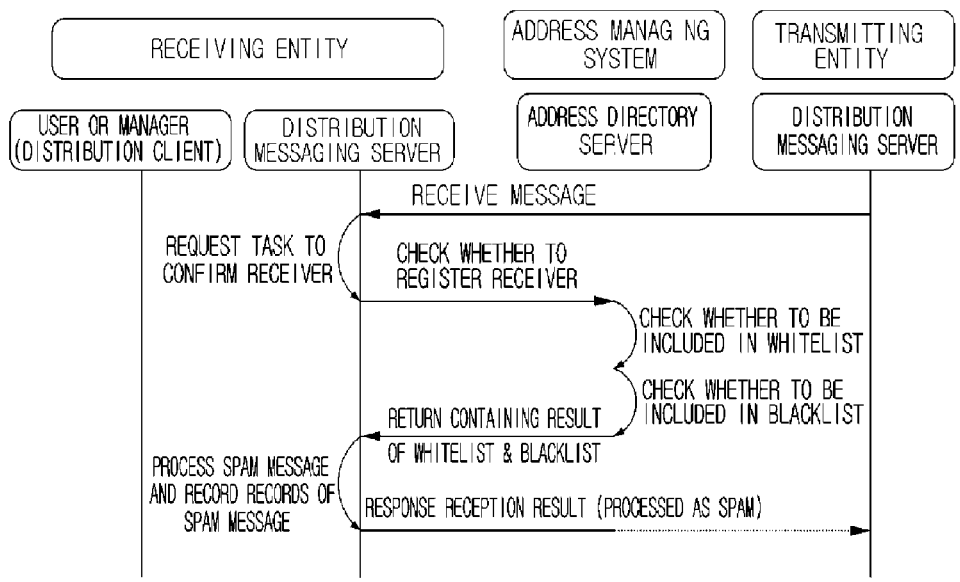
FIG. 27 is a view illustrating a process that checks whether to refuse to receive a communication party in real time basis when a transceiving entity servers as a receiver according to another exemplary embodiment of the present invention.

FIG. 27 illustrates a process of storing the communication between the transceiving entity and the third storing institution provider and the steps of the communication certificate storing process will be described in the following Table 27.

TABLE 27

| No. | Name of process |
|---|---|
| 1 | The communication messaging server of the transmitter receives the communication certificate from the communication messaging server of the receiver when the reception certificate is received from the receiving communication messaging server or the transmission certificate is received from the relay hub, the communication certificate is received as the response message when the reading certificate is received from the receiving communication messaging server or the reception certificate is received from the relay hub, the communication certificate is received as a request message |
| 2 | if the received communication certificate is verified so that the validity is confirmed, the communication certificate and the verification information of the certificate are sent to the communication messaging server of a previously set third party storing institution. if the communication certificate is not valid, the verification error message of the communication certificate is notified to the communication messaging server of the receiver to request for resending if the communication certificate is received as the response message, the verification error message is sent as the response message thereof (synchronously) if the communication certificate is received as the response message, the verification error message is sent as a new request message (asynchronously) if the verification error message of the communication certificate is received, the communication certificate is resent as a new request message or a certification issuance failure message is sent (asynchronously) if a valid communication certificate is not received, the transmission of the electronic document is considered to be failed and the electronic document needs to be resent |
| 3 | If the communication messaging server of the third party storing institution receives a message of the third party storing institution storing request, the communication messaging server of the third party storing institution calls the storage request client in order to store the communication certificate and the verification information (if the third party storing institution also serves as the electronic document provider, the communication messaging server directly calls the third party storing institution storage request client (local storage request)) |
| 4 | The communication certificate storage request client requests third party storing institution to store the communication certificate and the verification information in accordance with the connection interface standard of the third party storing institution |

[Management Process Such as Registration of Certified Electronic Mailing Address]

The transceiving entities needs to apply and register the certified electronic mailing address in order to participate in the communication system and a registration agency and a management agency needs to register and manage the information related to the certified electronic mailing address. The certified electronic mailing address management process includes a management process such as registration, change, and deletion related with the certified electronic mailing address and a blacklist/whitelist management process.

The management agency allows the certified electronic mailing address registration agency to manage the certified electronic mailing address in order to efficiently manage the certified electronic mailing address.

The registration agency performs the following tasks (1) to (4).

(1) examination task such as identification of an applicant of the certified electronic mailing address (2) registration information changing task of the registrant of the certified electronic mailing address (3) task support such as cancellation of the registration of the certified electronic mailing address (4) other task related with the management of the certified electronic mailing address The management agency may select any of the third party storing institution who satisfies requirements and the electronic document provider as the registration agency.

Hereinafter, a process of registering the certified electronic mailing address will be described.

Figure 21:
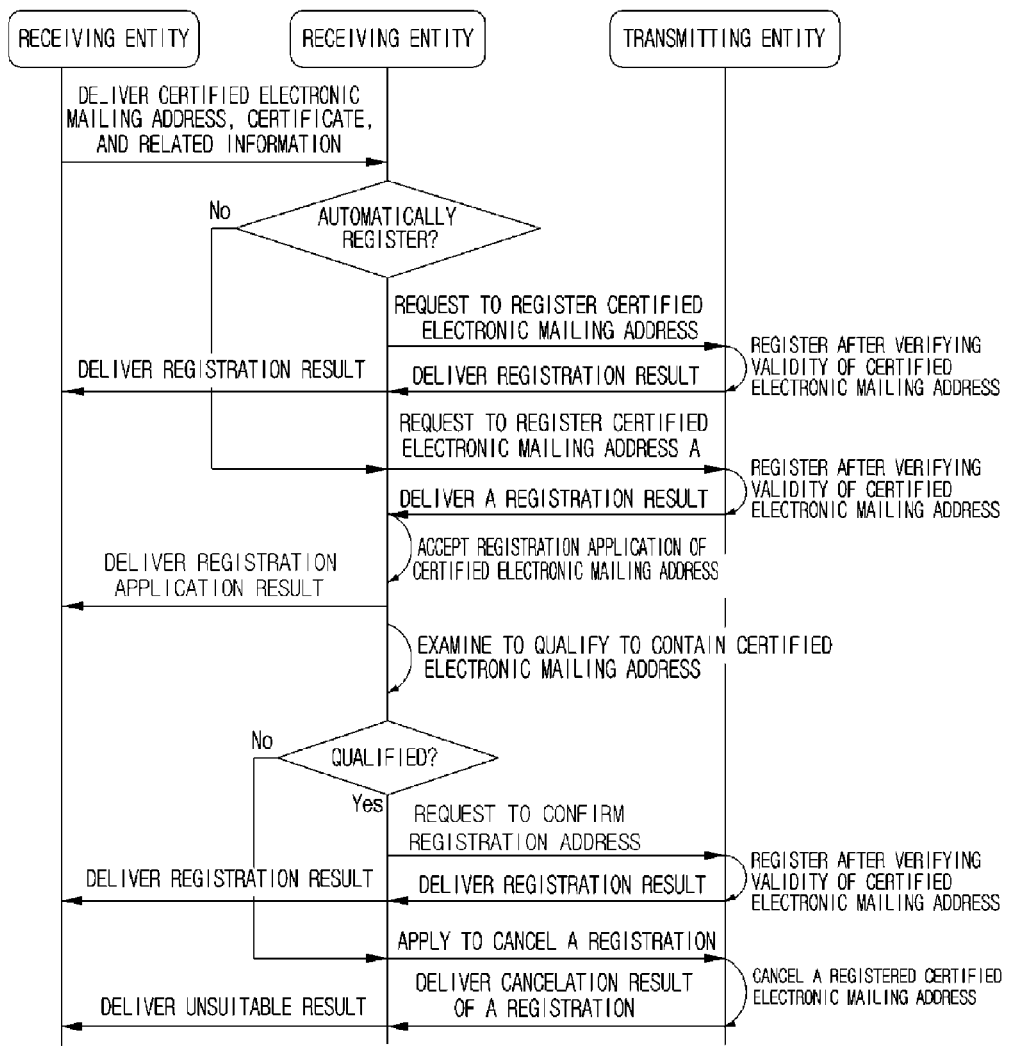
FIGS. 21 to 23 are views illustrating a managing process such as certified electronic mailing address registration according to an exemplary embodiment of the present invention.

A corporate/institution/individual which wants to participate in the communication system needs to apply the certified electronic mailing address and the registration agency examines and processes the applied information and notifies the result. The related process is illustrated in FIG. 21.

Hereinafter, a process of changing the registration information of the certified electronic mailing address will be described.

Even though the information related with the certified electronic mailing address which has been already registered may be changed due to various reasons, the identity needs to be maintained so that the electronic mailing address and the information of the owner are not changed.

An authority for changing the information related with the certified electronic mailing address is delegated to the registration agency to be processed. In this case, the record information concerning the change of the information needs to be stored in accordance with the service level agreement (SLA) between the management agency and the registration agency.

The process related therewith is illustrated in FIG. 22. Referring to FIG. 22, the certified electronic mailing address may be changed only by the party concerned. In case of the individual, the certified electronic mailing address, the registration number, and the name cannot be changed. Therefore, the individual withdraws the certified electronic mailing address and then newly creates a new one. In case of corporate, the certified electronic mailing address cannot be changed. If a registration number (business license number) and a company name are changed, the certified electronic mailing address needs to be changed with a new certificate which is received when the corresponding information is changed.

FIG. 23 illustrates a process of changing the registration agency. Referring to FIG. 23, if the registration agency is changed, 1) a withdrawal process from the existing registration agency and 2) a new registration process through a new registration agency need to be performed. In this case, it is required to request the address directory server to temporally hold the certified electronic mailing address. When all certified electronic addresses are withdrawn, the certified electronic mailing address is selectively temporally held so that the address directory server may maintain the certified electronic mailing address for a predetermined period when the registration agency is changed.

Hereinafter, a process of updating, suspending, and deleting the certified electronic mailing address will be described.

The certified electronic mailing address which has been already registered needs to be updated in accordance with a set usage term. After the registration of the certified electronic mailing address, the owner needs to update the certified electronic mailing address before the usage term set based on the service policy elapses. If the owner does not update the certified electronic mailing address, the owner lost the ownership of the certified electronic mailing address and the certified electronic mailing address is automatically cancelled.

Further, even when the certified electronic mailing address has not been expired, if the registrant wants to stop using or cancel the electronic mailing address, a function for that needs to be provided.

[Electronic Document Form Application Process]

An object of this process is to increase the usage after communicating the message. According to this process, the electronic document included in the message is automatically or semiautomatically processed in the corporation internal system. The communication messaging server exclusively transceives between the parties concerned and the communication client provides an interface so that the sender/receiver easily uses the message to be transceived. In the subsequent steps, the electronic document in the message is utilized. The electronic document form register or the electronic document form provides a method that efficiently operates the electronic document utilizing step.

The type of documents which communicated according to the communication system is not specifically limited. An image, an office document, or a motion picture may be available. However, in order to increase the convenience of the user, a function of creating a document in the form of text is additionally suggested in the communication system.

The additional function described above introduces an electronic document exchanging function so that document data is transceived based on the electronic document format appointed between the transceiving entities to automatically transform the electronic document which is received by the internal system of the receiving entity.

As for the form of the electronic document, the following two methods (1) and (2) are available.

(1) a method that utilizes an electronic document form register in the electronic document communication hub. A standardized electronic document such as an electronic tax invoice is mainly used (2) a method that shares an electronic document form obtained by the agreement between the transceiving entities. A nonstandaridized electronic document for which is specified to a specific corporate is mainly used Hereinafter, the utilization of the electronic document form register will be described in detail as follows.

After searching an electronic document form registered in the electronic document form register, the corporate, the organization, or the individual user registers the electronic document form for in the communication client to use the electronic document form. The electronic document form register is used by the following two methods (1) and (2).

(1) a method that directly searches an electronic document in the electronic document form register to import the electronic document from the communication client (2) a method that searches an electronic document from an electronic document form register site and downloads the electronic document in a local PC, and then registers the electronic document in the communication client to use the electronic document Since the electronic document form register registers/utilizes the standardized electronic document form, the management agency needs to systematically operate/manage the electronic document form register and the electronic document form register may have the following standards (1) to (3).

(1) The user needs to apply through the electronic document form register site. The application needs to be performed according to the format and procedure provided from the site.

(2) The registered/applied electronic document needs to be registered through the examination of the management agency.

(3) Individual electronic documents need to be classified based on a systematic context.

TABLE 28

| Classification | Description | Remark |
|---|---|---|
| Region | Classify whether the electronic document is communicated internationally or in a specific region, or a specific country | |
| Sentence structure | Classify whether a sentence structure which is applied to the electronic document is EDIFACT basis, or XML basis, or an editorial format | |
| Industry | Used when the electronic document is applied only to a specific industry. For example, classify whether a purchase order is used in a trading part, or a manufacturing or a communication or a logistics part | |
| Product | If the electronic document uses a format of a specific company product, classify whether the format is a PDF format or a specific company e-Form format | |
| Corporate | Classify when the electronic document is used only in a specific corporate | |
| The other | When it is classified by other context other than the above classification | |

Figure 24A:
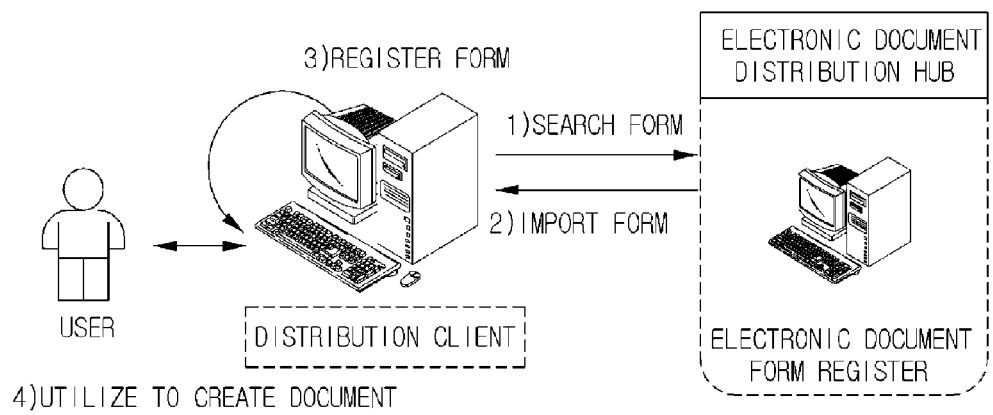
FIGS. 24A, 24B and 25 are views illustrating an electronic document format application process according to an exemplary embodiment of the present invention.
Figure 24B:
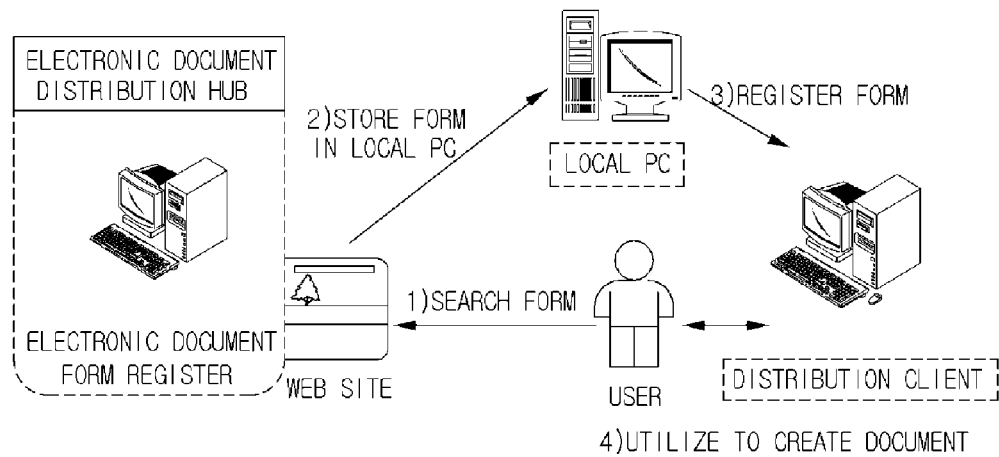

FIGS. 24A and 24B illustrate a basic flow of a process of utilizing the electronic document form register. Specifically, FIG. 24A illustrates that the electronic document form register is directly connected with the communication client and FIG. 24B illustrates that the electronic document form register site is used.

In the following Table 29, a process of utilizing the form by being directly connected to the communication client is described.

TABLE 29

| No. | Classification | Description |
|---|---|---|
| 1 | Searching electronic document form | Directly searches the electronic document form in the electronic document form register from the communication client |
| 2 | Importing form | When the form is searched, the form is imported to the communication client |
| 3 | Registering form | The form which is imported to the communication client is registered in the communication client |
| 4 | Importing/creating electronic document form | The electronic document form which is registered in the communication client is imported to create the electronic document and attach the electronic document to the message |

In the following Table 30, a process of utilizing the electronic document form register site is described.

TABLE 30

| No. | Classification | Description |
|---|---|---|
| 1 | Search electronic document form | Access to the electronic document form register site to search a necessary electronic document form |

TABLE 30-continued

| No. | Classification | Description |
|---|---|---|
| 2 | Store form in local PC | Download the searched form to store in a local PC |
| 3 | Register form | The form which is stored in the local PC is registered in the communication client |
| 4 | Importing/creating electronic document form | The electronic document form which is registered in the communication client is imported to create the electronic document and attach the electronic document to the message |

Hereinafter, utilization of the agreed electronic document form will be described.

The agreed electronic document form is used in order to communicate the form specified to a specific corporation in a site which is operated by the corporation to do a business with the parties related with the specific corporation.

Figure 25:
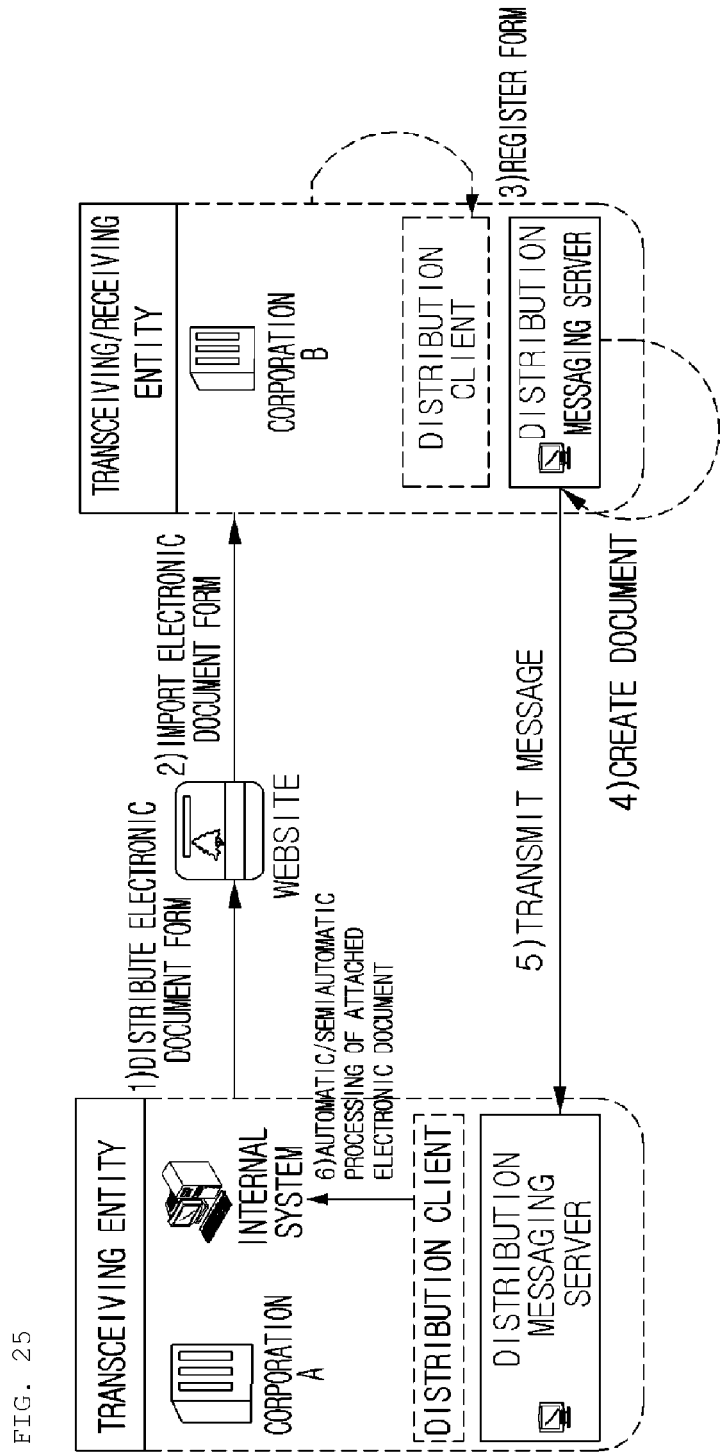

FIG. 25 illustrates a procedure of using the agreed electronic document form and the process related with FIG. 25 will be described in the following Table 31.

TABLE 31

| No. | Classification | Description |
|---|---|---|
| 1 | Communicating of electronic document form | A corporation A communicates an electronic document form which may be processed in its own system in a web site which is operated by itself to support to be utilized by a business partner |
| 2 | Storing of form in local PC | A corporation B2 downloads the form from the web site to store the form in a local PC |
| 3 | Registering of form | The form stored in the local PC is registered in a communication client of a corporation B |
| 4 | Importing/creating of electronic document form | The electronic document form which is registered in the communication client is imported to create the electronic document and attach the electronic document to a message |
| 5 | Transmitting of message | Transmit a message through a communication messaging server |
| 6 | Automatic/semiautomatic processing of attached document | The electronic document which is attached to the received message is transformed to be automatically or semiautomatically registered in an internal system of the corporation A |

[Spam Message Processing Process]

In the communication system, the transmitter performs the transmission through a certified communication messaging server and the receiver performs the reception therethrough. Therefore, if a spam mail is transmitted, the communication system has an infrastructure that holds the transmitter responsible.

However, a specific transmitter may establish a user account in the electronic document provider and transmits a commercial message using the user account. The current authentication method may authentify only technical contents of a system so that it is difficult to eradicate the spam message at the initial stage.

In order to block the communication of the spam message, the communication system provides a whitelist based on the authentication list management or the blacklist having malicious intention such as a spam to enhance the safety and the reliability of the communication system.

A function of reporting the spam message and confirming a transmitting party is an essential function. Therefore, all communication messaging servers necessarily build the function.

Hereinafter, a method of reporting the spam message will be described.

Steps of a reporting procedure of the spam message will be described in the following Table 32.

TABLE 32

| No. | Name of process |
|---|---|
| 1 | If a receiver determines that a message is a spam message at the timing of receiving the message, the receiver reports the message as a received message to the address directory server through the distributing messaging server |
| 2 | The address directory server that receives a report for the spam message from the communication messaging server returns a confirmation message indicating that the report is received |
| 3 | The management agency which is a principal agent managing the address directory server analyzes the message and searches for the transmitter to examine and determine whether to add the certified electronic mailing address of the transmitter to the blacklist |
| 4 | If it is finally confirmed as an object of the blacklist, the address directory server adds the certified electronic mailing address to the blacklist and then notifies the transmitter the contents of addition to the blacklist |
| 5 | The address directory server transmits the result for the request of the spam message to a reporter (receiver) of the spam |

Figure 26:
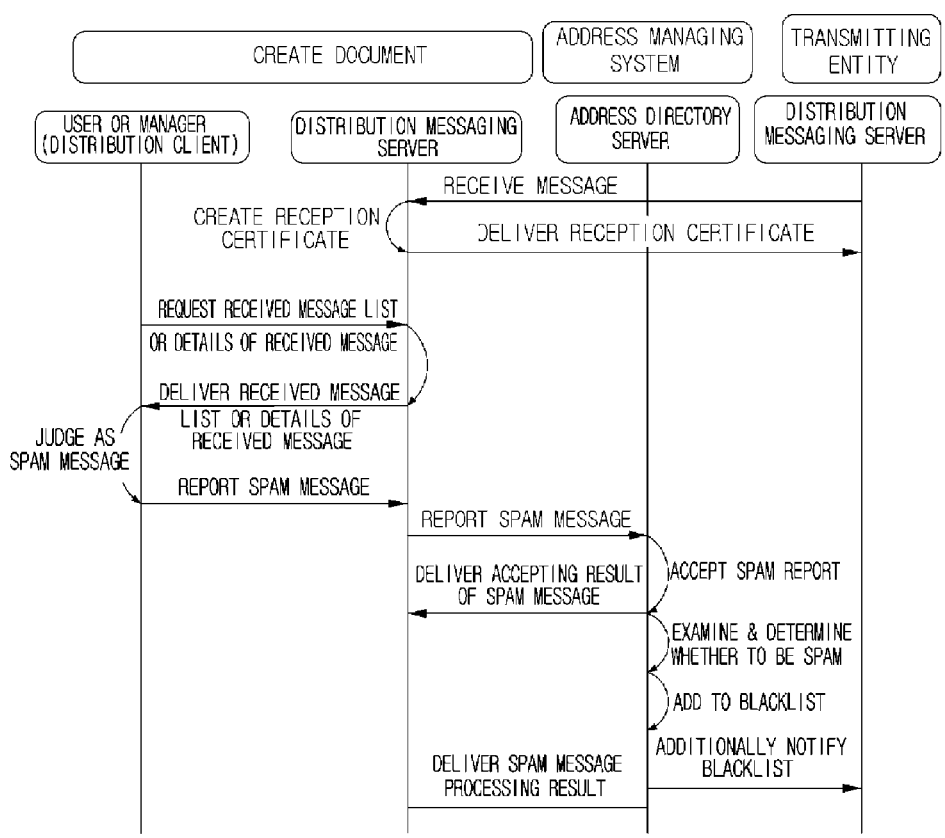
FIG. 26 is a view illustrating a process that reports a spam message at an electronic document communication hub when a transceiving entity servers as a receiver according to another exemplary embodiment of the present invention.

If the receiver determines that the received message is a spam message, the receiver reports the spam message to the address directory server by the process illustrated in FIG. 26.

Roles of the whitelist and the blacklist are as follows:

(1) whitelist: records only information for a messaging server which is authenticated by the transmitting communication messaging server and formally registered (2) blacklist: if an address of the transmitter is registered as a spam sender, the sender is registered as the blacklist If the spam address which is registered in the blacklist through the same communication messaging server is repeatedly generated, the management agency determines to cancel the authentication of the communication messaging server, the authentication is cancelled, and deletes the spam address from the whitelist.

Hereinafter, a processing method when the spam message is received will be described.

When the message is received, the receiving entity checks the whitelist and the blacklist of the address directory server in order to confirm whether the transmitting party is a reliable and legal user and then determines whether to deny the reception.

The transmitter may be checked 1) in real time basis at the time of receiving the message or checked by a periodic checking method that manages as a cache in the communication messaging server system of the receiver.

(1) A real time checking process: the receiving entity determines whether the address of the transmitting entity is registered in the whitelist and the blacklist in the address directory server at the time of receiving the message and then determines whether to deny the reception.

TABLE 33

| No. | Name of process |
|---|---|
| 1 | When the message is received, the communication messaging server of the receiver delivers a checking request message to the address directory server in order to check whether the transmitter is a legal user |

TABLE 33-continued

| No. | Name of process |
|---|---|
| 2 | The address directory server checks whether the address information of the requested user is included in the whitelist |
| 3 | If the address is not included in the whitelist, the address directory server immediately returns the result message indicating the user is not a registered user to a checking requestor. If the address is included in the white list, the address directory server checks whether the address is registered in the blacklist |
| 4 | The address directory server returns a result message indicating whether to be registered in the blacklist to the checking requestor |
| 5 | If the receiver receives a result message indicating the transmitter is not the legal user (not in the whitelist or registered in the blacklist) from the address directory server, the receiver autonomously processes the received message as a spam message and then records and stores the processed result message received from the address directory server and the spam message reception records |
| 6 | The processing records for the spam message is necessarily stored for one month or longer so that the legitimacy of the reception denial against the transmitter is checked |

FIG. 27 illustrates a process of checking the spam message in realtime basis.

(2) A periodic checking process: the receiver periodically receives the whitelist and the blacklist from the address directory server and autonomously manages and determines whether the address of the transmitter is registered in the whitelist and the blacklist based thereon and then determines whether to deny the reception of the message.

TABLE 34

| No. | Name of process |
|---|---|
| 1 | The communication messaging server of the receiving entity requests the latest whitelist and blacklist to the address directory server in advance and autonomously manages. In this case, the communication messaging server transmits automatic notification request when the list is changed (when the automatic notification of the changed matter is requested, periodically requests the address directory server in order to import the latest list so that an interval of list information is at most one day) |
| 2 | The address directory server broadcasts details of the change to a user who requests the changing notification when the whitelist and the blacklist are changed |
| 3 | The communication messaging server that receives the changed matter modifies the information of the list which is autonomously managed to synchronize the information |
| 4 | When the message is received, the receiver checks the list which is autonomously managed in order to check whether the transmitter is a legal user to the address directory server |
| 5 | If the transmitter is not determined to be a legal user (not in the whitelist or registered in the blacklist) as a result of checking the list which is autonomously managed, the receivers processes the received message as a spam message and then records and stores the spam message reception records |
| 6 | The processing records for the spam message is necessarily stored for one month or longer so that the legitimacy of the reception denial against the transmitter is checked |

Figure 28:
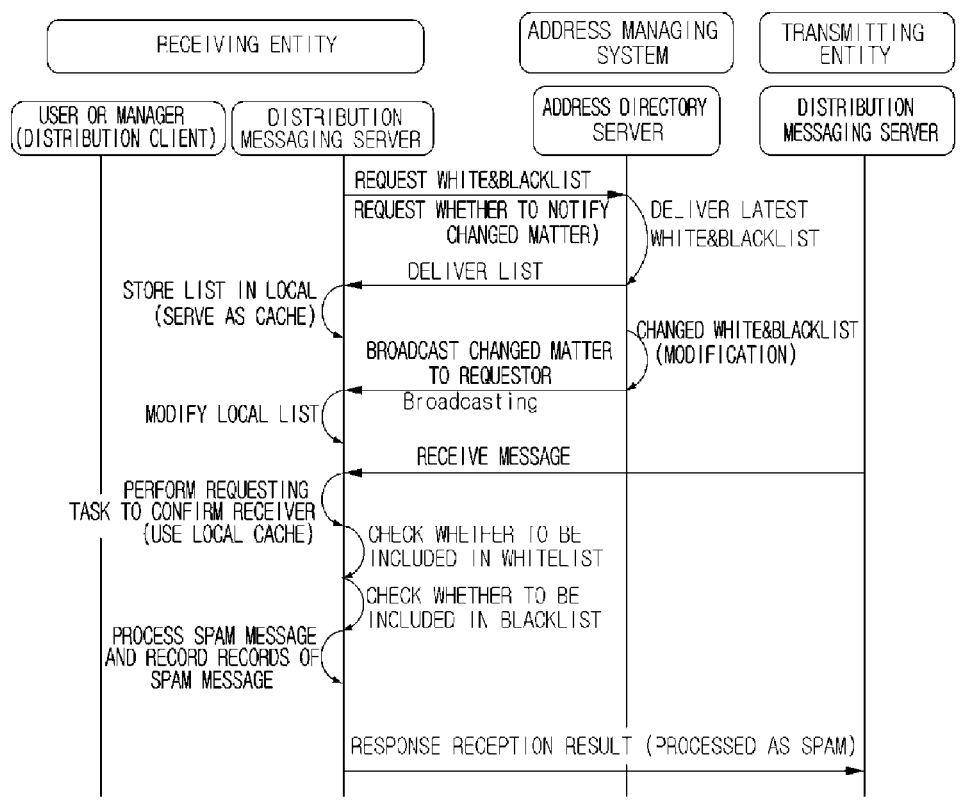
FIG. 28 is a view illustrating a process that periodically checks whether to refuse to receive a communication party in real time basis when a transceiving entity servers as a receiver according to another exemplary embodiment of the present invention.

FIG. 28 illustrates a periodical checking process in order to manage the spam message between the communication messaging server and the address directory server.

[Error Processing Process]

Types of error occurring in the communication system are classified into the following (1) and (2).

(1) error occurrence of synchronous response: in the case of an error for the synchronous response, the requestor is waiting until the processing result for the request message is received so that the requestor immediately notices the error (2) error occurrence of asynchronous response: the requestor transmits the request contents and the processing result for the request will be received later so that additional error processing is required Hereinafter, a synchronous error processing method will be described.

Since all errors for synchronous transmission may be immediately checked by the transmitter, basically the message is retransmitted. The retransmitting method is determined in accordance with the system policy of the corporate or the institution which participate in the communication system. However, basically, if the identical message is transmitted, an identical MessageId value is set to transmit the message.

Types of synchronous error processing are as follows (1) to (4):

(1) Request message transmission failure: a transmission error occurs in the process of transmitting a message by the transmitter so that the request message is not transmitted to the receiver. The transmitter notices the transmission failure by the timeout for the trial of the transmission or a network error message.

(2) Response message reception failure: Even though the transmitter normally transmits the message, an error occurs in the process of receiving a response message from the receiver. The response message reception failure is not discriminated from (1) "request message transmission failure" so that the error is processed by the same method, but the processing method is different because the receiver normally receives the request message.

(3) Error message reception: Even though the transmitter normally transmits the message, an error occurs in the process of processing the message by the receiver. In this case, the processing method of the transmitter may be varied depending on the types of the error message.

(4) Three stage synchronous error: The message communication between three entities in which the communication client is connected with the other communication messaging server, address directory server, and communication relay hub through the communication messaging server supports a synchronous connection method among the connection types in order to immediately check the final result. In this process, if an error occurs in a step of connecting the communication messaging server and the receiver, the communication messaging server promptly occurs an error and then transmits the error to the communication messaging server as a response message.

Hereinafter, asynchronous error processing method will be described.

The message communication between three entities in which the communication client is connected with the other communication messaging server, address directory server, and communication relay server through the communication messaging server may support the connection in the asynchronous method such that the communication client independently operates in accordance with the situation of the final receiver.

The transmitter may not immediately check the final error for the asynchronous transmission, which is different from the synchronous transmission. Therefore, an error message is generated for the communication client at the time of finally checking the error so as to allow the communication client to receive the error message.

[Electronic Document Reading Service]

The electronic document reading service is a service that provides an electronic document which is stored in a transmitter system or the third party storing institution to be read rather than directly exchanges the electronic document between the transmitter and the receiver.

The electronic document reading service uses the existing communication system as it is. In this case, the transmitter transmits not a message including the electronic document but a message including a reading authority that reads the electronic document stored in the transmitter system or the third party storing institution to the receiver.

The procedure related therewith is as follows.

(1) acquisition of public key of receiver
(2) storage of electronic document
(3) creation of certificate to which security such as reading authority and DRM is applied
(4) transmission of certificate of reading authority and confirmation of transmission
(5) reading of electronic document by receiver
(6) issuance and storage of communication (reading) certificate or reading evidence The electronic document reading service may be classified into a method where the transmitter uses its own system and a method where the transmitter uses a third party.

Figure 29:
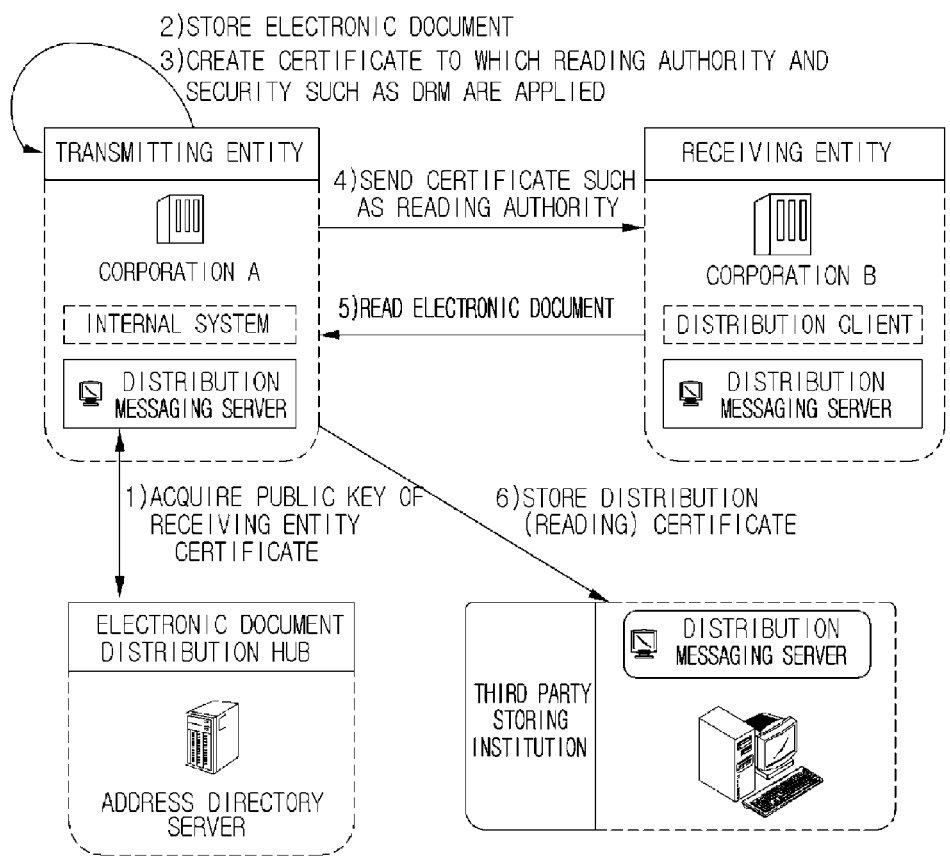
FIGS. 29 and 30 are conceptual views of an electronic document reading service according to an exemplary embodiment of the present invention.

FIG. 29 illustrates a flow that the transmitter uses the electronic document reading service utilizing the own system and the procedure illustrated in FIG. 29 will be described in the following Table 35.

TABLE 35

| No. | Name of process | Description |
| --- | --- | --- |
| 1 | acquisition of public key of receiving entity certificate | Acquire a public key of the receiving entity certificate which is required to create the electronic document reading authority from the address directory server |
| 2 | storage of electronic document and creation of reading authority | Store the electronic document in its own system of the transmitting entity |
| 3 | creation of certificate to which security such as reading authority and DRM is applied | Create an authority of reading the stored electronic document and a reading authority certificate to which the security such as DRM is applied |
| 4 | Transmission of reading authority | Send the certificate including the reading authority to the receiving entity |
| 5 | Reading of electronic document | The receiver of the receiving entity accesses to an electronic document reading system with the reading authority to read the electronic document |
| 6 | Storage of communication (reading) certificate | When the receiver of the receiving entity reads the electronic document, the transmitting entity creates the communication (reading) certificate and stores the certificate in the third party storing institution |

In order to provide the above-described service, the transmitter needs to include a system that is capable of providing an electronic document reading service in addition to the communication system.

Figure 30:
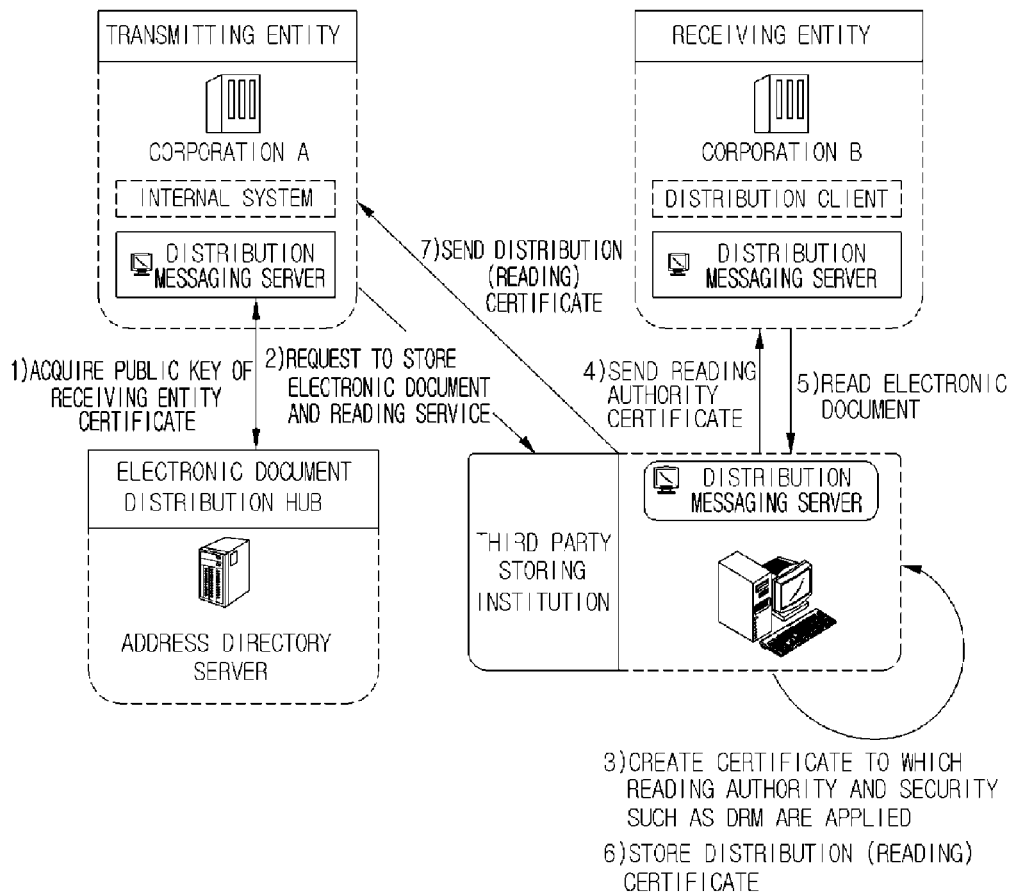
Figure 31:
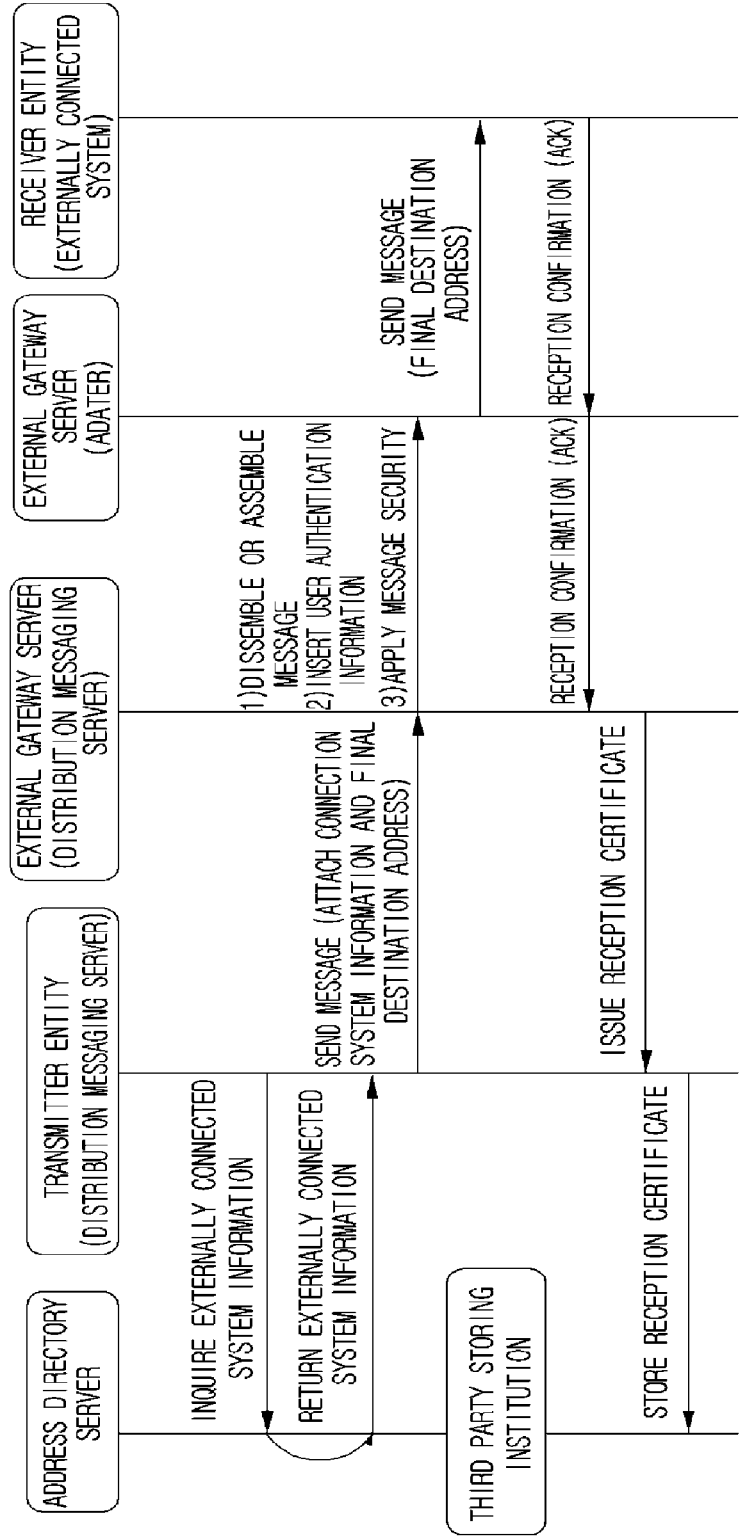
FIG. 31 is a view illustrating a process of communicating an electronic document that is connected to an external system in the exemplary embodiment of the present invention.
Figure 32:
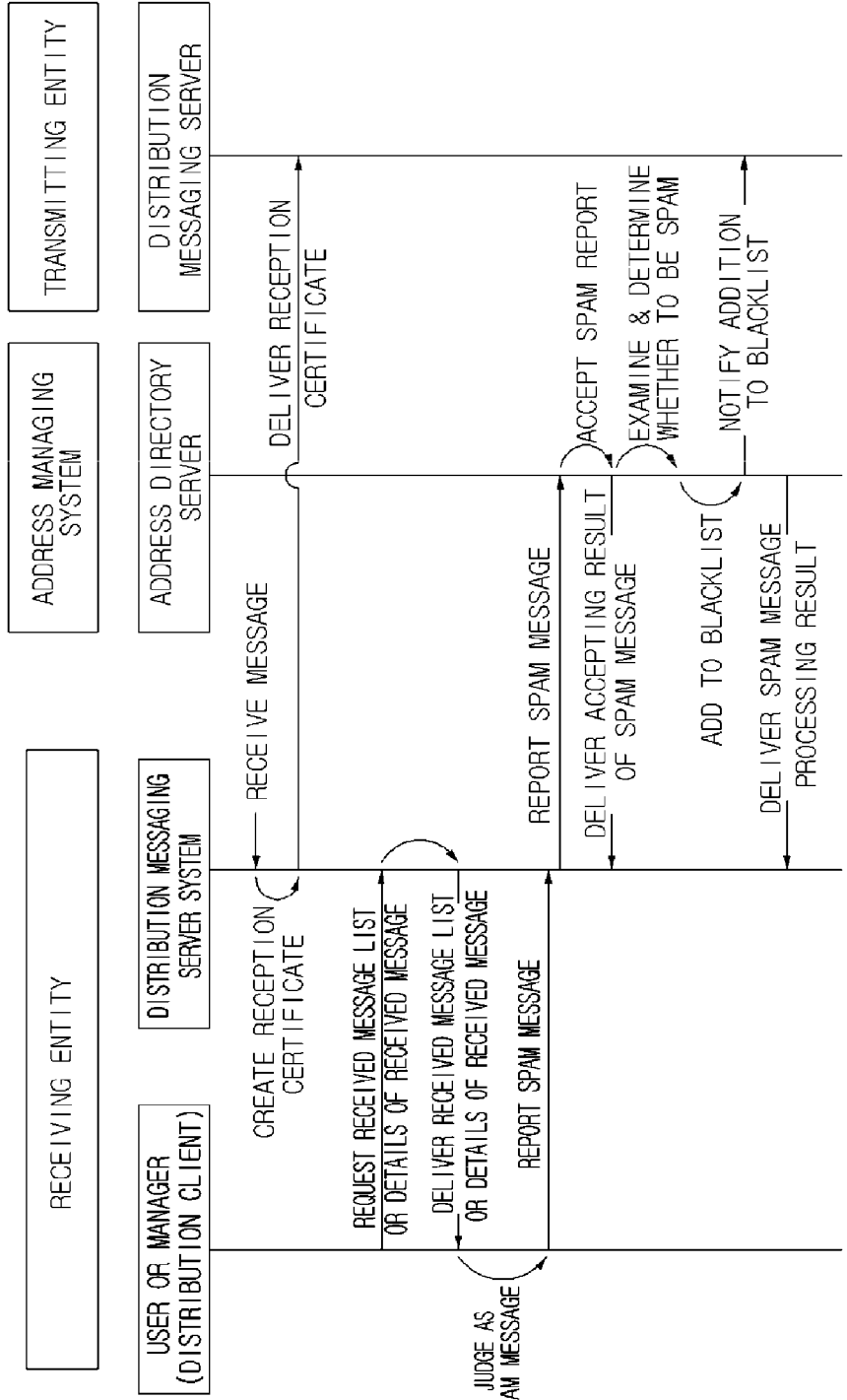
FIGS. 32 to 34 are views illustrating a spam message processing process according to an exemplary embodiment of the present invention.
Figure 33:
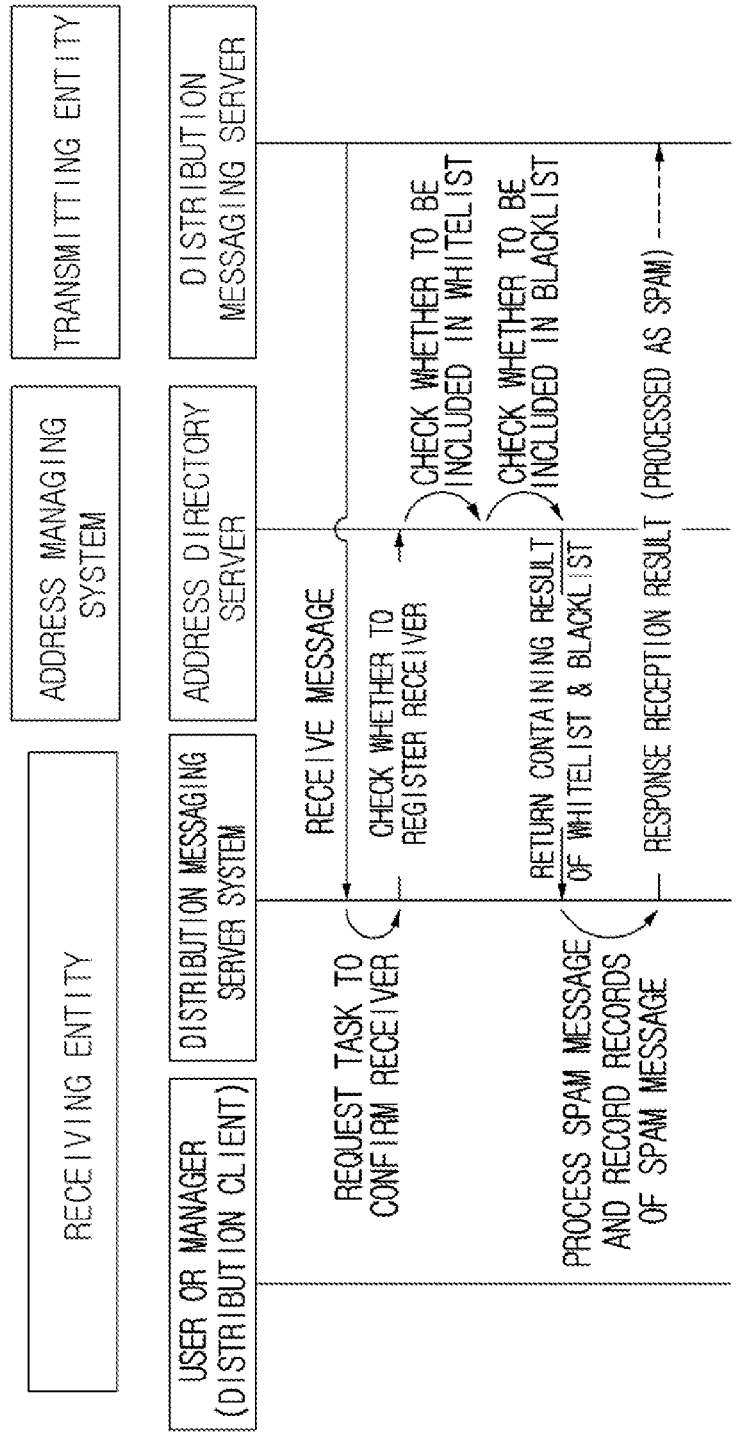

FIG. 30 illustrates a flow where the transmitting entity utilizes the third party to use the electronic document reading service and the procedure illustrated in FIG. 30 will be described in Table 36.

TABLE 36

| No. | Name of process | Description |
| --- | --- | --- |
| 1 | Acquisition of public key of receiving entity certificate | Acquire a public key of the receiving entity certificate required to create the electronic document reading authority from the address directory server |
| 2 | Storage of electronic document and request of reading service | The transmitting entity stores and requests the electronic document in third party storing institution, and requests the reading service therefor (write the certified electronic mailing address of the receiver) |
| 3 | Creation of certificate to which security such as reading authority and DRM are applied | Create a certificate of an authority of reading the requested electronic document stored in the third party storing institution and a certificate to which the security such as DRM is applied |
| 4 | Transmission of reading authority certificate | Transmit a certificate including a reading authority of the third party storing institution to the receiving entity |
| 5 | Reading of electronic document | The receiver of the receiving entity accesses to the third party storing institution with the reading authority to read the electronic document |
| 6 | Storage of communication (reading) certificate | When a receiver of the third party storing institution receiving entity reads the electronic document, create and store the communication (reading) certificate |
| 7 | Transmission of communication (reading) certificate | In addition, transmit the communication (reading) certificate to the transmitting entity that requests the third party storing institution reading service |

[Connection Method with System in Corporation]

The corporation/institution internally creates and stores various electronic documents and exchanges the electronic document with the external corporation/institution by various methods.

The electronic document may be exchanged by off-line such as a postal mail or by an e-mail or job related system. The communication systems are connected to each other as illustrated in Table 37 and FIG. 117A to 117D when it is connected to the inside the corporation/institution.

TABLE 37

| Classification | Description |
| --- | --- |
| Postal communication system | parties to a transaction transmit a document including an official document by mail<br>a person in charge of the corporation/institution receives the mail including the document including the official document<br>tear the mail to receive and register the document including the official document and receive internal approval<br>after the approval, the document is stored in the document box as a document format<br>(strength) 1) this system is used for a long time and thus very familiar method, 2) IT system cost is saved<br>(weakness) 1) it takes time to communicate the document, 2) service fee and document storing cost are required, 3) it takes time to search |
| e-mail communication system | parties to a transaction transmit the document including the official document by e-mail<br>a person in charge of the corporation/institution receives the e-mail including the document including the official document using an e-mail program<br>(in case of being linked with an internal system) the electronic document in the received message is semiautomatically registered and processed by the internal system<br>(if it is not connected with the internal system) the electronic document in the received message is stored in the local PC of a person in charge. Accesses to the internal system to register and process the stored electronic document<br>(strength) 1) easy to use, 2) widely used in the worldwide as an assistance of the task, 3) few or no cost<br>(weakness) 1) since the exchange is performed between the person in charge, additional task processing of the person in charge is required. Further, task failure may occur due to mistake or change of the person in charge<br>2) when a reception error is caused by the instability of e-mail protocol, a legal dispute may occur<br>3) the corporation/institution cannot collectively manage the distributing documents so that the distributing document may be locally processed and managed by the person in charge<br>4) for one time usage as a simple assistance of the task. A concept for the storage/deletion is weak<br>5) the e-mail management by the individual has widely spread. Lack in managing principle and control of usage of the corporation e-mail.<br>6) automatized processing is not available due to the communication of non-structurized document such as a word document (semiautomatic or manual processing) |
| Electronic document exchange (EDI) Communication system | the parties to a transaction transmit the electronic document through EDI<br>the receiver receives the electronic document through the EDI application<br>the received electronic document is automatically transformed and processed to be registered in the internal system<br>a person in charge of the corporation/institution checks and processes the electronic document registered in the internal system in accordance with the task<br>(strength) 1) the electronic document is automatically transformed and processed without intervention of a person so that the task efficiency is high, 2) correct transmission is available. If there is a dispute for the transmission error, the provider is responsible.<br>(weakness) 1) lots of initial investment cost is consumed and service fee is required in case of outsourcing. 2) it is required to agree with the party to a transaction for the task and document in advance, 3) only structurized (standardarized) document is communicated. Non-structurized document is not communicated |
| Task related system communication system | the parties to a transaction accesses to the web site which is operated by the receiver through a web browser by the user authentication such as a log-in process<br>the document is created and the file is attached in accordance with the procedure and the method provided in the web site<br>a person in charge of the corporation/institution checks the electronic document received by accessing to the task related system. However, since the task related system is the internal system, a specific processing is not required<br>(strength) 1) since the receiver automatically receives the electronic document, the task efficiency of the receiver is high, 2) the transmitter does not need to install additional program so that the communication cost is not required<br>(weakness) 1) since the communication system is mainly based on the receiver, the transmitter needs to access to the system which is operated by the receiver, which is inconvenient for the transmitter, 2) the electronic document remains only in the receiver's system so that if a dispute occurs in the future, the transmitter has a disadvantage |

The communication system based on the certified electronic address may be connected with the internal of the corporation/institution by the following method.

Hereinafter, a method that is linked with an internal system will be described.

Figure 118A:
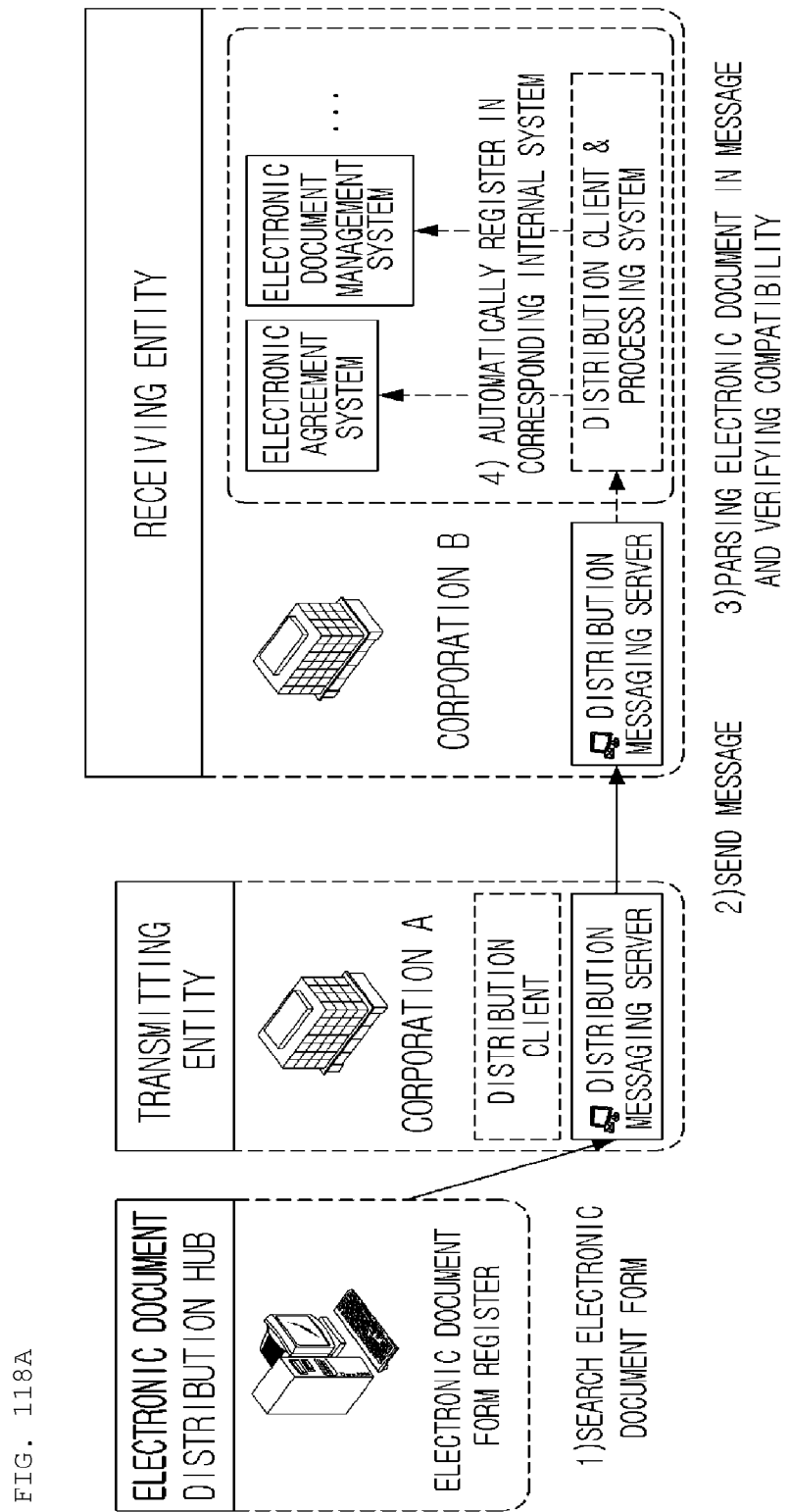

A method that is linked with the internal system is mainly used when the corporation or institution installs the communication messaging server and develops the communication client in the internal system as system integration (SI). The details will be described in the following Table 38 and the drawing thereof is illustrated in FIGS. 118A and 118B.

TABLE 38

| Classification | Description |
| --- | --- |
| Automatic processing method | share user authentication system which is used in the corporation internal system<br>the electronic document uses a standard electronic document form or an agreed electronic document form<br>a communication document processing program is required to automatically process a message which is transmitted at a specific certified electronic mailing address (parsing of the electronic document in the message or verification of suitability)<br>send and register the electronic document into the internal system in accordance with the certified electronic mailing address |
| Semi-automatic processing method | share user authentication system which is used in the corporation internal system<br>an connection system with the internal system such as an electronic linkage system needs to be already built in the communication client<br>a person in charge of the corporation/institution semi-automatically registers the electronic document in accordance with the contents of the communication client |

Hereinafter, a method that is not linked with the internal system will be described.

Figure 119A:
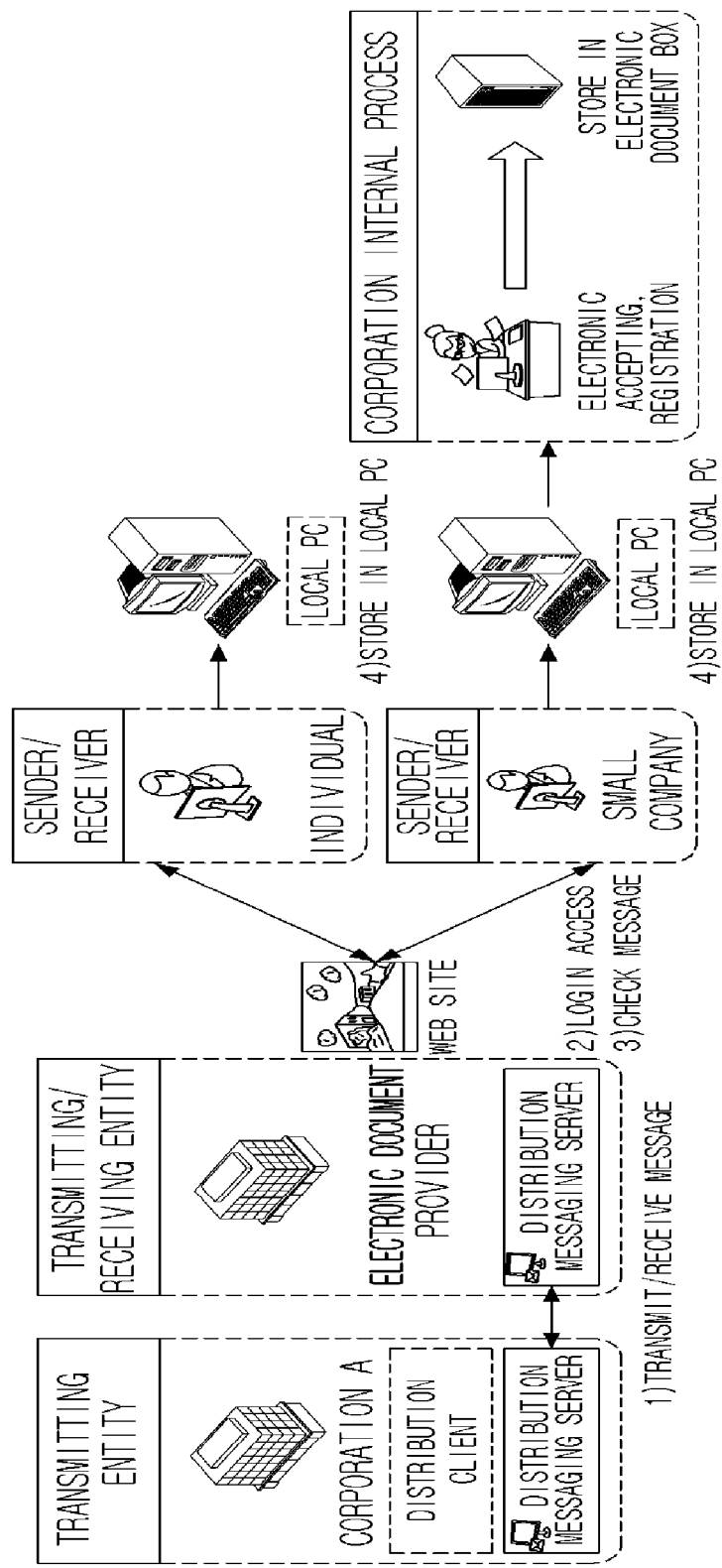
FIG. 119A is a view illustrating a web method of Table 39 and FIG. 119B is a view illustrating an application method of Table 39.
Figure 119B:
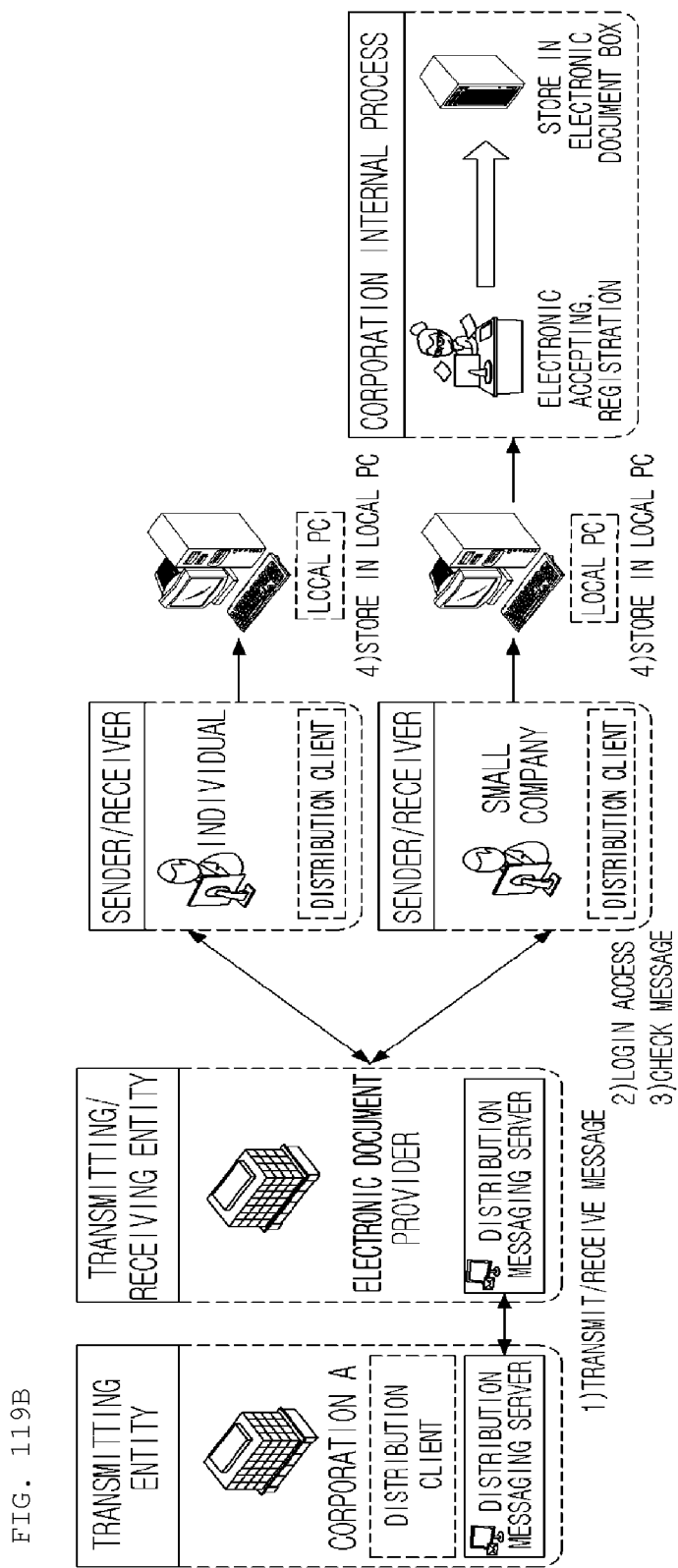

A method that is not linked with the internal system is suitable for a certified sender/receiver that receives a user account from the electronic document provider to use the user account and is a method that uses a web type communication client provided by the electronic document provider or installs a communication client application communicated by the electronic document provider in the local PC to use the communication client application. The details will be described in the following Table 39 and the drawing is illustrated in FIGS. 119A and 119B.

TABLE 39

| Classification | Description |
| --- | --- |
| Web method | become a member of a web site which is operated by the electronic document provider to secure the user account access to the communication messaging server based on the web site. Store the electronic document in the received message in the local PC<br>if a small corporation has a corporation internal system, the electronic document stored in the local PC is registered and stored in the internal system |
| Application method | the electronic document provider communicates a communication client install file<br>the sender/receiver installs the communication client application in the local PC<br>access to the communication messaging server using the communication client application. Store the electronic document in the received message in the local PC<br>if a small corporation has a corporation internal system, the electronic document stored in the local PC is registered and stored in the internal system |

According to the web method, the user access and process to a web site, the individual user does not needs to install a program in the local PC.

According to the application method, the individual user downloads the install program and installs the program in the local PC to access to the communication messaging server to use the program.

In the electronic document communication system and and electronic document communication method according to the exemplary embodiment of the present invention as described above, in order to communicate the electronic document, components such as a communication messaging server, a communication client, and a communication relay server are required and these components need to be connected with each other in an overall flow of the electronic document communication. Therefore, the components operate so as to be connected with each other, a communication protocol, a message exchanging method, and a connected message structure for the connection need to be defined.

Hereinafter, a common base communication protocol and the message exchanging method for the connection between the components are defined and a message structure in accordance with the connection type are defined as a standard to be suggested. Therefore, the present invention allows the smooth connection between the components built under the different circumstances, and by a different development method and interoperation.

[Base Communication Protocol for Connection]

Under the electronic document communication system based on the certified electronic address, in the electronic document communication connection interface which is required to communicate the information and the electronic document between the components, the communication connected message is based on "ebXML Message Services v2.0 standard" (hereinafter, referred to as ebMS) and is hierarchically extended to be defined as a more generalized form. The ebXML based structure is configured by components such as SOAP, SOAP with Attachment, Security, and Reliability which are independent but have a close relationship. "base communication protocol for connection" (hereinafter, base communication protocol) defines elements required in the communication system based on these basic elements and configured to be a form in which the elements are organically recombined.

The base communication protocol is configured by packaging that forms a message, message envelope configuration, message security, and message transception that transmits and receives a message.

Hereinafter, the message packaging in the base protocol configuration will be described.

The entire message structure of the communication connection message applies the ebMS v2.0 standard. The message defined in the base communication protocol has two logical MIME Parts.

A first MIME Part is referred to as a header container and includes a SOAP message. The SOAP message is configured by a Header and a Body.

Second or subsequent MIME Parts are referred to as a payload container and include an application level message and an attached document.

The first MIME Part will be described in detail below. In this part, common information for communicating a message (routing related information of a message, a SOAP message exchanging pattern, digital signature, error information, and position information of data which is added at a second time) is described.

The second MIME Part attaches requests for every connection interface and a response message. In accordance with a type of the connection interface, the presence of a third or subsequent MIME Parts is determined. When the electronic document or the certificate is delivered using the communication system, the second MIME is included in the third MIME Part.

Figure 65:
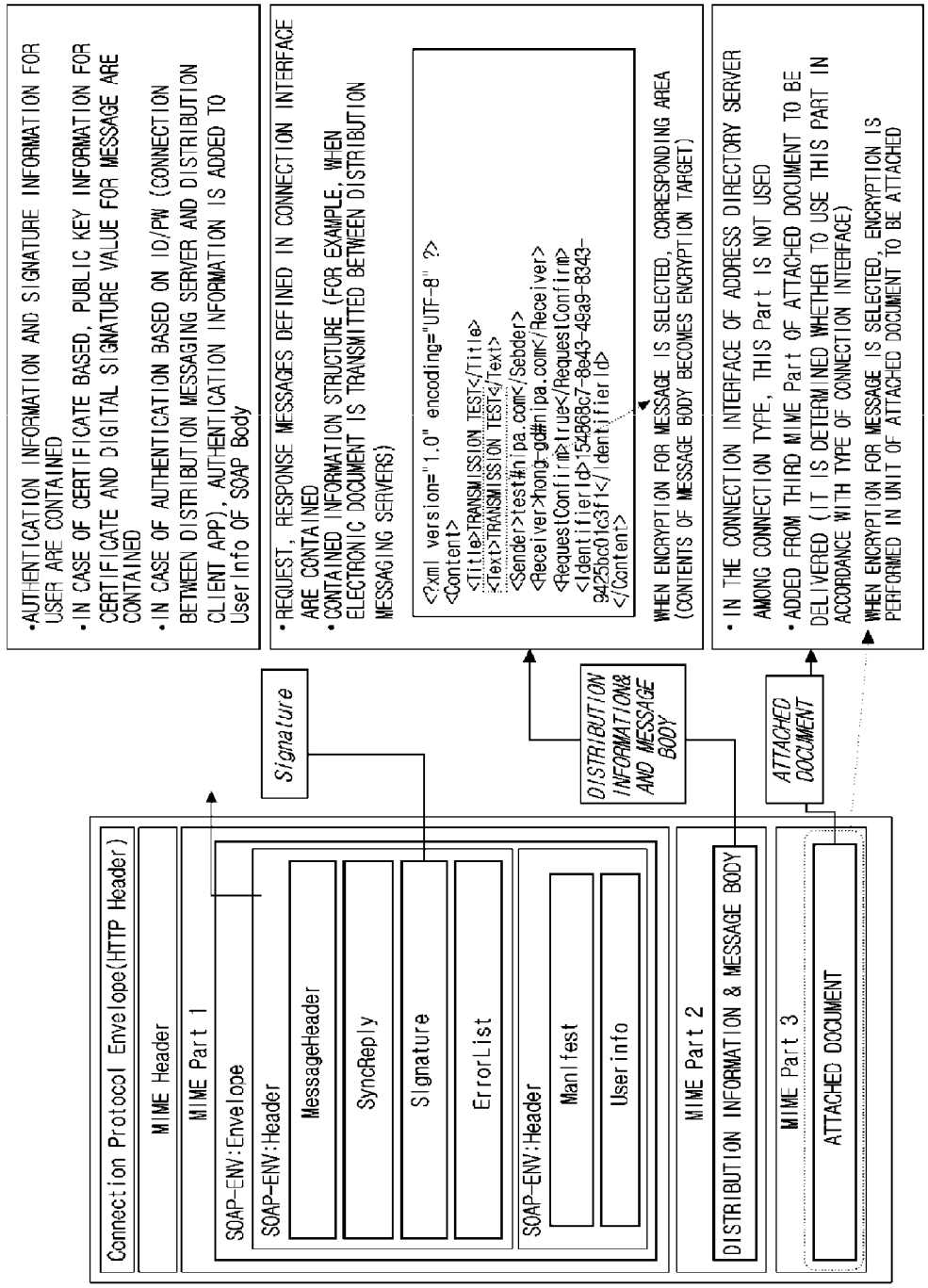
FIGS. 65 to 69 are views illustrating a configuration of a communication protocol for operating components so as to be linked to each other in order to communicate the electronic document under the electronic document communication system according to an exemplary embodiment of the present invention.
Figure 66:
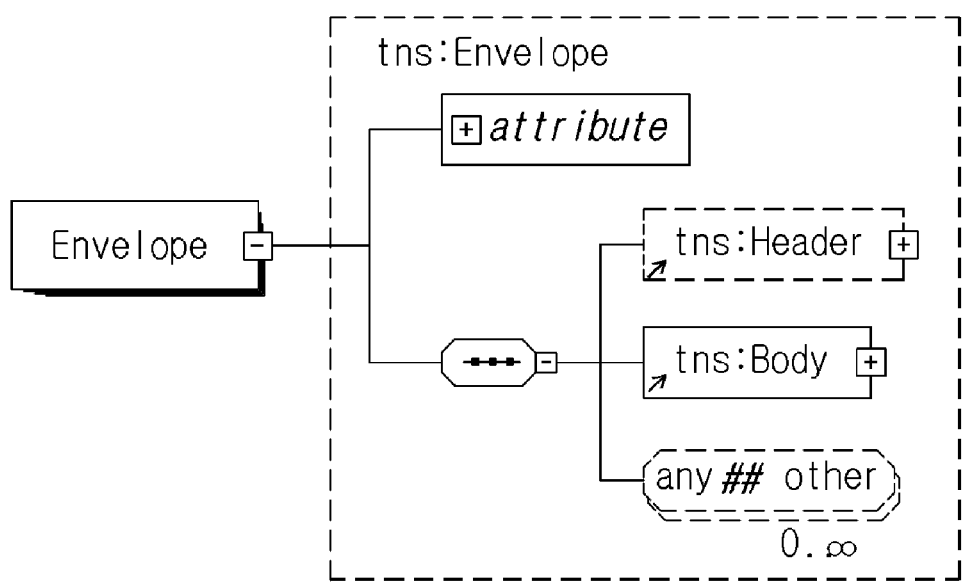

A basic configuration of the communication connection message is illustrated in FIG. 65. Referring to FIG. 65, (1) "SOAP-ENV: Header" is configured by MesageHeader and Signature information accordance with the communication protocol standard, (2) "SOAP-ENV: BODY" includes Mainfest component information and user login information defined by the communication protocol standard, (3) "sending container #1 (payload container #1)" includes the request message and the response message. Detailed contents of a business document are defined in accordance with the type of the connection interface, and the presence of request, response, or error message, and (4) in "sending container #2 (payload container #2)", documents to be attached in accordance with the type of the connection interface is sequentially input from the payload container #2.

Hereinafter, detailed components of the message in the base protocol configuration will be described.

The MessageHeader element is an essential element which is expressed in all ebXML messages and expressed as a child element of the SOAP Header element. The MessageHeader element is a complex element configured by the following subelements.

An element structure of the MessageHeader will be described in the following Table 47.

TABLE 47

| Name of item | | Description | Number of repetition | Type | Length |
|---|---|---|---|---|---|
| From | | message transmitting and transceiving entity information | 1...1 | | |
| | PartyId | type fixed as 'ecf_cd' | | | |
| | | code identifying transmitter authentication number in case of distribution messaging server set self-management number in case of distribution client set entity code value in case of address directory server, and distribution relay server | 1...1 | S | 13 |
| | Role | serve as transmitter fixed as 'sender' | 1...1 | S | Up to 256 |
| To | | message receiving and transceiving entity information | 1...1 | | |
| | PartyId | type fixed as 'ecf_cd' | 1...1 | S | 13 |
| | | code discriminating receiver authentication number in case of distribution messaging server set self-management number in case of distribution client set entity code value in case of address directory server and distribution relay server | 1...1 | S | 13 |
| | Role | serves as receiver fixed as 'receiver' | 1...1 | S | Up to 256 |
| CPAId | | ID of business cooperation protocol set code value depending on type of connection interface | 1...1 | S | Up to 256 |
| ConversationId | | transceiving transaction identifier | 1...1 | S | Up to 256 |
| Service | | identifier of business service defined in business cooperation protocol | 1...1 | S | Up to 256 |
| Action | | identifier of specific task process in Service unique value in Service | 1...1 | S | Up to 256 |
| MessageData | | data for discriminating message | 1...1 | | |
| | MessageId | unique identifier of one message | 1...1 | S | Up to 256 |
| | Timestamp | message creating time UTC type ex> 2008-07-31T06:29:39.724Z | 1...1 | S | 24 |
| | RefToMessageId | existed Only in response message MessageId of request message | 0...1 | S | Up to 256 |

TABLE 47-continued

| Name of item | Description | Number of repetition | Type | Length |
|---|---|---|---|---|
| Other | extension element depending on type of interface name of element has different name depending on the interface refer to connection interface (chapters 5, 6, 7, and 8) for details | 0 . . . 1 | | |

Figure 34:
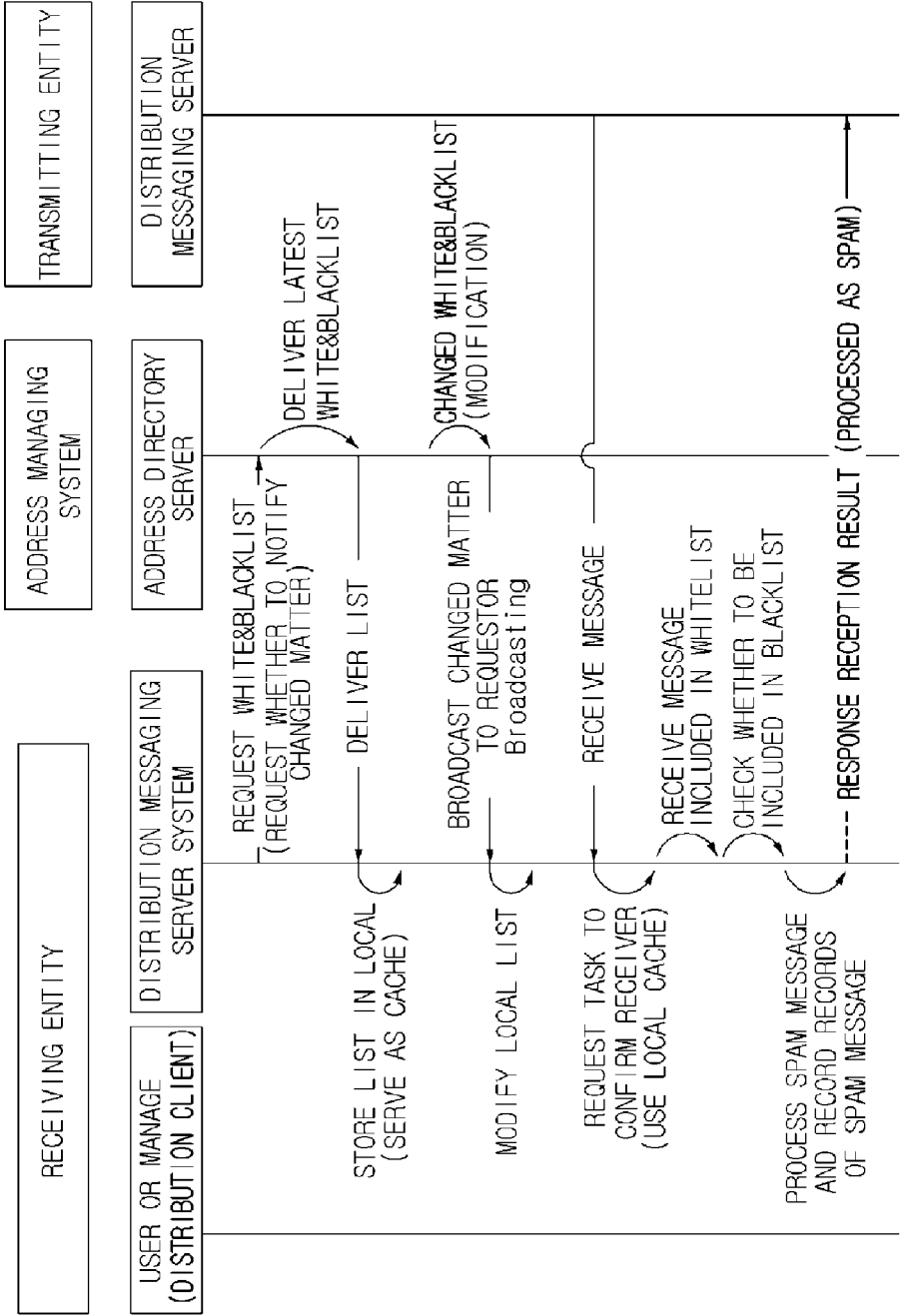
Figure 35:
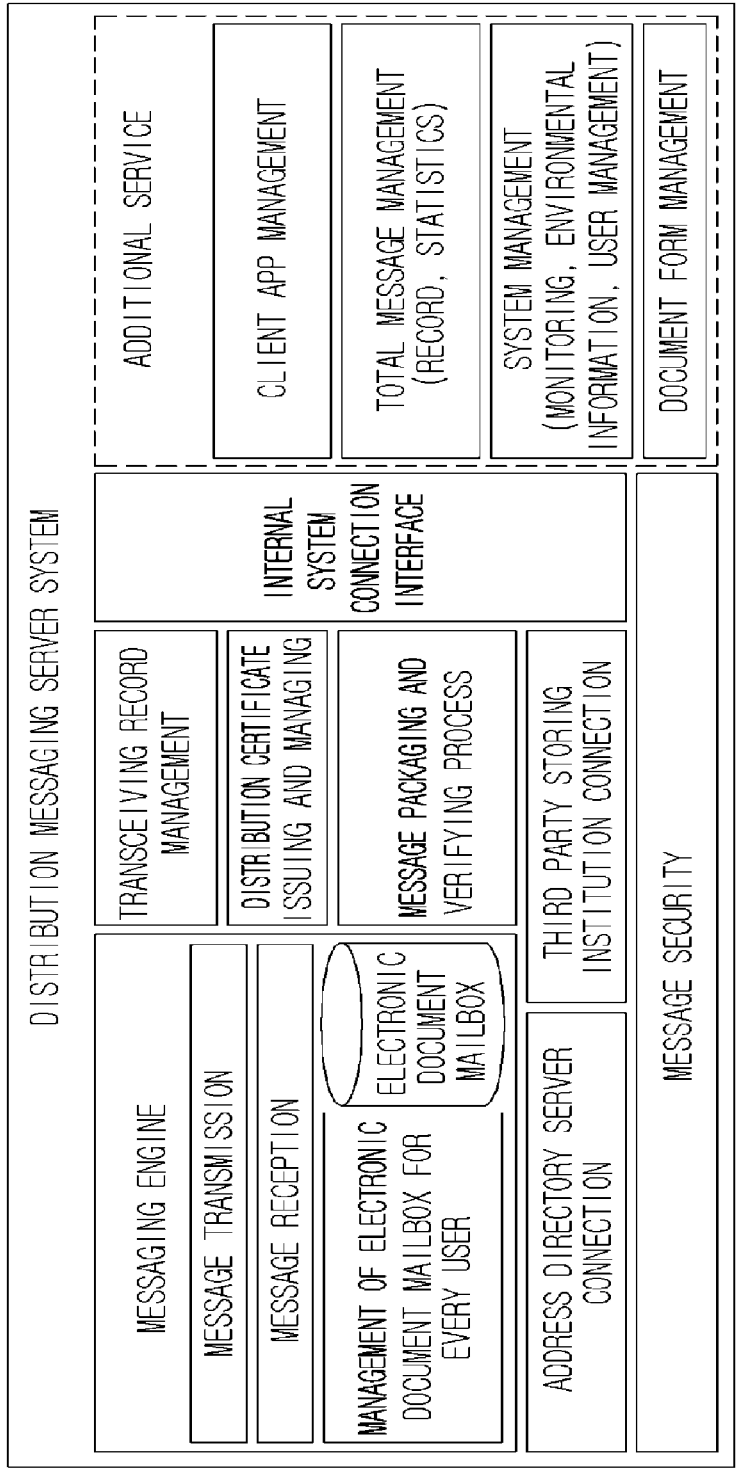
FIGS. 35 to 49 are views illustrating a communication messaging server system according to another exemplary embodiment of the present invention.

A schema structure of MessageHeader is illustrated in FIG. 34 and an item code table of MessageHeader will be described in the following Table 48 and a Service/Action item per business will be described in the following Table 49.

TABLE 48

| Item of identification code | Code value | Definition of code value |
|---|---|---|
| PartyId | ads | Address directory server entity code |
| | ech | communication relay server entity code |
| CPAId | urn:ads-and-ecm-cpa | When connection interface between communication messaging server and address directory server is used |
| | urn:ecm-and-ecm-cpa | When connection interface between communication messaging servers is used |
| | urn:ecm-and-ecc-cpa | When connection interface between communication client and communication messaging server is used |
| | urn:ech-and-ecm-cpa | When connection interface between communication messaging server and communication relay server is used |

TABLE 49

| Item | Service | Action | Definition |
|---|---|---|---|
| When connection interface between communication messaging server and address directory server is used | urn:ads-service | request response | Request response |
| When connection interface between communication messaging servers is used | urn:ecm-service | request response | request response |
| When connection interface between and communication client and communication messaging server is used | urn:ecc-service | request response | request response |
| When connection interface between communication messaging server and communication relay server is used | urn:ech-service | request response | request response |

The communication connection message needs to be digitally signed in order to cope with various dangerous elements which may occur in the process of transceiving. Therefore, the Signature element needs to be present as a child element of the SOAP Header.

Entire SOAP message and a message and attached document contained in the payload container in the communication connection message need to be a target of the digital signature. Signature target information is digested to be included in the digital signature information.

A process of performing the digital signature in accordance with [XMLDSIG] standard is as follows (1) to (4).

(1) Create a SignedInfo element having SignatureMethod, CanonicalizationMethod, and Reference elements and an essential payload object in the SOAP Envelope as defined in [XMLDSIG]

A first Reference item at a lowerlevel of SignedInfo has the entire SOAP message as a target so that " " is described in the URI value.

From a second Reference item, it is described repeatedly as many as the number of payload containers. In this case, the URI value describes a content ID value defined in the MIME Header of the attached document. (a target of Digest is a Content part excluding the Mime Header)

(2) After canonicalization, calculate SignatureValue of SignedInfo based on an algorithm designated in the SignedInfo as designated in [XMLDSIG]

(3) Create signature element including SignedInfo, KeyInfo, and SignatureValue elements as designated in [XMLDSIG]

(4) The Signature of the SOAP Header is included in the SOAP Header element

Algorithm information which is used at the time of digital signature is as follows. The algorithm basically follows an algorithm part (6.0 Algorithms) of W3C "XML-Signature Syntax and Processing" (RFC3275). Further, in order to support a domestic unique algorithm, an algorithm defined in TTAS.IF-RFC3075 "XML-Signature Syntax and Processing" (Telecommunications Technology Association, 2004) is used.

Next, an algorithm list used in the communication protocol will be described. In order to minimize ambiguity in the process of creating and verifying of the digital signature at the time of transceiving a message, the use of the algorithm other than the listed following (1) to (5) is restricted.

(1) Digital Signature Namespace

TABLE 52

<... xmlns:ds="http://www.w3.org/2000/09/xmldsig#" ... >

(2) Hash (Digest);

An algorithm used to reduce data observes a related regulation of a certified authentication system.

TABLE 53

<ds:DigestMethod Algorithm="http://www.w3.org/2000/09/xmldsig#sha1"/>
or
<ds:DigestMethod Algorithm="http://www.w3.org/2001/04/xmlenc#sha256/>

(3) Digital Signature (Signature);

; An algorithm used to perform digital signature of the message observes a related regulation of a certified authentication system.

TABLE 54

```
<ds:SignatureMethod
 Algorithm="http://www.w3.org/2000/09/xmldsig#rsa-sha1"/>
or
<ds:SignatureMethod
 Algorithm="http://www.w3.org/2001/04/xmldsig-more#rsa-
 sha256"/>
```

(4) Canonicalization;

Due to characteristics of XML which can physically variously express logically identical document, the digital signature value may be different for the same document. In order to prevent the above phenomenon, the canonicalization process needs to be performed. In the canonicalization, a canonical XML in which comments are omitted is used.

TABLE 55

```
<ds:CanonicalizationMethod
Algorithm="http://www.w3.org/TR/2001/REC-xml-c14n-20010315"/>
```

(5) Transform;

even though there are various transform algorithms as an algorithm that passes through a process of processing and selecting data to be signed among the entire XML data, only three algorithms may be used among the various transform algorithms. A first algorithm is Enveloped Signature transformation since the digital signature observes the form included in the target of the signature, a second algorithm is the above-described Canonicalization, and a third algorithm is Xpath filtering that selects signature target information.

TABLE 56

```
<Transform
Algorithm="http://www.w3.org/2000/09/xmldsig#enveloped-
signature"/>
and
<ds:Transform Algorithm="http://www.w3.org/TR/2001/REC-xml-c14n-
20010315"/>
and
<ds:Transform Algorithm="http://www.w3.org/TR/1999/REC-xpath-
19991116">
<ds:XPath>not(ancestor-or-
self::node( )[@SOAP:actor="urn:oasis:names:tc:ebxml-
msg:actor:nextMSH"]
       | ancestor-or-self::node( )[@SOAP:actor=
"http://schemas.xmlsoap.org/soap/
actor/next"])
    </ds:XPath>
</ds:Transform>
```

When an error occurs in the process of communication protocol processing process such as message syntax verification or message digital signature verification, the ErrorList element is created in the lowerlevel of the Header and is synchronously returned to the transmitter. When the ErrorList element is generated, RefToMessageId is necessarily present in the MessageHeader elemet and RefToMessageId needs to designate the MessageID of a message in which error occurs.

The ErrorList element has the following attributes (1) to (5).

Figure 36:
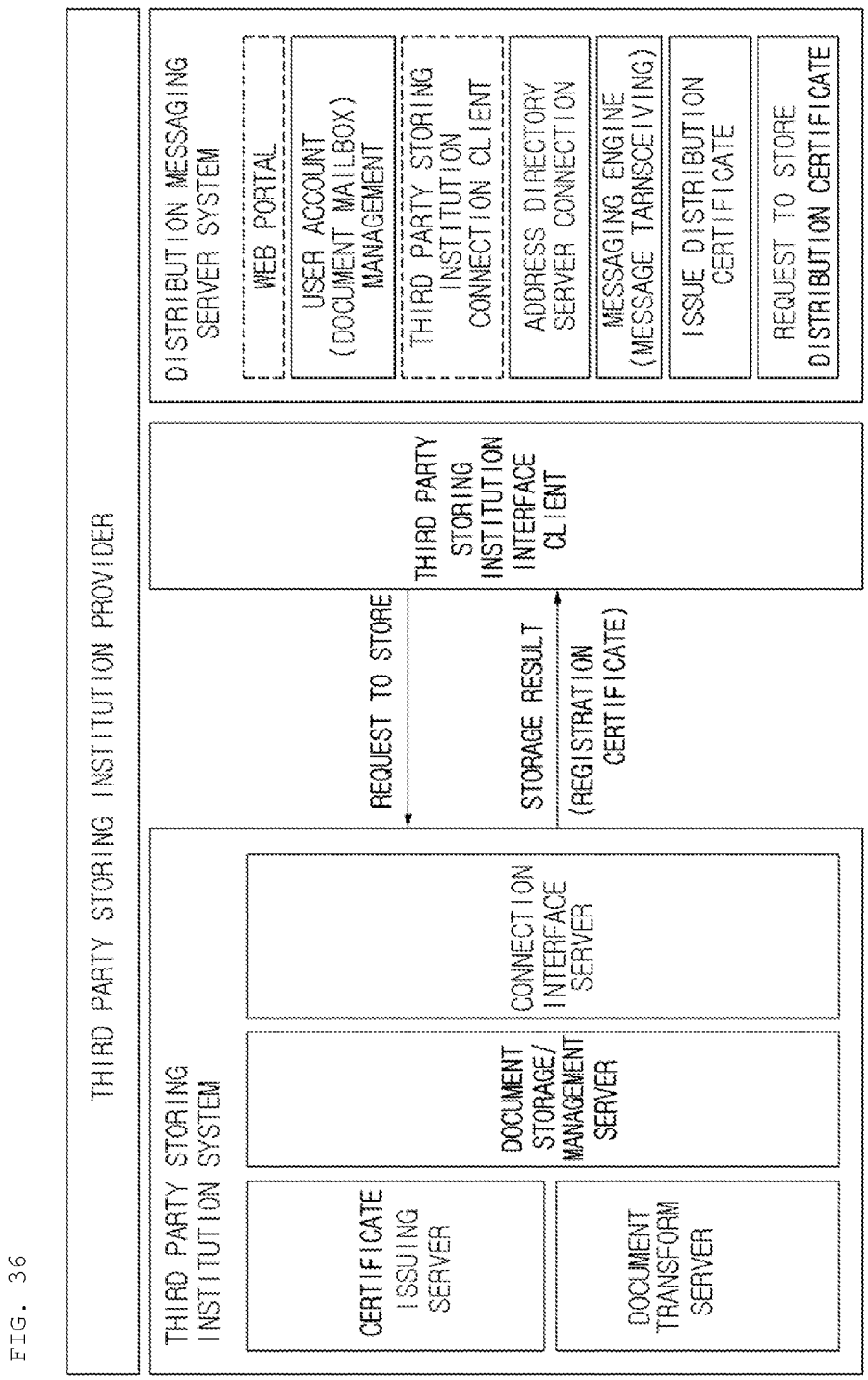

(1) id attribute (2) SOAP mustUnderstand attribute (3) version attribute (4) highestSeverity attribute (5) one or more Error elements If there is no error to be reported, the ErrorList element should not be present. A structure of ErrorList is illustrated in FIG. 36.

The highestSeverity attribute indicates a most serious status of all Error elements. Specifically, if an Error element set the severity as Error, the highestSeverity is set to be Error. Otherwise, the highestSeverity is set as Warning.

The Error element has the following attributes (1) to (6).

(1) Id Attribute;

The id attribute serves to uniquely discriminate an ErrorList element in the document.

(2) codeContext Attribute;

The codeContext attribute represents a name space or a schema of the errorCodes and should be an URI. A default value of this attribute is urn:oasis:names:tc:ebxml-msg:service:errors. If there is no default value in this attribute, the implementation of the specification indicates that errorCodes is used.

(3) errorCode Attribute;

An essential errorCode attribute indicates an essence of an error of a message having an error.

(4) Severity Attribute;

The severity attribute which is an essential attribute indicates a severity of the error. An effective value is Warning and Error. Warning indicates that other messages in the process of the conversation are normally created regardless of the error. Error indicates that no recovery error is present in the message and other messages are not created in the process of the conversation any more.

(5) Location Attribute;

The location attribute indicates a message part in which an error is present. If the error is present in ebXML element and the element is "well-formed", the contents of the location attribute needs to be [Xpointer].

(6) Description Attribute;

Contents of the Description element provides a descriptive explanation of the error by a language defined in a xml:lang attribute. Generally, this message is generated by software that verifies XML parser or the message. This means that the content is defined by a seller or a developer of software that creates the Error element.

If an error occurs in the process of transceiving a message based on the communication protocol, a transceiving entity that notices the error needs to report the error to the other party. Errors to be reported include a message structure error, a messaging error, and a security error.

Errors related with a data communication protocol such as HTTP and Socket which belongs to a lower layer than the communication protocol defined in this invention needs to be found and reported by a standard mechanism supported by the data communication protocol and do not use the error reporting mechanism defined in this invention.

An error code is classified by an error target and error type and details thereof will be described in the following Table 59.

TABLE 59

| Error code | Contents | Detailed description |
| --- | --- | --- |
| ValueNotRecognized | Element contents or attribute value is not recognized | Even though the document is well formed and effective, a value of element/attribute is unrecornized and thus a value which is used by the ebXML message service is included. |
| NotSupported | Element or attribute is not supported | Even though the document is well formed and effective and the element or the attribute follows a regulation or restriction of this specification, the document is not supported by the sbXML message service that is capable of processing the message |
| Inconsistent | Element contents or attribute value is inconsistent with other element or attribute | Even though the document is well formed and effective and follows a regulation or restriction of this specification, the contents of the element and the attribute do not match with the element or the attribute. |
| OtherXml | Other error in element contents or attribute value | Even though the document is well formed and effective, the contents of the element or the attribute value do not follow a regulation or restriction of this specification and do not belong to other error codes. Contents of Error element need to be used to indicate the essence of the problem. |
| DeliveryFailure | Message transmission failure | The received message is approximately or surely sent to a next destination. If the severity is set as Warning, a possibility that the message is delivered is low |
| TimeToLiveExpired | Expiration of time when message is present | Even though the message is received, the message is received at a time when a time restricted by TimeToLive of the MessageHeader element has elapsed. |
| SecurityFailure | Message security check failure | Verification of the signature of the party who sends a message or checking an authority or real name is failed. |
| Unknown | Unknown error | An error which does not belong to any kinds of error occurs. The content of the Error element is used to indicate the essence of the problem. |

Hereinafter, an HTTP response code in the HTTP binding method will be described.

In the invention, in order to return the response code of the HTTP level, an HTTP response code defined in [RFC2616] needs to be used. Main response codes will be described in the following Table 61.

TABLE 61

| State code | Related message | Meaning |
| --- | --- | --- |
| 200 | OK | Request is successfully performed |
| 400 | Bad Request | Request has grammatical problem |
| 401 | Unauthorized | Client tries to access to a page that requires an approval without having proper approval |
| 404 | Not Found | No content is found in this address |
| 500 | Internal Server Error | Request is not normally processed due to error in server |
| 503 | Service Unavailable | Server currently cannot process requests due to excessive requests which exceeds available limit |

Hereinafter, an HTTP sending security method in the HTTP binding method will be described.

The transmission between communication messaging server and communication messaging server in the communication system or the sending between the communication messaging server and the communication client need to be processed using HTTP/S(Secure Hypertext Transfer Protocol) that necessarily uses SSL (Secure Socket Layer) V3.0 for the network sending security.

A type of error occurring in the communication system according to the present invention is largely classified into error occurrence for the synchronous response and error occurrence for the asynchronous response.

In the case of the error for the synchronous response, the requester waits until the processing result for the request message is received so that the requester immediately recognizes the error. In contrast, in the case of the error for the asynchronous response, the requester receives the processing result later after delivering request contents only so that additional error processing is required.

Hereinafter, a synchronous error processing method in the error processing method will be described.

All message communication between a communication two entities of messaging server, other communication messaging server, the address directory server, the communication client, and the communication relay server is a synchronous communication. Further, the message communication between three entities in which the communication client is connected to the other communication messaging server, the address directory server, and the communication relay server through the communication messaging server through the communication messaging server is synchronously or asynchronously connected in accordance with the connection type.

All errors for the synchronous transmission may be immediately checked by the transmitter so that the message is basically retransmitted. The retransmission method is determined in accordance with a policy of the system of the corporation or the institution which participates in the communication system. However, basically, the identical message is transmitted again by setting the same MessageId value.

By transmitting the message with the same MessageId, not only when the error occurs at the time of sending, but also when an error occurs in the process of synchronously sending the response message after the receiver successfully receives the message, the redundancy message is noticed so as to prevent the same request from being redundantly processed.

The transmitter and the receiver of the synchronous error may be the communication messaging server, the address directory server, the communication client, and the communication relay server in accordance with the connection type.

Figure 39:
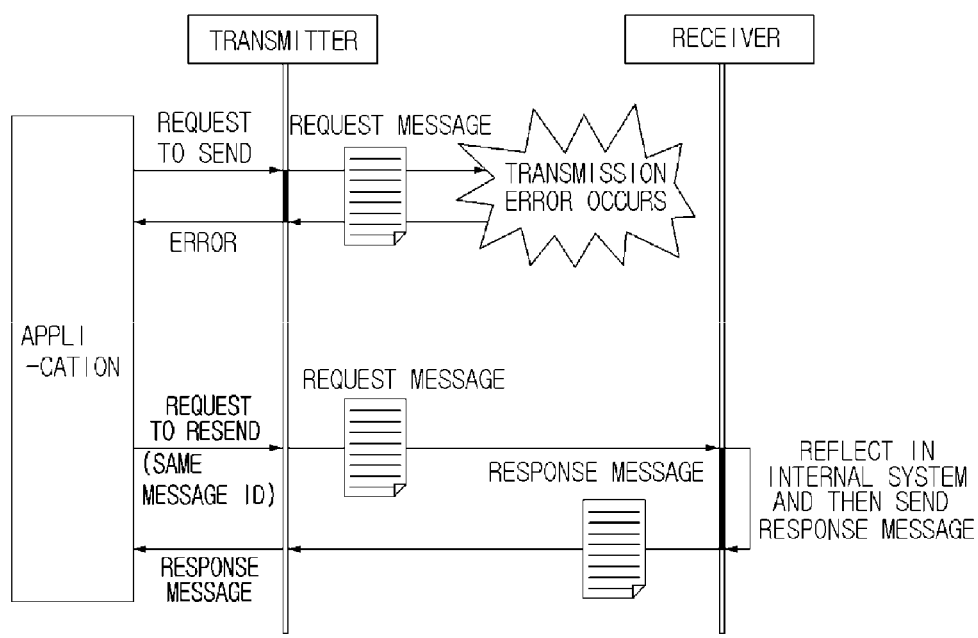

(1) error message sending failure: the sending error occurs when the transmitter sends a message so that the request message is not delivered to the receiver. The transmitter recognizes the sending failure by timeout or network error message for the trial of the transmission. FIG. 39 illustrates a process when the request message transmission is failed and the processing procedure is as follow 1) to 3).

Figure 40:
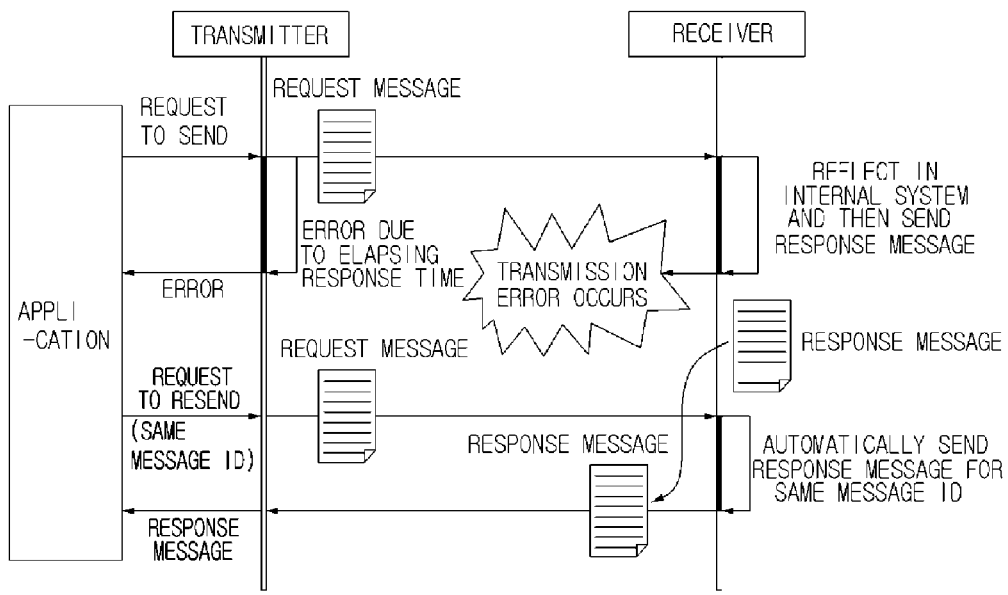

1) The sending error occurs in the process of the sending by the message transmitter. In most cases, this error is caused by the network error 2) If the transmitter receives an error message such as an HTTP error, the transmitter requests needs to resend the same message 3) Only when the reception confirmation message is received from the receiver, the transmitter recognizes that the sending is successful (2) response message reception failure: Even though the transmitter normally transmits a message, an error occurs when the response message is received from the receiver. In the position of the transmitter, the response message reception failure is not discriminated from the (1) request message transmission failure so that the error is processed by the same method. However, since the receiver normally receives the request message, the processing method is different from the transmitter's processing method. FIG. 40 illustrates a process related with the response message reception failure and the processing procedure will be described as follows 1) to 3).

1) Even though the message is normally delivered to the receiver, when the transmitter does not receive a reception confirmation message from the receiver 2) In this case, the transmitter recognizes as the transmission failure error and retransmits the identical message to the receiver with the identical MessageId 3) If the MessageId of the received document is identical to the previously received message, the receiver sends a reception confirmation message indicating redundant reception and internally processes the message (3) Error message reception: Even though the transmitter normally sends a message, an error occurs while the receiver who receives the sent message processes the message. In this case, the processing method of the transmitter is varied depending on the type of the error message. The error type on the communication protocol refers to the above-described "ErrorList" item. Further, the error occurring in the process of the internal processing on the request message for every connection interface refers to the message structure of the connection interface is referred. FIG. 39 illustrates a process related with the reception of the error message and the processing procedure is as follows 1) to 3).

1) Even though the message which is sent to the receiver is correctly delivered, when the error message is received due to the error of the transmission message 2) In this case, generally, the transmitter recreates the request message and then resends the message. However, the message processing may be varied depending on the error type 3) when the transmitter resends the request message, the MessageId of the message to be sent does not need to be identical to the previous message and differently processed in accordance with the task situation.

(4) three stage synchronous error: the message communication between three entities in which the communication client is connected to the other communication messaging server, the address directory server, and the communication relay server through the communication messaging server supports a synchronous connection method among the connection methods in order to immediately check the final result. During this process, if an error occurs in the connection step between the communication messaging server and the receiver, the communication messaging server immediately generates an error and then delivers the error to other communication messaging server as a response message. FIG. 40 illustrates a process related with the three stage synchronous error and the processing procedure is as follows 1) to 3).

1) Even though the transmission is successful in the process where the communication client transmits a message in connection with the communication messaging server, an error occurs in the process of transmitting a message to a receiver next to the communication messaging server (the address directory server, other communication messaging server, or the communication relay server)

2) In this case, the error refers to all errors that occur during the synchronous sending between the communication messaging server and the receiver 3) the communication messaging server generates an error message for the communication client at the time when the communication messaging server notices the error and delivers the error message to the communication client as a response message The error message created by the communication messaging server is configured in the structure of the following Table 62.

TABLE 62

| Name of item | Description | Number of repetition | Type | Length |
|---|---|---|---|---|
| Content | Root element | | | |
| DocType | type of communication message failure: 9 | 1 . . . 1 | Integer | 1 |
| Sender | receiver of request message certified electronic mailing address | 1 . . . 1 | String | Up to 128 |
| Receiver | transmitter of request message certified certified electronic mailing address | 1 . . . 1 | String | Up to 128 |
| RefIdentifier | unique identification value of request message | 1 . . . 1 | String | 36 |

TABLE 62-continued

| Name of item | Description | Number of repetition | Type | Length |
|---|---|---|---|---|
| Identifier | unique identification value of error message created in UUID type | 1 . . . 1 | String | 36 |
| ErrorCode | corresponding error code | 1 . . . 1 | Integer | 4 |

Hereinafter, the asynchronous error processing method in the error processing method will be described.

The message communication between three entities in which the communication client is connected to the other communication messaging server, the address directory server, and the communication relay server through the communication messaging server supports an asynchronous connection method among the connection methods adapted to situation of final receiver.

The final error for the asynchronous transmission may not be immediately checked by the transmitter, which is different from the synchronous transmission. Therefore, the communication messaging server generates an error message for the communication client at the time when the communication messaging server finally checks the error and allows the communication client to receive the error message.

Figure 41:
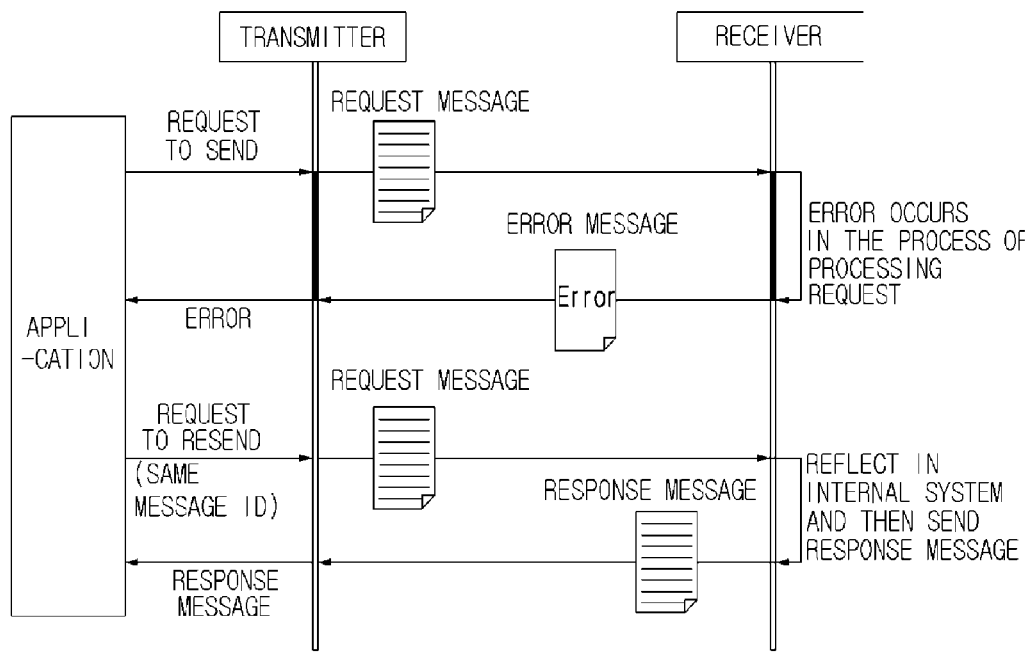

FIG. 41 illustrates a process related with the asynchronous error processing method and the processing method is as follows 1) to 4).

1) Even though the transmission is successful in the process where the communication client transmits a message in connection with the communication messaging server, an error occurs in the process of transmitting a message to a receiver next to the communication messaging server (the address directory server, other communication messaging server, or the communication relay server)

2) In this case, the error refers to all errors that occur during the synchronous transmission between the communication messaging server and the receiver 3) the communication messaging server generates an error message for the communication client at the time of finally recognizing the error after the retrial and then delivers the error message to the mail box of the communication client 4) the communication client notices the error for the previous request message by the error message which is received in its mail box in the process of requesting the reception message to the communication messaging server The error message generated by the communication messaging server is configured by the structure of the following Table 63.

TABLE 63

| Name of item | Description | Number of repetition | Type | Length |
|---|---|---|---|---|
| Content | Root element | | | |
| DocType | type of communication message failure: 9 | 1 . . . 1 | Integer | 1 |
| Sender | receiver of request message certified electronic mailing address | 1 . . . 1 | String | Up to 128 |
| Receiver | transmitter of request message certified electronic mailing address | 1 . . . 1 | String | Up to 128 |

TABLE 63-continued

| Name of item | Description | Number of repetition | Type | Length |
|---|---|---|---|---|
| RefIdentifier | unique identification value of request message | 1 . . . 1 | String | 36 |
| Identifier | unique identification value of error message created in UUID type | 1 . . . 1 | String | 36 |
| ErrorCode | corresponding error code | 1 . . . 1 | Integer | 4 |

[Connection Interface Between Communication Messaging Server and Address Directory Server]

The address directory server is a system that manages a certified electronic mailing address which is very basic in the communication system and is inevitably necessary in the electronic document communication.

The connection interface between the communication messaging server and the address directory server are largely divided into two functions. A first function is an interface related with a registration task of the certified electronic mailing address of the registration agency and a second function is an interface related with a task of physical address inquiring/response with the communication messaging server and reporting the spam.

The interface for the registration task of the certified electronic mailing address with the registration agency may be separated. However, the electronic document provider or the third party storing institution server is the registration agency so that the interface function is inserted in the communication messaging server.

In this case, in the communication messaging server provided in the transceiving entity, the connection interface related with the registration of the certified electronic mailing address is not inserted.

The interface function between the communication messaging server and the address directory server will be described in the following Table 64.

TABLE 64

| Classification of Interface | | Description of interface | Remark |
|---|---|---|---|
| Address Management | Register certified electronic mailing address (when address of certified sender/receiver is registered) | interface of registering certified electronic mailing address information of a certified sender/receiver who transmits/receives a document through the electronic document provider in the address directory server if the requested certified electronic mailing address is not unique in the address directory server, the registration is failed | Requester is electronic document provider |
| | Change certified electronic mailing address information | interface that requests the address directory server to change the information and receives the result when information concerning certified electronic mailing address (for example, security information or ID) is changed | |
| | Delete certified electronic mailing address | interface that requests the address directory server to delete the address and receives the result when the certified electronic mailing address registered in the address directory server is not used any more | |

TABLE 64-continued

| Classification of Interface | | Description of interface | Remark |
|---|---|---|---|
| Address search | Search physical address information | interface that requests the address directory server to search the security information (certificate) of the user corresponding to the certified electronic mailing address information and physical address information and then receives the result | Requester is electronic document provider and transceiving entity |
| Black-list management | Report spam message | interface that reports the spam message to the address directory server and then receives the reception as a result address directory server notifies the reporter and the spam sending party of the final processing result for the reported spam message (whether to be confirmed as a spam message) using "message transmitting interface" | |
| notification | Notify whitelist | interface that transmits whitelist from the address directory server to the transceiving entity | |
| | Notify blacklist | interface that transmits blacklist from the address directory server to the transceiving entity | |

Details of the interfaces between the communication messaging server and the address directory server will be described below.

First, common facts of the interfaces between the communication messaging server and the address directory server are as follows (1) and (2).

(1) Extension of MessageHeader of Request Message

The digital signature information of the transmitting entity needs to be delivered so as to be included in a SOAP message of the first MIME Part of the request message which is transmitted from the communication messaging server of the transmitting entity to the address directory server. Further, additional information (CorpNum, RValue) of the transmitting entity which is required for the address directory server to verify whether an owner of the certificate used for the digital signature of the SOAP message matches with the transmitting entity (VID verification) is also delivered to be included therein.

The additional information of the transmitting entity needs to be located at a lower level of the MessageHeader element in the SOAP message of the request message as an extension element (any ##other position).

The extension element structure will be described in the following Table 65.

TABLE 65

| Name of item | Description | Number of repetition | Type | Length |
|---|---|---|---|---|
| Extension | Extension element | 1 . . . 1 | | |
| CorpNum | business registration No. of provider or transceiving entity | 1 . . . 1 | String | 10 |
| RValue | Rvalue extracted from private key of certificate of provider or transceiving entity RValue is encoded by Base64 to be input | 1 . . . 1 | String | 28 |

(2) Entire Message Structure

In the connection interface between the communication messaging server and the address directory server, the SOAP message is located at the first MIME part of the message and the communication message for the request and response is located at the second MIME Part.

Figure 42:
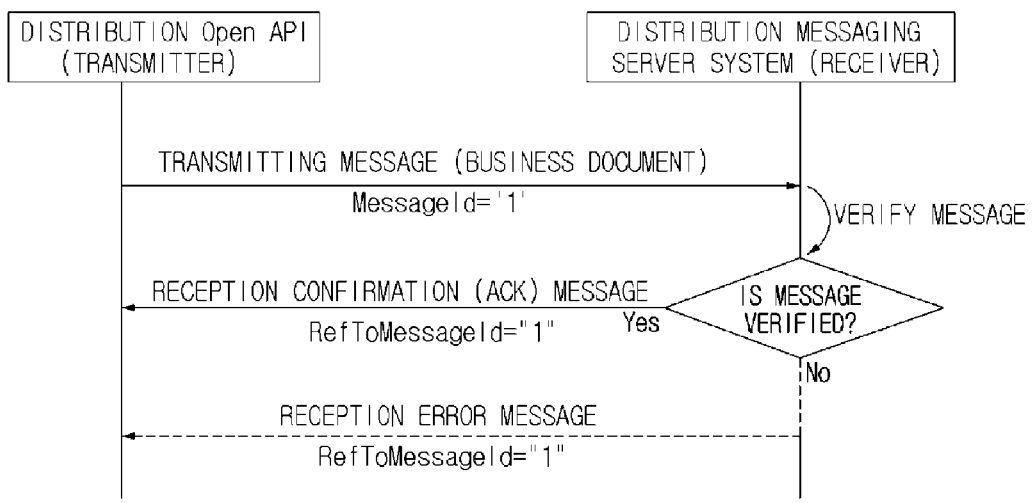

The SOAP structure between the communication messaging server and the address directory server is illustrated in FIG. 42.

Hereinafter, the registration of the certified electronic mailing address in the interface between the communication messaging server and the address directory server will be described.

Figure 43:
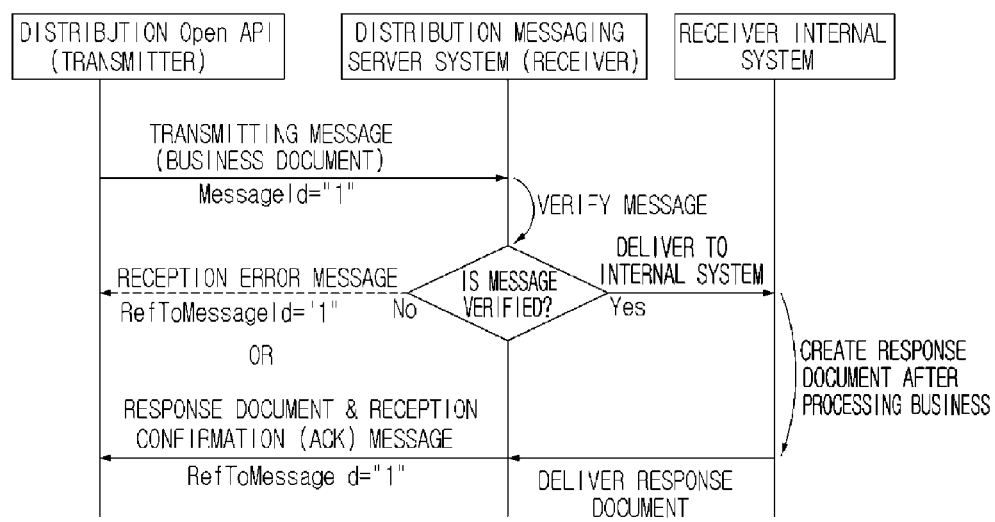

A message exchange flow related with the registration of the certified electronic mailing address is illustrated in FIG. 43.

The request communication message structure will be described in the following Table 67.

TABLE 67

| Name of item | Description | Number of repetition | Type | Length |
|---|---|---|---|---|
| Request RegAddrReq | request Root element registration request element of certified electronic mailing address of certified sender/receiver | | | |
| PeerCorpNum | business registration No. of transceiving entity | 1 . . . 1 | String | 10 |
| PeerRegNum | authentication No. of transceiving entity | 0 . . . 1 | String | 10 |
| Name | Name of member | 1 . . . 1 | String | 70 |
| Type | membership type personal: U business: C | 1 . . . 1 | String | 1 |
| IDN | Identification No. of member personal: resident registration number business: business registration No. | 1 . . . 1 | String | minimum 10 up to 13 |

TABLE 67-continued

| Name of item | Description | Number of repetition | Type | Length |
|---|---|---|---|---|
| RAddress | certified electronic mailing address | 1 ... 1 | String | minimum 1 up to 128 |
| Cert | certificate | 0 ... 1 | Base64 | — |
| Representative | name of representative in case of business member | 0 ... 1 | String | 30 |
| Addr | personal or business address | 0 ... 1 | String | 256 |
| Tel | personal or business phone number (omitting -) | 0 ... 1 | Integer | minimum 9 up to 12 |
| Fax | personal or business fax number | 0 ... 1 | Integer | minimum 9 up to 12 |
| Mobile | personal or business mobile phone number (omitting -) | 0 ... 1 | Integer | minimum 10 up to 12 |
| EMail | personal or business e-mail | 0 ... 1 | String | 256 |
| RegDate | registration date of certified electronic mailing address | 0 ... 1 | Long | — |
| EndDate | expiration date of certified electronic mailing address | 0 ... 1 | Long | — |
| ManagerName | name of manager of certified electronic mailing address | 0 ... 1 | String | 70 |
| ManagerAddr | address of manager of certified electronic mailing address | 0 ... 1 | String | 256 |
| ManagerEMail | email of manager of certified electronic mailing address | 0 ... 1 | String | 256 |
| ManagerTel | phone number of manager of certified electronic mailing address | 0 ... 1 | Integer | minimum 9 up to 12 |
| ManagerMobile | mobile phone number of manager of certified electronic mailing address | 0 ... 1 | Integer | minimum 10 up to 12 |

A structure of the response communication message will be described in the following Table 69.

TABLE 69

| Name of item | Description | Number of repetition | Type | Length |
|---|---|---|---|---|
| Response RegAddrRes | Response Root element registration agency (electronic document provider) member registration response element | | | |
| ResultCode | processing result success: 1 fail: 0 | 1 ... 1 | Boolean | — |
| ErrorCode | error code (only when the processing result is failed (0), input corresponding error code) | 0 ... 1 | String | 256 |

Hereinafter, an interface of changing the certified electronic mailing address information in the interface between the communication messaging server and the address directory server will be described.

The interface of changing the certified electronic mailing address information is an interface that allows the electronic document provider to request the address directory server to change the certified electronic mailing address information of the certified sender/receiver registered in the address directory server and receive the response. After transmitting the request message including the user information and the certified electronic mailing address information to be changed, the electronic document provider receives the changing result of the address directory server as a response message.

Figure 44:
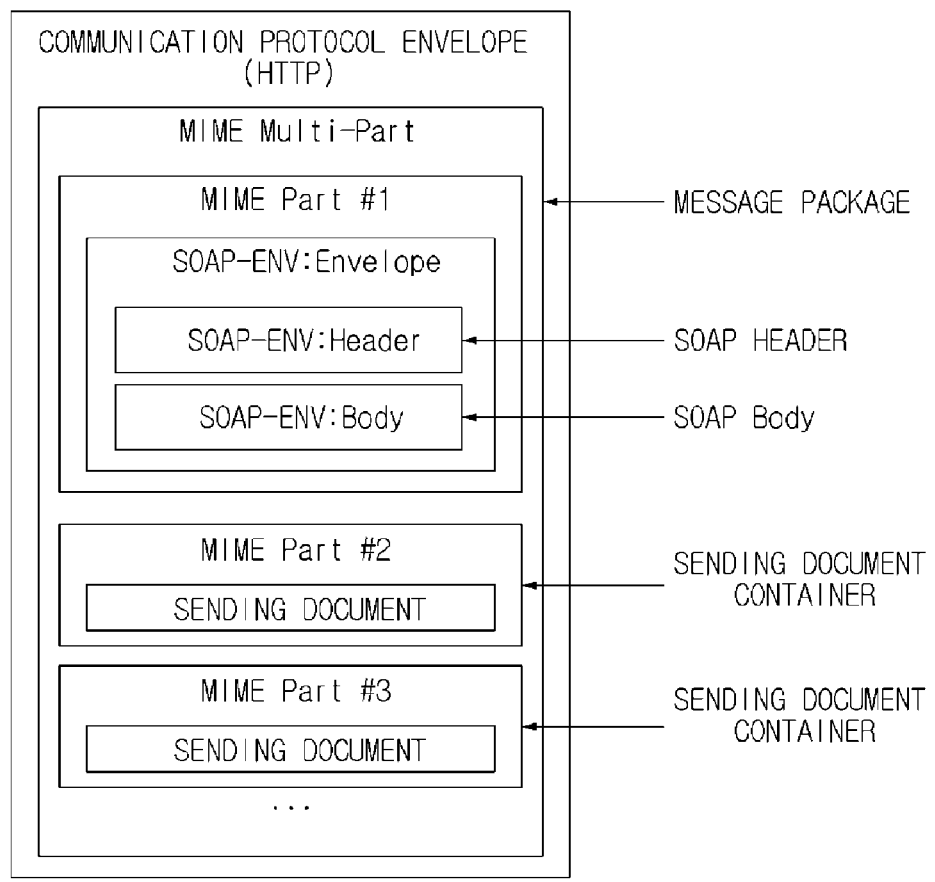

A message exchange flow related with the changing process of the certified electronic mailing address is illustrated in FIG. 44.

The request communication message structure will be described in the following Table 71.

TABLE 71

| Name of item | Description | Number of repetition | Type | Length |
|---|---|---|---|---|
| Request ModAddrReq | request Root element registration request element of certified electronic mailing address of certified sender/receiver | | | |
| PeerCorpNum | business registration No. of transceiving entity | 1 . . . 1 | String | 10 |
| PeerRegNum | authentication No. of transceiving entity | 0 . . . 1 | String | 10 |
| Name | Name of member | 0 . . . 1 | String | 70 |
| Type | membership type personal: U business: C | 0 . . . 1 | String | 1 |
| IDN | Identification No. of member personal: regident registration number business: business registration No. | 0 . . . 1 | String | minimum 10 up to 13 |
| RAddress | certified electronic mailing address | 1 . . . 1 | String | minimum 1 up to 128 |
| Cert | certificate | 0 . . . 1 | Base64 | — |
| Representative | name of representative in case of business member | 0 . . . 1 | String | 30 |
| Addr | personal or business address | 0 . . . 1 | String | 256 |
| Tel | personal or business phone number (omitting -) | 0 . . . 1 | Integer | minimum 9 up to 12 |
| Fax | personal or business fax number | 0 . . . 1 | Integer | minimum 9 up to 12 |
| Mobile | personal or business mobile phone number (omitting -) | 0 . . . 1 | Integer | minumum 10 up to 12 |
| EMail | personal or business e-mail | 0 . . . 1 | String | 256 |
| RegDate | registration date of certified electronic mailing address | 0 . . . 1 | Long | — |
| EndDate | expiration date of certified electronic mailing address | 0 . . . 1 | Long | — |
| ManagerName | name of manager of certified electronic mailing address | 0 . . . 1 | String | 70 |
| ManagerAddr | address of manager of certified electronic mailing address | 0 . . . 1 | String | 256 |
| ManagerEMail | email of manager of certified electronic mailing address | 0 . . . 1 | String | 256 |
| ManagerTel | phone number of manager of certified electronic mailing address | 0 . . . 1 | Integer | minumum 9 up to 12 |
| ManagerMobile | mobile phone number of manager of certified electronic mailing address | 0 . . . 1 | Integer | minumum 10 up to 12 |

A structure of the response communication message will be described in the following Table 73.

TABLE 73

| Name of item | Description | Number of repetition | Type | Length |
|---|---|---|---|---|
| Response ModAddrRes | Response Root element member modification response element of electronic document provoder | | | |
| ResultCode | processing result success: 1 fail | 1 . . . 1 | Boolean | — |

TABLE 73-continued

| Name of item | Description | Number of repetition | Type | Length |
|---|---|---|---|---|
| ErrorCode | error code (only when the processing result is failed (0), input corresponding error code) | 0 . . . 1 | String | 256 |

Figure 108:
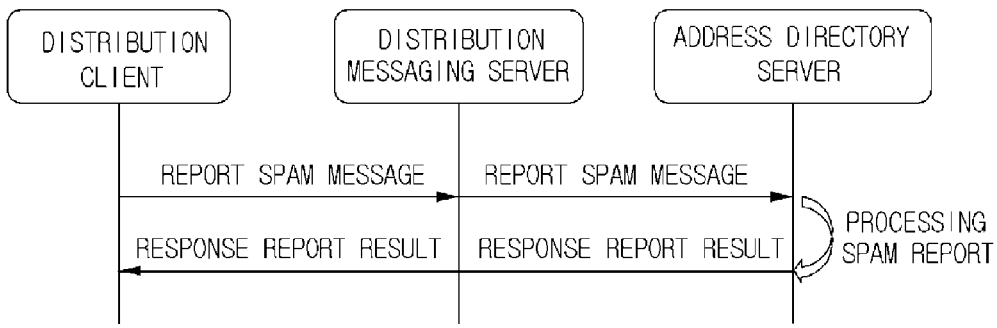

In FIG. 108, if the ResultCode is input as failure (0), an error code corresponding to a cause of the error is input as ErrorCode Hereinafter, an interface of deleting the certified electronic mailing address information in the interface between the communication messaging server and the address directory server will be described.

The interface of deleting the certified electronic mailing address information is an interface that allows the electronic document provider to request the address directory server to delete the certified electronic mailing address information of the certified sender/receiver registered in the address directory server and receive the response. After transmitting the request message including the user information and the certified electronic mailing address information to be deleted, the electronic document provider receives the deleting result of the address directory server as a response message.

Figure 45:
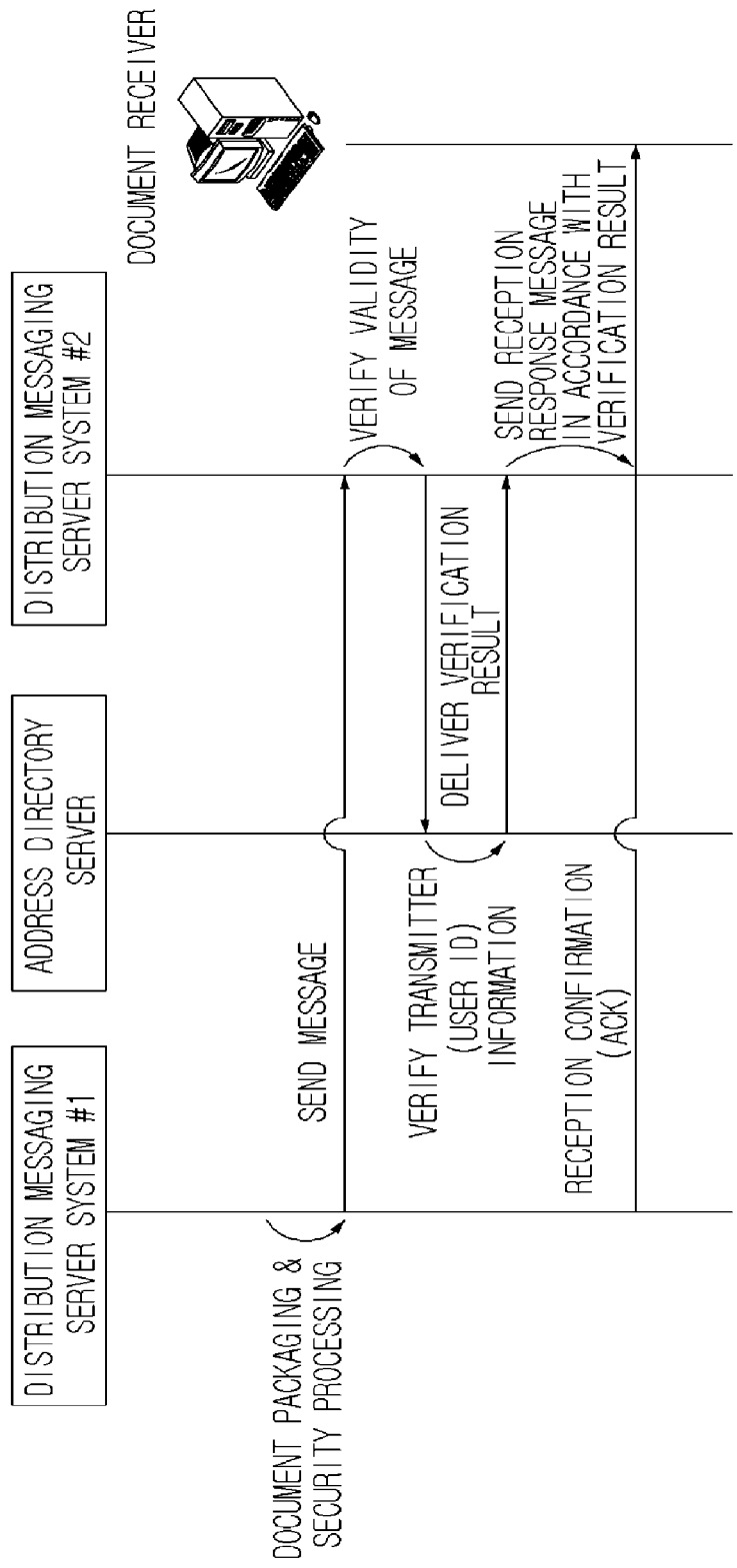

A message exchange flow related with the deleting process of the certified electronic mailing address is illustrated in FIG. 45.

The request communication message structure will be described in the following Table 75.

TABLE 75

| Name of item | Description | Number of repetition | Type | Length |
|---|---|---|---|---|
| Request DelAddrReq | request Root element deleting request element of certified electronic mailing address of member | | | |
| Name | name of member | 1 . . . 1 | String | Up to 70 |
| IDN | Identification No. of member personal: regident registration number business: business registration No. | 1 . . . 1 | String | Minimum 10 Up to 13 |
| RAddress | certified electronic mailing address | 1 . . . 1 | String | minimum 1 up to 128 |

A structure of the response communication message will be described in the following Table 77.

TABLE 77

| Name of item | Description | Number of repetition | Type | Length |
|---|---|---|---|---|
| Response DelAddrRes | Response Root element member deleting response element of electronic document provider | | | |
| ResultCode | processing result success: 1 fail: 0 | 1 . . . 1 | Boolean | — |

TABLE 77-continued

| Name of item | Description | Number of repetition | Type | Length |
|---|---|---|---|---|
| RAddress | certified electronic mailing address | 0 . . . ∞ | String | minimum 1 up to 128 |
| ErrorCode | error code (only when the processing result is failed (0), input corresponding error code) | 0 . . . 1 | String | 256 |

Figure 112:
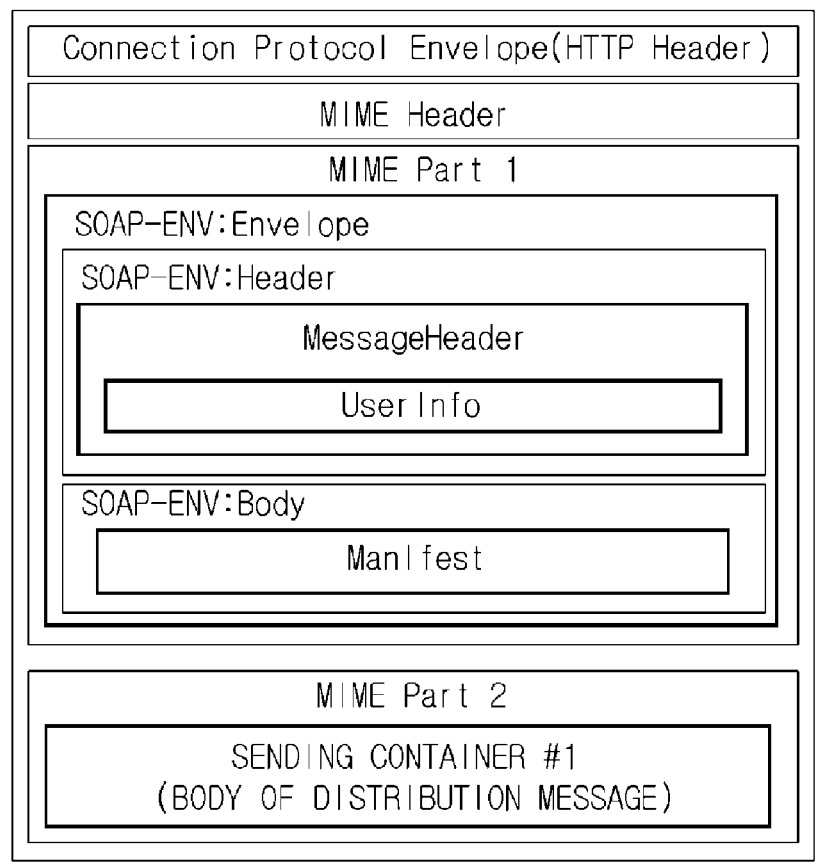

In FIG. 112, if the ResultCode is input as failure (0), an error code corresponding to a cause of the error is input as ErrorCode.

Hereinafter, an interface of searching physical address information in the interface between the communication messaging server and the address directory will be described.

The interface of searching physical address information is an interface that allows the electronic document provider or the transceiving entity to request the address directory server to request physical address information corresponding the certified electronic mailing address information of the receiver of the electronic document and certificate information for message secure processing and receive the response. After transmitting the request message including the certified electronic mailing address of the receiver of the electronic document and request of the certificate, the electronic document provider receives the physical address information (IP address or Domain address) of the receiver of the electronic document and the certificate information from the address directory server as a response message.

Figure 46:
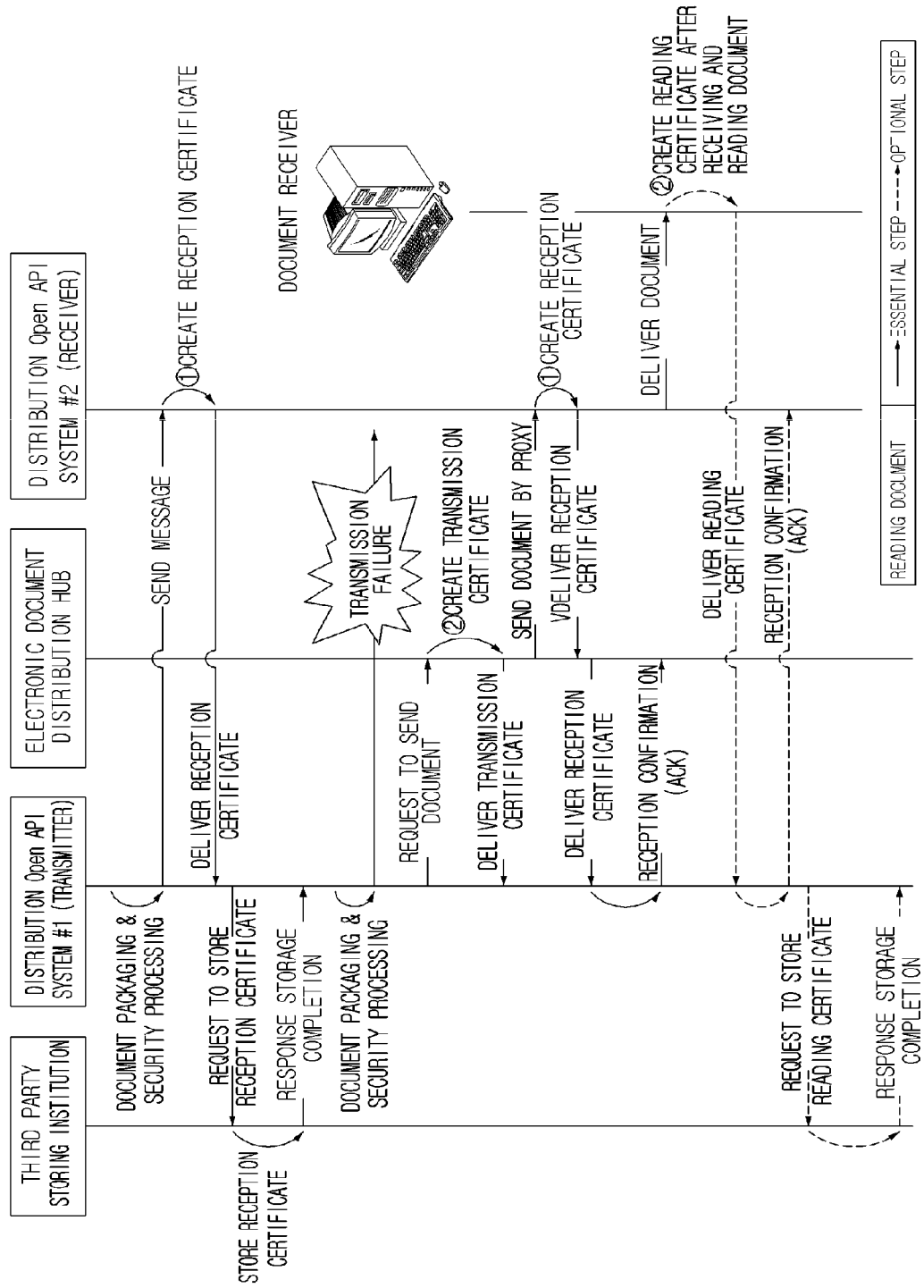

A message exchange flow related with the searching process of the physical address information is illustrated in FIG. 46.

The request communication message structure will be described in the following Table 79.

TABLE 79

| Name of item | Description | Number of repetition | Type | Length |
|---|---|---|---|---|
| Request SchAddrReq | request Root element searching request element of certified electronic mailing address | | | |
| ReqInfo | request certified electronic mailing address information element | 1 . . . ∞ | | |
| RAddress | certified electronic mailing address | 1 . . . 1 | String | Up to 128 |
| IsCert | request of certificate request: 1 no request: 0 | 1 . . . 1 | Integer | 1 |

A structure of the response communication message will be described in the following Table 81.

TABLE 81

| Name of item | Description | Number of repetition | Type | Length |
|---|---|---|---|---|
| Response | Response Root element | | | |
| SchAddrRes | searching response element of certified electronic mailing address | | | |
| ResultCode | processing result success: 1 fail: 0 | 1...1 | Boolean | — |
| ResultData | result list | 0...∞ | | |
| RAddress | certified electronic mailing address | 0...∞ | String | minimum 1 maximum 128 |
| IsExist | existence of address information (Attribute) existed: 1 not existed: 0 | 1...1 | Integer | 1 |
| Endpoint | physical address of certified electronic mailing address | 0...1 | String | maximum 256 |
| PeerRegNum | authentication number of transceiving entity | 0...1 | String | 10 |
| Cert | public key of receiver | 0...1 | Base64 | — |
| PeerCert | public key of transceiving entity | 0...1 | Base64 | — |
| ErrorCode | error code (only when the processing result is failed (0), input corresponding error code) | 0...1 | String | 256 |

Hereinafter, an interface of reporting a spam message in the interface between the communication messaging server and the address directory will be described.

The interface of reporting a spam message is an interface that allows the electronic document provider or the transceiving entity to report the spam message to the address directory server. After transmitting the request message including the certified electronic mailing address of the spam transmitter and spam message information, the interface receives whether to accept the spam report from the address directory server as a response message. If the determination regarding whether the reported spam message is a spam is completed, the address directory server notifies the processing result using the "message sending" interface of the connection interface between the communication messaging servers.

Figure 47:
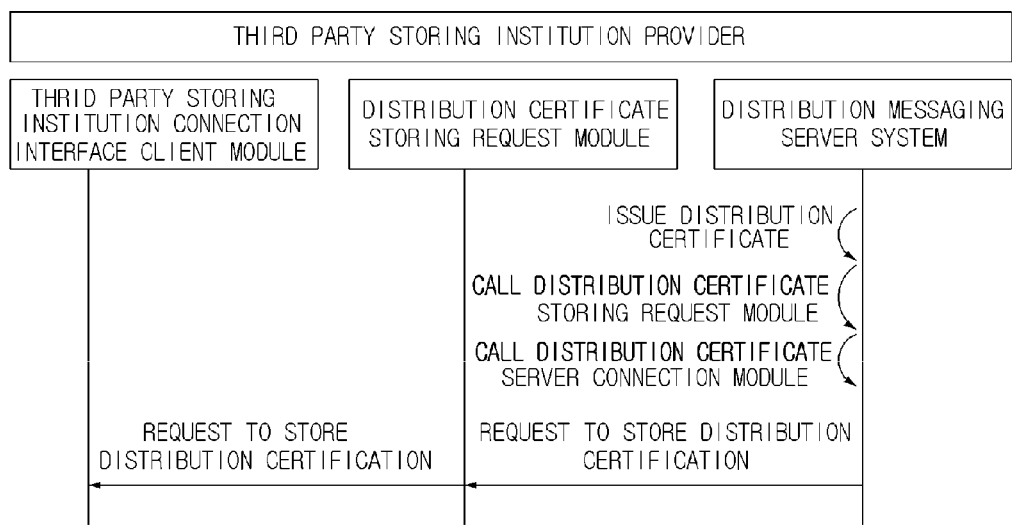

A message exchange flow related with the reporting and accepting process of the spam message is illustrated in FIG. 47.

The request communication message structure will be described in the following Table 83.

TABLE 83

| Name of item | Description | Number of repetition | Type | Length |
|---|---|---|---|---|
| Request ReportSpamReq | request Root element spam report request element | | | |
| ReportRAdderss | certified electronic mailing address of reporter | 1...1 | String | Up to 128 |

TABLE 83-continued

| Name of item | Description | Number of repetition | Type | Length |
|---|---|---|---|---|
| SpamRAdderss | certified electronic mailing address of spam transmitter | 1...1 | String | Up to 128 |
| ContentsPid | reference ID of content ID sent by spam transmitter (MIME Part cid of spam reporting message) | 1...1 | String | Up to 256 |
| AttacheFileInfo | attached document information sent by spam transmitter | 0...* | | |
| FilePid | reference ID of attached document information sent by spam transmitter (MIME Part cid of spam reporting message) | 1...1 | String | Up to 256 |
| FileName | reference name of attached document information sent by spam transmitter | 1...1 | String | Up to 256 |
| SpamPeerCorpNum | business number of distribution messaging server operator that is used by spam user | 1...1 | String | Up to 10 |

A structure of the response communication message will be described in the following Table 85.

TABLE 85

| Name of item | Description | Number of repetition | Type | Length |
|---|---|---|---|---|
| Response ReportSpamRes | Response Root element spam report response element | | | |
| ResultCode | processing result success: 1 fail: 0 | 1...1 | Boolean | — |
| RAddress | certified electronic mailing address of spam transmitter | 0...1 | String | minimum 1 up to 128 |
| ErrorCode | error code (only when the processing result is failed (0), input corresponding error code) | 0...1 | String | 256 |

In Table 85, it is noted that ResultCode is a simple acception processing result for the spam reporting message.

Hereinafter, an interface of notifying a whitelist in the interface between the communication messaging server and the address directory will be described.

The interface of notifying a whitelist is an interface that notifies the whitelist (list of the transceiving entities and certified electronic mailing addresses of the sender/receiver that participate in the communication system) to the transceiving entity.

Figure 48:
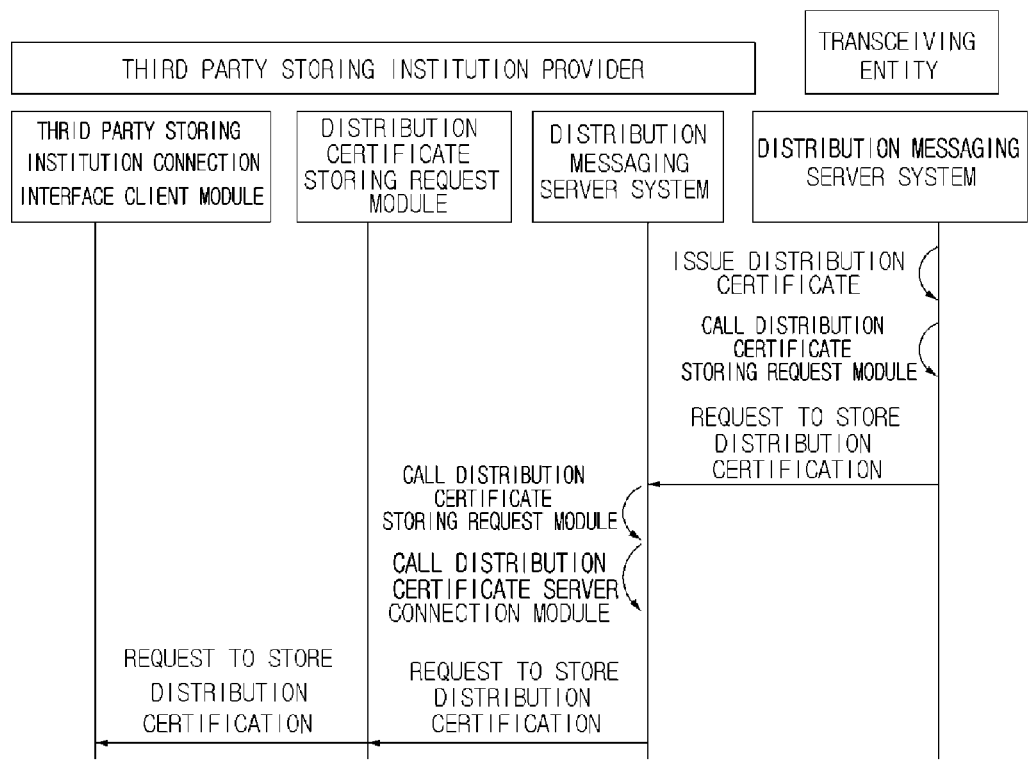

A message exchange flow related with the whitelist notification is illustrated in FIG. 48.

The request communication message structure will be described in the following Table 87.

TABLE 87

| Name of item | Description | Number of repetition | Type | Length |
|---|---|---|---|---|
| Request | request Root element | | | |
| BroadcastWlistReq | whitelist notifying request element | | | |
| PeerInfo | transceiving entity information | 1 . . . ∞ | | |
| Name | real name of registrant (individual: name institution: business name) | 1 . . . 1 | String | Up to 128 |
| PeerCorpNum | business number of operator of belonged distribution messaging server | 1 . . . 1 | String | Up to 128 |
| CorpType | (general corporation: C, ASP business: A) | 1 . . . 1 | String | Up to 256 |
| RAddress | certified electronic mailing address | 1 . . . ∞ | String | minimum 1 up to 128 |
| Tel | Phone number (input without using '-') | 0 . . . 1 | Integer | minimum 9 up to 12 |

A structure of the response communication message will be described in the following Table 89.

TABLE 89

| Name of item | Description | Number of repetition | Type | Length |
|---|---|---|---|---|
| Response BroadcastWlistRes | Response Root element whitelist notifying response element | | | |
| ResultCode | processing result success: 1 fail: 0 | 1 . . . 1 | Boolean | — |
| ErrorCode | error code (only when the processing result is failed (0), input corresponding error code) | 0 . . . 1 | String | 256 |

In Table 89, it is noted that ResultCode is a simple acceptation processing result for the spam reporting message Hereinafter, an interface of notifying a blacklist in the interface between the communication messaging server and the address directory server will be described.

The interface of notifying a blacklist (reception denial list) is an interface that notifies the blacklist to the transceiving entity. The notified blacklist is used to manage the blacklist by the transceiving entity.

Figure 82:
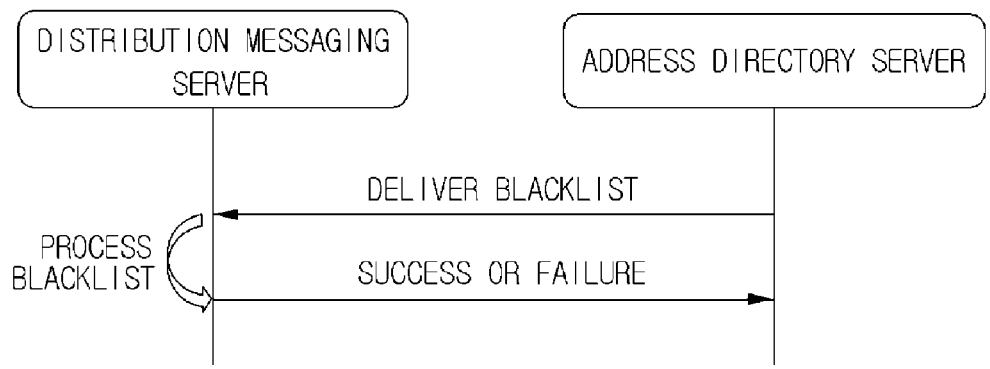

A message exchange flow related with the blacklist notification is illustrated in FIG. 82.

The request communication message structure will be described in the following Table 91.

TABLE 91

| Name of item | Description | Number of repetition | Type | Length |
|---|---|---|---|---|
| Request | request Root element | | | |

TABLE 91-continued

| Name of item | Description | Number of repetition | Type | Length |
|---|---|---|---|---|
| BroadcastBlistReq | blacklist notifying request element | | | |
| UserInfo | blacklist element | 1 . . . ∞ | | |
| SpamPeerCorpNum | business number of operator of distribution messaging server that transmits spam | 1 . . . 1 | String | Up to 128 |
| Name | real name of registrant (individual: name institution: business name) | 0 . . . 1 | String | Up to 128 |
| RAddress | certified electronic mailing address | 1 . . . ∞ | String | minimum 1 up to 128 |
| Tel | Phone number (input without using '-') | 0 . . . 1 | Integer | minimum 9 up to 12 |

A structure of the response communication message will be described in the following Table 93.

TABLE 93

| Name of item | Description | Number of repetition | Type | Length |
|---|---|---|---|---|
| Response | Response Root element | | | |
| BroadcastBlistRes | spam report response element | | | |
| ResultCode | processing result success: 1 fail: 0 | 1 . . . 1 | Boolean | — |
| ErrorCode | error code (only when the processing result is failed (0), input corresponding error code) | 0 . . . 1 | String | 256 |

[Connection Interface Between Communication Messaging Servers]

The communication messaging server is basically connected with a communication messaging server which is built by other transceiving entity or other electronic document provider in order to transmit/receive a message.

In addition to the above basic function, the communication messaging server has a connection function that delivers the communication certificate between the communication messaging server of the third party storing institution provider and other messaging server in order to store the communication certificate in the third party storing institution.

The connection interface between the communication messaging servers is a protocol for transmitting/receiving a message and a communication certificate between the messaging servers and classified by interfaces described in the following Table 95.

TABLE 95

| Classification of Interface | | Description of interface |
|---|---|---|
| Connection between communication messaging server | message transmission | an interface that allows a communication messaging server of a transmitter to transmit a message to a communication messaging server of a receiver after receiving a message, the receiving communication messaging server returns a reception certificate or an error message to the transmitting communication messaging server as a response message |
| | communication certificate delivery | an interface that allows a communication messaging server of a message receiver to transmit a reading certificate to a communication messaging server of a message transmitter when the message receiver reads the message, the receiving communication messaging server transmits the reading certificate to the message transmitting messaging server the communication messaging server that receives the communication certificate returns a reception confirmation ACK or an error message as a response message |
| | Request to store communication certificate | an interface that allows a general communication messaging server to request a communication messaging server of a third party storing institution provider to store the communication certificate the communication messaging server built by the third party storing institution needs to built a service that receives the communication certificate from the general communication messaging server and store the communication certificate in the third party storing institution general corporation/institution/personal communication messaging server other than the third party storing institution provider does not build this service |
| | third party storing institution storing result delivery | an interface that delivers the storage result (initial registration certificate) to a storing request communication messaging server after the communication messaging server of the third party storing institution provider stores the communication certificate/communication document |

Details of the interfaces between the communication messaging servers will be described below.

First, a common fact of the interfaces between the communication messaging servers is as follows (1).

(1) Extension of MessageHeader of request and response message

The digital signature information of the transmitter needs to be delivered so as to be included in a SOAP message which is a first MIME Part of the message of the connection interface between the communication messaging servers. Further, additional information (CorpNum, RValue) of the transmitter which is required to verify whether an owner of the certificate used for the digital signature of the SOAP message matches with the transmitter (VID verification) is also delivered to be included therein.

The additional information of the transmitter needs to be located at a lower level of the MessageHeader element in the SOAP message of the request and response message as an extension element (any ##other position).

The extension element structure will be described in the following Table 96.

TABLE 96

| Name of item | Description | Number of repetition | Type | Length |
|---|---|---|---|---|
| Extension | Extension element | 1 ... 1 | | |
| CorpNum | business registration No. of transmitter | 1 ... 1 | String | 10 |
| RValue | RValue extracted from private key of transmitter certificate RValue is encoded by Base64 to be input | 1 ... 1 | String | 28 |

Hereinafter, a message transmitting interface in the interfaces between the communication messaging servers will be described.

The message transmitting interface is used when one communication messaging server transmits a message to the other communication messaging server.

Figure 83:
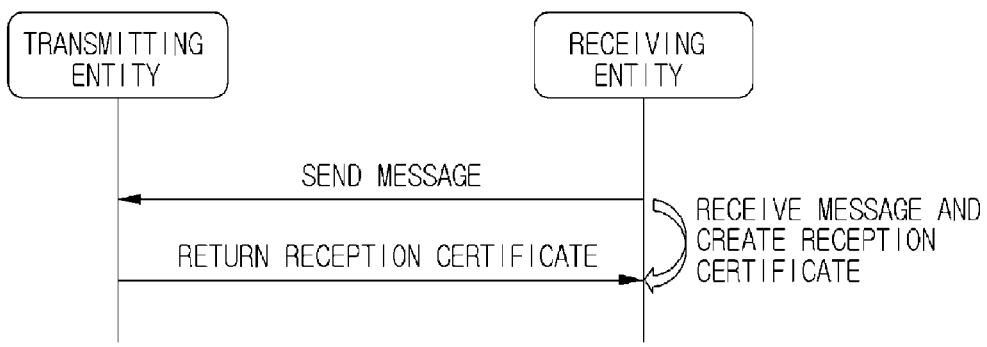
FIGS. 83 to 97 are views illustrating a linkage interface between communication messaging servers in the electronic document communication system according to the exemplary embodiment of the present invention.

A message structure of message transmitting interface is illustrated in FIG. 83.

Figure 84:
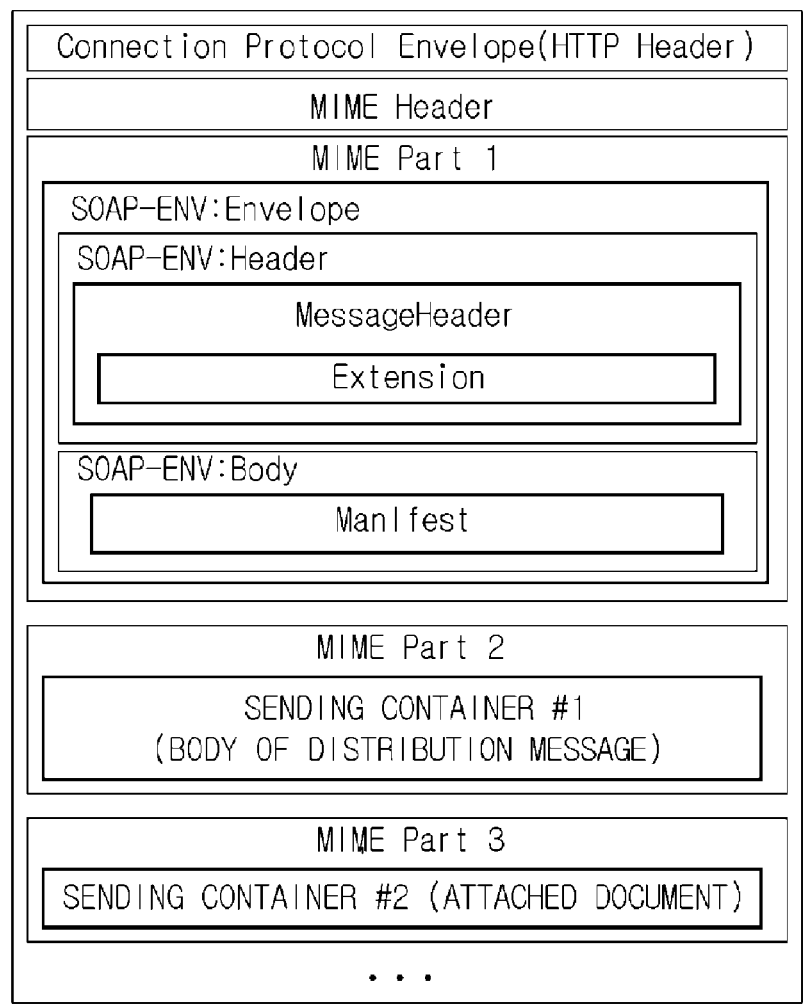

A request format at the time of exchanging a message is illustrated in FIG. 84. In the entire message structure as illustrated in FIG. 84, a SOAP message is located in a first MIME Part, a request communication message is located in a second MIME Part, and a document which is attached by the user is located in a third or subsequent MIME part.

The request communication message structure will be described in the following Table 98.

TABLE 98

| Name of item | Description | Number of repetition | Type | Length |
|---|---|---|---|---|
| Request SendMsgReq | request Root element message transmitting request element | | | |
| DocType | type of distribution message document: 0 | 1 ... 1 | Integer | 1 |
| Title | title of message | 1 ... 1 | String | Up to 256 |
| Text | body of message may be encrypted as certificate of receiver by transmitter | 0 ... 1 | String | — |
| Sender | certified electronic mailing address of transmitter | 1 ... 1 | String | Up to 128 |
| Receiver | certified electronic mailing address of receiver | 1 ... 1 | String | Up to 128 |
| ReqConfirm | request reading certificate unrequested: 0 requested: 1 | 1 ... 1 | Integer | 1 |
| IsEncrypted | encryption of message plane text: 0 cipertext: 1 | 1 ... 1 | Integer | 1 |

TABLE 98-continued

| Name of item | Description | Number of repetition | Type | Length |
|---|---|---|---|---|
| Identifier | unique identifier (UUID) of request distribution message | 1 . . . 1 | String | 36 |

In Table 98, if the body is not necessary for the purpose of delivering the document, the Text may be omitted.

Figure 85:
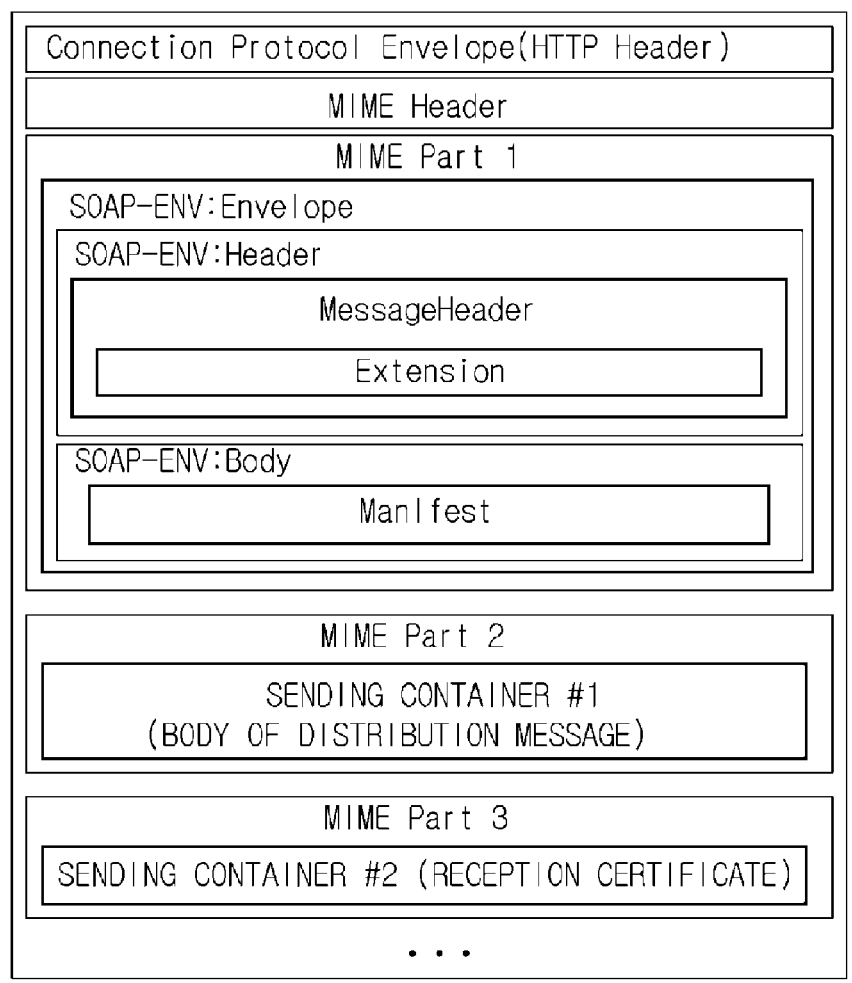

A response format at the time of exchanging a message is illustrated in FIG. 85. In the entire message structure as illustrated in FIG. 85, a SOAP message is located in a first MIME Part, a response communication message is located in a second MIME Part, and a reception certificate is located in a third MIME part. If an error occurs in the process of processing the request message, the third MIME Part is not generated.

The response communication message structure will be described in the following Table 100.

TABLE 100

| Name of item | Description | Number of repetition | Type | Length |
|---|---|---|---|---|
| Response SendMsgRes | request Root element message transmitting response element | | | |
| DocType | type of distribution message reception certificate: 1 error: 9 | 1 . . . 1 | Integer | 1 |
| RefIdentifier | unique identifier value (UUID) of request distribution message corresponding to response distribution message | 1 . . . 1 | String | 36 |
| ErrorCode | error code (only when the type of distribution message is error (9), input corresponding error code) | 0 . . . 1 | String | 256 |

In Table 100, if DocType is an error (9), the MIME Part 3 in which the reception certificate is located is not generated.

Hereinafter, a communication certificate delivering interface in the interface between the communication messaging servers will be described.

The communication certificate delivering interface is used when the communication messaging server sends the reading certificate to the other communication messaging server. Further, the communication certificate transmitting interface is used when the communication relay server receives the request to send the electronic document, send the electronic document to the receiving communication messaging server and then sends the received reception certificate to the sending request communication messaging server as a response message.

Figure 86:
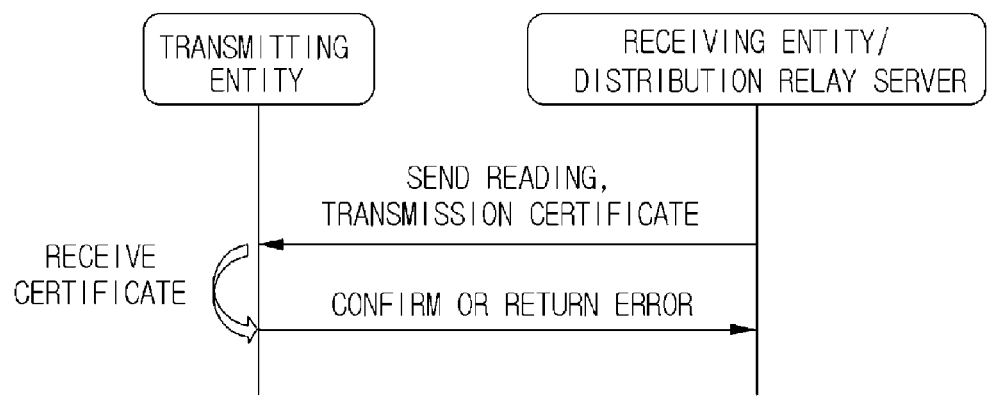

A message exchanging flow related with the communication certificate delivering processing is illustrated in FIG. 86.

Figure 87:
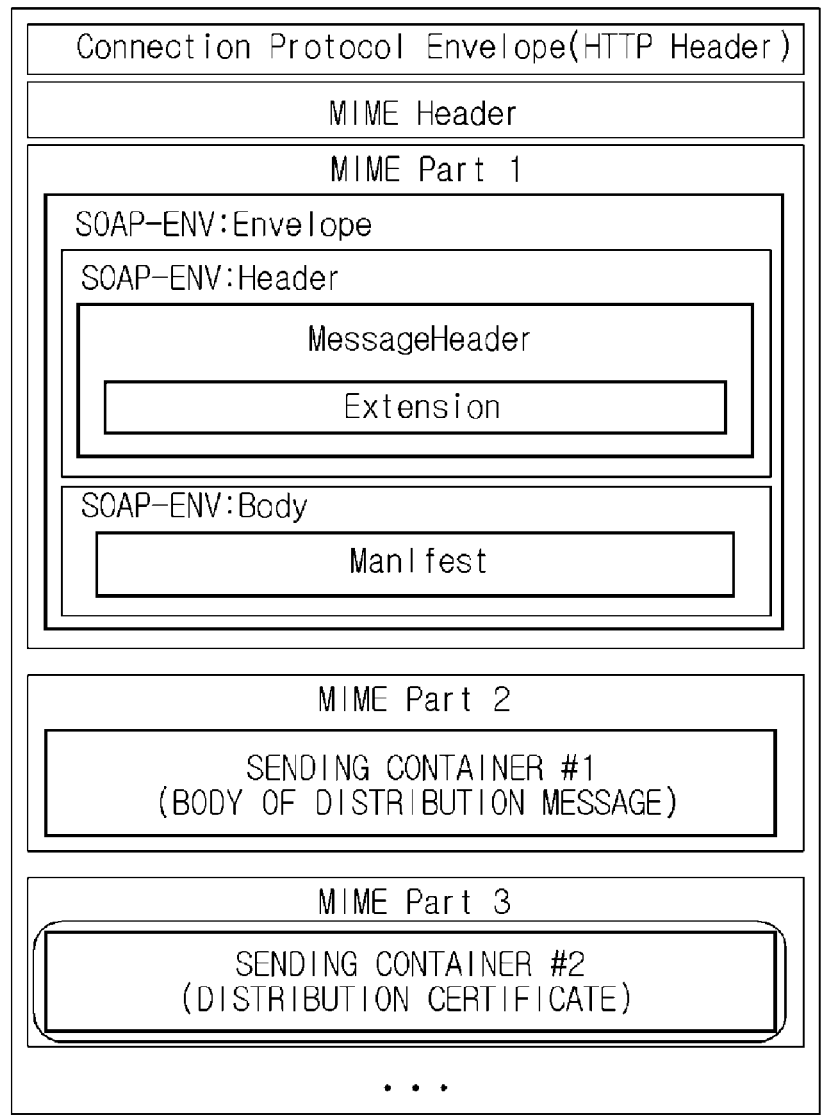

A communication certificate delivery request format is illustrated in FIG. 87. In the entire message structure as illustrated in FIG. 87, a SOAP message is located in a first MIME Part, a request communication message is located in a second MIME Part, and a communication certificate is located in a third MIME part.

The request communication message structure will be described in the following Table 102.

TABLE 102

| Name of item | Description | Number of repetition | Type | Length |
|---|---|---|---|---|
| Request SendCertReq | request Root element distribution certificate delivering request element | | | |
| DocType | type of distribution message reception certificate: 1 transmission certificate: 2 reading certificate: 3 | 1 . . . 1 | Integer | 1 |
| Sender | certified electronic mailing address of transmitter of certificate | 1 . . . 1 | String | Up to 128 |
| Receiver | certified electronic mailing address of receiver | 1 . . . 1 | String | Up to 128 |
| Identifier | unique identifier (UUID) of request distribution message | 1 . . . 1 | String | 36 |
| TargetIdentifier | unique identifier (UUID) of transmission request distribution message whose certificate needs to be issued | 1 . . . 1 | String | 36 |

Figure 88:
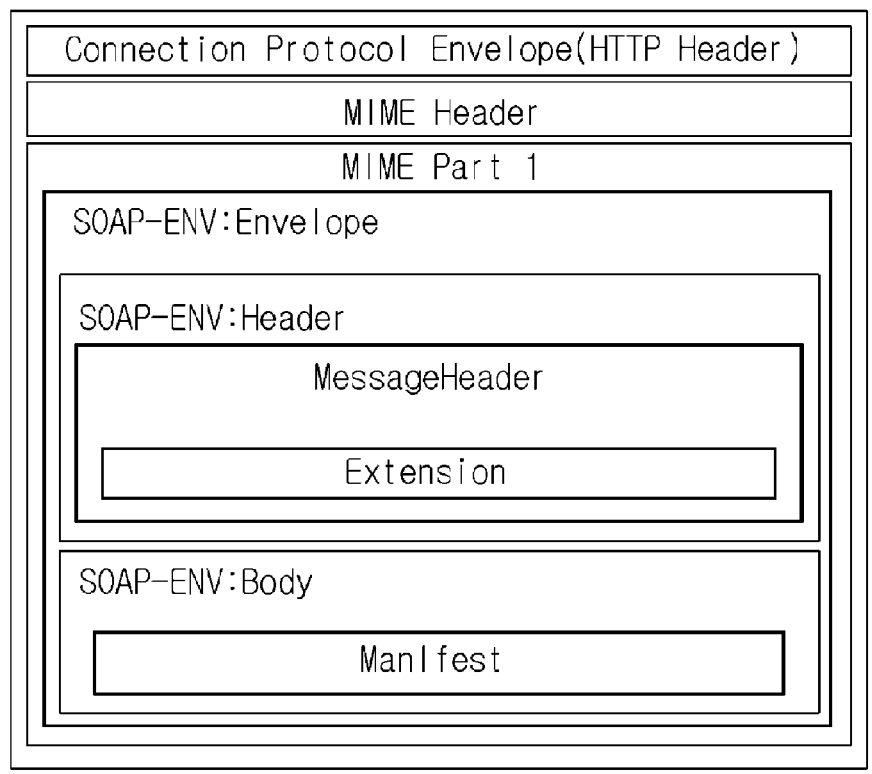
Figure 89:
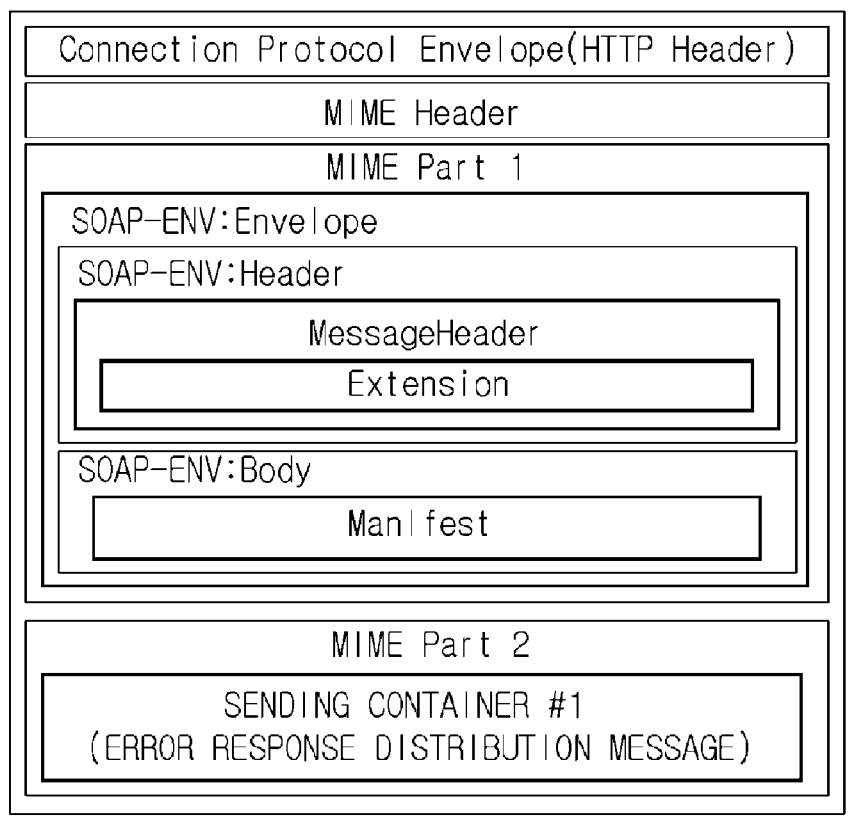

A communication certificate transmission response format is illustrated in FIGS. 88 and 89 (FIG. 88 illustrates the communication certificate transmission response in case of being successful, FIG. 89 illustrates the communication certificate transmission response in case of being failed). In the entire message structure as illustrated in FIGS. 88 and 89, if the processing for the request message is successful, only reception confirmation Acknowledgment SOAP message is located in a first MIME Part. In case of being an error, a SOAP message is located in the first MIME Part and error response message is located in a second MIME Part.

The response communication message structure will be described in the following Table 104. Table 104 corresponds only when the processing result is failed.

TABLE 104

| Name of item | Description | Number of repetition | Type | Length |
|---|---|---|---|---|
| Response SendCertRes | request Root element distribution certificate delivery response element | | | |
| DocType | type of sending message error: 9 | 1 . . . 1 | Integer | 1 |
| RefIdentifier | unique identifier (UUID) of request distribution message corresponding to response distribution message | 1 . . . 1 | String | 36 |
| ErrorCode | error code | 1 . . . 1 | String | 256 |

Hereinafter, a communication certificate storing request interface in the interface between the communication messaging servers will be described.

The communication certificate storing request interface is used when the communication messaging server of the transceiving entity requests the communication messaging server of the third party storing institution to store the communication certificate in order to store the communication certificate in the third party storing institution. In the response message in the interface, only reception confirmation information is included. An initial registration certificate which is issued as a result that the communication certificate is stored in the third party storing institution is delivered to the storing request communication messaging server using a "third party storing institution storing result delivering interface which will be described below.

Figure 90:
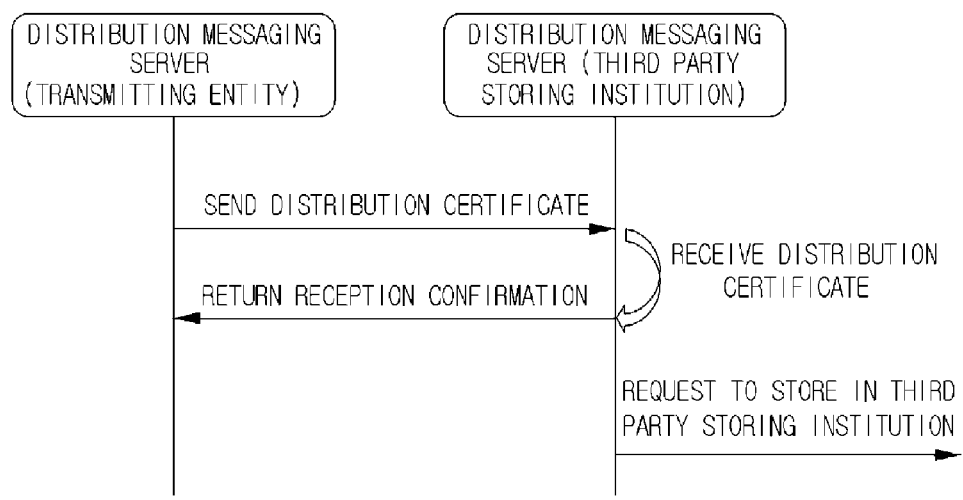

A message exchanging flow related with the communication certificate storing request processing is illustrated in FIG. 90.

Figure 91:
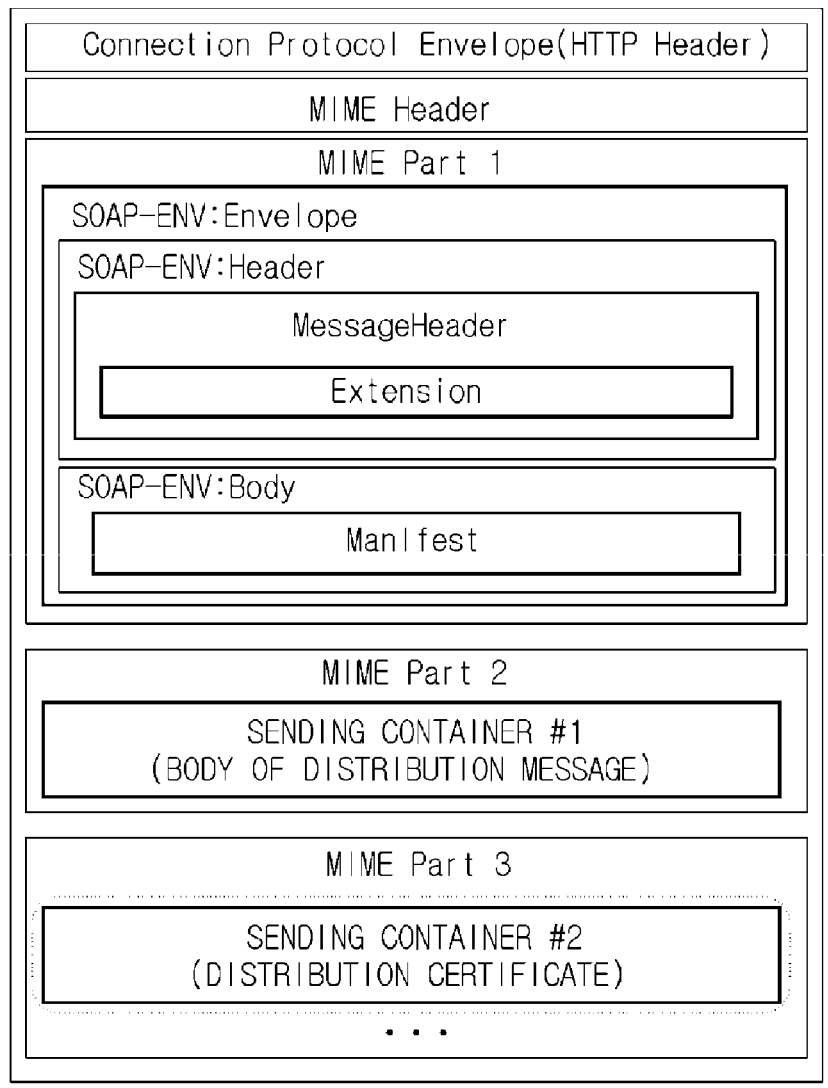

A communication certificate storing request format is illustrated in FIG. 91. In the entire message structure as illustrated in FIG. 91, a SOAP message is located in a first MIME Part, a request communication message is located in a second MIME Part, and a communication certificate is located in a third MIME part.

The request communication message structure will be described in the following Table 105.

TABLE 105

| Name of item | Description | Number of repetition | Type | Length |
|---|---|---|---|---|
| Request RegCertReq | request Root element distribution certificate storing request element | | | |
| DocType | type of distribution message reception certificate: 1 transmission certificate: 2 reading certificate: 3 | 1...1 | Integer | 1 |
| Sender | certified electronic mailing address of transmitter | 1...1 | String | Up to 128 |
| Receiver | certified electronic mailing address of receiver | 1...1 | String | Up to 128 |
| Identifier | unique identifier (UUID) of request distribution message | 1...1 | String | 36 |

Figure 92:
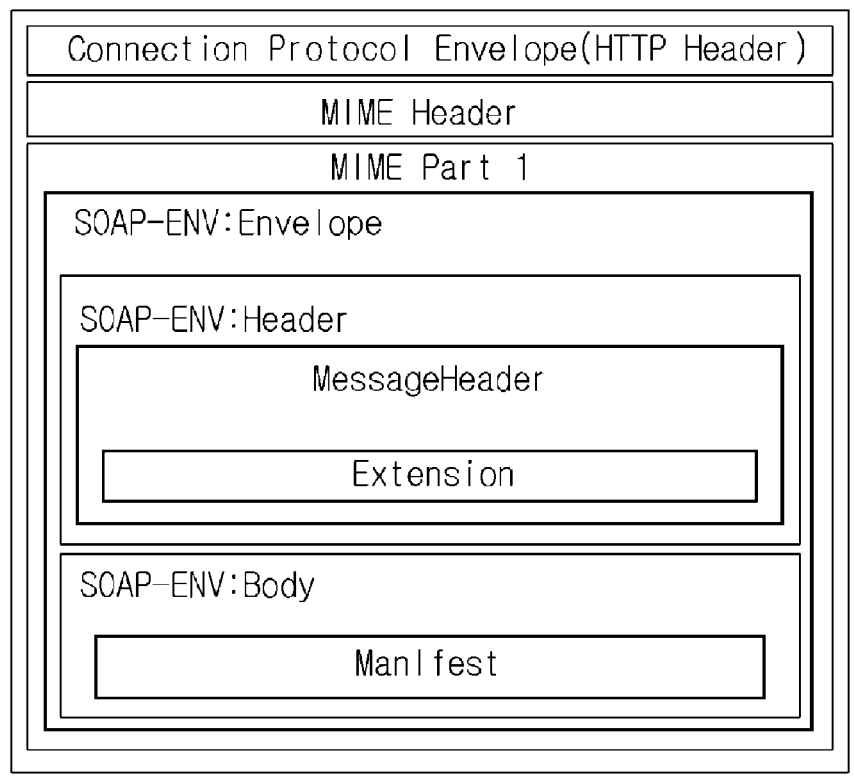
Figure 93:
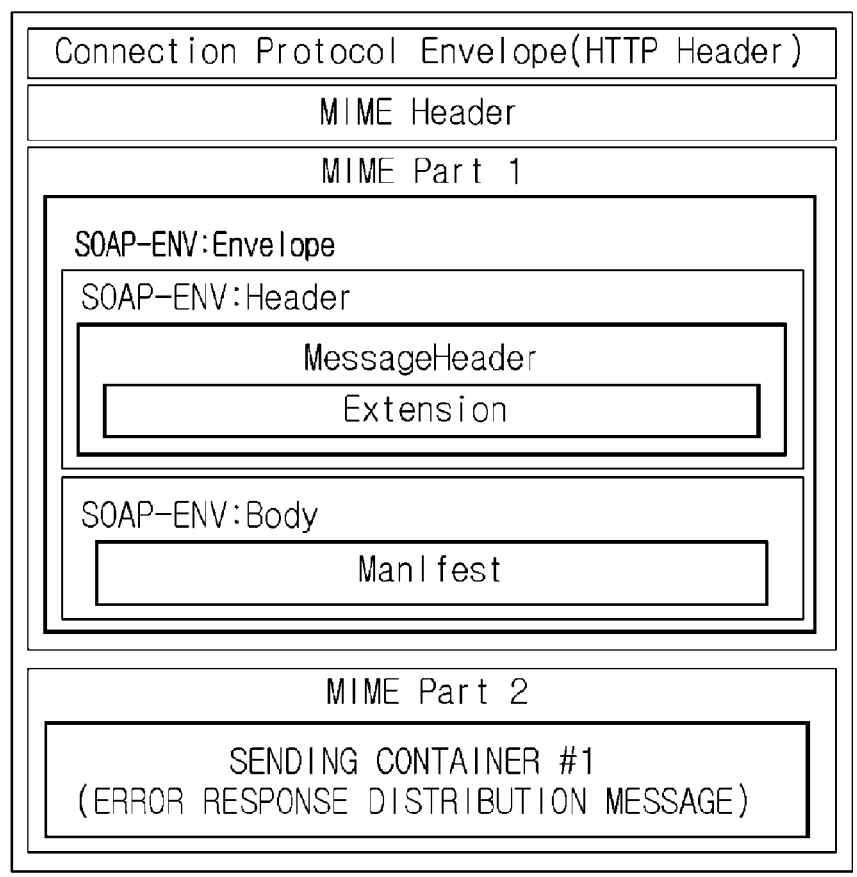

A communication certificate storing response format is illustrated in FIGS. 92 and 93 (FIG. 92 illustrates the communication certificate storing response in case of being successful, FIG. 93 illustrates the communication certificate storing response in case of being failed). In the entire message structure as illustrated in FIGS. 92 and 93, if the processing for the request message is successful, only a reception confirmation Acknowledgment SOAP message is located in a first MIME Part. In case of being an error, a SOAP message is located in the first MIME Part and error response message is located in a second MIME Part.

The response communication message structure will be described in the following Table 107. Table 107 corresponds only when the processing result is failed.

TABLE 107

| Name of item | Description | Number of repetition | Type | Length |
|---|---|---|---|---|
| Response RegCertRes | request Root element distribution certificate storing response element | | | |
| DocType | type of distribution message error: 9 | 1...1 | Integer | 1 |
| RefIdentifier | unique identifier (UUID) of request distribution message corresponding to response distribution message | 1...1 | String | 36 |
| ErrorCode | error code | 1...1 | String | 256 |

Hereinafter, a third party storing institution storing result delivering interface in the interface between the communication messaging servers will be described.

The third party storing institution storing result delivering interface is used when the communication messaging server of the third party storing institution provider stores the communication certificate in the third party storing institution and then transmits the initial registration certificate which is received as the result to the communication messaging server that requests to store the communication certificate.

Figure 94:
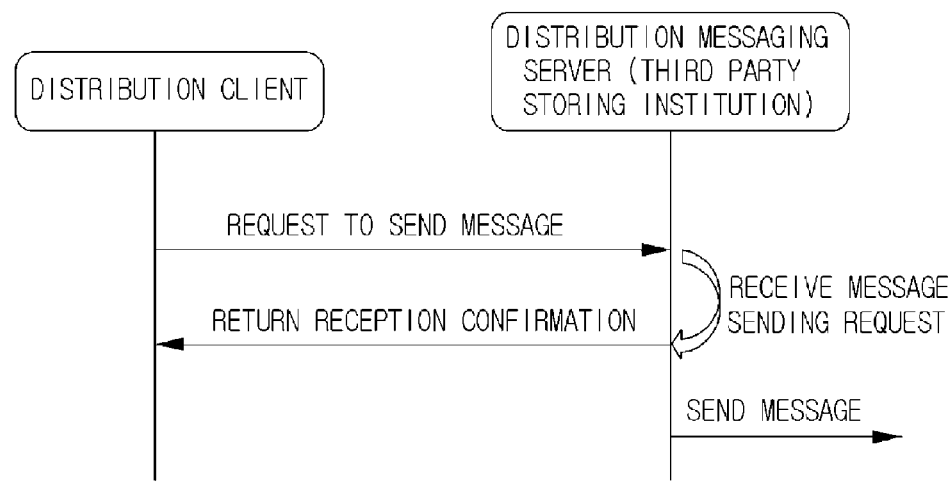

A message exchanging flow related with the third party storing institution storing result delivery processing is illustrated in FIG. 94.

Figure 95:
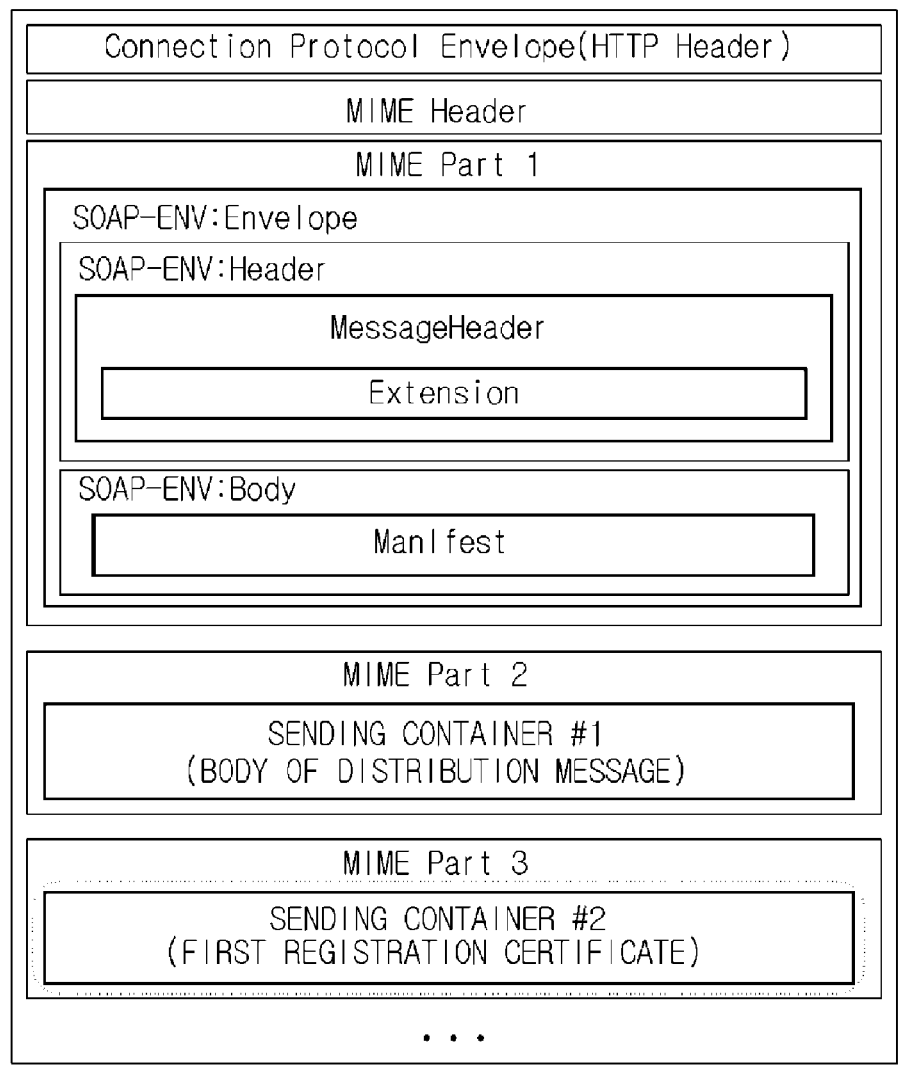

A third party storing institution storing result delivery format is illustrated in FIG. 95. In the entire message structure as illustrated in FIG. 95, a SOAP message is located in a first MIME Part, a request communication message is located in a second MIME Part, and the first registration certificate is located in a third MIME part. If an error occurs in the process of storing the communication certificate in the third party storing institution, the third MIME Part is not generated.

The request communication message structure will be described in the following Table 108.

TABLE 108

| Name of item | Description | Number of repetition | Type | Length |
|---|---|---|---|---|
| Request RegResultReq | request Root element third party storing institution storing result delivery processing request element | | | |
| DocType | type of communication message initial registration certificate: 4 error: 9 | 1...1 | Integer | 1 |
| Sender | certified electronic mailing address of transmitter | 1...1 | String | Up to 128 |

TABLE 108-continued

| Name of item | Description | Number of repetition | Type | Length |
|---|---|---|---|---|
| Receiver | certified electronic mailing address of receiver | 1 . . . 1 | String | Up to 128 |
| Identifier | unique identifier (UUID) of request communication message | 0 . . . 1 | String | Up to 128 |
| TargetIdentifier | unique identifier (UUID) of communication certificate storing request communication message which is a target of the request communication messaging | 1 . . . 1 | String | Up to 128 |
| ErrorCode | error code (only when the type of communication message is error (9), input corresponding error code) | 0 . . . 1 | String | Up to 256 |

In Table 108, if DocType is an error (9), the MIME Part 3 in which the initial registration certificate is located is not generated.

Figure 96:
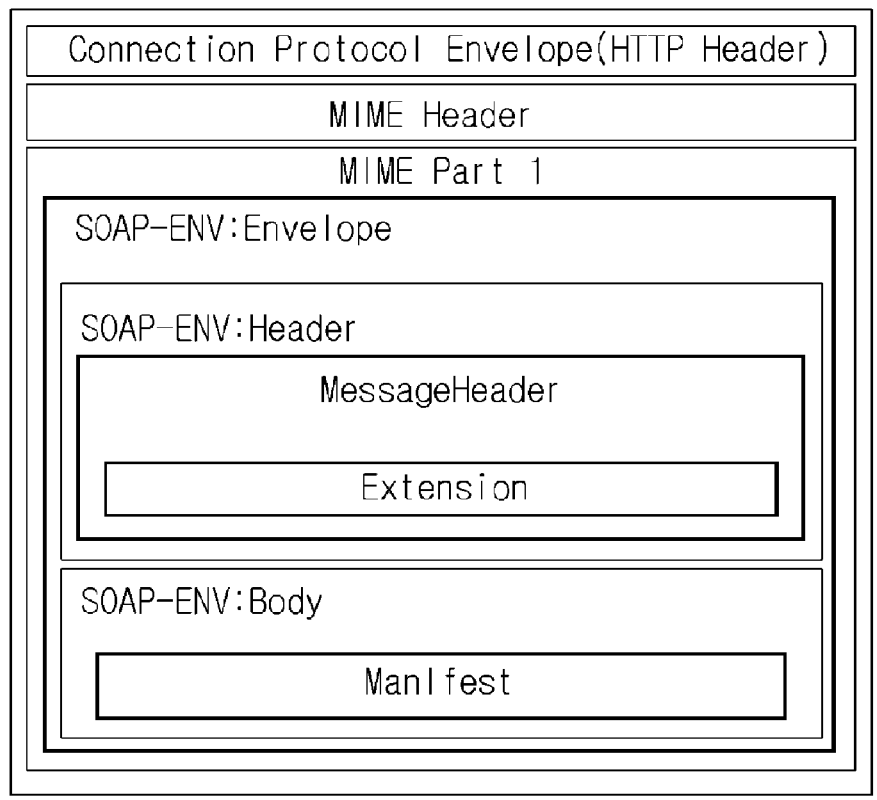
Figure 97:
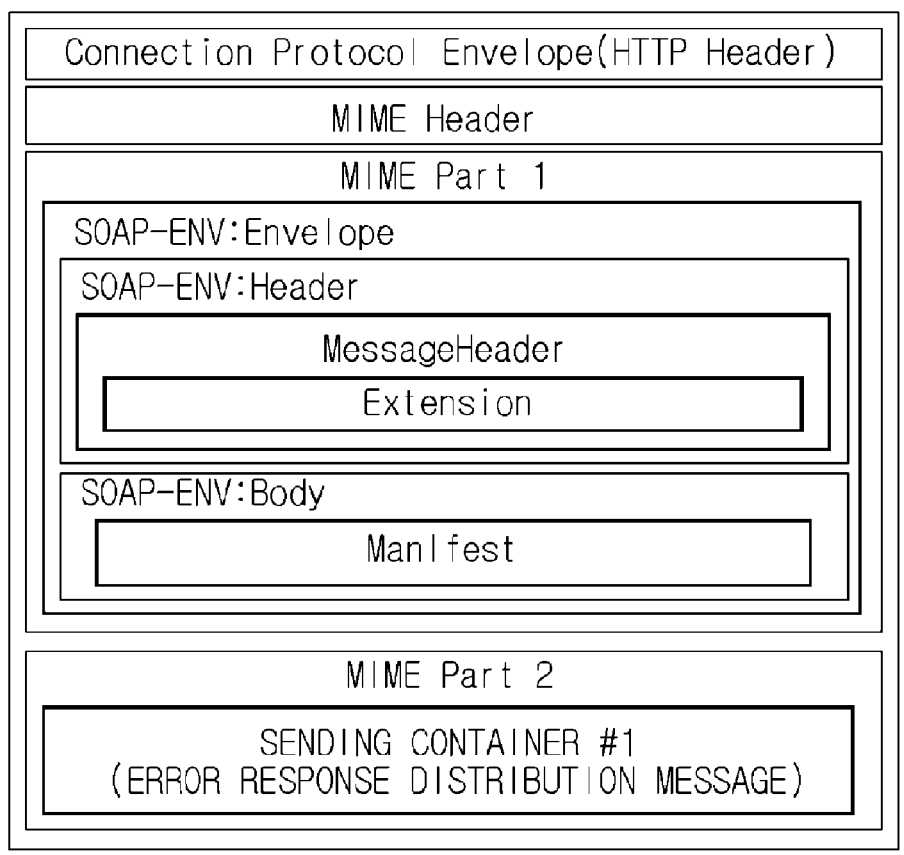

A third party storing institution storing result response format is illustrated in FIGS. 96 and 97 (FIG. 96 illustrates the communication certificate transmission response in case of being successful, FIG. 97 illustrates the communication certificate transmission response in case of being failed). In the entire message structure as illustrated in FIGS. 96 and 97, if the processing for the request message is successful, only a reception confirmation Acknowledgment SOAP message is located in a first MIME Part. In case of being an error, a SOAP message is located in the first MIME Part and error response message is located in a second MIME Part.

The response communication message structure will be described in the following Table 110. Table 110 corresponds only when the processing result is failed.

TABLE 110

| Name of item | Description | Number of repetition | Type | Length |
|---|---|---|---|---|
| Response RegResultRes | request Root element third party storing institution storing result delivery processing result element | | | |
| DocType | type of distribution message error: 9 | 1 . . . 1 | Integer | 1 |
| RefIdentifier | unique identifier (UUID) of request distribution message corresponding to response distribution message | 1 . . . 1 | String | 36 |
| ErrorCode | error code | 1 . . . 1 | String | 256 |

[Connection Interface Between Communication Client and Communication Messaging Server]

The communication messaging server needs to provide a basic document transceiving function to a user in connection with a system (communication client) for a user (an internal sender/receiver or a certified sender/receiver) that requests actual electronic document communication.

The connection interface between the communication client and the communication messaging server is a protocol that allows the communication client to primarily communicate with the communication messaging server in order to transmit and receive the electronic document and classified into interfaces as described in the following Table 111.

TABLE 111

| Classification of Interface | | Description of interface |
|---|---|---|
| Connection interface between communication client and communication messaging server | Request to transmit message | an interface that allows a communication client to request a communication messaging server to transmit a message |
| | Request message list | an interface for requesting a list of received message received in the communication messaging server after authenticating the communication client user, the communication messaging server delivers the received message lists to the user |
| | Request details of message | an interface that allows the communication client to request whole information for a specific received message to the user to the communication messaging server after authenticating the communication client user, the communication messaging server delivers the whole information of the message requested by the user |
| | Report spam message | an interface that allows the communication client to report a spam message after authenticating the communication client user, the communication messaging server delivers the contents reported by the user to the address directory server |
| | Search physical address information | an interface that allows the communication client to search physical address information after authenticating the communication client user, the communication messaging server delivers the result of the request of the searching to the address directory server |

Details of the interfaces between the communication client and the communication messaging server will be described below.

First, a common fact of the connection interfaces between the communication client and the communication messaging server is as follows (1).

(1) Extension of MessageHeader of Request Messages

The digital signature information of the user needs to be delivered so as to be included in a SOAP message which is a first MIME Part of a request message which is transmitted from the communication client to the communication messaging server. Further, additional user information (IDN, RValue) which is required for the communication messaging server to verify whether an owner of the certificate used for the digital signature of the SOAP message matches with the corresponding user (VID verification) is also delivered to be included therein.

Corresponding information needs to be located at a lower level of the MessageHeader element in the SOAP message of the request message as an extension element (any ##other position).

Further, individual authentication information for a plurality of internal users that uses the same certificate will be added.

The extension element structure will be described in the following Table 112.

TABLE 112

| Name of item | Description | Number of repetition | Type | Length |
|---|---|---|---|---|
| UserInfo | Extension element | 1 . . . 1 | | |
| IDN | User identification No. individual: resident registration number business: business registration number | 1 . . . 1 | String | 10 |
| RValue | RValue extracted from private key of user certificate RValue is encoded by Base64 to be input | 1 . . . 1 | String | 28 |
| Id | user ID registered in the communication messaging server | 0 . . . 1 | String | Up to 20 |
| Password | user password registered in the communication messaging server | 0 . . . 1 | String | 8 |
| AuthType | authentication method of a plurality of internal users method using ID, password is basically set to 0 in order to authenticate the user using other method than the method using ID and password, AuthType value and lower extension element are autonomously defined to be used | 1 . . . 1 | Integer | 1 |
| Any Extension | in order to authenticate the user using other method than the method using ID and password, a new element is autonomously defined to be used ex> Token, Certificate | 0 . . . 1 | Any | — |

Hereinafter, a message transmission request interface in a connection interface between the communication client and the communication messaging server will be described.

The message transmission request interface is used when the communication client transmits a message to the communication messaging server in order to transmit a message through the communication messaging server.

Figure 98:
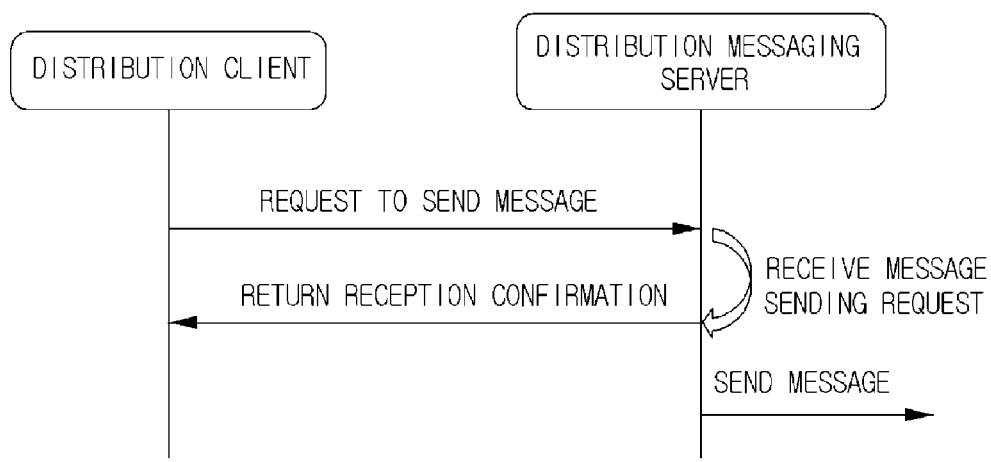
FIGS. 98 to 113 are views illustrating a linkage interface between a communication client and a communication messaging server in the electronic document communication system according to the exemplary embodiment of the present invention.

The message transmission processing flow of the communication client is illustrated in FIG. 98.

Figure 99:
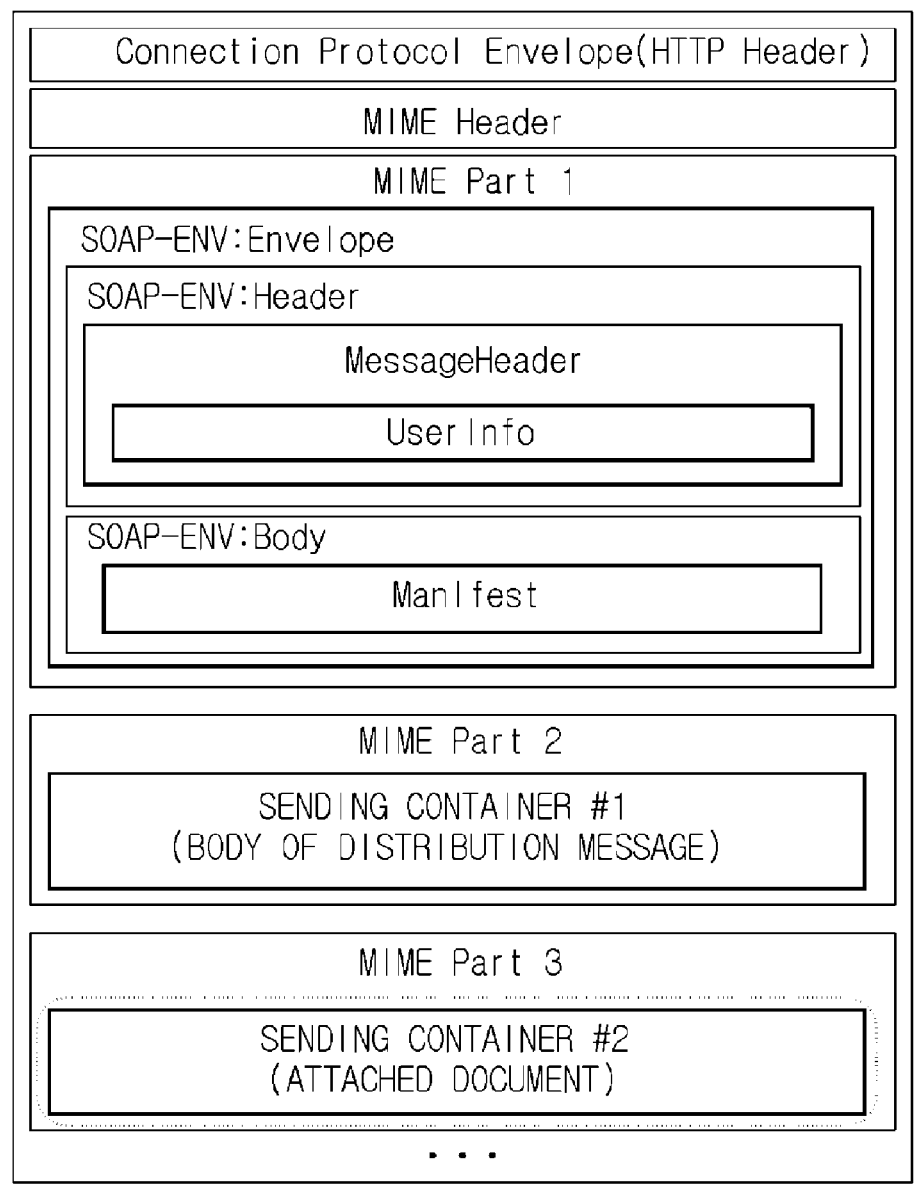

A message transmission request format of the communication client is illustrated in FIG. 99. In the entire message structure as illustrated in FIG. 99, a SOAP message is located in a first MIME Part and a request communication message is located in a second MIME Part. If there is a document which is attached by the user, the document is located in a third or subsequent MIME part.

The request communication message structure will be described in the following Table 114.

TABLE 114

| Name of item | Description | Number of repetition | Type | Length |
|---|---|---|---|---|
| Request SendMsgReq | request Root element message transmitting request element | | | |

TABLE 114-continued

| Name of item | Description | Number of repetition | Type | Length |
|---|---|---|---|---|
| DocType | type of distribution message document: 0 | 1...1 | Integer | 1 |
| Title | title of message | 1...1 | String | Up to 256 |
| Text | body of message may be encrypted as certificate of receiver by transmitter | 0...1 | String | — |
| Sender | certified electronic mailing address of transmitter | 1...1 | String | Up to 128 |
| Receiver | certified electronic mailing address of receiver | 1...1 | String | Up to 128 |
| ReqConfirm | request reading certificate unrequested: 0 requested: 1 | 1...1 | Integer | 1 |
| IsEncrypted | encryption of message plane text: 0 cipertext: 1 | 1...1 | Integer | 1 |
| Identifier | unique identifier (UUID) of request distribution message | 1...1 | String | 36 |

Figure 100:
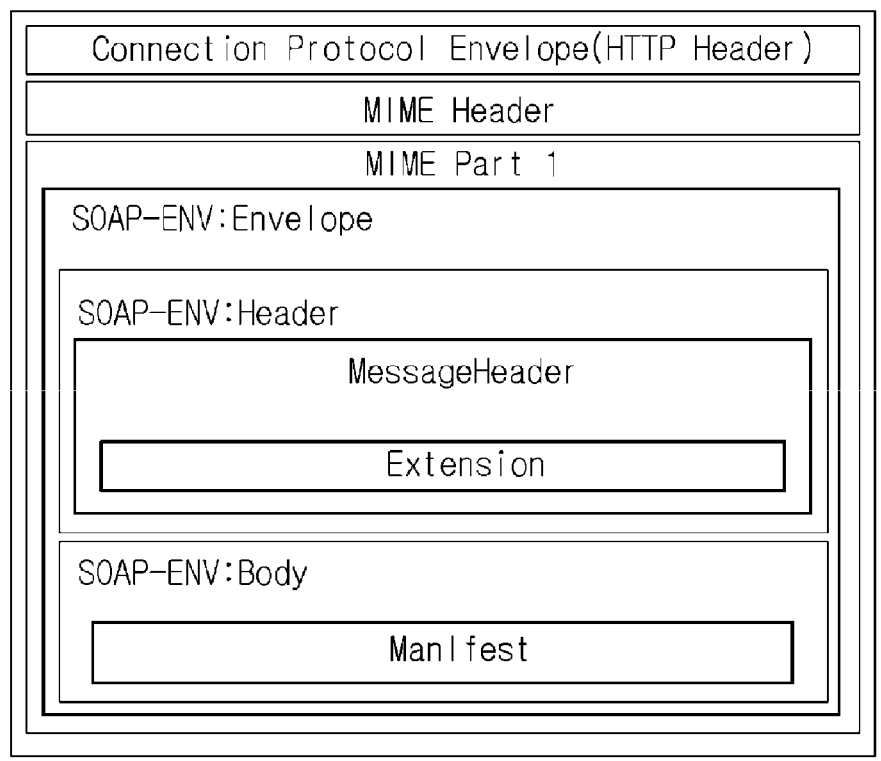
Figure 101:
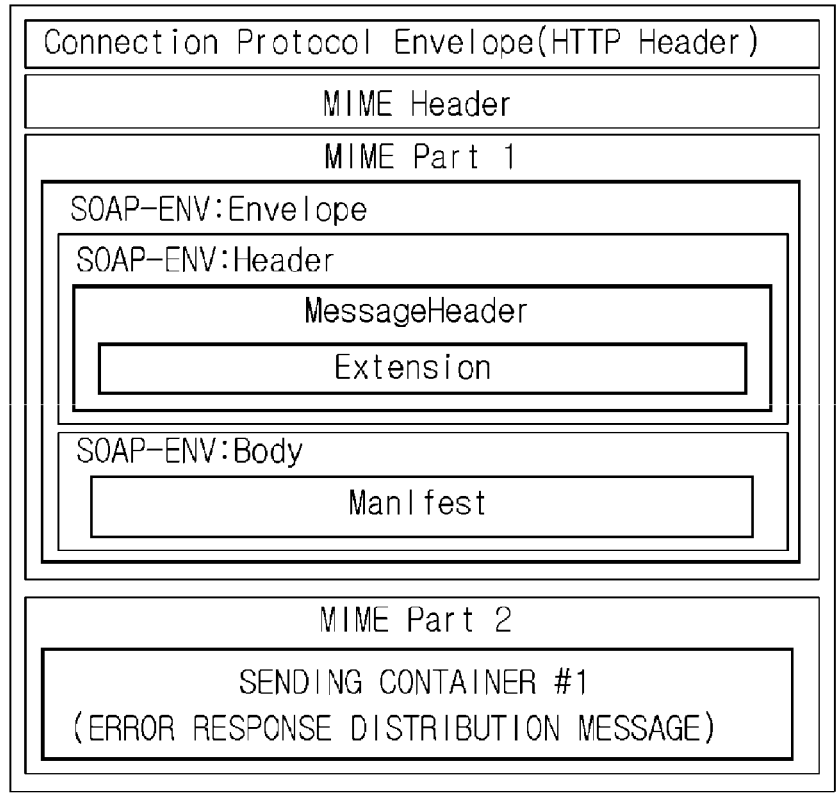

In Table 114, if the body is not necessary for the purpose of delivering the document, the Text may be omitted.

tA communication client message transmission response format is illustrated in FIGS. 100 and 101 (FIG. 100 illustrates the communication certificate transmission response in case of being successful, FIG. 101 illustrates the communication certificate transmission response in case of being failed). In the entire message structure as illustrated in FIGS. 100 and 101, if the processing for the request message is successful, only a reception confirmation Acknowledgment SOAP message is located in a first MIME Part. In case of being an error, a SOAP message is located in the first MIME Part and error response communication message is located in a second MIME Part.

The response communication message structure will be described in the following Table 116. Table 116 corresponds only when the processing result is failed.

TABLE 116

| Name of item | Description | Number of repetition | Type | Length |
|---|---|---|---|---|
| Response SendMsgRes | request Root element message transmission response element | | | |
| DocType | type of transmission message error: 9 | 1...1 | Integer | 1 |
| RefIdentifier | unique identifier (UUID) of request communication message corresponding to response communication message | 1...1 | String | 36 |
| ErrorCode | error code | 1...1 | String | 256 |

Hereinafter, a message list request interface in the connection interface between the communication client and the communication messaging server will be described.

The message list request interface is used when the communication client requests the list of the messages received in the communication messaging server.

Figure 102:
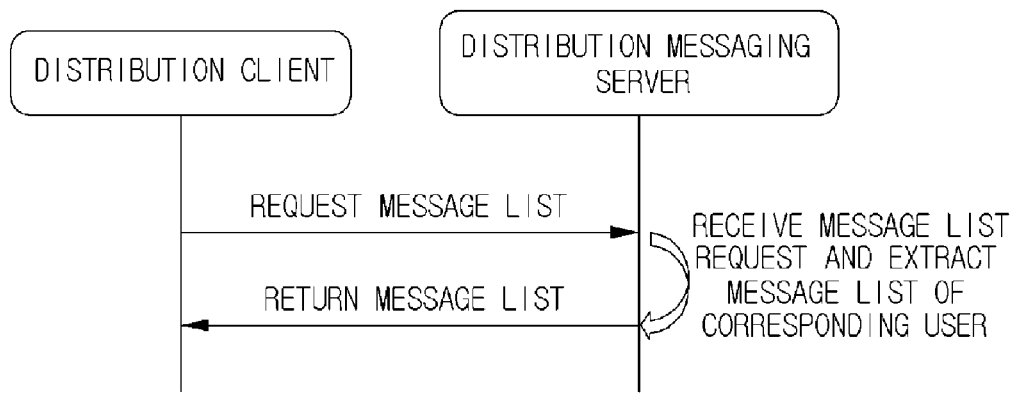

The message list processing flow of the communication client is illustrarted in FIG. 102.

Figure 103:
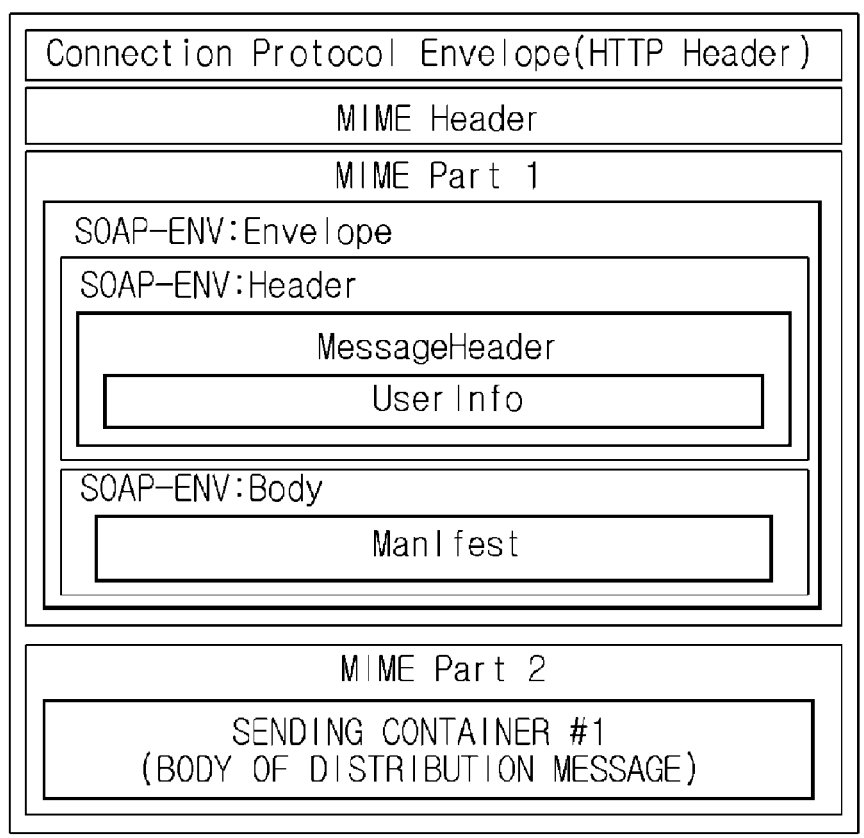

A message list request format of the communication client is illustrated in FIG. 103. In the entire message structure as illustrated in FIG. 103, a SOAP message is located in a first MIME Part and a request communication message is located in a second MIME Part.

The request communication message structure will be described in the following Table 117.

TABLE 117

| Name of item | Description | Number of repetition | Type | Length |
|---|---|---|---|---|
| Request MsgListReq | request Root element message list request element | | | |
| Requester | certified electronic mailing address of requester | 1...1 | String | Up to 128 |
| MsgSize | number of lists of communication messages | 1...1 | Integer | Up to 100 |

Figure 67:
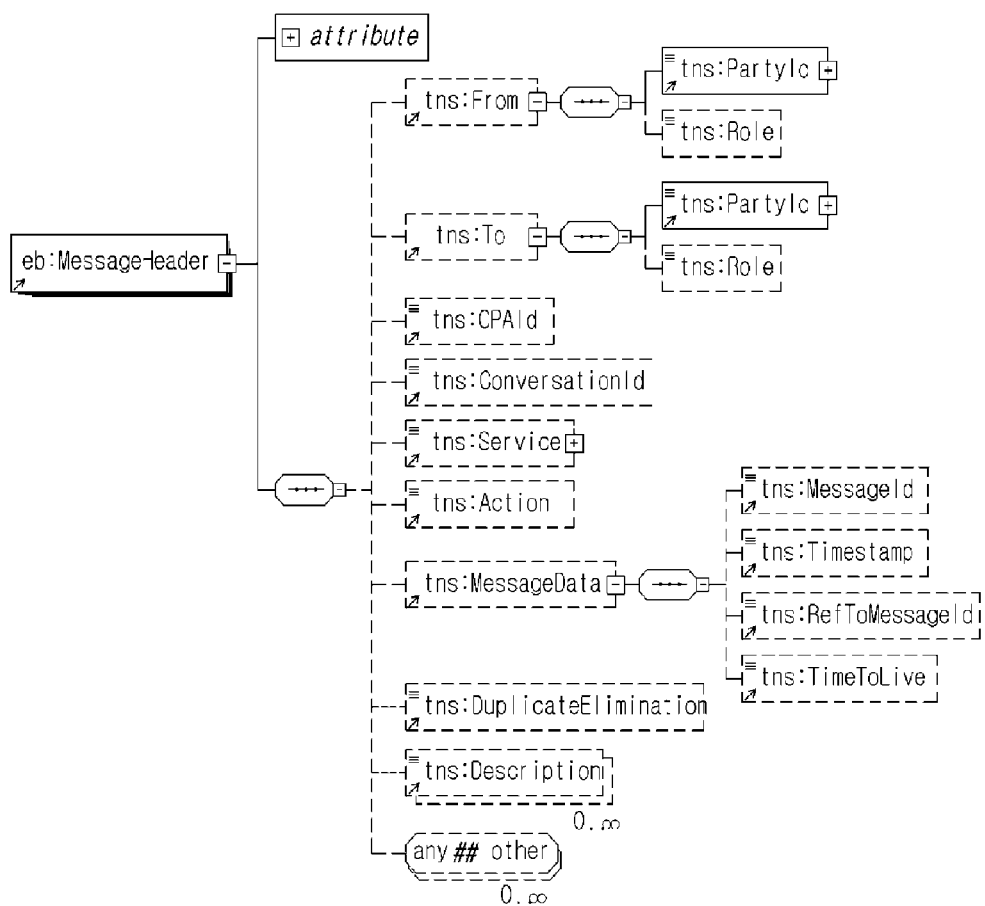

A message list response format of the communication client is illustrated in FIG. 67. In the entire message structure as illustrated in FIG. 67, the SOAP message is located in a first MIME Part and a response communication message (list of communication messages received in the communication messaging server) is located in a second MIME Part.

The response communication message structure will be described in the following Table 119.

TABLE 119

| Name of item | Description | Number of repetition | Type | Length |
|---|---|---|---|---|
| Response MsgListRes | request Root element message list response element | | | |
| ResultCode | processing result successful: 1 failed: 0 | 1...1 | Boolean | — |
| ErrorCode | error code (input corresponding error code only when ResultCode is failed (0)) | 0...1 | Integer | 1 |
| List | received communication message list | 0...∞ | | |
| DocType | type of communication message document: 0 reception certificate: 1 transmission certificate: 2 reading certificate: 3 storage certificate: 4 error: 9 | 1...1 | Integer | Up to 100 |
| Title | title of message | 0...1 | String | Up to 256 |
| Sender | certified electronic mailing address of transmitter | 1...1 | String | UP to 128 |

TABLE 119-continued

| Name of item | Description | Number of repetition | Type | Length |
|---|---|---|---|---|
| Identifier | unique identifier (UUID) of communication message | 0 . . . 1 | String | 36 |
| TargetIdentifier | when the type of communication message is communication certificate, unique identifier (UUID) of communication message whose certificate is issued | 0 . . . 1 | String | 36 |
| IsExistPayloads | presense of attached file None: 0 Present: 1 | 1 . . . 1 | Integer | 1 |
| IsEncrypted | encryption of message planar text: 0 ciphertext: 1 | 1 . . . 1 | Integer | 1 |
| SendDate | document transmission time | 0 . . . 1 | Long | — |
| ReceiveDate | document reception time | 0 . . . 1 | Long | — |

Hereinafter, a message detailed information request interface in the connection interface between the communication client and the communication messaging server will be described.

The message detailed information request interface is used when the communication client requests a specific message and an attached document received by the communication messaging server.

Figure 104:
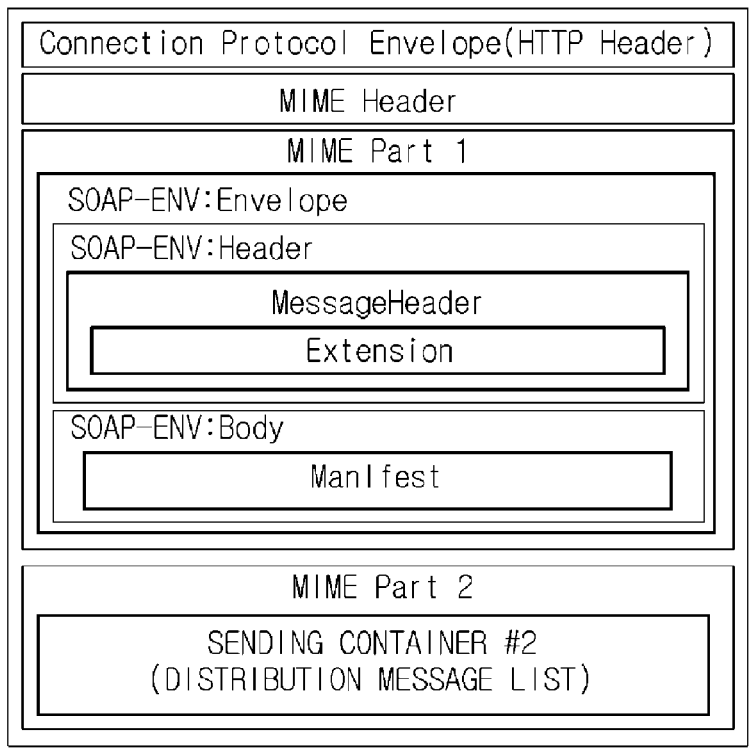
Figure 105:
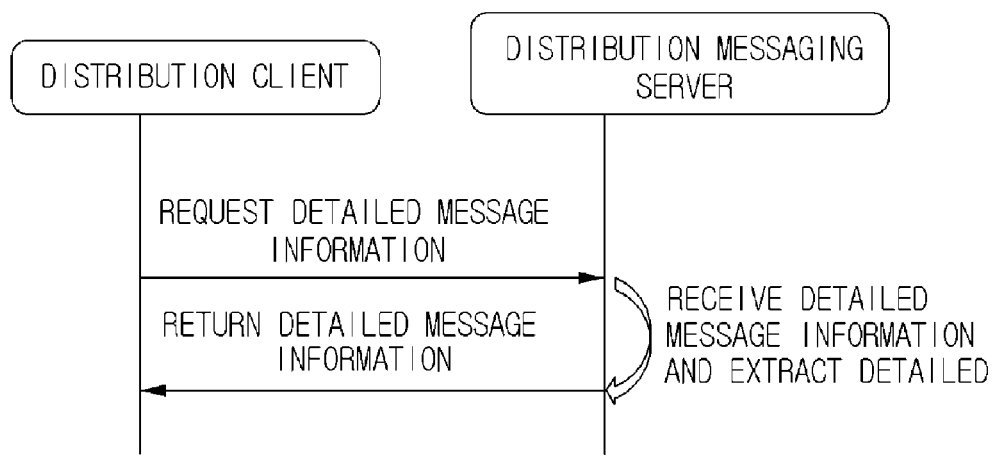
Figure 106:
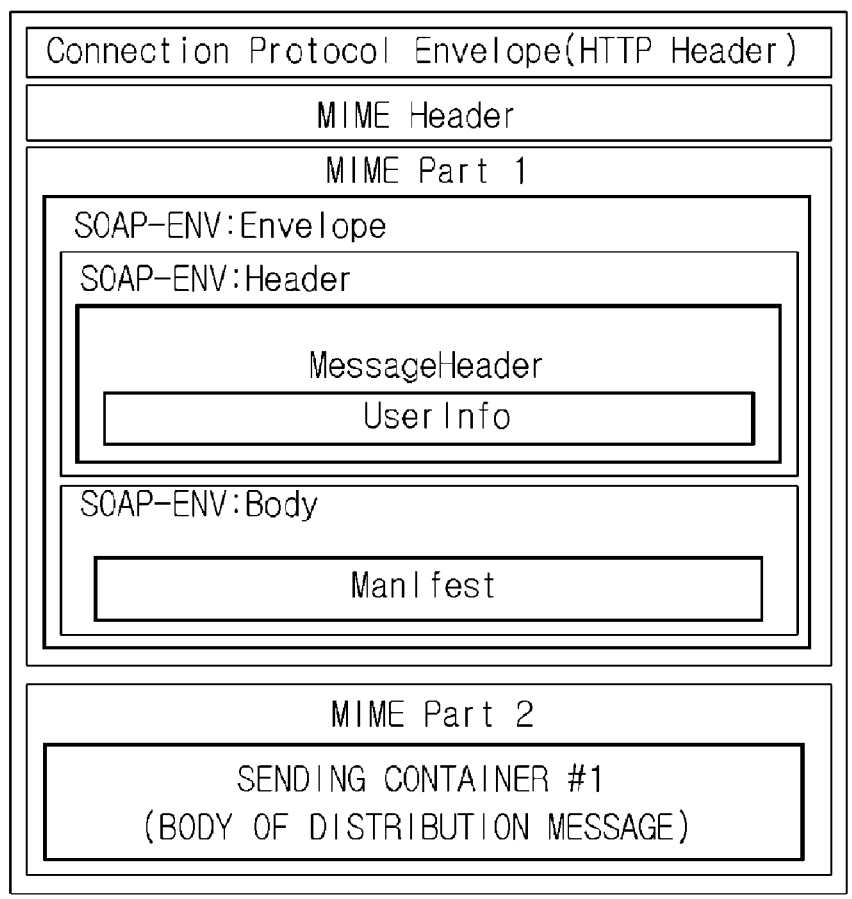

The detailed information request processing flow of the communication client is illustrated in FIG. 104.

Figure 68:
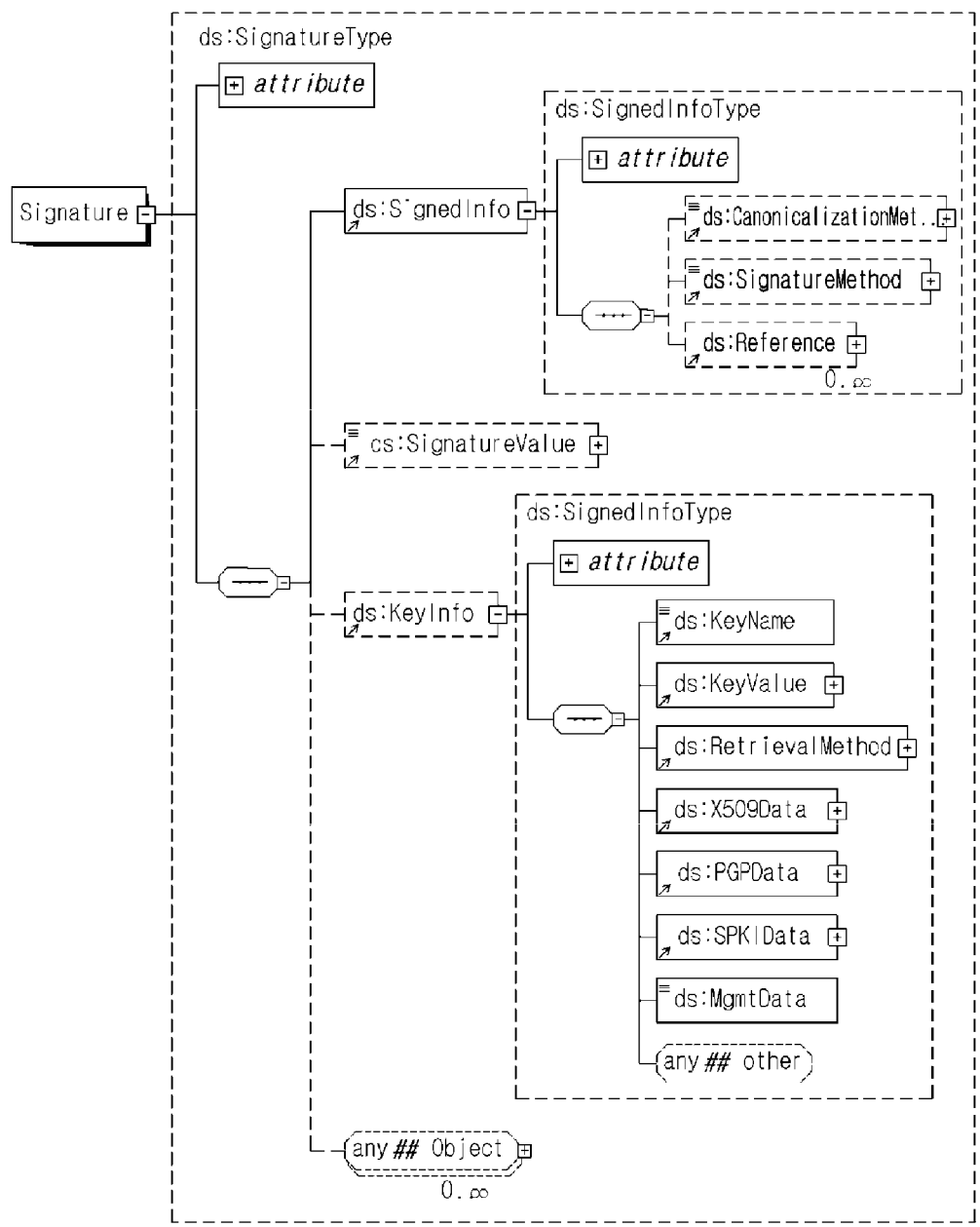
Figure 69:
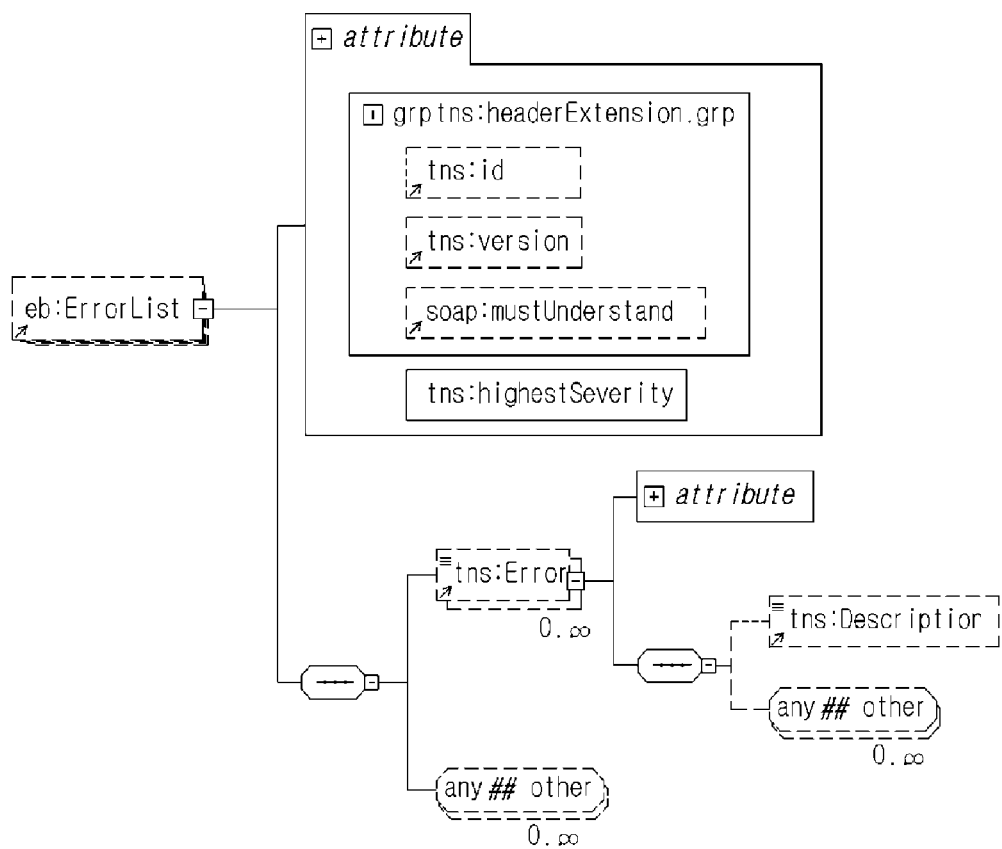
Figure 70:
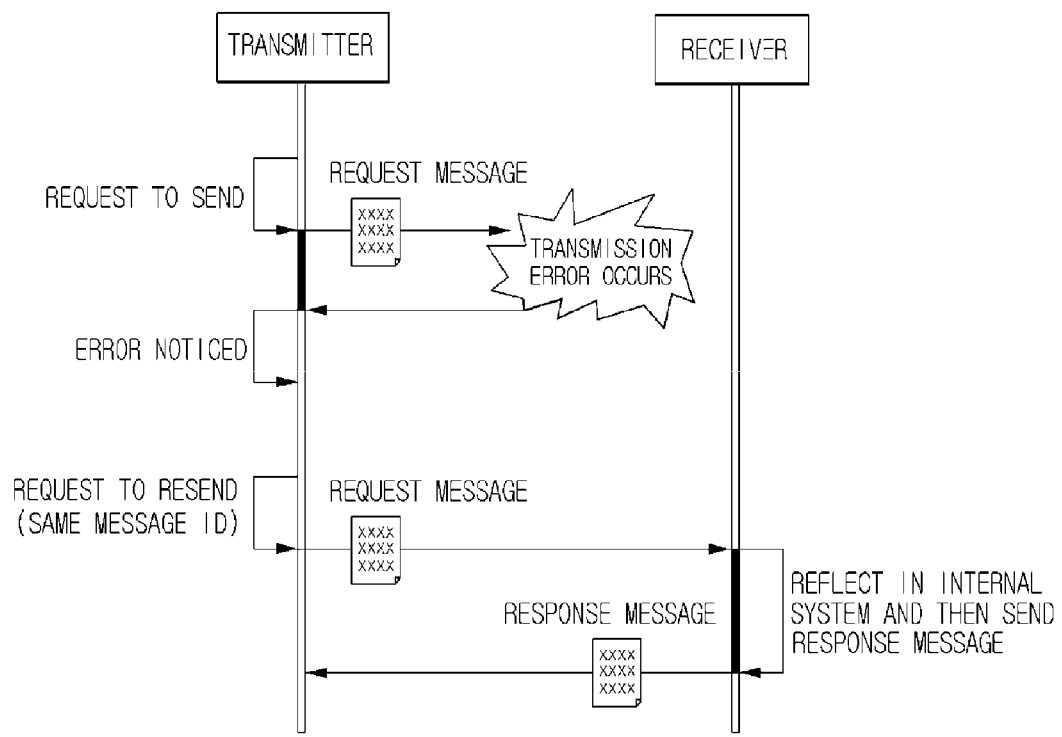
FIGS. 70 to 74 are views illustrating an error processing method under the electronic document communication system according to an exemplary embodiment of the present invention.
Figure 71:
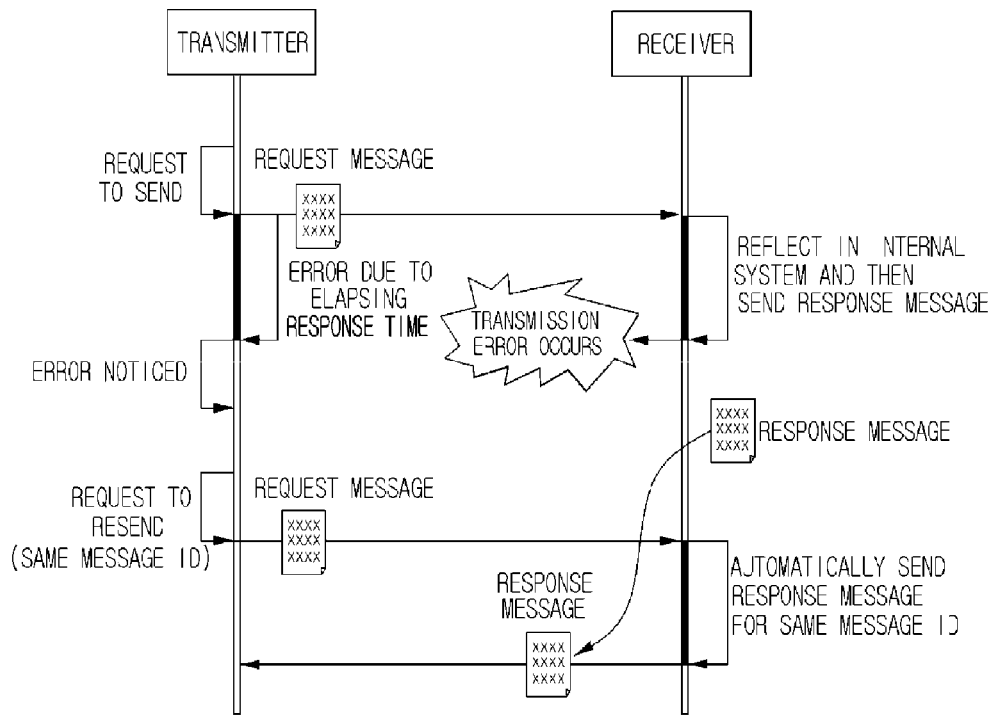
Figure 72:
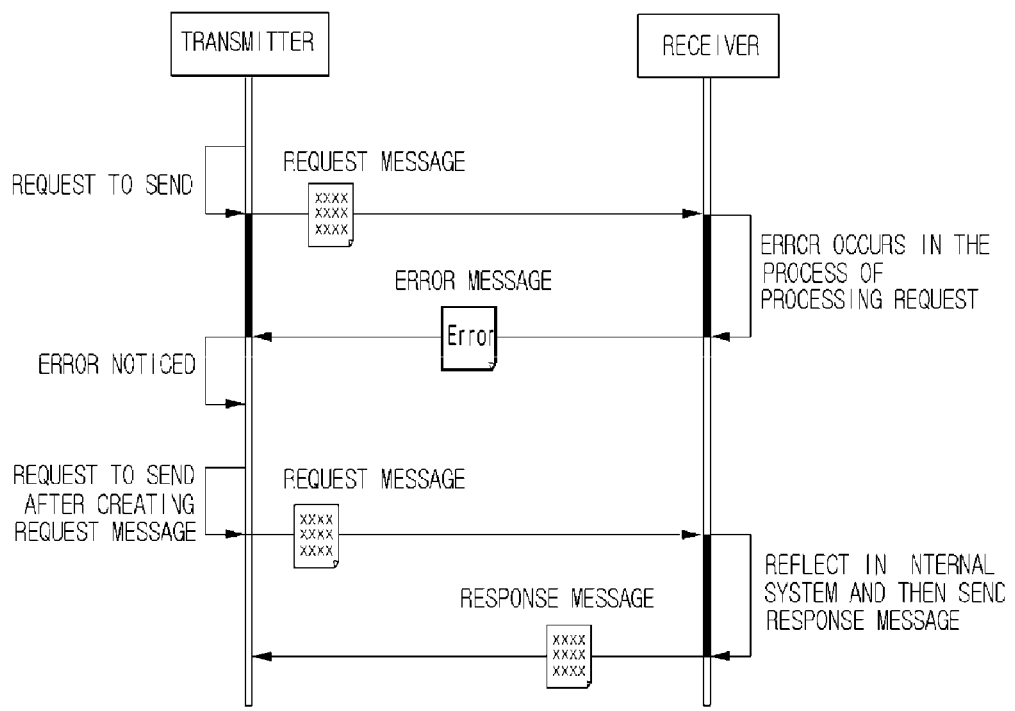
Figure 73:
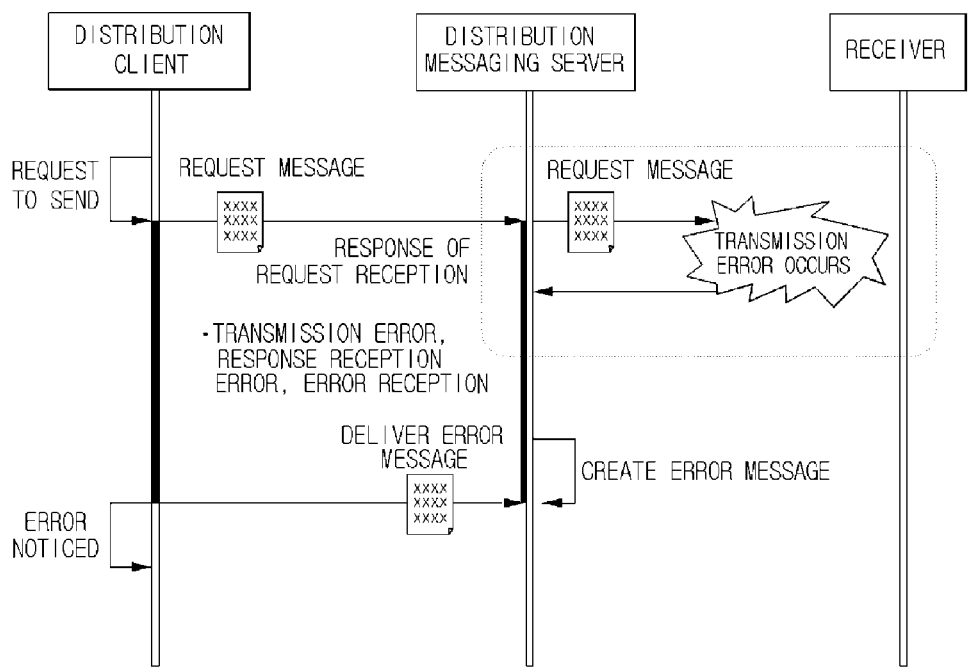
Figure 74:
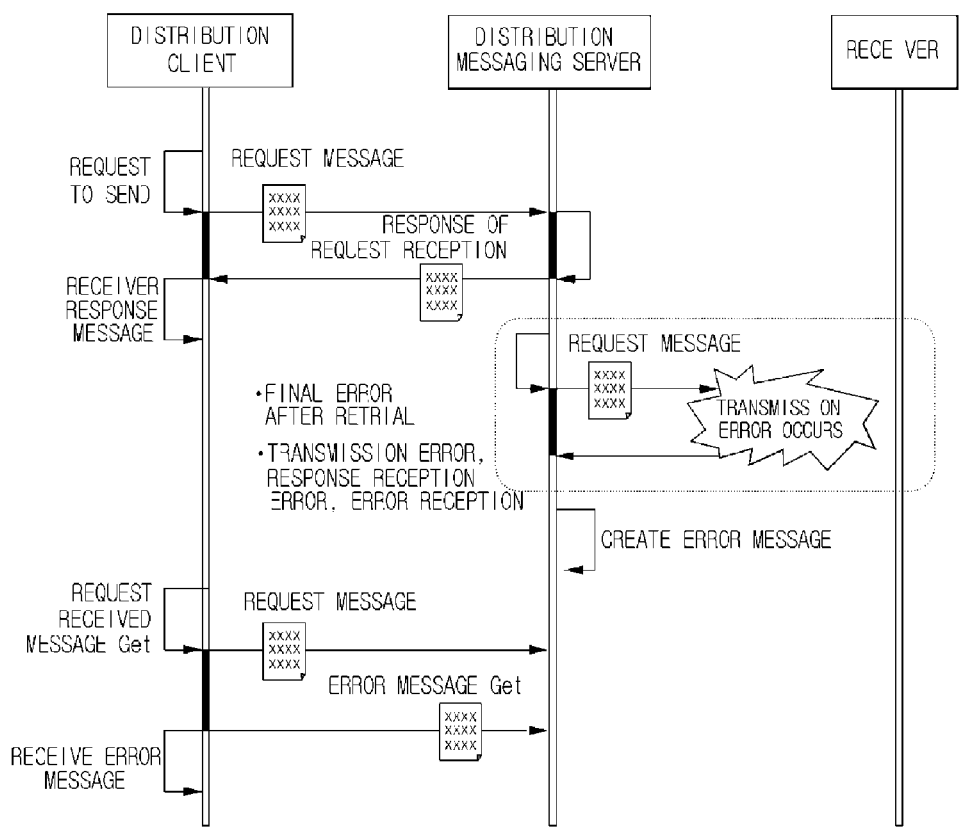
Figure 75:
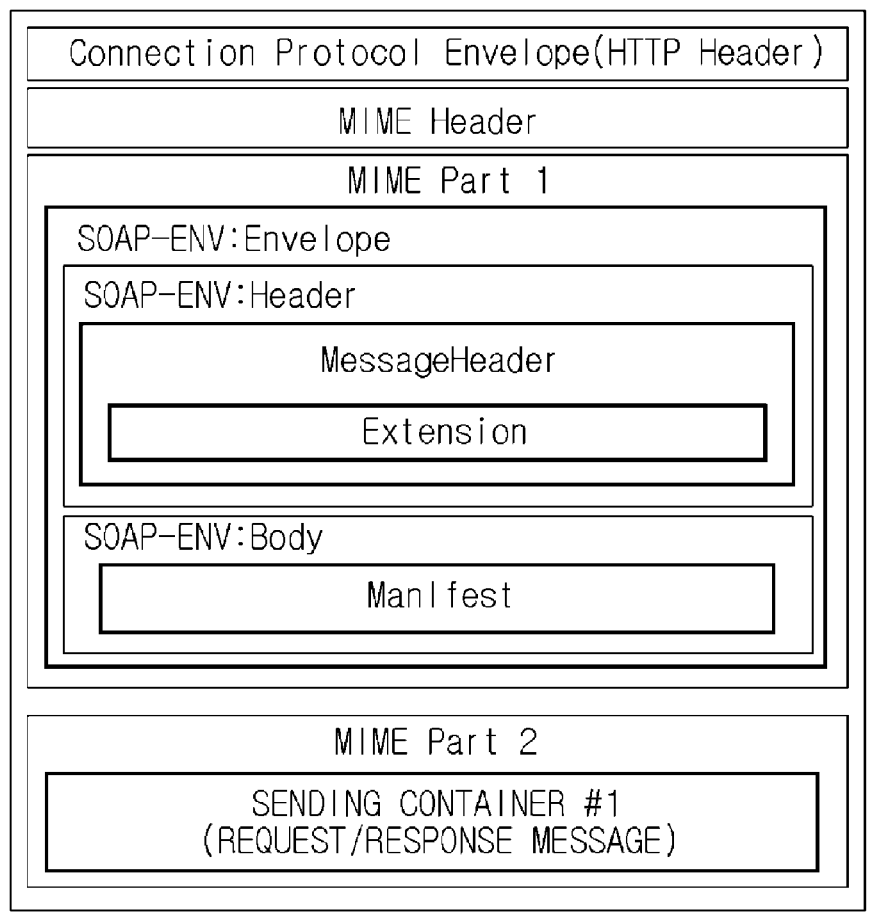
FIGS. 75 to 82 are views illustrating a linkage interface between a communication messaging server and an address directory server in the electronic document communication system according to the exemplary embodiment of the present invention.
Figure 76:
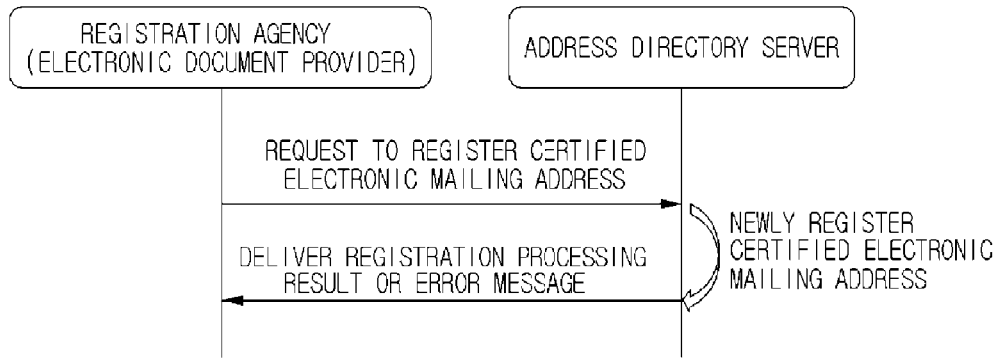
Figure 77:
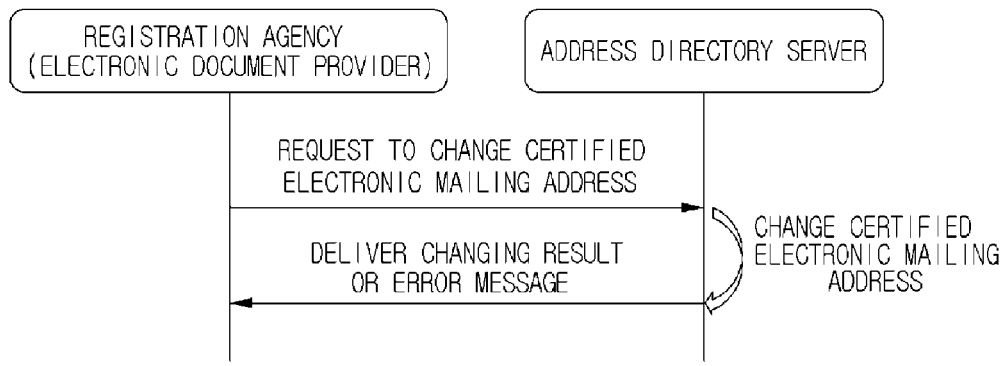
Figure 78:
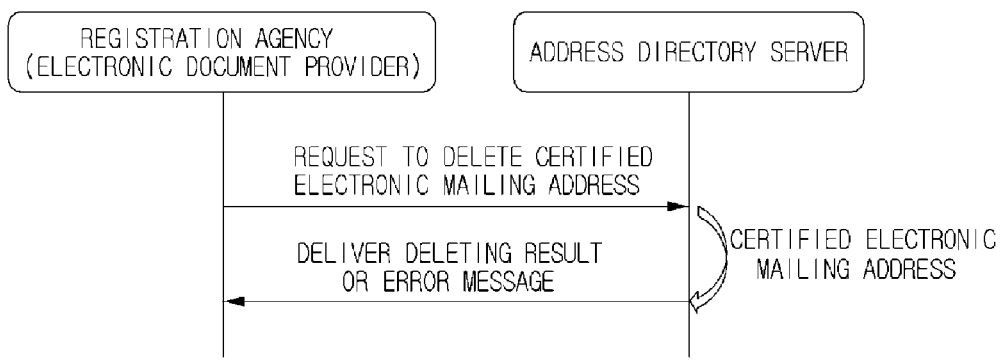
Figure 79:
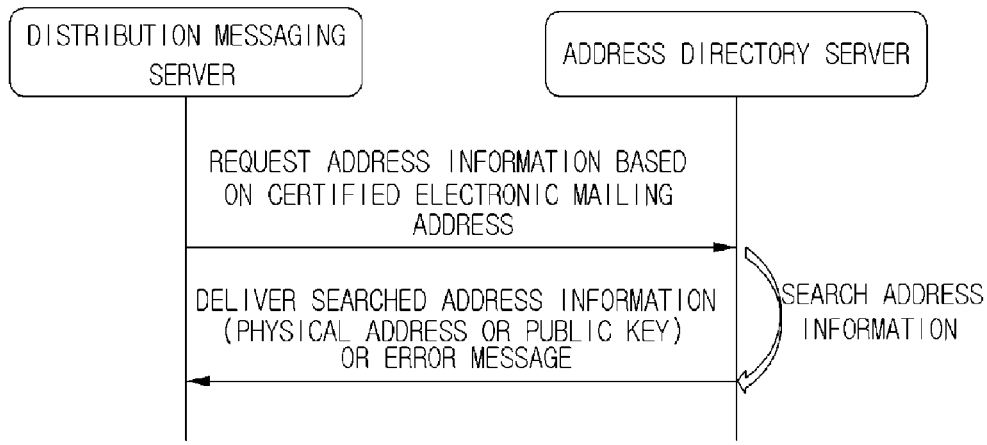
Figure 80:
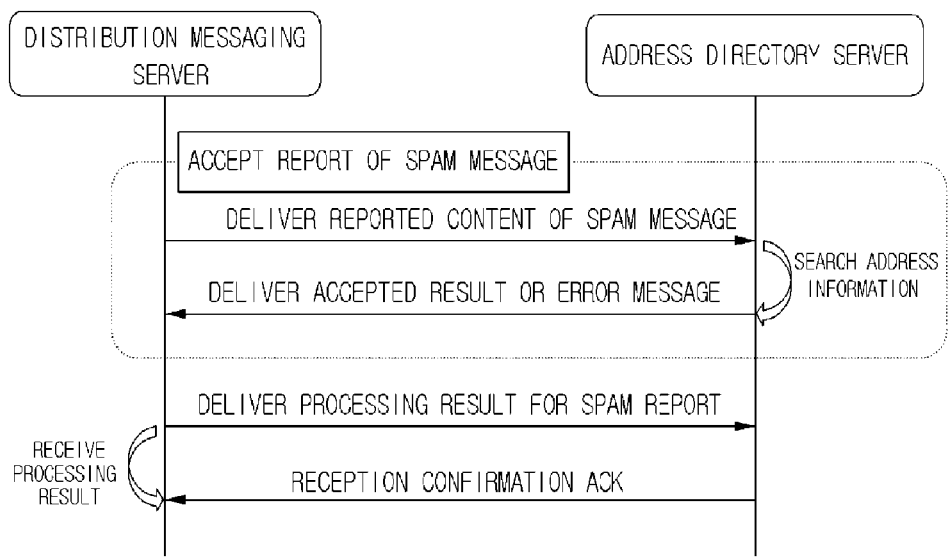
Figure 81:
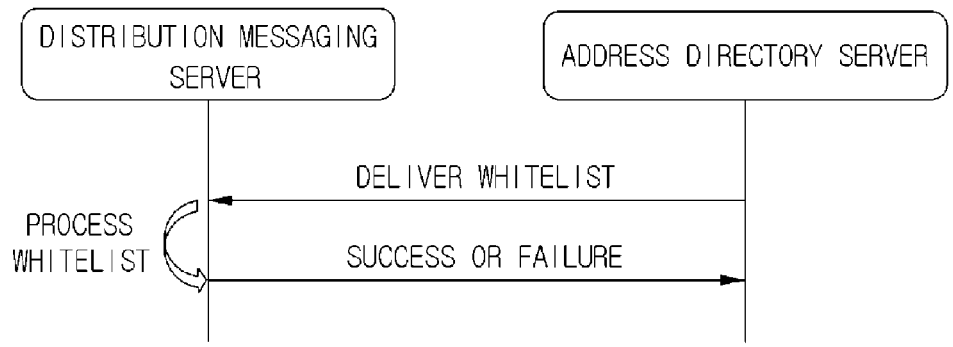

A message detailed information request format of the communication client is illustrated in FIG. 68. In the entire message structure as illustrated in FIG. 68, a SOAP message is located in a first MIME Part and a body of a request communication message is located in a second MIME Part.

The request communication message structure will be described in the following Table 121.

TABLE 121

| Name of item | Description | Number of repetition | Type | Length |
|---|---|---|---|---|
| Request MsgDetailReq | request Root element message detailed information request element | | | |
| Requester | certified electronic mailing address of requester | 1 . . . 1 | String | Up to 128 |
| RefIdentifier | unique identifier (UUID) of communication message to be requested | 1 . . . 1 | String | 36 |

Figure 107:
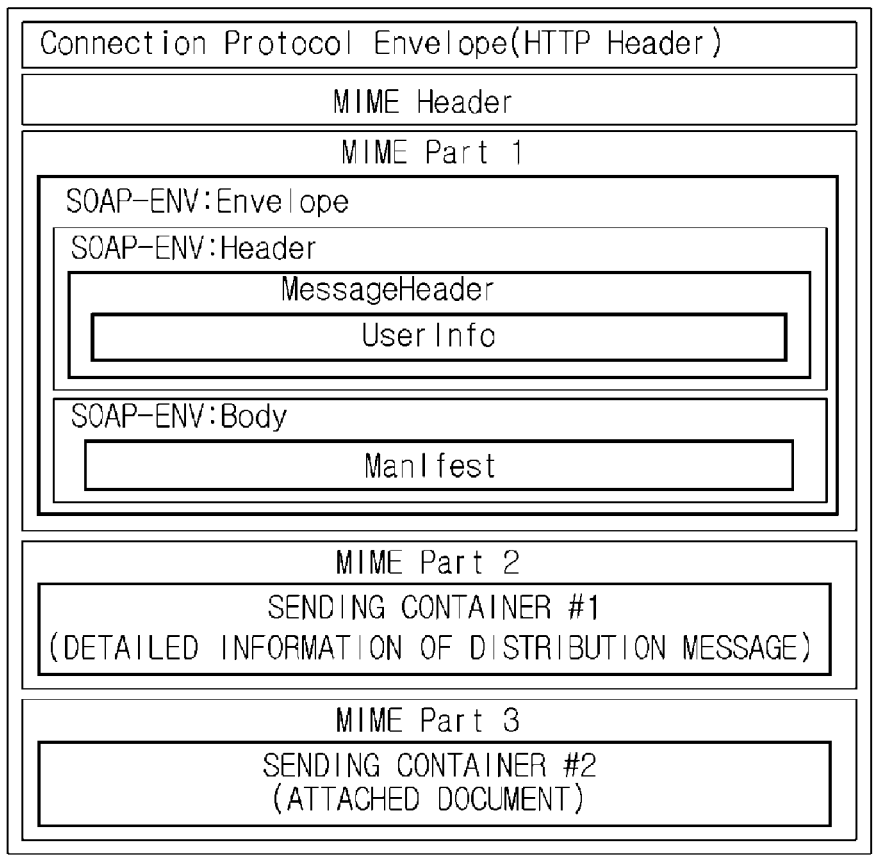

A message detailed information response format is illustrated in FIG. 107. In the entire message structure as illustrated in FIG. 107, a SOAP message is located in a first MIME Part and a response communication message (detailed information of the communication message) is located in a second MIME Part. If there is an attached document, the attached document is sequentially located in a third or subsequent MIME Part.

The response communication message structure will be described in the following Table 123.

TABLE 123

| Name of item | Description | Number of repetition | Type | Length |
|---|---|---|---|---|
| Response MsgDetailRes | request Root element message detailed information response element | | | |
| DocType | type of communication message document: 0 reception, transmission, reading certificate: 1, 2, 3 storage certificate: 4 error: 9 | 1 . . . 1 | Integer | Up to 100 |
| Title | message title | 0 . . . 1 | String | Up to 256 |
| Text | body of message | 0 . . . 1 | String | — |
| Sender | certified electronic mailing address of transmitter | 1 . . . 1 | String | Up to 128 |
| Receiver | certified electronic mailing address of receiver | 0 . . . 1 | String | Up to 128 |
| ReqConfirm | request of reading certificate unrequested: 0 requested: 1 | 0 . . . 1 | Integer | 1 |
| IsEncrypted | encryption of message planar text: 0 ciphertext: 1 | 1 . . . 1 | Integer | 1 |
| Identifier | unique identifier (UUID) of communication message | 0 . . . 1 | String | 36 |
| TargetIdentifier | when the type of communication message is communication certificate, unique identifier (UUID) of communication message whose certificate is issued | 0 . . . 1 | String | 36 |
| ErrorCode | error code (only when the type of communication message is an error (9), input the corresponding error code) | 0 . . . 1 | Integer | 1 |

Hereinafter, a spam message reporting interface in the connection interface between the communication client and the communication messaging server will be described.

The spam message reporting interface is used when the communication client reports the spam message to the communication messaging server. The communication messaging server reports the spam message to the address directory server and then delivers the result to the communication client.

The spam message report processing flow of the communication client is illustrated in FIG. 108.

Figure 109:
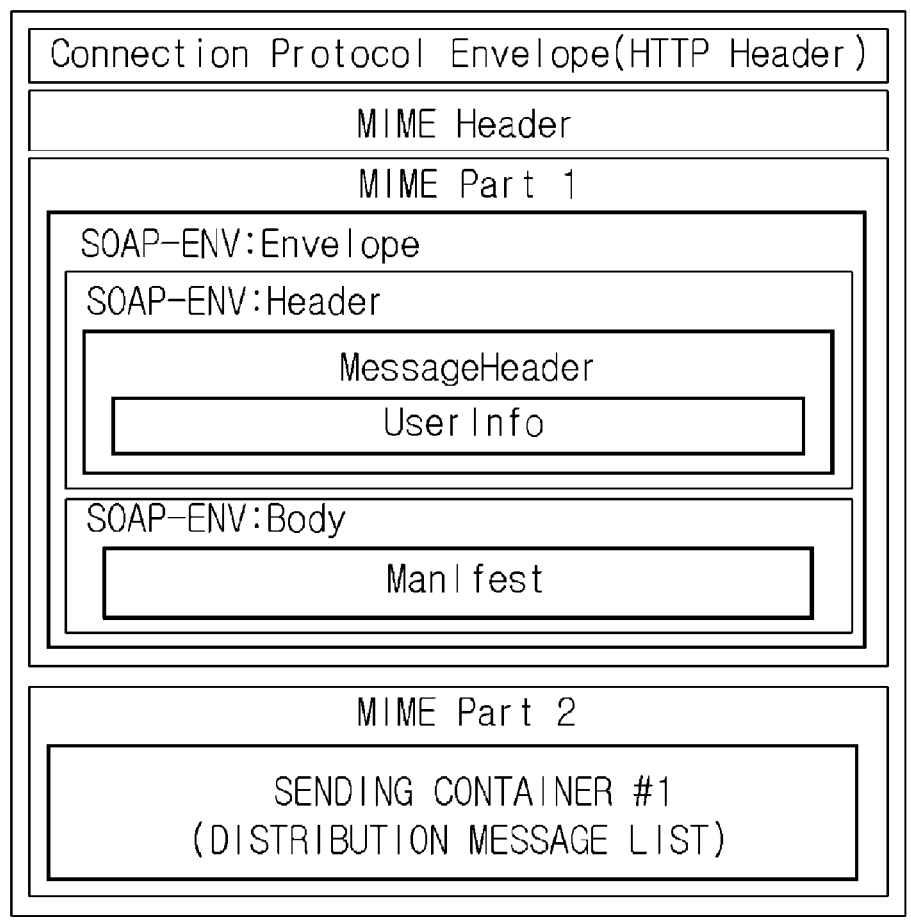

A spam message reporting format of the communication client is illustrated in FIG. 109. In the entire message structure as illustrated in FIG. 109, a SOAP message is located in a first MIME Part and a request communication message is located in a second MIME Part.

The request communication message structure will be described in the following Table 125.

TABLE 125

| Name of item | Description | Number of repetition | Type | Length |
|---|---|---|---|---|
| Request ReportSpamReq | request Root element spam reporting request element | | | |
| ReportRAdderss | certified electronic mailing address of reporter | 1 . . . 1 | String | Up to 128 |
| SpamRAdderss | certified electronic mailing address of spam transmitter | 1 . . . 1 | String | Up to 128 |
| ContentsPid | reference ID of content file sent by spam transmitter (MIME Part cid of spam report message) | 1 . . . 1 | String | Up to 256 |
| AttacheFileInfo | information of attached document sent by spam transmitter | | | |
| FilePid | reference ID of attached document sent by spam transmitter (MIME Part cid of spam report message) | 1 . . . 1 | String | Up to 256 |

Figure 110:
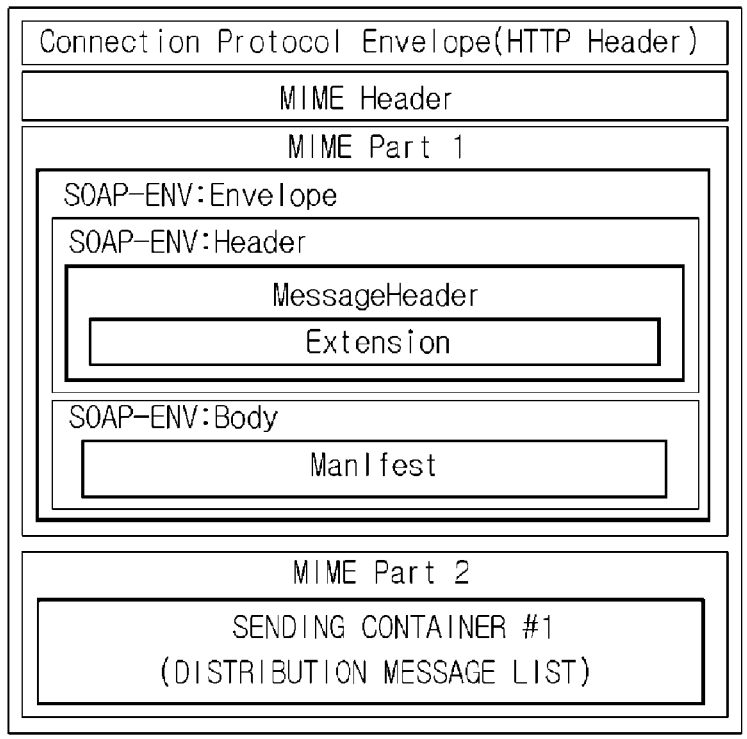

A spam message response format of the communication client is illustrated in FIG. 110. In the entire message structure as illustrated in FIG. 110, the SOAP message is located in a first MIME Part and a response communication message (list of communication message received in the communication messaging server) is located in a second MIME Part.

The response communication message structure will be described in the following Table 127.

TABLE 127

| Name of item | Description | Number of repetition | Type | Length |
|---|---|---|---|---|
| Response | request Root element | | | |
| ReportSpamRes | spam report response element | 1 . . . 1 | | |
| ResultCode | processing result successful: 1 failed: 0 | 1 . . . 1 | Boolean | — |
| RAddress | certified electronic mailing address of spam transmitter | 0 . . . 1 | String | minimum 1 up to 128 |
| ErrorCode | error code (input corresponding error code only when ResultCode is failed (0)) | 0 . . . 1 | String | 256 |

In Table 127, it is noted that ResultCode indicates a simple accepting result for the spam report message.

Hereinafter, a physical address searching interface in the connection interface between the communication client and the communication messaging server will be described.

The physical address searching interface is used when the communication client requests the communication messaging server to search a physical address. The communication messaging server searches the physical address and then delivers the result to the address directory server.

Figure 111:
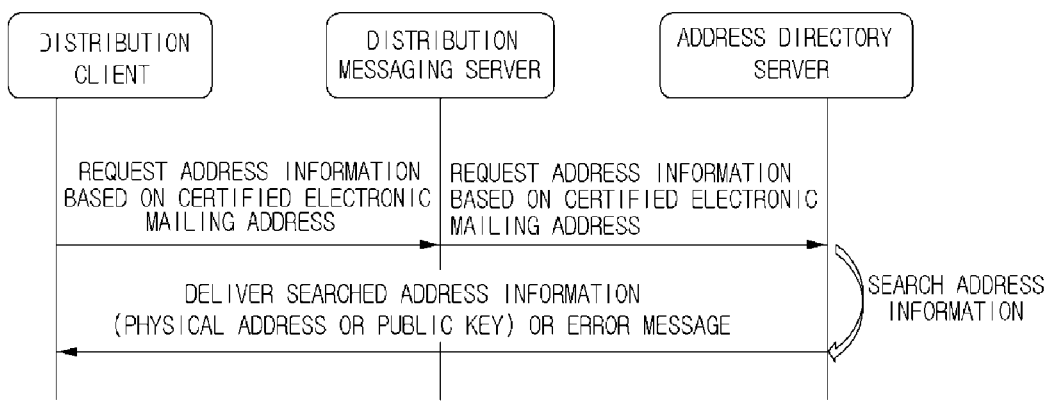

A message exchanging flow related with the physical address search processing is illustrated in FIG. 111.

A physical address searching request format is illustrated in FIG. 112. In the entire message structure as illustrated in FIG. 112, a SOAP message is located in a first MIME Part and a request communication message is located in a second MIME Part.

The request communication message structure will be described in the following Table 129.

TABLE 129

| Name of item | Description | Number of repetition | Type | Length |
|---|---|---|---|---|
| Request SchAddrReq | request Root element search request element of certified electronic mailing address of a member | | | |
| ReqInfo | request certified electronic mailing address information element | 1 . . . ∞ | | |
| RAddress | certified electronic mailing address | 1 . . . 1 | String | Up to 128 |
| IsCert | request of certificate requested: 1 non requested: 0 | 1 . . . 1 | Integer | 1 |

Figure 113:
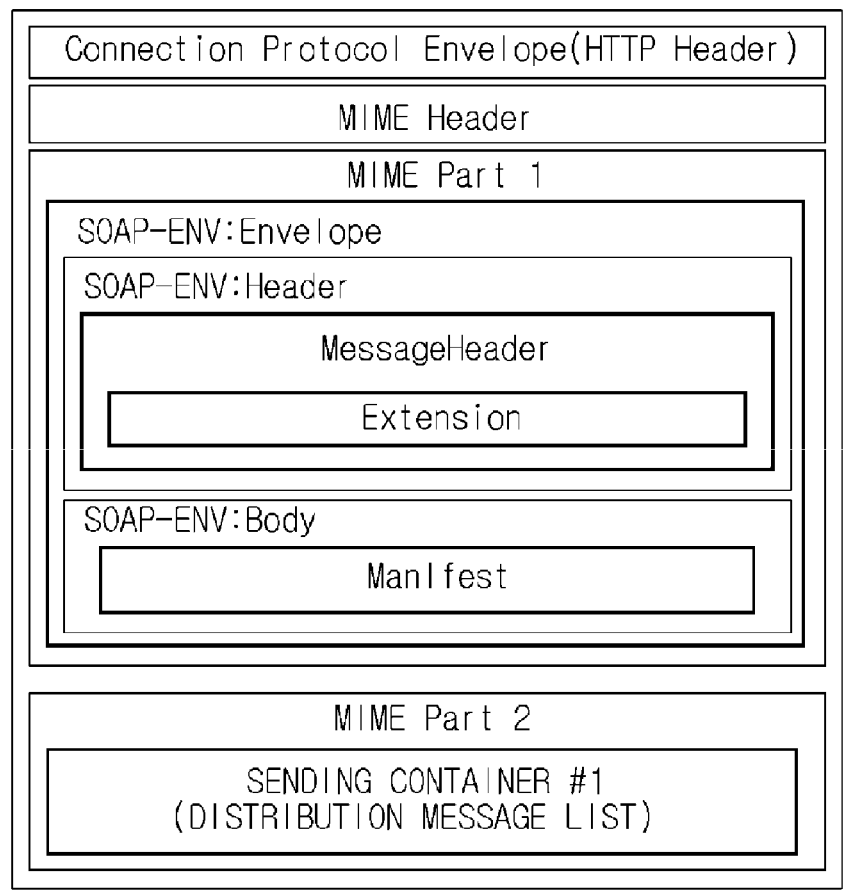

A physical address searching response format is illustrated in FIG. 113. In the entire message structure as illustrated in FIG. 113, a SOAP message is located in a first MIME Part and a response communication message (list of communication messages received in the communication messaging server) is located in a second MIME Part.

The response communication message structure will be described in the following Table 131.

TABLE 131

| Name of item | Description | Number of repetition | Type | Length |
|---|---|---|---|---|
| Response SchAddrRes | request Root element certified electronic mailing address searching response element | | | |
| ResultCode | processing result successful: 1 failed: 0 | 1 . . . 1 | Boolean | — |
| ResultData | result list | 0 . . . ∞ | | |
| RAddress | certified electronic mailing address | 1 . . . 1 | String | Minimum 1 Up to 128 |
| IsExist | existence of address information (Attribute) existed: 1 not existed: 0 | 1 . . . 1 | Integer | 1 |
| Endpoint | physical address of certified electronic mailing address | 0 . . . 1 | String | Up to 256 |
| PeerRegNum | authentication No. of transceiving entity | 0 . . . 1 | String | 10 |
| Cert | receiver certificate | 0 . . . 1 | Base64 | — |
| PeerCert | public key of transceiving entity | 0 . . . 1 | Base64 | — |
| ErrorCode | error code (input corresponding error code only when ResultCode is failed (0)) | 0 . . . 1 | String | 256 |

It is noted that even when a search is normally performed for some or all of a plurality of RAddresses but when an error of non-existence of address occurs, ResultCode is input to be successful (1), which is different from the other interface.

RAddress is described regardless of success (1)/failure (0) of ResultCode and whether RAddress is existed is input in IsExist which is attribute information Endpoint and Cert are input when a value of IsExist is existed (1)

RAddress is not pharsed due to the error of the request message, RAddress may be omitted (as a result, Endpoint and Cert will be omitted)

If ResultCode is input as failure (0), that is, other error than the error of non-existence of address occurs, ErrorCode inputs an error code corresponding to a cause of the error

[Connection Interface Between Communication Messaging Server and Communication Relay Server]

The communication relay server is a system that sends an electronic document by proxy for the transmitting communication messaging server when an error occurs in the process of directly sending the electronic document between the communication messaging servers in the electronic document communication system so that the sending is failed.

The communication relay server is managed by National Industry Promotion Agency and all communication messaging servers may be supported in connection with the communication relay server when an error occurs in P2P communication process.

The connection interface between the communication messaging server and the communication server is a protocol that allows the communication messaging server to request the communication relay server to transmit an electronic document and classified into an interface described in the following Table 133.

TABLE 133

| Classification of Interface | | Description of interface |
|---|---|---|
| Transmission by proxy | Request to transmit message | an interface that allows a communication messaging server of a transmitter to request the communication relay serve to transmit a transmission message by proxy when an error occurs in the process of transmitting a message due to a system or a network environment of the receiver communication relay server returns a transmission certificate evidencing that the communication messaging server of the transmitter tries to transmit as a response message |

First, a common fact of the connection interfaces between the communication messaging server and the communication relay server is as follows (1).

(1) Extension of MessageHeader of request messages

The digital signature information of the communication messaging server needs to be delivered so as to be included in a SOAP message which is a first MIME Part of the connection interfaces between the communication messaging server and the communication relay server. Further, additional information (CorpNum, RValue) of the communication messaging server which is required for the communication messaging server to verify whether an owner of the certificate used for the digital signature of the SOAP message matches with the corresponding messaging server (VID verification) is also delivered to be included therein.

Additional information of the communication messaging server needs to be located at a lower level of the MessageHeader element in the SOAP message as an extension element (any ##other position).

The extension element structure will be described in the following Table 134.

TABLE 134

| Name of item | Description | Number of repetition | Type | Length |
|---|---|---|---|---|
| Extension | Extension element | 1 . . . 1 | | |
| CorpNum | Business registration number of transmitter | 1 . . . 1 | String | 10 |
| RValue | RValue extracted from private key of certificate of transmitter RValue is encoded by Base64 to be input | 1 . . . 1 | String | 28 |

Hereinafter, a message transmission request interface in the connection interface between the communication messaging server and the communication relay server will be described.

The message transmission request interface is used to request the communication relay server for the message transmission and issue the transmission certificate when a reception error occurs at the other communication messaging server in the process of transmitting a message from the communication messaging server to the other communication messaging server. The communication relay server immediately returns the accepting result for the message transmission request of the communication messaging server and transmits the reception certificate which is received after transmitting a message to the receiving communication messaging server to the transmission request communication messaging server using the above-described "communication certificate transmission interface".

Figure 114:
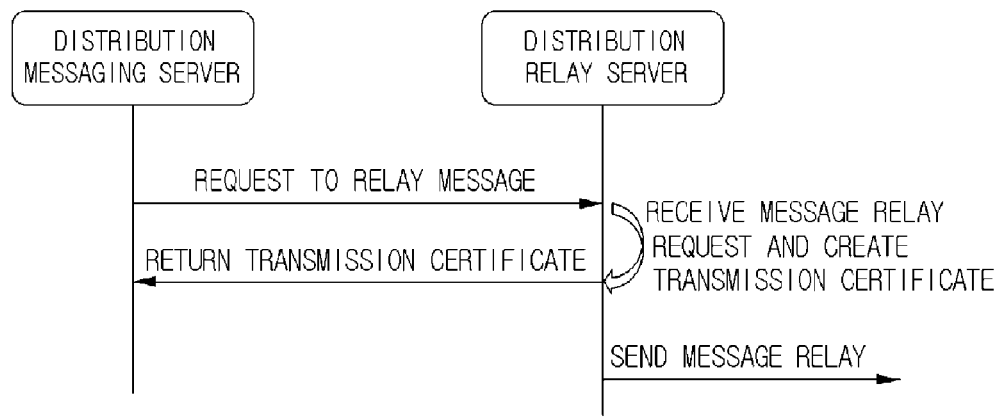
FIGS. 114 to 116 are views illustrating a linkage interface between a communication messaging server and a communication relay server in the electronic document communication system according to the exemplary embodiment of the present invention.

The message relay processing flow is illustrated in FIG. 114.

Figure 115:
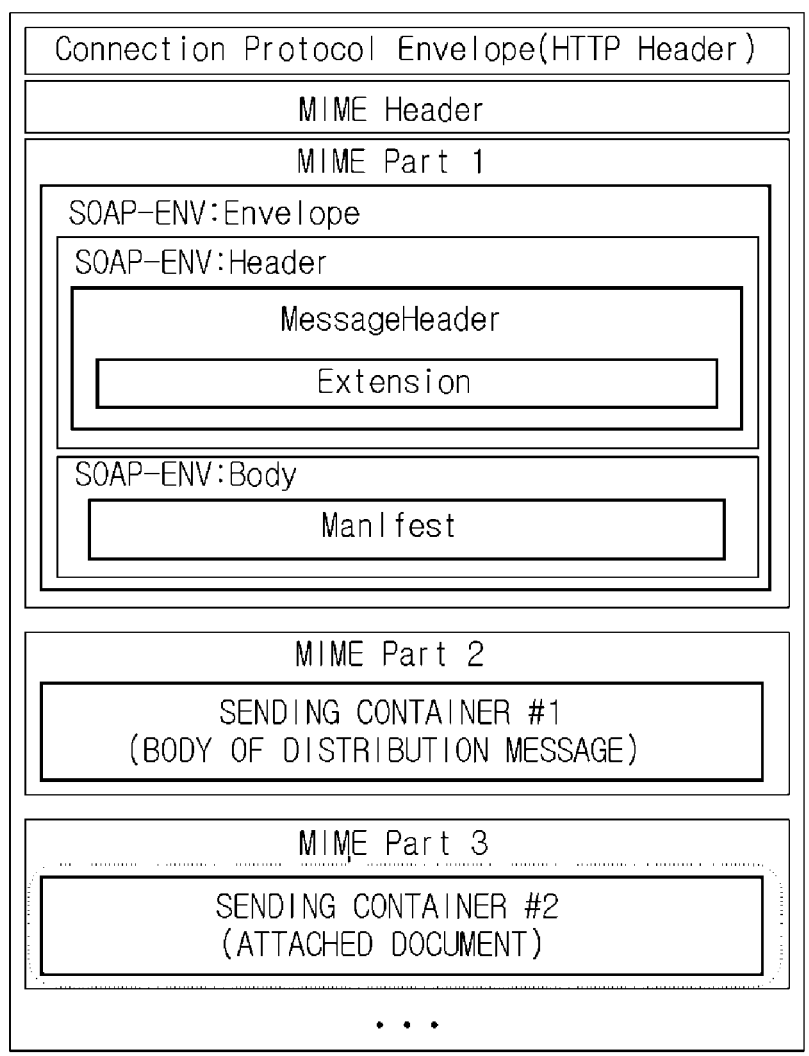

A message relay request message format is illustrated in FIG. 115. In the entire message structure as illustrated in FIG. 115, a SOAP message is located in a first MIME Part and a request communication message is located in a second MIME Part. If there is a document which is attached by the user, the document is located in a third or subsequent MIME part.

The request communication message structure will be described in the following Table 136.

TABLE 136

| Name of item | Description | Number of repetition | Type | Length |
|---|---|---|---|---|
| Request SendMsgReq | request Root element message transmitting request element | | | |
| DocType | type of communication message document: 0 | 1 . . . 1 | Integer | 1 |
| Title | title of message | 1 . . . 1 | String | Up to 256 |
| Text | body of message may be encrypted as certificate of receiver by transmitter | 0 . . . 1 | String | — |
| Sender | certified electronic mailing address of transmitter | 1 . . . 1 | String | Up to 128 |
| Receiver | certified electronic mailing address of receiver | 1 . . . 1 | String | Up to 128 |
| ReqConfirm | request reading certificate unrequested: 0 requested: 1 | 1 . . . 1 | Integer | 1 |

TABLE 136-continued

| Name of item | Description | Number of repetition | Type | Length |
|---|---|---|---|---|
| IsEncrypted | encryption of message plane text: 0 cipertext: 1 | 1...1 | Integer | 1 |
| Identifier | unique identifier (UUID) of request communication message | 1...1 | String | 36 |

In Table 136, if the body is not necessary for the purpose of delivering the document, the Text may be omitted.

Figure 116:
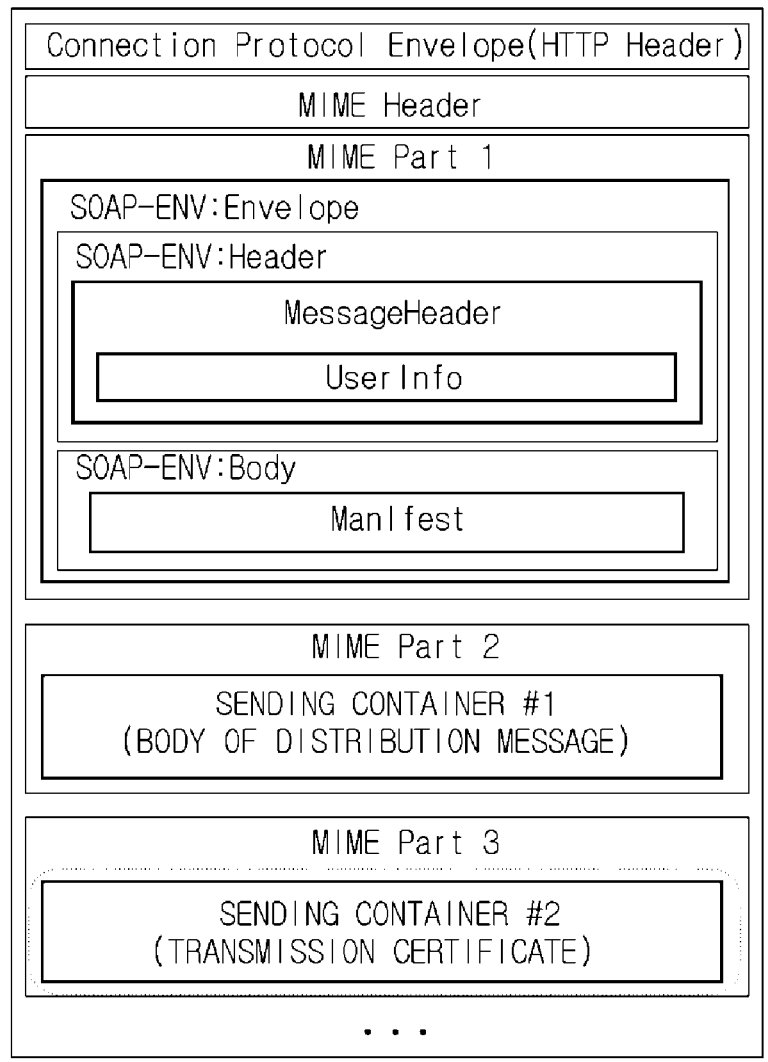
Figure 117A:
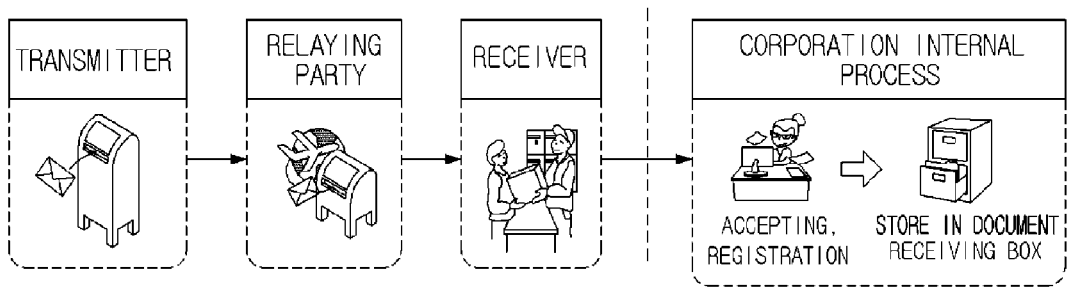
FIG. 117A is a view illustrating a postal communication system of Table 37.
Figure 117B:
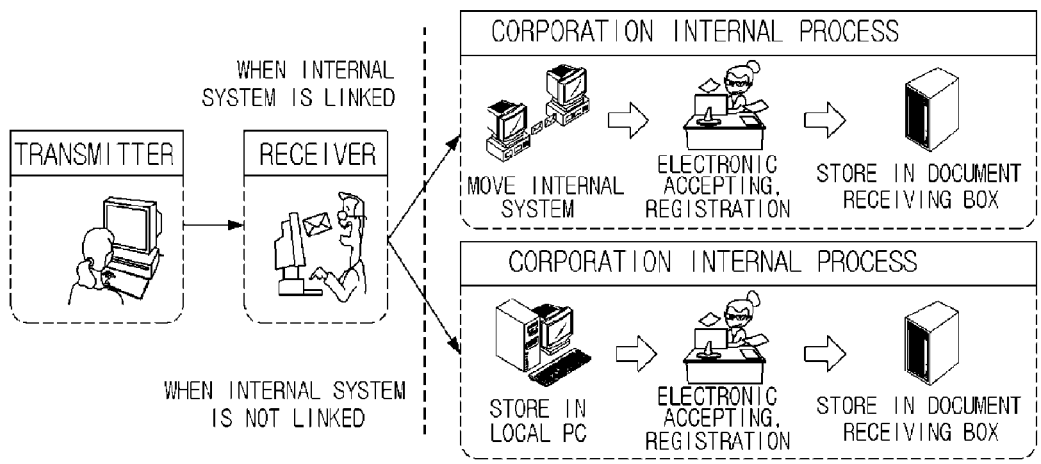
FIG. 117B is a view illustrating an e-mail communication system of Table 37.
Figure 117C:
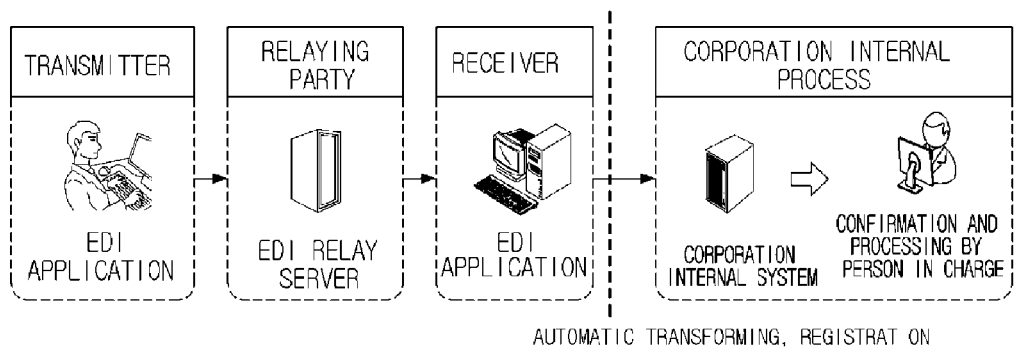
FIG. 117C is a view illustrating an electronic document interchange (EDI) communication system of Table 37.
Figure 117D:
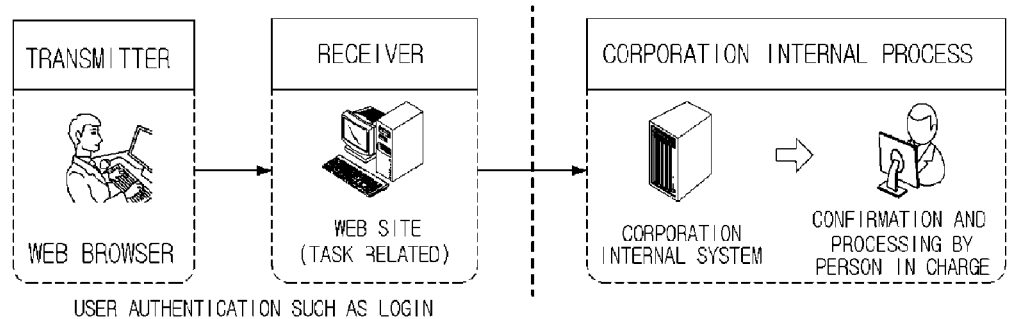
FIG. 117D is a view illustrating a work related system communication system of Table 37.

A message relay response message format is illustrated in FIG. 116. In the entire message structure as illustrated in FIG. 116, the SOAP message is located in a first MIME Part, a response communication message is located in a second MIME Part, and a transmission certificate is located in a third MIME Part. If an error occurs in the process of processing the request message, the third MIME Part is not generated.

The response communication message structure will be described in the following Table 138.

TABLE 138

| Name of item | Description | Number of repetition | Type | Length |
|---|---|---|---|---|
| Response SendMsgRes | request Root element response for message transmission request | | | |
| DocType | type of communication message transmission certificate: 2 error: 9 | 1...1 | Integer | 1 |
| RefIdentifier | unique identifier (UUID) of request communication message corresponding to response communication message | 1...1 | String | 36 |
| ErrorCode | error code (input corresponding error code only when a type of communication message is an error (9)) | 0...1 | String | 256 |

In Table 138, if DocType is an error (9), the third MIME Part in which the transmission certificate is located is not generated.

Hereinafter, another example of the electronic document communication system and electronic document communication method using the same according to the exemplary embodiment of the present invention as described above will be described in detail.

[Structure of Electronic Document Communication System and Electronic Document Communication Process]

The electronic document is communicated based on P2P communication that allows corporation/institution that observes the standard for reliable communication to directly transmit/receive the electronic document to each other. A basic element of the electronic document communication system according to the present invention for performing the P2P communication is a communication messaging server system based on the standard that supports the communication between the address directory server that manages address information and each transceiving entity. If only the address directory server and the communication messaging server system are provided, a basic structure that allows the corporation or institution to communicate the electronic document is equipped. Further, a communication certificate for certifying the document communication between the senders/receivers is issued and is simultaneously stored in the third party storing institution (certified electronic document storing institution) to establish a legal basis for the communication.

In addition to the basic element, the electronic document communication system according to the present invention includes a communication client application (APP) that supplies a user interface for document transceiving function so as to allow a general user (corporation/institution, individual) to easily communicate document, an electronic document form register that provides a standard document format in order to increase convenience of creating a document, and a public sector connection gateway for relaying an administrative institution with the electronic document as additional configuration elements.

A basic process that is performed in the above-mentioned electronic document communication system will be described in the following Table 140.

TABLE 140

| classification | process | remarks |
|---|---|---|
| Registration and management of address information | Registration of address information | Basic process |
| | Changing of address information | Basic process |
| | Searching of address information | Basic process |
| P2P document communication between transceiving entities | Electronic document transmission and reception confirmation between transceiving entities | Basic process |
| | Electronic document transceiving request between actual user and communication messaging server of transceiving entity | Basic process |
| | Request to issue communication certificate and store in certified electronic document depository | Basic process |

TABLE 140-continued

| classification | process | remarks |
| --- | --- | --- |
| | Search and download electronic document form between communication client APP and electronic document form register | Selective process |
| | Request certified electronic document depository to store transmitted/received document | Selective process |
| Electronic document communication between public sector/ administrative sector and corporation/ individual user | Document communication via public connection gateway | Document is communicated by public connection gateway when public sector/ administrative institution is hard to built communication system in accordance with standard of communication messaging server |

[Component of Electronic Document Communication System]

The elements of the electronic document communication system will be more systematically described below.

In order to establish the electronic document communication, first "(1) a transceiving entity" which is a principal agent of the communication needs to be present and the transceiving entity needs to include "(2) a communication messaging server system" that observes the communication messaging server standard in order to communicate the document. Further, "(3) an address directory server" which is a basic configuration of the electronic document communication and registers and manages a certified electronic mailing address of the transceiving entity and a user needs to be present.

Based on the above basic configuration, "(4) a communication client APP" is provided in order to provide a convenience of the communication to the user and "(5) a public sector connection gateway" that supports to connect the administrative/public institution and "(6) an electronic document form register" that manages a form of the document are additionally provided.

Hereinafter, the above-mentioned components will be described in detail.

(1) Transceiving Entity

Among base infra components of the electronic document communication, a unit which is a criterion of the communication is the transceiving entity. The transceiving entity serves as a sender or a receiver in accordance with a role that participates in the communication and these entities communicate the document (information) through the communication messaging server system in accordance with a communication protocol.

All transceiving entities that participate in the communication build a communication messaging server system that is capable of transceiving a document in accordance with the communication messaging standard and then registers physical address information of the communication messaging server system in the address directory server to create a base for participating in the electronic document communication. In this case, each transceiving entity has an actual communication user having at least one certified electronic mailing address at a lower level.

An entity that is recognized as a transceiving entity in the electronic document communication is limited to an entity that builds a system observing the messaging server standard and then receives the authentication of standard compatibility and interoperability by National Industry Promotion Agency. In order to evidence the communication, (1) after communicating the electronic document through the authenticated transceiving entity, (2) the communication certificate needs to be issued in accordance with the standard and stored in a third party storing institution.

In this case, the transceiving entity is classified into an entity that is responsible to directly transmit the electronic document as a legal owner and a person in charge for the electronic document and an entity that acts as a proxy for a user who is an actual owner and a person in charge of the communicating electronic document. In this case, if the owner of the electronic document is a transceiving entity that directly transmits the electronic document, only by receiving the authentication of the standard compatibility and the interoperability of the communication messaging server system and stably storing the communication certificate in the third party storing institution, the owner of the electronic document may participate in the communication as the transceiving entity.

In contrast, if the transceiving entity is responsible to transmit the electronic document by proxy for the owner (user) of the electronic document as a third party, the transceiving entity needs to prove that the tranceiving entity stably and reliably manages the transmission message and manages and authenticates the user information. In order to secure the stability and reliability of the third party communication, temporally, the transceiving entity that performs the third party communication is limited only to the third party storing institution provider.

(2) Communication Messaging Server System

The communication messaging server system needs to build a message transceiving function and a function of searching address information concerning a receiver and security related information in connection with the address directory server in order to communicate the electronic document (information) based on the communication messaging server standard. The communication messaging server system physically has one electronic mailing address (IP address) but may issue or manage a plurality of user account for lower level users and each user account has one certified electronic mailing address.

The communication messaging server system needs to manage electronic document mail box for every user account in order to manage the user accounts and communication messaging server system has responsibility for stable and reliable electronic document communication as a representative for the user accounts.

In order to participate in the electronic document communication as a transceiving entity, the communication messaging server system is authentified whether the requirements according to this invention are appropriately implemented and there is no problem in the interoperation with other solution.

The authentifying system that authenticates the standard compatibility and the interoperability for the communication messaging server system manages the authenticated transceiving entity. Further, if the address directory server requests to confirm whether to be authentified in the process of registering the certificated electronic mailing address, the authentifying system returns the result.

Figure 63:
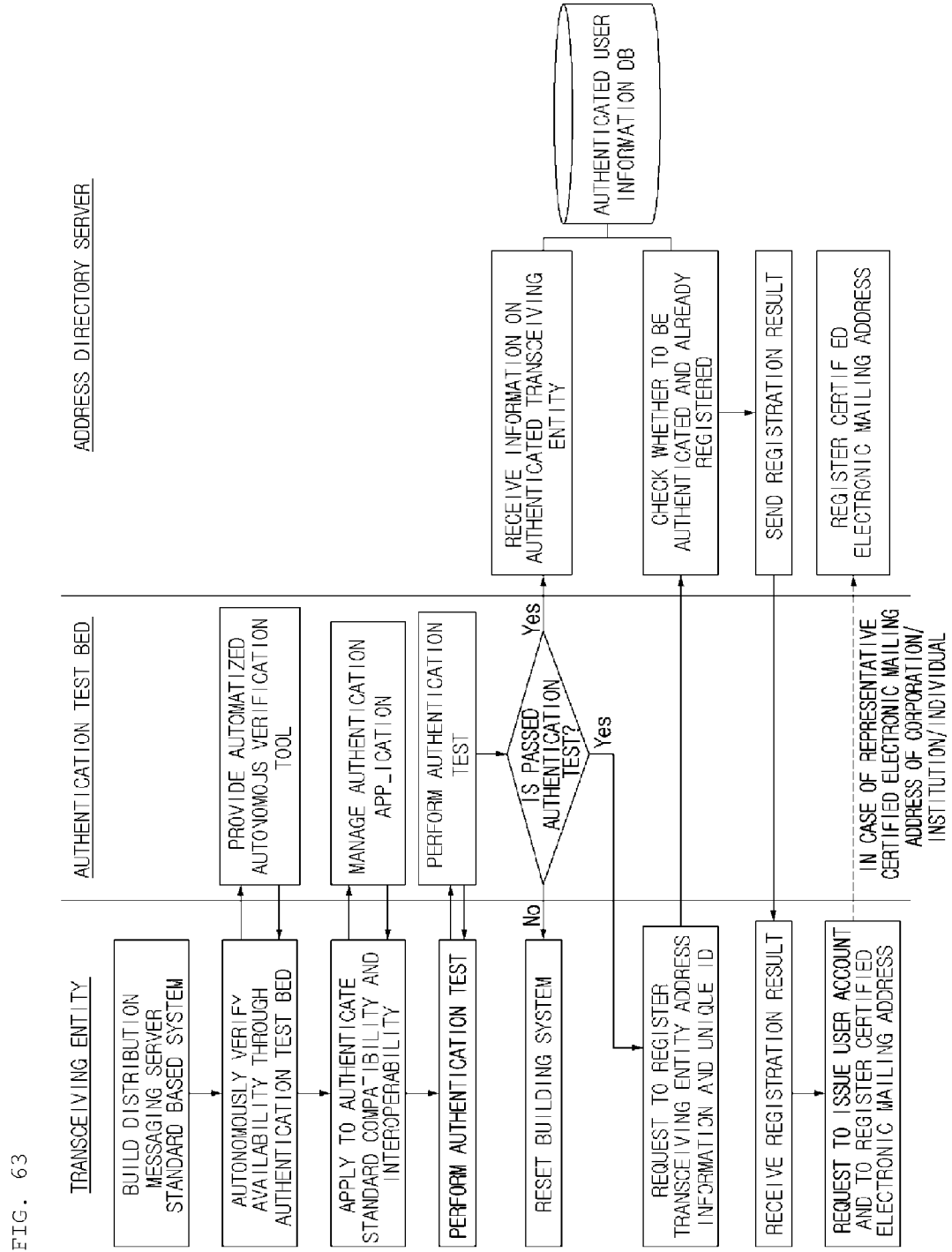

The communication messaging system is authenticated and registered by the certificated electronic mailing address in accordance with the following process as illustrated in FIG. 63.

First, a corporation/institution or an individual user which serves as a transceiving entity builds a communication messaging server system in accordance with a technical standard.

Next, the standard compatibility and the interoperability of the built communication messaging server system is authenticated by an automatic verifying equipment provided by an authentication test bed.

Next, the transceiving entity whose verification is completed requests the authentication test bed for the authentication test.

Next, if the result of the authentication for the system in accordance with the test process of the authentication test bed is "pass", the transceiving entity prepare a next procedure for registering the certified electronic mailing address.

Next, the authentication test bed delivers information concerning the transceiving entity that passes the authentication examination to the address directory server and the address directory server utilizes the information as a condition of address registration.

Next, the transceiving entity requests the address directory server to issue a unique ID in order to register the authenticated communication messaging server system.

Next, if the communication messaging server system is completely registered in the address directory server, the communication messaging server system may participate in the electronic document communication.

Next, after completely authenticating the communication messaging server system, the user account is open. In the case of representative certified electronic mailing address, the user account is requested to be registered in the certified electronic mailing address.

(3) Address Directory Server

In order to participate in reliable electronic document communication, all users need to receive a unique electronic mailing address.

(4) Communication Client APP

The communication client APP refers to an application that provides an UI such as document transmission and reception, received document reading, and management for the users who participate in the document communication. The communication client APP does not independently transmit/receive the document but needs to be connected with the communication messaging server system.

A document which is created or attached by the communication client APP is delivered to the users using the communication messaging server system, the documents received through the communication messaging server system are searched. If the communication messaging server system manages the transceiving mail box through the user account, the communication client APP may access to only the corresponding document among the received documents by checking the user account information.

The communication client APP may be implemented as a C/S type application or a web type screen in accordance with the request of the user.

(5) Public Sector Connection Gateway

An administrative or public institution which cannot accept the electronic document communication performs a function that relays the administrative or public institution with a private enterprise, institution, or individuals under the electronic document communication system through a public sector connection gateway.

(6) Electronic Document Form Register

Users who wants to transmit an electronic document using the communication messaging server system may directly create a document to be transmitted using Office tools. The electronic document form register is a system that support the management such as the registration and management of the document format, searching, reading, and downloading of the document format so as to be used by a user application such as the communication client APP while registering and managing the standard document format so as to support to allow the user to easily create the electronic document.

The electronic document form register provides a server engine that manages the document standard format and a standard interface that allows a client application (APP) to search and download the document standard format and then plugged-in an internal program to use the document standard format.

[Electronic Document Communication Method]

A whole process for communication an electronic document in the electronic document communication is largely divided into "(1) a prior preparation step before the communication", "(2) an electronic document communication step", "(3) an evidencing step for communication". Hereinafter, the above-mentioned three steps will be described in detail. Further, a document transceiving method", "a communication evidencing method", and "a spam message processing method" will be described in detail.

(1) Prior Preparation Step Before Communication

A manager of the electronic document form register registers a standard document form to be used using the electronic document form register.

A transceiving participant determines whether to autonomously build a communication messaging server system for reliable communication or open a user account in a previously built communication messaging server system to use the communication messaging server system. If the communication messaging server system is autonomously built for reliable communication, a communication messaging server system for transceiving the electronic document is built and then an authentication test is performed for the standard compatibility and interoperability of the communication messaging server system through an authentication institution. Thereafter, the transceiving participant accesses to the address directory server to apply and receive a transceiving entity ID for an authenticated communication messaging server system, and then autonomously registers and manages an internal identifier for an internal actual user and plugs-in a standard document form creating function in the client application for a document creating function based on the standard document form (optional). In contrast, if a transceiving entity that includes a communication messaging server system in which third party communication is allowed is used, the transceiving participant requests to open a user account for a corporation/institution/individual through the communication messaging server system and then registers certified electronic mailing address information for the user account in the address directory server. Thereafter, the transceiving participant plugs-ins a standard document format creating function in the client application in order for a general user to use the document creating function based on the standard document form (optional).

(2) Electronic Document Communication Step

Document transmitter

- A document transmitter selects a document to be communicated or creates a document to be transmitted using a word processor.
- Address information of the other party who receives the document and a document to be delivered, whether to encrypt the document and whether to do digital signature is selected (encryption and the digital signature are performed on an attached delivery document rather than the transmission message and this processes are optional)
- The communication client APP acquires physical address information and public key information for encryption based on a certified electronic mailing address of a receiving party in connection with the address directory server (optionally, if the communication client APP does not acquire the physical address, the communication messaging server performs this process)
- The communication client APP requests the transmission to the communication messaging server based on the address information of the receiver (both physical address information and the certified electronic mailing address are available)

Communication messaging server of transmitter

- If the transmission request message requested in the communication client APP is not the physical address information for the receiver, the communication messaging server inquires physical address information for a transceiving entity of the receiver based on the certified electronic mailing address to the address directory server.
- The electronic document is packaged as a message structure defined in a communication protocol standard.
- Digital signature is performed on the message based on the certificate of the communication messaging server of the transmitter.
- The message is sent the receiver based on the physical address information of terminal.

Communication messaging server of receiver

- After receiving a message, the message is verified and then a document is extracted from the message.
- The message including a reception certificate is sent to the transmitter as a synchronous response.

(3) Evidencing Step for Communication

A receiver creates a "reception certificate" at a time of receiving a document for confirmation of reception of the document and delivers the reception certificate to the transmitter. The transmitter that receives the reception certificate stores the reception certificate in the third party storing institution.

If there is a request from a transmitter, the receiver delivers the received document to an actual person in charge of the document (user) and then creates a "reading certificate" at a time when the person in charge checks the received document to deliver the reading certificate to the transmitter. The document transmitter that receives the "reading certificate" stores the "reading certificate" in the third party storing institution (the reading certificate is issued only when there is a request from the transmitter).

- When the transmitter tries to deliver a document to the receiver but the trial is failed, the transmitter requests an electronic document communication hub which is an objective third party in order to evidence the transmission trial and the electronic document communication hub that receives the transmission request issues a "transmission certificate" in order to evident the reception of the transmission request and delivers the transmission certificate to a transmission requestor. The transmission requester who receives the transmission certificate stores the "transmission certificate" in the third party storing institution.

Document Transceiving Method

The transmitter and the receiver electronically communicate the document through the communication messaging server system. The communication messaging server system transmits/receives the electronic document in accordance with the communication protocol. All messages are configured by combination of transmission and reception confirmation (or reception certificate) messages for reliable message communication and the physical address information for the receiver is acquired through the address directory server.

Communication Verification Method

"Communication verifying" refers verification of events regarding transmission, reception, or reading related with the electronic document communication using a reliable method. In this case, a certificate that is issued for an action related with the electronic document communication is collectively referred to as a "communication certificate".

The communication messaging server system issues a communication certificate at a time of transmission and reception in order to evidence the action for transmission and reception and stores the issued communication certificate in the third party storing institution so as to be utilized as an evidential material for the communication action.

The communication messaging server system evidences events for transmitting, receiving, and reading the electronic document and creates communication certificates for the events. The communication certificate includes identification information of the communication certificate, creating time and expiring time of the communication certificate, a policy of the communication certificate, and a communication evidencing target.

The communication certificate for the transmission of the electronic document is created by the electronic document communication hub and the communication evidencing target includes identification information of a transmitter, identification information of a receiver, communication identification information, document identification information, and an electronic document transmission request time.

The communication certificate for the reception of the electronic document is created by a receiver who receives the electronic document and the communication evidencing target includes identification information of a transmitter, identification information of a receiver, communication identification information, document identification information, electronic document transmitting time, and an electronic document receiving time.

The communication certificate for the reading of the electronic document is created by a user who checks the reception of the electronic document and the communication evidencing target includes identification information of a transmitter, identification information of a receiver, communication identification information, document identification information, electronic document transmitting time, an electronic document receiving time, and an electronic document checking time.

The communication certificate created as described above is digitally signed by NPKI or GPKI certificate and the created communication certificate is delivered to the electronic document transmitter. All communication certificates are preferably stored in the third party storing institution.

Spam Message Processing Method

The electronic document communication has an infrastructure in which basically, the transmitter transmits the electronic document through a certified communication messaging server system and a receiver also receives the electronic document based thereon so that the transmitter is responsible therefor. However, the spam transmitter may open a user account in the communication messaging server system and transmit an electronic document using the same. Further, a current authentication system authenticates only technical contents of the system. Therefore, if a spam transmitter builds a communication messaging server system, technically authenticates the communication messaging server system, and then uses the communication messaging server system as a spam transmitting unit, it is difficult to block any attempt at an initial stage.

Therefore, in order to solve the above problems, in the standard document communication infra according to the present invention, whitelist based on the authentication list management and blacklist system based on the spam target list management in accordance with the user reporting method are provided and a process that allows the receiver to deny the reception by this system is applied to prevent the spam message.

Functions of reporting the spam message and checking a transmitting party are essential and thus all communication messaging servers need to necessarily build these functions.

If a receiver judges that the received message is a spam message, the receiver reports the spam message to the address directory server of the electronic document communication hub in accordance with the process illustrated in FIG. 26 and a processing procedure related therewith is as follows.

First, if the receiver judges that the message is a spam message at a time of receiving the message, the receiver reports the message to the address directory server through the communication messaging server system as a spam message.

Next, the address director serve that accepts the report of the spam message from the communication messaging server system returns a confirmation message indicating the acceptation.

Next, National IT Industry Promotion Institution that is a principal agent that manages the address directory server analyzes the message and investigates the transmitter to examine and determine whether to add the certified electronic mailing address of the transmitter as blacklist.

Next, if the transmitter is determined as a blacklist candidate, the address director server adds the corresponding certified electronic mailing address to the blacklist and then notifies the addition to the blacklist to the transmitter.

Next, the address directory server delivers the processing result for the spam message request to the spam reportor (receiver).

In the above-mentioned processing procedure, only information for a messaging server system which is authenticated and formally registered is recorded in the whitelist. In contrast, when an address of the transmitter is registered as a spam transmitter, the address is registered in the blacklist. If the spam address which is registered in the blacklist through the same communication messaging server system is repeatedly generated, the electronic document communication hub determines whether to cancel the authentication for the corresponding messaging server system and then cancels the authentication and deletes the spam address from the whitelist.

When a message is received, the receiver checks the whitelist and the blacklist of the address directory server in order to confirm whether the transmitting party is a reliable and legal user to determine whether to deny the reception. A transmitter checking method includes a realtime checking method at the time of reception and a periodical checking method that checks the transmitter through a list which is managed in a type of cache in the communication messaging server of the receiver.

In the process of checking the transmitter in realtime basis, as illustrated in FIG. 27, at a time when the receiver receives the message, it is determined whether the address of the transmitter is registered in the whitelist or blacklist in the address directory server and then determines whether to deny the reception. The details of checking the transmitter in the realtime basis will be described below.

First, if a message is received, the communication messaging server system of the receiver delivers a checking request message to the address directory server in order to check whether the transmitter is a legal user.

Next, the address directory server checks whether the address information of the requested user is included in the whitelist.

Next, if the address is not in the whitelist, the address directory server immediately returns a result message indicating that the requested user is non-registered user to the checking requester. If the address is included in the whitelist, the address directory server checks whether the corresponding address is registered in the blacklist.

Next, the address directory server returns a result message whether to be registered in the blacklist to the checking requester.

Next, if the receiver receives a result message indicating that the transmitter is not a legal user (not included in the whitelist or registered in the blacklist) from the address directory server, the receiver autonomously processes the received message as a spam message and then records and stores the processing result message received from the address directory server and the reception records of spam message.

Next, the processing record of the spam message needs to be stored one month or longer so as to confirm the legitimacy of the reception denial against the corresponding transmitter.

Further, in the process of periodically checking the transmitter, as illustrated in FIG. 28, the receiver receives the whitelist and the blacklist from the address directory server in advance, autonomously manages the whitelist and the blacklist, and determines whether that the address of the transmitter is registered in the whitelist and the blacklist based thereon to determine whether to deny the reception of the message. The details of the process of periodically checking the transmitter will be described below.

First, the communication messaging server system of the receiver requests a latest whitelist and a latest blacklist to the address directory server in advance and autonomously manages the whitelist and the blacklist. In this case, if the list is changed, whether to request the automatic notification is delivered. Even though the automatic notification of the changed matter of the list is requested, a request for importing a latest list in the address directory server is periodically performed so that the difference of the list information is at most one day.

Next, if the whitelist and the blacklist are changed, the address directory server broadcasts the changed details to a user who requests the notification of the change.

Next, the communication messaging server system of the user who receives the changed matters for the list modifies information of the list which is autonomously managed to synchronize the list.

Next, if the message is received, the receiver checks the list which is autonomously managed in order to check whether to be a legal user to the address directory server.

Next, if it is determined that the transmitter is not a legal user (not included in the whitelist or registered in the blacklist) as a result of checking the list which is autonomously managed, the receiver autonomously processes the received message as a spam message and records and stores the receiving record of the spam message.

Next, the processing record for the spam message needs to be stored one month or longer so as to confirm the legitimacy of the reception denial against the corresponding transmitter.

[Communication Messaging Server System]

Hereinafter, a communication messaging server system of the electronic document communication system according to an exemplary embodiment of the present invention as described above will be described in detail.

The communication messaging server system is largely configured by message transmission, message reception, mail box management of a received message, message security (user authentication, document encryption/decoding), transceiving record management, address directory server connection, message verification, an internal system connection interface, issuance and management of a communication certificate, and connection of third party storing institution.

FIG. 36 illustrates a configuration of the communication messaging server system. Referring to FIG. 36, components (1) to (9) of the communication messaging server system will be described in detail as follows.

(1) Message Transmission/Reception

A message is transmitted and received in accordance with a communication protocol.

(2) Account (Mailbox) Management for Every User

A transmitted or received message is stored in a mailbox for every account in accordance with the user account or an internal identifier.

For the transmitted document stored in the mail box, four stage status information including "in the process of transmitting", "transmission completed", "transmission failed", and "reception completed by a person in charge" is managed. In this case, a status of "in the process of transmitting" refers to a status when no response is received from the receiver after transmitting a document, a status of "transmission completed" refers to a status when the "reception certificate" is received from the communication messaging server system of the receiver, a status of "transmission failed" refers to a status when SOAP Fault message is returned due to an error occurring inside of the receiving communication messaging server system or a network error occurs in the transceiving process, and a status of "reception completed by a person in charge" refers to a status when the transmitting communication messaging server system receives a "reading certificate" evidencing that the person in charge checks the document from the receiver.

For the received document stored in the mailbox for every user account, four stage status information including "verification error", "before reception confirmation", "reception confirmation", and "reading confirmation" is managed. In this case, a status of "verification error" refers to a status when an error occurs in verification of basic structure of received message, a status of "before reception confirmation" refers to a status before a person in charge of the received document reads a list of received documents in the mailbox, a status of "reception confirmation" refers to a status when the person in charge of the received document has read the list of the received document in the mailbox, and a status of "reading confirmation" refers to a status when the person in charge of the received document has read the details of the received document and the communication messaging server system of the receiver issues a "reading certificate" at this time and then delivers the "reading certificate" to the transmitter.

If deleting request is received from the reception user, the corresponding received document is physically deleted.

In the mailbox, the transmitted document, reception confirmation message for transmission, and reception confirmation message of a person in charge of reception has connection information so as to be connected to each other.

(3) Address Directory Server Connection

The communication messaging server system manages address information in accordance with the address information registering and searching process provided by the address directory server.

The communication messaging server system includes a client function that is capable of calling a service provided by the address directory server. In other words, the communication messaging server system provides a service client function that remotely calls the address information registering, searching, editing, and deleting functions provided by the address directory server.

(4) Message Security (User Authentication, Document Encryption/Decoding)

The communication messaging server system basically performs the message security function (message digital signature, signature verification) suggested by the communication protocol.

(5) Transmitting/Receiving Record Management

The communication messaging server system necessarily stores/manages the transmitting/receiving records at least one year or longer.

Information on the transmitting/receiving records to be stored includes a transmitting record and a receiving record. The transmitting record includes a message id, a related message id, a transmitter (including a user account), a receiver, a transmitting time, and a hashed value for the transmitted document. The receiving record includes a transmitter, a receiver (including a user account), a reception time, and a hashed value for the received document.

(6) Communication Certificate Issuance and Management

The communication messaging server system issues and manages the communication certificate so as to evidence the contents for the document transmitting and receiving event.

The issued communication certificate is requested to be stored in a third party storing institution as soon as the certificate is delivered so as to assure reliability.

After issuing the communication certificate, the communication messaging server system manages the record of the communication certificate stored in the third party storing institute. The issuing record of the communication certificate includes a communication certificate id, a communication certificate issuing time, a related message id, an original of the communication certificate (optional), and storage key information which is received after storing the communication certificate in the third party storing institution.

(7) Message Packaging Process (Packaging, Parsing, Extracting)

The communication messaging server system packages the transmitting document as a message structure defined in the communication protocol before transmitting the transmitting document.

The communication messaging server system parses (syntactic analyzes) the received document by the message structure defined in the communication protocol and extracts necessary information.

(8) Request to Store Communication Certificate

In order to request to store the communication certificate, a general transceiving entity transmits a third party storing institution storing request message to a communication messaging server system of a third party storing institution (remote storing request).

If the certificated electronic document depository storing request message is received, the communication messaging server system of a third party storing institution calls a storing request client to store the communication certificate in the third party storing institution.

If the communication messaging server system of the third party storing institution directly creates the communication certificate, the communication messaging server system of the third party storing institution directly calls the storing request client of the third party storing institution (local storing request)

The client for requesting to store the communication certificate requests the third party storing institution to store the communication certificate in accordance with the transceiving connection interface standard of the third party storing institution.

(9) Additional Service

The communication messaging server system communicates the communication client APP management and manages a version thereof.

The communication messaging server system performs the message communication management (record or statistic information).

The communication messaging server system performs system management (system monitoring or environmental information).

The communication messaging server system performs document form management.

If the communication messaging server system according to the present invention including the above-mentioned components (1) to (9) is applied to a third party storing institution as illustrated in FIG. 36, when the communication certificate storing request module calls an connection interface client developed in accordance with a third party storing institution connection interface standard to request to store the communication certificate.

Figure 37:
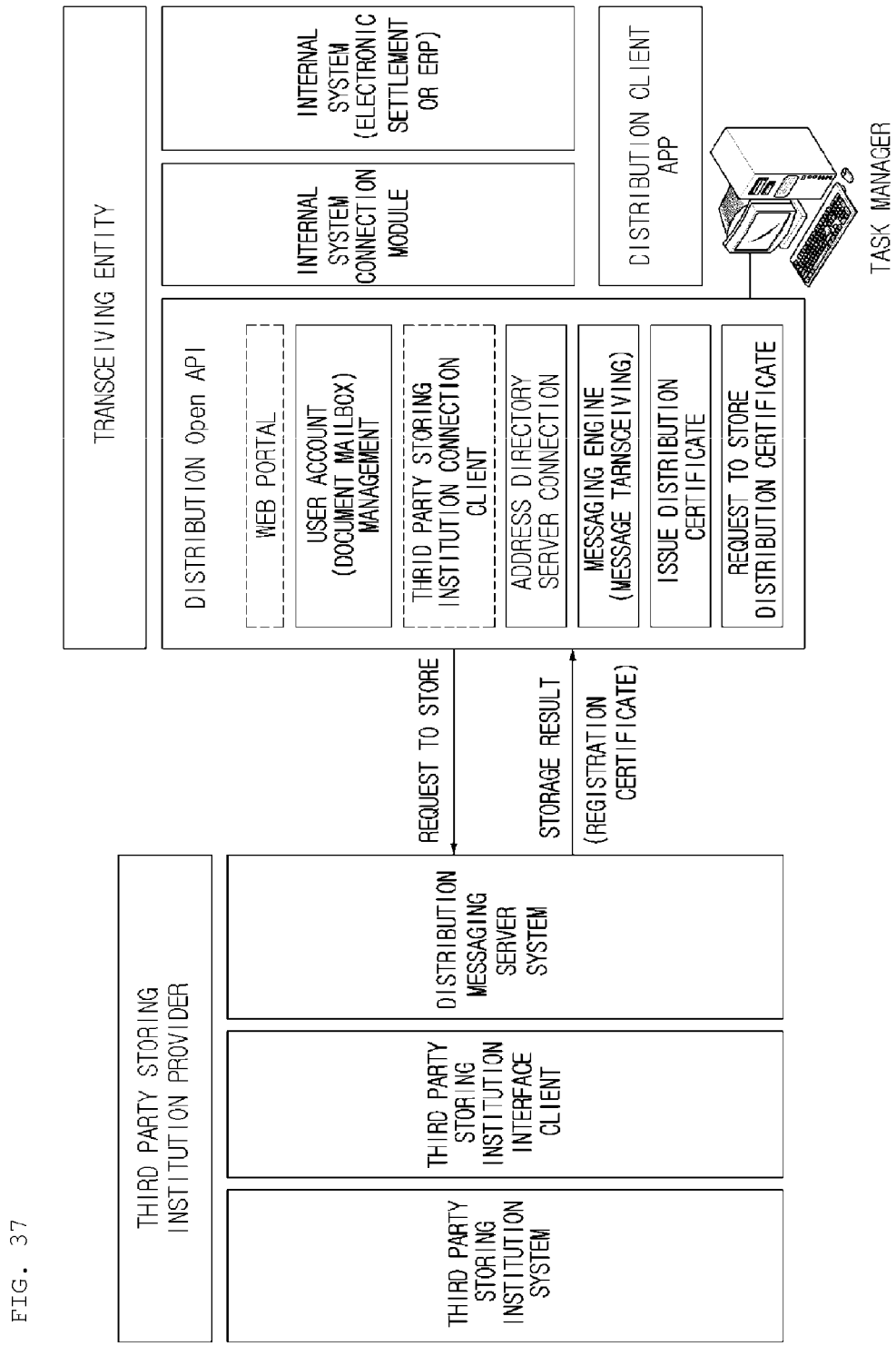

If the communication messaging server system according to the present invention including the above-mentioned components (1) to (9) is applied to a general transceiving entity (general business entity) as illustrated in FIG. 37, the communication certificate is stored by a method that transmits a message requesting to store the communication certificate to the communication messaging server system of the third party storing institution provider and receives the processing result.

Figure 38:
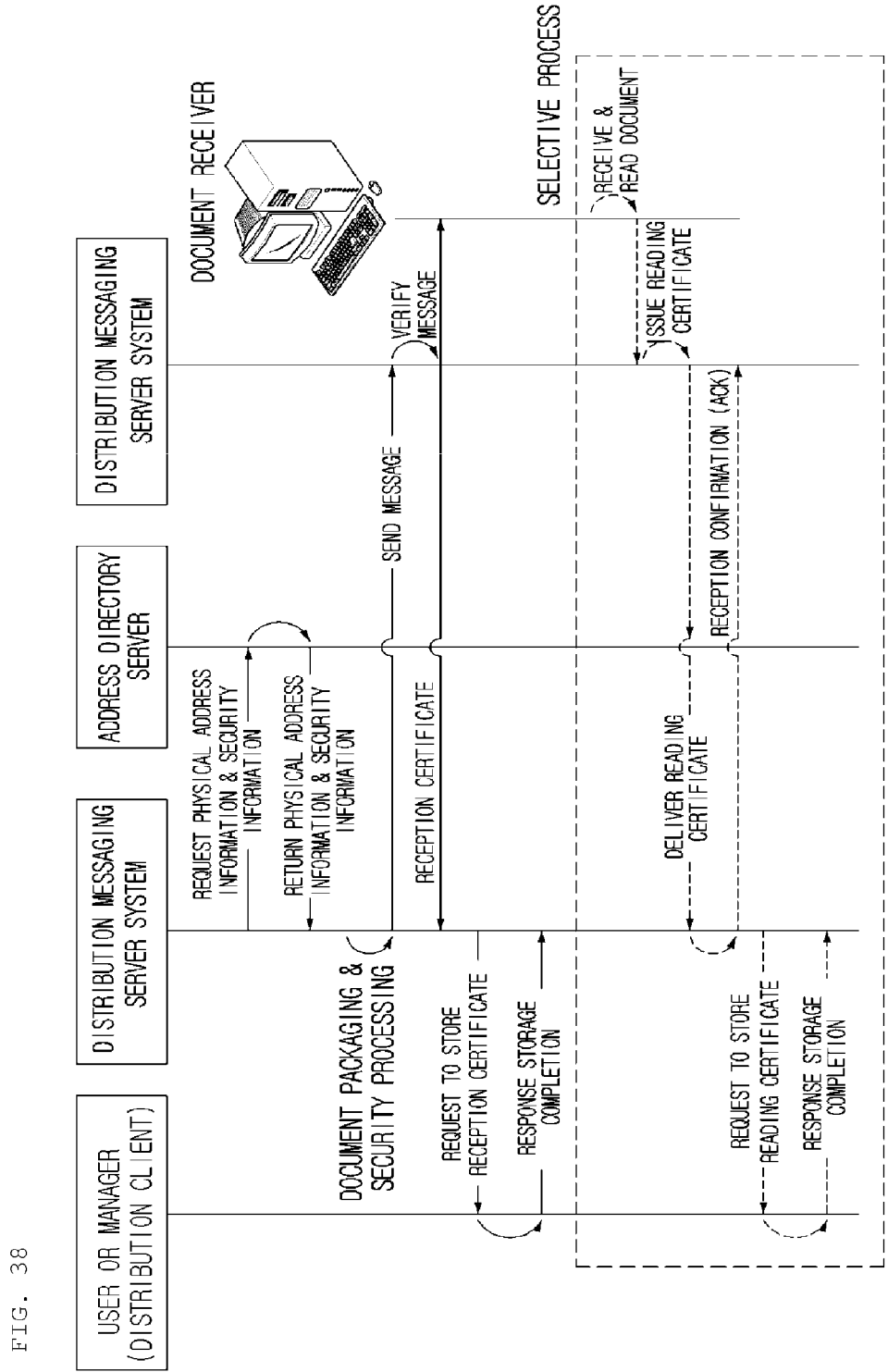

A process that directly communicate between a transmitter and a receiver using the communication messaging server system according to the present invention including the above-mentioned components (1) to (9) is configured by four steps including "(1) acquiring physical information and security information for a receiver", "(2) transmitting a message and confirming the transmission", "(3) confirming reception of a task receiver", and "(4) issuing and storing a communication certificate". The four steps will be described in detail with reference to FIG. 38.

(1) Acquisition of Physical Address and Security Information for a Receiver

A system of the transmitter requests the physical address information and the security information (if reception password for the transmission message is required) to which an actual message is delivered based on the address information of the other party to the address directory server to acquire the physical address information and the security information.

After the communication client APP requests the physical address information and the security information for the receiver to the address directory server, the physical address information of the receiver is delivered to the communication messaging server.

The Address information for the receiver may be acquired only using an id (for example, resident registration number or business registration number) for the user, which is available only when the receiver allows the transmitter to search the address information based on id.

If the transmitter already knows the physical address information and the security information of the receiver, this process may be omitted.

(2) Message Transmission and Transmission Confirmation

After packaging the message in accordance with the communication protocol standard, the transmitter performs the digital signature based on the certificate of the communication messaging server system.

The communication messaging server system transmits the message which is packaged in the previously acquired physical address and digitally signed.

The communication messaging server system that receives the message verifies a basic packaging structure, the validity of the digital signature and the suitability for the transmitter (refers to "2.4.6. Message verification" for details for the verification) and then creates a reception certificate for reception confirmation or an error message.

The receiving communication messaging server system transmits the created response message to the transmitter.

The transmission and transmission confirmation processes are configured by synchronous message processing.

(3) Confirmation Reception of a Task Receiver

If the transmitters requests a reading confirmation message of a person in charge of a task receiver at the time of transmitting a message, the receiver necessarily creates a reading certificate for evidencing the reading confirmation of a person in charge to deliver the reading certificate to the transmitter at the time of confirming the reception of the message on business.

If the receiver sends a reading certificate message for reading confirmation of a person in charge to the message transmitter, the message transmitter transmits synchronously the reception confirmation message.

(4) Issuance and Storage of Communication Certificate

If an evidence for the communication for every step is required, the transmitter issues certificates for reception, reading, and transmission in accordance with the steps and stores the certificate in the third party storing institution to assure a ground of the legal evidence for the communication.

The process of directly communicating the message between the transmitter and the receiver using the communication messaging server system according to the present invention performs "(5) error processing" in addition to the above-mentioned "(1) acquiring physical address and security information for a receiver", "(2) transmitting a message and confirming the transmission", "(3) confirming reception of a task receiver", and "(4) issuing and storing a communication certificate". Referring to FIGS. 90 to 92, details an error processing function will be described below.

(5) Error Processing Function

All message transceiving processes of the communication messaging server system are based on synchronous process. Therefore, since all errors for the transmission are checked by the transmitter, basically the message is retransmitted. The same message is resent by setting the same MessageId value so that the receiver may notice the redundant message even when an error occurs in the process of transmitting the reception confirmation message after successfully receiving the message.

The communication messaging server system follows the processing flowchart as illustrated in FIG. 39 even when the transmission of the request message is failed. In other words, when a transmission error occurs due to the network error in the process of transmitting the message by the message transmitter, if the transmitter receives an error message such as an HTTP error, the transmitter requests to retransmit the same message. Only when the transmitter receives the reception confirmation message, the transmitter recognizes that the transmission is successful.

The communication messaging server system follows the processing flowchart as illustrated in FIG. 40 when the reception of the response message is failed. In other words, even though the message is normally delivered to the receiver, if the transmitter does not receive the reception confirmation message from the receiver, the transmitter recognizes as transmission failure error and retransmits the same message to the receiver with the same MessageId. If the MessageId of the received document is identical to the previously received message, the receiver sends the reception confirmation message as redundancy reception and performs internal processing.

When the error message reception is failed, the communication messaging server system follows the processing flowchart as illustrated in FIG. 41. In other words, even though the message which is transmitted from the transmitter to the receiver is correctly delivered, when an error message is received as a response due to the error of the transmission message, the transmitter differently processes the message in accordance with the type of the error. However, the MessageId of the message which is transmitted in accordance with the re-request does not need to be the same but may be varied depending on the business situation.

"(1) A message transceiving function", "(2) a received message mailbox managing function", "(3) a message security function", "(4) a transceiving record managing function", "(5) an address directory server connecting function", "(6) a message verifying function", "(7) a internal system connecting interface function", and "(8) a communication certificate issuing and managing function" which are essentially required in the communication messaging server system according to the present invention as described above will be described in detail as follows.

(1) Message Transceiving

A basic process of transceiving the message by the communication messaging server system follows the "document transceiving method of the "electronic document communication method" according to the present invention as described above. A message exchanging type which is a basis for transceiving the message is based on the synchronous response of the message communication protocol and a configuration of a transmission message and a reception confirmation message, transmission message and a reception error message, a transmission message and a business response message (including a meaning of reception confirmation message) may be formed.

A message transceiving type includes two types including a combination of the transmitting and reception confirmation response messages and a combination of transmitting and business response messages.

A processing flow when the message transceiving type is the combination of the transmitting and reception confirmation response messages is illustrated in FIG. 42. The transmission message and the reception confirmation (or reception error) message is configured by the combination of SOAP (Simple Object Access Protocol) Request-Response and the transmission message and a response message thereof are connected by inserting the MessageId of the transmission message in a RefToMessageId of the response message to be sent and details thereof will be described with reference to [communication protocol] which will be described below.

A processing flow when the message transceiving type is the combination of the transmitting and business response messages is illustrated in FIG. 43. The transmission message and the response message including the reception confirmation (or reception error) message is configured by the combination of SOAP Request-Response. After the receiver receives the message and then creates a response document which is processed on business in connection with the internal system in realtime basis, the response document and the reception confirmation ACK message are included in the response message to be delivered to the transmitter. The transmission message and a response message thereof are connected by inserting the MessageId of the transmission message in a RefToMessageId of the response message to be sent and details thereof will be described with reference to [communication protocol] which will be described below.

A structure of the transceived message has a MultiPart-MIME structure as illustrated in FIG. 44. A SOAP message is inserted in a first MIME Part and a document to be transmitted is inserted in a second or subsequent MIME part.

A SOAP Envelope configured by a SOAP header and a SOAP Body is inserted in the first MIME. Message header information for transceiving a message, digital signature, a reception confirmation message, a synchronous transmission mark, and an error message are inserted in the SOAP Header. Further, in the second MIME part, a document (information) to be delivered to the message receiver is inserted. If the reception confirmation message of a person in charge is delivered, the document is inserted in this position. In the third MIME Part, if there are two or more documents (information) to be delivered to the message receiver, the documents are sequentially inserted in the third or subsequent MIME part.

(2) Received Message Mailbox Management

If a message is received, the communication messaging server system stores the received messages in the mailbox for every account. The reception message mailboxes are divided for one or more user accounts to store and manage the messages. The reception message mailbox needs to provide an interface that performs a required process in accordance with the request of the user (existence of the new received message, reading of the received message, downloading of the received message, and deletion of the received message) and returns the result in a standardized manner.

In order to qualify the user account managed by the communication massaging server system as a certified electronic mailing address included in the electronic document communication, the communication messaging server system needs to satisfy certification requirements in order to have a reliable user account (the requirements will be defined by separate evaluation guideline and currently, it is recognized that only third party storing institution satisfies the certification requirements).

Therefore, a method of allowing an individual or a corporation (institution) to acquire the certified electronic mailing address in the electronic document communication includes the following two methods. A first method is a method of autonomously building a communication messaging server system and authenticating the communication messaging server system to register an acquired transceiving entity ID in the address directory server. A second method is a method of opening a mailbox in a transceiving entity that additionally satisfies the requirement to have a reliable user account in the authenticated communication messaging server system to receive a user ID and then register the user ID in the address directory server.

(3) Message Security

The security for the transmission message is divided into digital signature for securing integrity and encryption/decoding for securing confidentiality. The message which is transmitted through the communication messaging server system is divided into a SOAP message and an attached document. In this case, the attached document is already encrypted in the communication client APP and only header information for transceiving a message is included in the SOAP Envelope so that additional encrypting process is not performed in the communication messaging server system but the digital signature process for preventing forgery is performed in the message transceiving process. The digital signature method and a detailed procedure refer [communication protocol] which will be described below.

(4) Transceiving Record Management

The communication messaging server system needs to manage transceiving record information in order to check the record when a conflict or an issue related to the transmission/reception is caused in the future. The record information may include not only information regarding the transceiving action but also actual transmission/reception document. If an actual document is stored in the third party storing institution, only the registration certificate received from the third party storing institution may be stored rather than an original of the document.

(5) Address Directory Server Connection

The communication messaging server system is connected with the address directory server using the service connection interface provided by the address directory server. The address directory server provides two kinds of address searching services, an address registering service, and an address changing service. The communication messaging server system essentially provides function of a "searching service of physical address related to the certified electronic mailing address" among the address searching services.

In addition to the searching service, whether to use the address registering service and the address changing service is determined depending on whether to use the user account which is registered/managed at a lower level by the communication messaging server system as a certified electronic mailing address of the corporation or individual. If the user account which is registered/managed by the communication messaging server system is authenticated so as to be registered as the certified electronic mailing address, since the communication messaging server system performs the registering and changing service for the certified electronic mailing address by proxy, the corresponding service of the address directory service is connected.

(6) Message Verification

When the communication messaging server system transmits/receives a message, the receiver verifies the validity of the message at the time of receiving the message, and likes the process illustrated in FIG. 45, after verifying the validity of the message, only when the message passes the verification, the receiver delivers the message reception confirmation message to the transmitter. Otherwise, the receiver transmits an error message for the received message.

Verification target: Schema verification of the received message (verifies whether the received message is correctly packaged in accordance with the communication protocol), verification of integrity of message (digital signature value of the received message is verified so as to verify that the message is perfect without being forged), and message transmitter verification (it is verified whether owner of the certificate used for the digital signature is identical to the transmitter of the message in order to authenticate whether the transmitter who performs the digital signature on the message is identical to the transmitter represented on the message).

(7) Internal System Connecting Interface

The communication messaging server system provides a standardized interface for transceiving in order to allow an internal system to transmit and receive a document through the communication messaging server system. Details of the interface will be described with reference to [communication client APP] which will be described below.

(8) Communication Certificate Issuance and Management

Basic conditions of the communication certificate are that (1) the communication certificate is created by the transmission and receiving communication messaging server system, (2) the communication certificate is created by performing digital signature based on GPKI and NPKI certificates, and (3) the communication certificate is created based on the electronic document communication action (in this case, if one or more electronic documents are delivered while the electronic document is communicated once, one communication certificate is created and an ID is assigned so as to identify the corresponding communication in order to communicate one electronic document and the communication certificate is created by the communication based thereon).

When the communication certificate is issued, it is considered that (1) since a serial number of the communication certificate is created by individual transceiving entities, 20 byte random number is used in order to give an uniqueness, which is different from the standard of the existing certificate, (2) the update and revocation of the communication certificate are not defined, (3) a system time of the communication messaging server system that creates the communication certificate and the communication client APP always maintains the current time, and (4) the communication certificate policy uses only OID and names defined in the technical standard.

The communication certificate issuing process is illustrated in FIG. 46 and a type of the communication certificate and essential information required to create the communication certificate are described in the following Table 141 and a method of acquiring the essential information of the communication certificate will be described in the following Table 142.

TABLE 141

| Type | Principal agent of creation/time | Purpose | Essential information |
| --- | --- | --- | --- |
| Reception certificate | Receiving communication messaging server system/immediately after reception | Prevention of denial that the receiver receives the message | Document information, transmitter, receiver, transmitting time by transmitter, receiving time by receiver |

TABLE 141-continued

| Type | Principal agent of creation/time | Purpose | Essential information |
|---|---|---|---|
| Reading certificate | Receiving communication messaging server system/immediately after being read by a person in charge | Prevention of denial that the receiver reads the received message | Document information, transmitter, receiver, transmitting time by transmitter, receiving time by receiver, reading time by receiver |
| Transmission certificate | Electronic document communication hub/immediately after receiving a transmitting request message | Evidence of transmission trial of the transmitter | Document information, transmitter, receiver, transmission request time by transmitter |

TABLE 142

| type | Essential information | Creating method |
|---|---|---|
| Reception certificate | Document information, transmitter, receiver, transmitting time by transmitter | Use field value in communication message transmitted by the transmitter |
| | receiving time by receiver | Use time of receiving communication messaging server system |
| Reading certificate | Document information, transmitter, receiver, transmitting time by transmitter | Use field value in communication message transmitted by the transmitter |
| | receiving time by receiver, reading time by receiver | Use time in receiving communication messaging server system |
| Transmission certificate | Document information, transmitter, receiver | Use field value in communication message transmitted by the transmitter |
| | transmission request time by transmitter | Use time of electronic document communication hub system |

The communication certificate is created by the transceiving entity and digitally signed using the NPKI and GPKI certificates of the transceiving entity. As a basic structure of the communication certificate, a SignedData structure of CMS standard is used and a contents identifier which is equal to the certificate is used.

contentType of the communication certificate is as follows.

```
    id-kiec-arcCertResesponse OBJECT IDENTIFIER ::=
{ iso(1) member-body(2) korea(410) kiec(200032)
certificate(2) 2 }
    ARCCertResponse ::= CHOICE {
        arcCertInfo      [0] EXPLICIT ARCCertInfo,
        arcErrorNotice   [1] EXPLICIT
ARCErrorNotice }
```

A basic field of the communicationcertificate is as follows.

```
    ARCCertInfo ::= SEQUENCE {
        version          [0] EXPLICIT ARCVersion
DEFAULT v1,
        serialNumber     SerialNumber,
        issuer           GeneralNames,
        dateOfIssue      GeneralizedTime,
        dateOfExpire     DateOfExpiration,
        policy           ARCCertificatePolicies,
        requestInfo      RequestInfo,
        target           TargetToCertify,
        extionsions      [1] EXPLICIT Extensions
OPTIONAL
    }
```

Details of the basic field of the communication certificate as described above will be described below.

(1) Version version indicates a version of the structure of the communication certificate. The version is set to v2 for the communication certificate and dataHash is used in a target field.

ARCVersion::=INTEGER {v1(1), v2(2)}

(2) Serial Number

Serial number indicates identification information of the communication certificate. The communication certificate is created by the transceiving entity that receives the electronic document so that an identification number of serial number style is useless. Further, when the communication client of the transceiving entity is reinstalled, it is difficult to maintain the serial number. Therefore, the identification information of the communication certificate uses 20 byte random number. Accordingly, in order to process the communication certificate, it should be possible to process 20 byte random number.

SerialNumber::=INTEGER (3) Issuer, Issuer of Certificate

A certificate identification value of an issuer that issues the communication certificate is input. A value of the field needs to have the same value as SubjectName field in the certificate of a signing person who digitally signs the communication certificate.

(4) dateOfIssue, Date of Issuing Certificate dateOfIssue indicates a time when the issuer issues the communication certificate.

(5) dateOfExpire, Expiration Date of Certificate dateOfExpire refers to the expiration date of the communication certificate.

(6) Policy, Certificate Policy policy refers to the policy of the communication certificate. A policy OID in all communication certificates are varied in accordance with the type of the certificate and only a value that is stored in the technical standard is used. The communication certificate has one OID in accordance with the type of the certificates in a lump.

A Qualifier value is represented in UserNotice>ExplicitText>DisplyText as a UTF8String type and a specified sentence is used.

Policy information represented in the following Table 143 is used in accordance with the type of the communication certificates.

TABLE 143

| Type of certificate | Policy OID | Qualifier |
|---|---|---|
| Transmission certificate | 1.2.410.200032.2.?.1 | Transmission certificate |

TABLE 143-continued

| Type of certificate | Policy OID | Qualifier |
|---|---|---|
| Reception certificate | 1.2.410.200032.2.?.2 | Reception certificate |
| Reception confirmation certificate | 1.2.410.200032.2.?.3 | Reception confirmation certificate |

(7) requestInfo, Certificate Request Message information
This field is set to be null.
RequestInfo::=CHOICE {
arcCertRequest ARCCertRequest,
null NULL}
(8) Target, Target of Evidencing
Hashed values of all communicated electronic documents are specified. This field necessarily uses communicationInfos method. The structure for opRecord and orgAndIssued, dataHash fields refers "certificate format and operating procedure technical standard" of the third party storing institution.
Information on the communicated electronic document is included in a CommunicationInfos field.

```
TargetToCertify ::= CHOICE {
    opRecord            [0] EXPLICIT OperationRecord,
    orgAndIssued        [1] EXPLICIT
OriginalAndIssuedDocumentInfo,
    dataHash            [2] EXPLICIT HashedDataInfo
    distributionInfos   [10] EXPLICIT
DistributionInfos}
    DistributionInfos ::= SEQUENCE OF DistributionInfo
    DistributionInfo ::= SEQUENCE {
        senderAdd           GeneralNames,
        receiverAdd         GeneralNames,
        dateOfSend          GeneralizedTime,
        dateOfReceive       [0] EXPLICIT
GeneralizedTime OPTIONAL,
        dateOfReceiveConfirm [1] EXPLICIT
GeneralizedTime OPTIONAL,
        distributionId      INTEGER,
        numberOfFiles       INTEGER,
        communicatedFileInfos  CommunicatedFileInfos}
```

(1)-1 senderAdd, certified electronic mailing address
This field indicates a certified electronic mailing address of the transmitter.
(1)-2 receiverAdd, certified electronic mailing address of receiver
This field indicates a certified electronic mailing address of the receiver.
(1)-3 dateOfSend, transmitting date and time
This field indicates a time when the transmitter transmits the electronic document.
In case of transmission certificate, dateOfSend specifies a time when the transmitter requests the transmission to the electronic document communication hub.
The transmission certificate includes only this field, but does not include dateOfReceive and dateOfReceiveConfirm.
(1)-4 dateOfReceive, receiving date and time
This field indicates a time when the receiver receives the electronic document. This time needs to be equal to or prior to the time when the certificate is created. The reception certificate and the reading certificate need to include this field. In contrast, the transmission certificate does not include this field.
(1)-5 dateOfReceiveConfirm, reading date and time
This field indicates a time when the receiver receives and checks the electronic document. This time needs to be equal to or later than the receiving date and time and equal to or prior to the time when the certificate is created. The reading certificate needs to include this field. In contrast, the transmission certificate and the reception certificate do not include this field.
(1)-6 communicationId, communication identification value
This field indicates an identification value for the communication of the electronic document. In order to create this field, 20 byte random number is created and used. This field value indicates an identification value which is assigned to the communication message for the electronic document communication.
(1)-7 numberOfFiles, number of communicated files
One or more electronic documents may be delivered in the communication and this field indicates a number of files which are delivered in one communication.
(1)-8 communicatedFileInfos, communication document information
One or more electronic documents may be delivered in the communication and information for all documents to be delivered needs to be included in this field.

```
CommunicatedFileInfos ::= SEQUENCE OF CommunicatedFile
CommunicatedFile ::= SEQUENCE {
    fileHashedData   HashedDataInfo,
    fileId           [0] UTF8String OPTIONAL,
    fileName         [1] UTF8String OPTIONAL
}
```

(1)-8-1 fileHashedData, file hashed information
This field indicates a hashed value for a communicated and delivered electronic document.
(1)-8-2 fileId, file identification value
When an identification value is assigned to the electronic document to be communicated, an identification value for the corresponding document is designated. A file identification value is created by the transmitter and needs to be delivered together when the electronic document is delivered to the receiver. The receiver applies the delivered file identification value to this field.
The transmitter creates this field using uuid method.
This field may be selectively used but if the fileName field is not used, this field is necessarily used and use of field is recommended.
(1)-8-3 fileName, fine name
This field indicates a file name of the electronic document to be communicated. A file name is designated by the transmitter and needs to be delivered together when the electronic document is delivered to the receiver. The receiver applies the delivered file identification value to this field.
This field may be selectively used but if the fileID filed is not used, this field is necessarily used.
The consistency criteria related with the time information of the communication certificate described above will be described in the following Table 144.

TABLE 144

| Number | Field | Contents |
|---|---|---|
| 1 | dateOfSend | Transmitting date and time/transmitting request date and time |
| 2 | dateOfReceive | Receiving date and time |
| 3 | dateOfReceiveConfirm | Reading date and time |
| 4 | dateOfIssue | Certificate issuing date |
| 5 | dateOfExpirre | Expiration date of certificate |

An order of time information is transmitting date and time<receiving date and time<reading date and time issuing date of certificate<expiration date of certificate. When the communication certificate is verified, the above order needs to be checked.

The verification of the communication certificate includes verification of certificate structure, verification of digital signature of certificate, checking of main fields of certificate, and verification of consistency of time information of certificate.

Verification of certificate structure is a process of verifying whether the certificate is same as defined in ASN.1.

Verification of digital signature of certificate is a process of verifying the digital signature applied to the communication certificate.

Checking of main fields of certificate includes checking of a version field checking whether a version field value is v2, checking of a target field checking whether the target field is hashData, issuer information verification verifying whether DN of a certificate used for the digital signature is identical to DN of a basic field of the certificate, checking of requestInfo field checking whether a requestInfo field is Null, checking of extension field checking whether communicationInfos extension field is existed and critical is TRUE, checking of number of files checking whether a value of numberOfFiles field is equal to the number of CommunicatedFile in communicationInfos extension field, checking of target field hashed value checking whether the hashed value of the target field is equal to the hashed value of the communicationInfos extension field, and verification of consistency of time information verifying in accordance with the consistency verification criteria of the time information.

Verification of consistency of time information of certificate verifies based on consistency verification criteria of the time information of the communication certificate.

In the meantime, the communication certification refers to an action certificating the fact of transmission, reception, and reception confirmation occurring in the process of communicating the electronic document using a reliable method. The communication certification is performed in a separate application program but is not performed in a communication certificate viewer and the communication certification API. If the communication certification is performed additionally to the verification of the communication certificate, the followings will be performed.

Verification of communication certificate: the communication certificate is verified.

Checking of policy of communication certificate: a communication certificate policy OID and a Qualifier value for transmission, reception, and reception confirmation are checked.

Checking of transmitter's address: Whether the address of the transceiving entity that transmits the electronic document is correct is checked.

Checking of receiver's address: Whether the address of the transceiving entity that receives the electronic document is correct is checked.

Checking of transmitting date and time: Whether the time when the transmitter transmits the electronic document is correct is checked.

Checking of receiving date and time: Whether the time when the receiver receives the electronic document is correct is checked.

Checking of reception confirmation date and time: Whether the time when the receiver confirms the reception of the electronic document is correct is checked.

Checking of communication ID: Whether the communication ID which is assigned to individual communication cases is correct is checked. If the transmitter and the receiver separately store and manage the communication IDs, the communication IDs may be compared and managed.

Checking of identifier or fine name of communication file: Whether an ID or a name of the file to be communicated is correct is checked. If the transmitter and the receiver separately store and manage the file IDs and the file names, the file IDs and the file names may be compared and managed.

Checking of hashed value of communication file:

Whether the hashed values of the files to be communicated are equal to the values of CommunicatedFile field of the extension field is checked. In this case, the hash algorithm which is designed in the communication certificated is used to compare the hashed value and the field value.

In the meantime, a profile of the communication certificate will be described in the following Table 145. It should be considered to apply RSA 2048 bit and SHA256 algorithms to the digital signature, necessarily include the certificate in the signedData structure, and include only one signerInfor in signerInfos field.

TABLE 145

| Basic field | contents | remarks |
| --- | --- | --- |
| Version | Version | V2 |
| serialNumber | Serial number | 20 byte random number |
| dateOfIssue | Date of issuance | GeneralizedTime |
| dateOfExpire | Date of expiration of certificate | GeneralizedTime |
| Policy | Policy of certificate | OID: 1.2.410.200032.2.?.? |
| requestInfo | Certificate request message information | Null |
| Target | Evidencing target | Use communicationInfos structure |
| senderAdd | Certified electronic mailing address of transmitter | |
| receiverAdd | Certified electronic mailing address of receiver | |
| dateOfSend | Date of transmission | GeneralizedTime, essential |
| dateOfReceive | Date of reception | GeneralizedTime, optional |
| dateOfReceiveConfirm | Date of reception confirmation | GeneralizedTime, optional |
| communicationId | Communication identifier | 20 byte random number |
| numberOfFiles | Number of communicated files | |
| communicatedFileInfos | Communicated file information | One or more communicatedFile |
| CommunicatedFile fileHashedData | File hashed value | SHA256 |
| fileId | File Id | One of fileID and filename is essential |
| filename | File name | |

In the method that connects the communication certificate with the third party storing institution as described above, the communication certificate is requested to be stored in the third party storing institution as soon as the communication certificate is issued so as to assure the reliability of the issued communication certificate.

In the case of the communication messaging server system of the third party storing institution provider, the communication certificate storing process is illustrated in FIG. 47. The third party storing situation connection module directly requests to directly store communication certificate issued from the communication messaging server system in the third party storing institution. The third party storing institution connection module is configured by a communication certificate storing request module and a third party storing institution connection interface client module. The communication certificate is stored in the third party storing institution in accordance with the existing third party storing institution connection interface module standard.

In the case of the communication messaging server system of a general transceiving entity, the communication certificate storing process is illustrated in FIG. 48. In order to request the third party storing institution providers to store the issued communication certificate, a request message is delivered to the communication messaging server system of the third party storing institution provider. The communication messaging server system of the third party storing institution provider that receives the storing request from the outside requests to store the communication certificate in the third party institution through the third party storing institution connection module. The third party storing institution connection module requests the third party storing institution to store the communication certificate in accordance with the existing third party storing institution connection interface module standard.

Figure 49:
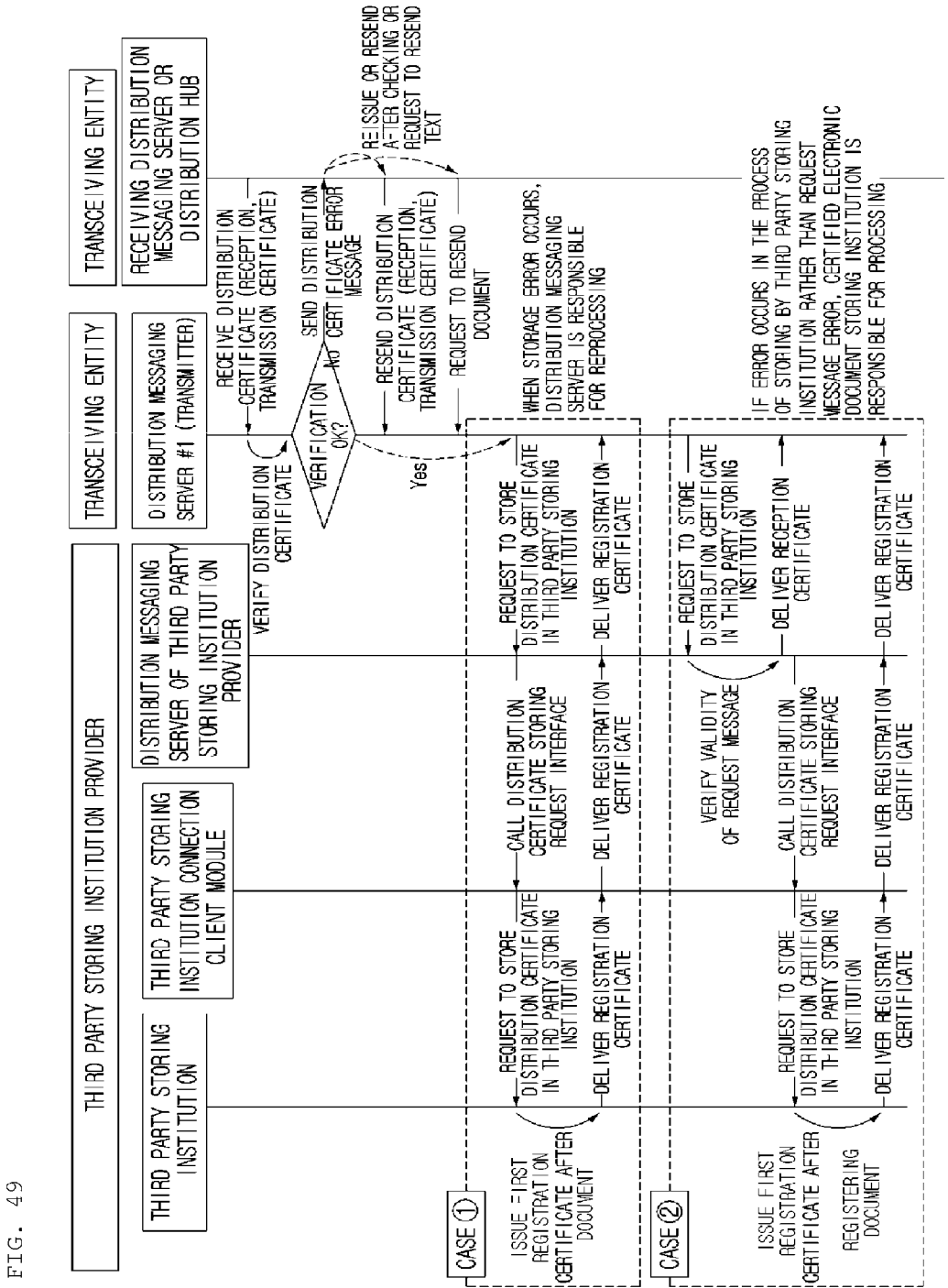

The detailed processing that the transceiving entity stores the communication certificate in the third party storing institution is illustrated in FIG. 49 and the details will be described below.

Communication certificate registrant
When the communication certificate is stored in the third party storing institution, a storing agent may be appointed by an agreement between the third party storing institution provider and the transceiving entity. The storing agency stores the communication certificate using certificate in the third party storing institution.
Type of storing request process of third party storing institution
The third party storing institution provider may provide at least one of synchronous processing and asynchronous processing and the communication messaging server is connected in accordance with a method provided by the third party storing institution provider to be connected
Case 1: A synchronous processing process (when a transmitter requests to store the communication certificate, all processes of issuing the registration certificate after completely registering the communication certificate in the third party storing institution are synchronously performed so that the communication messaging server of the transmitter receives the registration certificate as a synchronous response message. Since the response message for the request is a final registration result of the third party storing institution, if an error for the storing request occurs, reprocessing is performed by the communication messaging server of the transmitter)
Case 2: An asynchronous processing process (if a transmitter requests the third party storing institution communication messaging server to store the communication certificate, the third party storing institution communication messaging server verifies the validity of the request message first and then accepts the storing request. The third party storing institution provider needs to deliver the registration certificate which is registered in the third party storing institution to be issued in accordance with the storing request message to the communication messaging server of the transmitter which is a first storing requestor. Since the third party storing institution provider is responsible to register the registration certificate in the third party storing institution for the accepted storing request, if a storage error occurs, the reprocessing is also performed by the third party storing institution provider)

[Communication Protocol]

Hereinafter, a communication protocol which is applied to the electronic document communication system and method according to the exemplary embodiment of the present invention as described above will be described in detail.

In the description of the communication protocol which is applied to the electronic document communication system and method according to the exemplary embodiment of the present invention, "(1) message packaging", "(2) message envelope configuration", and "(3) HTTP binding" will be described in this order.

(1) Message Packaging

The message structure of the communication protocol applies the ebMS v2.0 standard and has two logical MIME Parts.

A first MIME Part includes a SOAP message and is referred to as a header container. The SOAP message is configured by a Header and a Body. A second MIME part is 0 or more additional MIME parts and is also called as a payload container. The second MIME part includes an application level attached document.

Figure 50:
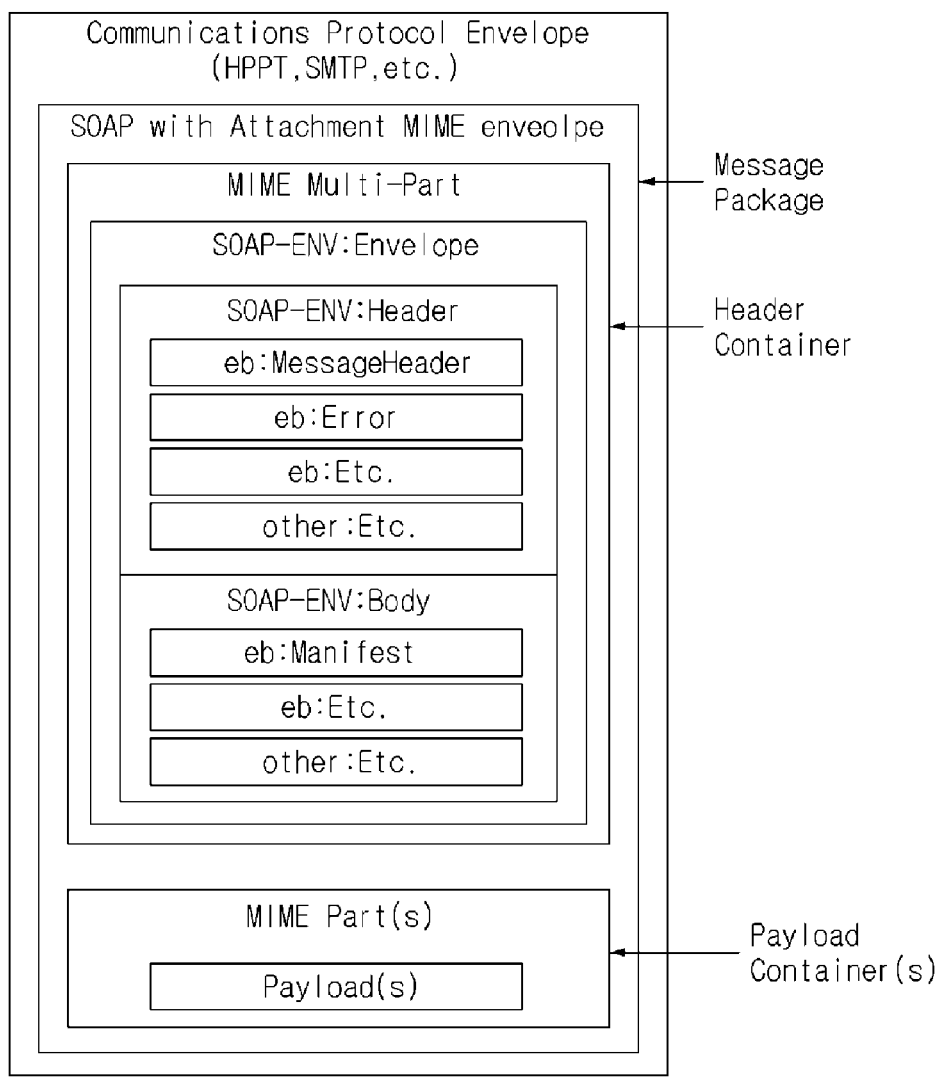
FIGS. 50 to 54 are views illustrating a communication protocol which is applied to the electronic document communication system and method according to another exemplary embodiment of the present invention.
Figure 51:
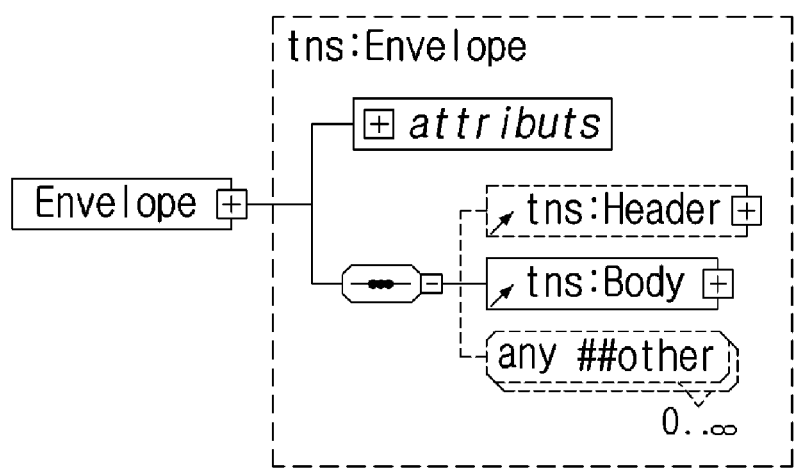

A basic structure of the communication message is illustrated in FIG. 50 and observes the standard such as Simple Object Access Protocol (SOAP) 1.1 and, SOAP Messages with Attachment.

All components of the MIME header of the communication message package observes the SOAP Messages with Attachments standard. Additionally, Content-Type MIME Header in the message package necessarily has an identical type attribute to a MIME media type of the MIME body part including the SOAP message document. The MIME type of the SOAP message according to the SOAP standard needs to have a "text/xml" value.

A root part needs to include Content-ID MIME Header having a structure based on [RFC2045] and a start parameter (optional in [RFC2387]) needs to be always present in addition to an essential parameter for a Multipart/Related media type.

Hereinafter, in the description of the communication message according to the present invention, a route Body part of the message package is defined as a Header container. The Header container includes one SOAP message as a MIME body part as defined in SOAP Messages with Attachment specification.

A MIME Content-Type header of the header container needs to have a "text/xml" value in accordance with the SOAP standard. The Content-Type header may include a "charset" attribute.

A MIME charset attribute is used to discriminate a character group which is used to create the SOAP message. Semantics of this attribute is described in "charset parameter/encoding consideration" of text/xml clearly expressed in [XMLMedia]. A list of effeceive values may be found in http://www.iana.org/.

If the MIME charset attribute include the Content-Type header, the MIME charset attribute needs to be equal to encoding declaratives of the SOAP message. Also, the MIME charset attribute does not include a value conflicting to the encoding when creating the SOAP message.

When this document is encoded, {UTF-8} is necessarily used to maximize compatibility. However, due to the processing rule defined for media types deducted from text/xml[XMLMedia], this MIME attribute does not have a default value.

In accordance with SOAP Messages with Attachments standard, 0 or more payload container may be included in the message package. If the message package includes an application payload, the message package is necessarily included in the payload container.

If the message package does not include an application payload, the payload container is not represented. The contents of the payload contains are discriminated by ebXML message Manifest element in the SOAP Body.

The ebXML message service specification does not restrict the structure and the contents of the application payload. The payload may be a simple-plain-text object or an object of complicatedly overlapping several parts. The specification for the structure and the configuration of the payload object may be varied depending on how to define the operation process or information exchange using ebXML message service.

All MIME parts of the communication message according to the present invention may include additional MIME headers based on the [RFC2045] standard. In the implementation, MIME headers which are not defined in this invention may be ignored and unidentified MIME headers should be ignored. For example, in the implementation, content-length may be included in the message. However, a receiver of a message including the content-length may ignore the content-length.

(2) Message Envelope Configuration

Contents of all extension elements need to be limited to an available name space based on the SOAP standard. The contents of all ebXML SOAP extension elements defined in this invention need to be limited to ebXML SOAP Envelope extension name space. The declarations of the name space may be included in the SOAP Envelop, Header, or Body elements or directly included in each SOAP extension element.

The SOAP Envelop declares various Namespaces in the SOAP message as a Root item of the SOAP message. The Namespaces to be declared are as following Table 150.

TABLE 150

| ITEM | Namespace URL |
|---|---|
| SOAP | http://schemas.xmlsoap.org/soap/envelope/ |
| Digital Signature | http://www.w3.org/2000/09/xmldsig# |
| xlink | http://www.w3.org/1999/xlink |
| xsi | http://www.w3.org/2001/XMLSchema-instance |

A schema structure of the message envelope is illustrated in FIG. 100.

A SOAP Header element and a SOAP Body element which are child elements of the SOAP Envelope element will be described in detail in this order as follows.

The SOAP Header element is a first child element of the SOAP Envelope element and includes extension elements such as MessageHeader, SyncReply, Signature, and ErrorList.

MessageHeader is an essential element including routing information (To/From) of a message and other context information concerning the message, SyncReply is an element indicating an essential transmission state to the next SOAP node, Signature is an element indicating digital signature based on [XMLDSIG] that signs data related with the message, and ErrorList is an element that has a list of errors reported for the previous message and used only when the error for the previous message is reported. Details of the elements of MessageHeader will be described below.

Figure 52:
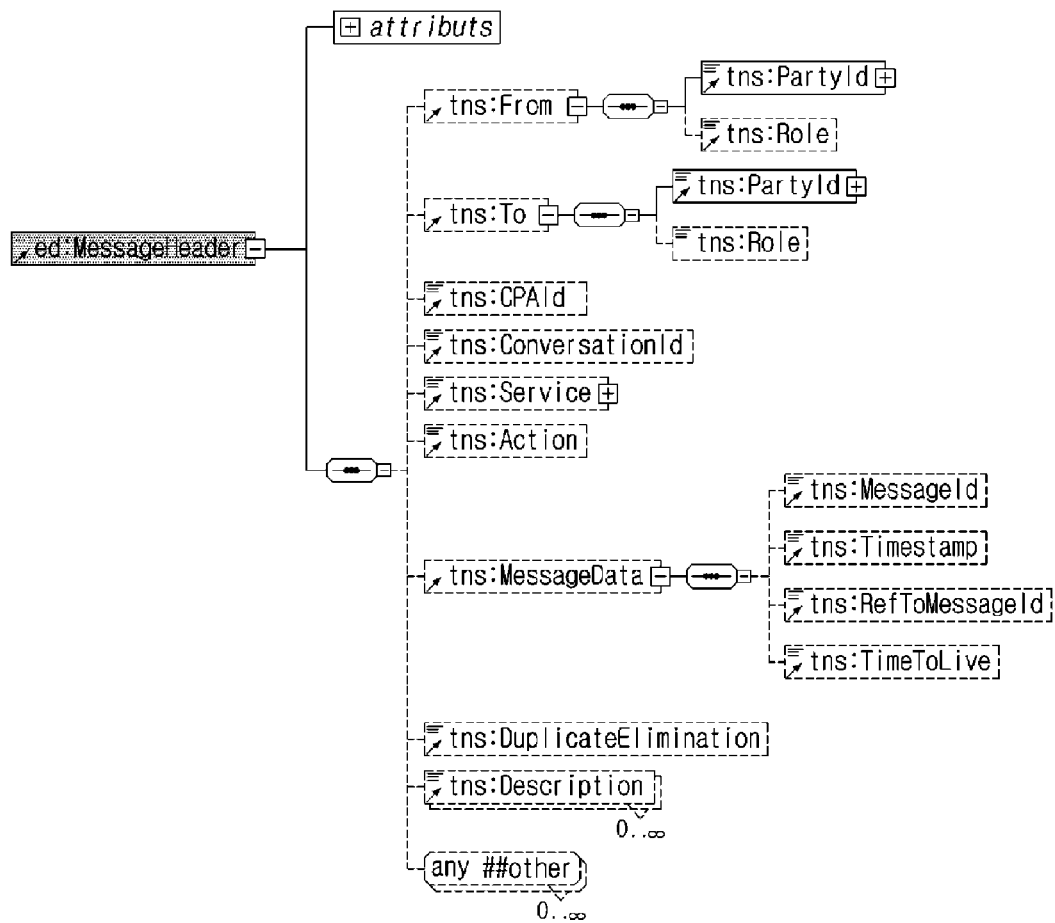

The MessageHeader element is an essential element which is expressed in all ebXML messages and expressed as a child element of the SOAP Header element. The MessageHeader element is a complex element configured by the following subelements. An element structure of the MessageHeader will be described in the following Table 152 and a schema structure of the MessageHeader is illustrated in FIG. 52.

TABLE 152

| Name of item | Description | | Number of repetition | Type | Length |
|---|---|---|---|---|---|
| From | message transmitting and transceiving entity information | | 1 ... 1 | | |
| | PartyId | code identifying transmitter | 1 ... 1 | S | 13 |
| | Role | serve as transmitter | 1 ... 1 | S | Up to 256 |
| To | message receiving and transceiving entity information | | 1 ... 1 | | |
| | PartyId | code discriminating receiver | 1 ... 1 | S | 13 |
| | Role | serves as receiver | 1 ... 1 | S | Up to 256 |
| CPAId | ID of business cooperation protocol | | 1 ... 1 | S | Up to 256 |
| ConversationId | transceiving transaction identifier | | 1 ... 1 | S | Up to 256 |
| Service | message service defined in CPA | | 1 ... 1 | S | Up to 256 |
| Action | identifier of specific task process in Service unique value in Service | | 1 ... 1 | S | Up to 256 |
| MessageData | data for discriminating message | | 1 ... 1 | | |
| | MessageId | unique identifier of one message | 1 ... 1 | S | Up to 256 |

TABLE 152-continued

| Name of item | Description | | Number of repetition | Type | Length |
|---|---|---|---|---|---|
| | Timestamp | message creating time UTC type ex> 2008-07-31T06:29:39.724Z | 1 . . . 1 | S | 24 |
| | RefToMessageId | Only response message MessageId of request message | 0 . . . 1 | S | Up to 256 |

The SyncReply means a synchronous transmission and includes an id attribute, a version attribute, a SOAP actor attribute (necessarily has "http://schemas.xmlsoap.org/soap/actor/next" value), and an SOAP mustUnderstand attribute value.

The Signature element needs to be present as a child element of the SOAP Header because the communication message needs to be digitally signed in order to cope with the dangerous element mentioned above.

A process of performing the digital signature in accordance with [XMLDSIG] standard is as follows.

First, a SignedInfo element having SignatureMethod, CanonicalizationMethod, and Reference elements and an essential payload object in the SOAP Envelope is created as defined in [XMLDSIG].

Next, after canonicalization, SignatureValue of SignedInfo is calculated based on an algorithm designated in the SignedInfo as designated in [XMLDSIG].

Next, a signature element including SignedInfo, KeyInfo (recommended), and SignatureValue elements is created as designated in [XMLDSIG].

Next, the Signature element of the SOAP Header is included in the SOAP Header element.

Algorithm information which is used at the time of digital signature as described above is as follows. The algorithm basically follows an algorithm part (6.0 Algorithms) of W3C "XML-Signature Syntax and Processing" (RFC3275). Further, in order to support a domestic unique algorithm, an algorithm defined in TTAS.IF-RFC3075 "XML-Signature Syntax and Processing" (Telecommunications Technology Association, 2004) is used.

An algorithm list used in the communication protocol according to the present invention includes digital signature NameSpace, hash (Digest), digital signature (Signature), Canonicalization, and Transform. In order to minimize ambiguity in the process of creating and verifying the digital signature at the time of transmitting/receiving a message, algorithms other than the following list are not preferably used.

As an algorithm used to reduce data, SHA1 and SHA256 may be used.

Due to characteristics of XML which can physically variously express logically identical document, the digital signature value may be different for the same document. In order to prevent the above phenomenon, the canonicalization process needs to be performed.

Even though there are various transform algorithms as an algorithm that passes through a process of processing and selecting data to be signed among the entire XML data, only three algorithms may be used among the various transform algorithms. A first algorithm is Enveloped Signature transformation since the digital signature observes the form included in the target of the signature, a second algorithm is the above-described Canonicalization, and a third algorithm is Xpath filtering that selects signature target information.

Figure 53:
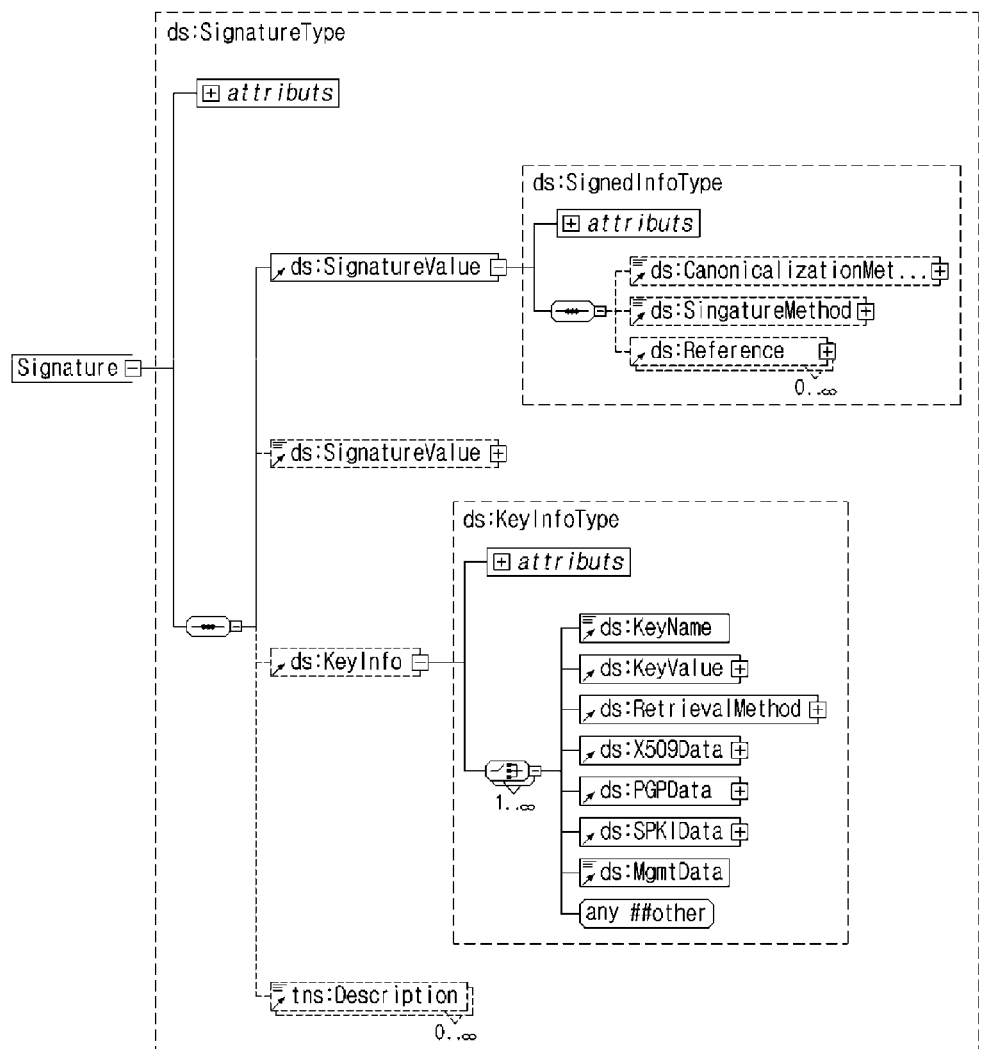

A structure of the digital signature syntax is illustrated in FIG. 53.

Figure 54:
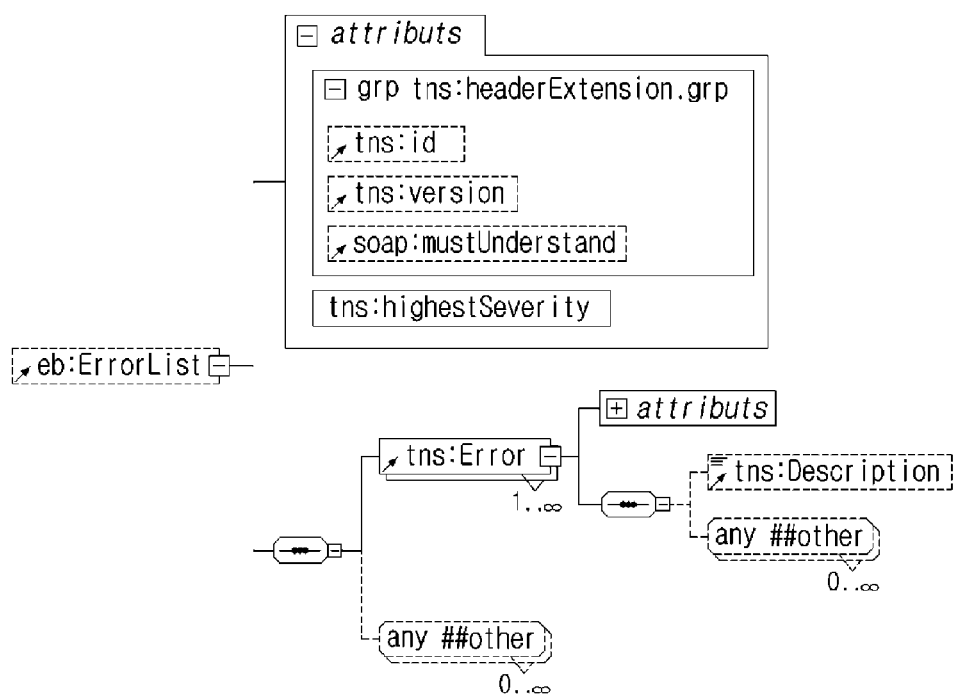

Only when an error occurs in the process of receiving the message to process the message, the ErrorList is located in the lower level of the Header. When the ErrorList element is generated, RefToMessageId is necessarily present in the MessageHeader element and RefToMessageId needs to designate the MessageID of a message in which error occurs. The ErrorList element has attributes such as an id attribute, an OAP mustUnderstand attribute, a version attribute, a highestSeverity attribute, and one or more Error elements. A structure of ErrorList is illustrated in FIG. 54. In this case, if there is no error to be reported, the ErrorList element should not be present.

The highestSeverity attribute indicates a most serious status of all Error elements. Specifically, if an Error element set the severity as Error, the highestSeverity is set to be Error. Otherwise, the highestSeverity is set as Warning.

The Error element has an id attribute, a codeContext attribute, an errorCode attribute, a severity attribute, a location attribute, and a Description attribute.

The id attribute serves to uniquely discriminate an ErrorList element in the document.

The codeContext attribute represents a name space or a schema of the errorCodes and should be an URI. A default value of this attribute is urn:oasis:names:tc:ebxml-msg:service:errors. If there is no default value in this attribute, the implementation of the specification indicates that errorCodes is used.

An errorCode attribute which is an essential attribute indicates an essence of an error of a message having an error. An effective value of the errorCode and the meaning of the code will be described below.

The severity attribute which is an essential attribute indicates a severity of the error. An effective value is Warning and Error. Warning indicates that other messages in the process of the conversation are normally created regardless of the error. Error indicates that no recovery error is present in the message and other messages are not created in the process of the conversation any more.

The location attribute indicates a message part in which an error is present. If the error is present in ebXML element and the element is "well-formed", the contents of the location attribute needs to be [Xpointer].

Contents of the Description attribute provides a descriptive explanation of the error by a language defined in a xml:lang attribute. Generally, this message is generated by software that verifies XML parser or the message. This means that the content is defined by a seller or a developer of software that creates the Error element.

If an error occurs in the process of transceiving a message based on the communication protocol, a transceiving entity that notices the error needs to report the error to the other party. Errors to be reported include a message structure error, a reliable messaging error, and a security error.

Errors related with a data communication protocol such as HTTP and Socket which belongs to a lower layer than the communication protocol defined in this invention are found and reported by a standard mechanism supported by the data communication protocol and do not use the error reporting mechanism defined in this invention.

An error code is classified by an error target and error type and details thereof will be described in the following Table 161.

TABLE 161

| Error code | Contents | Detailed description |
|---|---|---|
| ValueNotRecognized | Element contents or attribute value is not recognized | Even though the document is well formed and effective, a value of element/attribute is unrecognized and thus a value which is used by the ebXML message service is included. |
| NotSupported | Element or attribute is not supported | Even though the document is well formed and effective and the element or the attribute follows a regulation or restriction of this specification, the document is not supported by the sbXML message service that is capable of processing the message |
| Inconsistent | Element contents or attribute value is inconsistent with other element or attribute | Even though the document is well formed and effective and follows a regulation or restriction of this specification, the contents of the element and the attribute do not match with the other element or the attribute. |
| OtherXml | Other error in element contents or attribute value | Even though the document is well formed and effective, the contents of the element or the attribute value do not follow a regulation or restriction of this specification and do not belong to other error codes. Contents of Error element need to be used to indicate the essence of the problem. |
| DeliveryFailure | Message transmission failure | The received message is approximately or surely sent to a next destination. If the severity is set as Warning, a possibility that the message is delivered is low |
| TimeToLiveExpired | Expiration of time when message is present | Even though the message is received, the message is received at a time when a time restricted by TimeToLive of the MessageHeader element has elapsed. |
| SecurityFailure | Message security check failure | Verification of the signature of the party who sends a message or checking an authority or real name is failed. |
| Unknown | Unknown error | An error which does not belong to any kinds of error occurs. The content of the Error element is used to indicate the essence of the problem. |

The SOAP Body element includes an extension element such as Manifest as a second child element of the SOAP Envelope. Manifest is an element indicating data which is located in a different position such as a payload container or a web.

The Manifest element is a complex element configured by one or more Reference elements. Each of the Reference elements is included as a part of payload document(s) contained in the payload container or discriminates data related with a message which is a distant resource which is accessible by a URL. It is suggested not to load payload data in the SOAP Body. A purpose of the Manifest is to allow a specific payload related with the ebXML message to be easily and directly accessed and to determine whether the application processes the payload without parsing.

The Manifest element has one id attribute, one version attribute, and one or more Reference elements.

The Reference element is a complex element configured by subelements including 0 or more Schema elements and 0 or more Description elements. In this case, the 0 or more Schema elements are information concerning schema(s) that defines an instant document discriminated from a parent Reference element. Further, the 0 or more Description elements are description for a payload objects referenced by the parent Reference elements.

The Reference element is a simple link of [XLINK]. XLINK process or engine is not necessarily used but may be useful depending on the implementation requirements. The Reference element includes attribute contents such as id, xlink-type, xlink:href, xlink:role in addition to the contents of the above-mentioned elements. Other effective name space attributes may be present. A receiving MSH may ignore an external name space attributes other than the attributes defined above. In this case, id is XML ID for Reference element, xlink-type defines the element as a XLINK simple link and has a fixed value of "simple". xlink:href is a URI value of the referenced payload object and based on the simple link of [XLINK] specification. xlink:role discriminates the payload object or a resource that describes the purpose of the payload object. If this attribute is present, this attribute needs to have an available URI value based on the [XLINK] specification.

If reference items have schema(s) that describes the reference items (for example, XML Schema, DTD, or Database Schema), the Schema elements needs to be present as child elements of the Reference element. This is used to discriminate the schema from the version and defines the payload object which is discriminated by the parent Reference element. The Schema element has attributes such as location and version. In this case, location is an essential URI of the schema and version is a version identifier of the schema.

If the xlink:href attribute includes an URI which is content id(URI scheme "cid"), the MIME having the content-id needs to be expressed in the payload container of the message. Otherwise, an error having MimeProbem as errorCode and Error as severity needs to be transmitted to the transmitting party. If the xml:href attribute does not include an URI which is the content id(URI scheme "cid"), the URI is not interpreted and thus it is determined whether to transmit an error depending on the implementation. If it is determined to transmit the error, an error having MimeProbem as errorCode and Error as severity needs to be transmitted to the transmitting party.

The following Table 162 represents a typical Mainfest of the message having one payload MIME body part.

TABLE 162

```
<eb:Manifest eb:id="Manifest" eb:version="2.0">
  <eb:Reference eb:id="pay01" xlink:href="cidpayload-1"
  xlinkrole="http://regrep.org/gci/purchaseOrder">
    <eb:Schema
    eb:location="http://regrep.org/gci/purchaseOrder/po.xsd"
    eb:version="2.0"/>
    <eb:Description xml:lang="en-US">Purchase Order for
    100,000 widgets</eb:Description>
  </eb:Reference>
</eb:Manifest>
```

(3) HTTP Binding

An HTTP binding example in a method of transmitting a message through an HTTP will be described in the following Table 163.

TABLE 163

```
POST /servlet/ebXMLhander HTTP/1.1
Host: www.example2.com
SOAPAction: "ebXML"
Content-type multipart/related; boundary="BoundarY";
type="text/xml";
Start="<ebxhmheader111@example.com>"
--BoundarY
Content-ID: <ebxhmheader111@example.com>
Content-Type: text/xml
<?xml version="1.0" encoding="UTF-8"?>
<SOAP:Envelope xmlns:xlink=http://www.w3.org/1999/xlink
    xmlns:xsi="http://www.w3.org/2001/XMLSchema-instance"
    xmlns:SOAP="http://schemas.xmlsoap.org/soap/envelope/"
    xmlns:eb="http://www.oasis-open.org/committees/ebxml-
msg/schema/msg-header-2_0.xsd"
xsi:schemaLocation="http://schemas.xmlsoap.org/soap/envelope/
    http://www.oasis-open.org/committees/ebxml-msg/schema/envelope.xsd
    http://www.oasis-open.org/committees/ebxml-msg/schema/msg-
header-2_0.xsd
    http://www.oasis-open.org/committees/ebxml-msg/schema/msg-header-
2_0.xsd">
<SOAP:Header>
    <eb:MessageHeader SOAP:mustUnderstand="1" eb:version="2.0">
        <eb:From>
            <eb:PartyId>urn:duns:123456789</eb:PartyId>
        </eb:From>
        <eb:To>
            <eb:PartyId>urn:duns:912345678</eb:PartyId>
        </eb:To>
        <eb:CPAId>20001209-133003-28572</eb:CPAId>
        <eb:ConversationId>20001209-133003-
28572</eb:ConversationId>
<eb:Service>urn:services:SupplierOrderProcessing</eb:Service>
        <eb:Action>NewOrder<eb:Action>
        <eb:MessageData>
            <eb:MessageId>20001209-133003-
28572@example.com</eb:MessageId>
            <eb:Timestamp>2001-02-15T11:12:12</eb:Timestamp>
        </eb:MessageData>
    </eb:MessageHeader>
</SOAP:Header>
<SOAP:Body>
    <eb:Manifast eb:version="2.0">
        <eb:Reference xlink:href="cid:ebxmlpayload111@example.com"
            xlink:role="XLinkRole" xlink:type="simple">
            <eb:Description xml:lang="en-US">Purchase Order
1</eb:Description>
        </eb:Reference>
    </eb:Manifest>
</SOAP:Body>
</SOAP:Envelope>
--BoundarY
Content-ID: <ebxmlpayload111@example.com>
Content-Type: text/xml
<?xml version="1.0" encoding="UTF-8"?>
<purchase_order>
    <po_number>1</po_number>
    <part_number>123</part_number>
    <price currency="USD">500.00</price>
</purchase_order>
--BoundarY--
```

In this invention, in order to return the response code of the HTTP level, an HTTP response code defined in [RFC2616] needs to be used. Main response codes will be described in the following Table 164.

TABLE 164

| State code | Related message | Meaning |
|---|---|---|
| 200 | OK | Request is successfully performed |
| 400 | Bad Request | Request has grammatical problem |
| 401 | Unauthorized | Client tries to access to a page that requires an approval without having proper approval |
| 404 | Not Found | No content is found in this address |
| 500 | Internal Server Error | Request is not normally processed due to error in server |
| 503 | Service Unavailable | Server currently cannot process requests due to excessive requests which exceeds available limit |

[Electronic Document Form Register]

Hereinafter, an electronic document form register of the electronic document communication system according to the exemplary embodiment of the present invention as described above will be described in detail.

The electronic document form register is a system that allows a transceiving entity to create, register, and manage a form required to communicate a document in the electronic document communication.

The electronic document form register includes a form creating unit, a form registering unit, and a form managing unit, and a standard connection module.

The form creating unit includes a PDF transforming module and a PDF form designer. The PDF transforming module provides a function of transforming a general form to a PDF (for example, create a standard PDF-A). The PDF form designer provides a function of creating an writable form PDF and a document security function such as two-dimensional barcode and copy prevention mark.

The form registering unit provides a function of allowing a user to register a form (for example, a general form such as HWP or MS-Word).

The form managing unit provides a function of allowing a form manager to register and manage a form and provides a registration function for every category and a record management function for every version. Further, a setting function to control a viewing period for every form, the number of viewing, and the number of printing is provided.

The standard connection module provides a function of connecting with the communication client application. Further, a form list searching function and a file downloading function are also provided.

Figure 55:
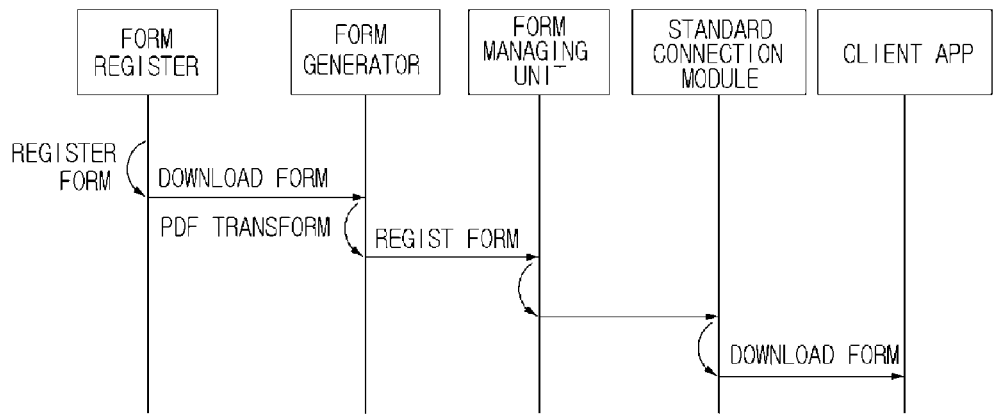
FIGS. 55 and 56 are views illustrating an electronic document form register according to another exemplary embodiment of the present invention.
Figure 56:
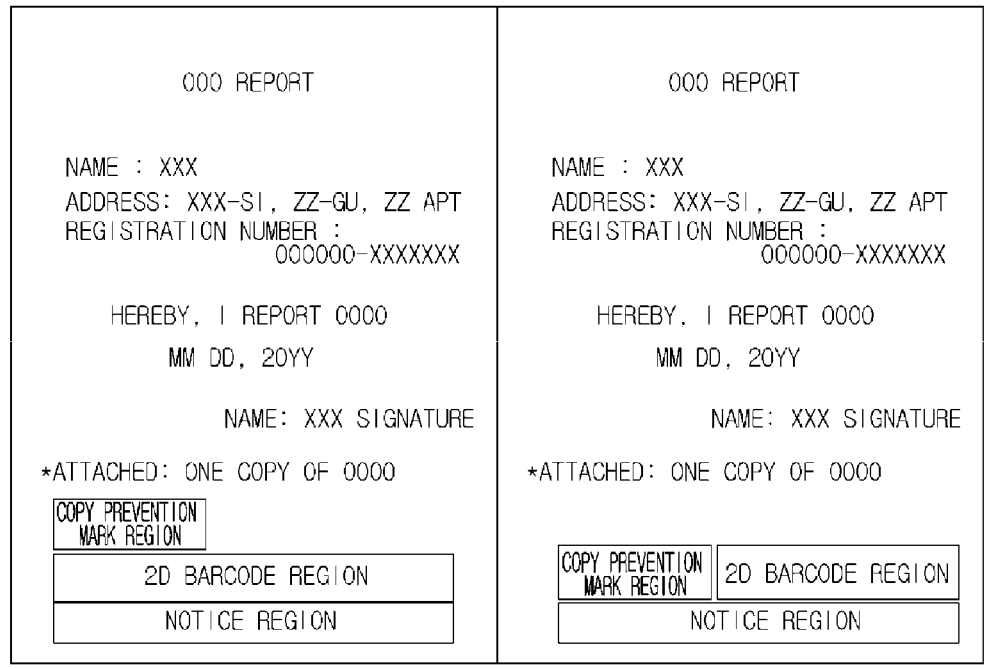

A form registering process of the electronic document form register according to the present invention is illustrated in FIG. 55.

A standard electronic document is created as a FormPDF using a Form designer and essential requirements will be described in the following Table 165.

TABLE 165

| Classification | Description |
|---|---|
| Data input field | Data input field for inputting contents |
| Two-dimensional barcode | Original document and digital signature data of original document are inserted in order to certificate an original of a printed document |
| Copy prevention mark | Function for preventing the printed document from being copied. When the document is printed, an original mark disappears using a designated pattern |

TABLE 165-continued

| Classification | Description |
| --- | --- |
| Information sentence | Expiration date of the document and verification method are included |

In a structure of the standard electronic document, a space of approximately 5 cm from a lower edge of the document is required. A size of the barcode may be varied depending on the amount of data and a size of the copy prevention mark is 3>1.3 and appropriately disposed in accordance with a shape of the form.

The standard connection module (standard interface) allows a user to search and download the form and create a form in the communication client application and is provided to a Web US (user interface) to be included in the communication client application. The standard connection module provides a function of searching for every category, a form list, and file downloading.

[Electronic Document Packaging]

Hereinafter, the electronic document packaging which is applied to the electronic document communication system and method according to the exemplary embodiment of the present invention as described above will be described in detail.

The electronic document packaging is a messaging system standard required to allow the transceiving entity to communicate a document in the electronic document communication.

The electronic document packaging is configured by a standard electronic document and an attached document and configured by metadata for the standard electronic document. The standard electronic document is created based on PDF-A and the metadata is configured by information such as a document security function. The attached document is not transformed into a PDF but packaged into an original as it is.

The standard electronic document is digitally signed by the certificate of the user and the electronic document package is digitally signed after the packaging to be included in the package.

Figure 57:
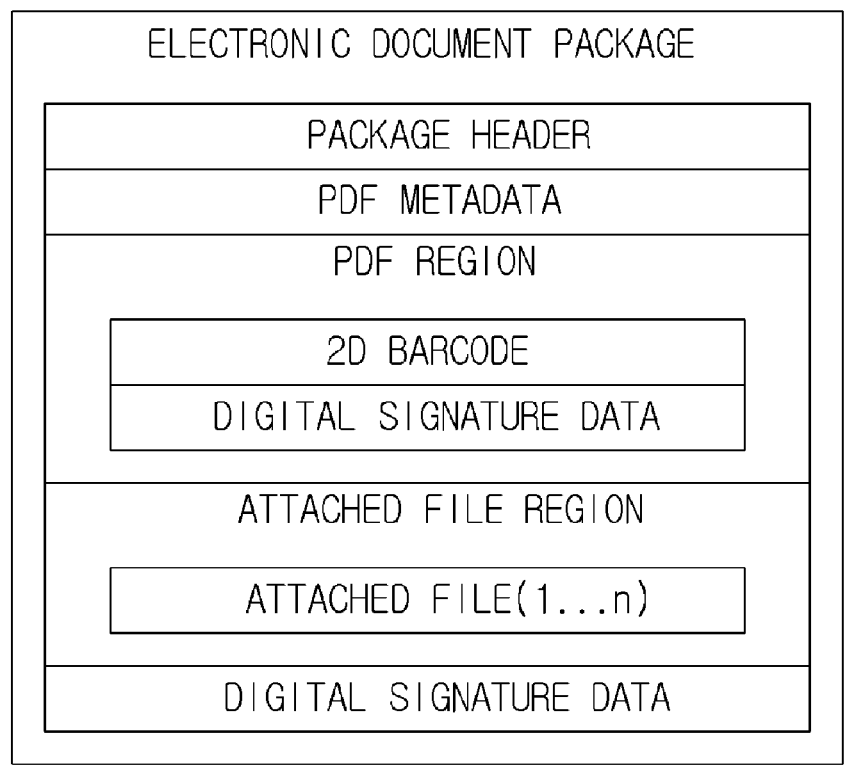
FIG. 57 is a view illustrating electronic document packaging which is applied to the electronic document communication system and method according to another exemplary embodiment of the present invention.

FIG. 57 illustrates an electronic document package structure. Referring to FIG. 57, the electronic document package structure according to the present invention includes a package header, metadata, a standard electronic document, an attached document, and digital signature data. Detailed components those of will be described in the following Tables 27 to 31.

The package header includes entire package structure information. The metadata includes information of the document security function of the standard electronic document and also includes information such as the number of document reading, the number of printing, and two-dimensional barcode information. The standard electronic document is configured in a standard PDF-A type and two-dimensional barcode data is included in an image region in a PDF file, and the digital signature data is included in a standard PDF Signed Data region. The attached document is not a standard electronic document, but atypical document. Therefore, the attached document is excluded from a target to which the document security function is applied. The digital signature data digitally signs the packaged data using the certificate of the user to be included in the packaging.

TABLE 166

| Number | Component | Remarks |
| --- | --- | --- |
| 1 | Entire file size | |
| 2 | Size of Metadata | |
| 3 | Size of Standard electronic document | |
| 4 | Number of attached file | |
| 5 | Size of attached file | |

TABLE 167

| Number | Component | Remarks |
| --- | --- | --- |
| 1 | Number of reading | |
| 2 | Number of printing | |
| 3 | Storing function | |
| 4 | Text extracting function | |
| 5 | Temporary storing/importing function | |
| 6 | Type of document | |
| 7 | 2D barcode size (horizontal) | |

TABLE 168

| Number | Component | Remarks |
| --- | --- | --- |
| 1 | PDF file | |

TABLE 169

| Number | Component | Remarks |
| --- | --- | --- |
| 1 | Attached file | |

TABLE 170

| Number | Component | Remarks |
| --- | --- | --- |
| 1 | Digital signature data | |

A method of verifying the electronic document packaging includes (1) a method of verifying electronic document packaging digital signature, (2) a method of verifying a standard electronic document, and (3) a method of verifying a printed electronic document, which will be described below.

(1) Method of Verifying Electronic Document Packaging Digital Signature

The client APP verifies the digital signature when processing the digital signature packaging. Only when the verification is successful, the client APP delivers the standard electronic document to an electronic document viewer.

Further, the client APP supports a manual digital signature verifying function to verify the digital signature when a dispute occurs.

(2) Method of Verifying Standard Electronic Document

The electronic document viewer verifies the digital signature when reading the standard electronic document. Only when the digital signature verification is successful, the file is read in the electronic document viewer.

(3) Method of Verifying Printed Electronic Document

Using additionally provided a verification program and a flat panel scanner, the digital signature data in the two-dimensional barcode is verified and contents of the original document and the contents of the printed document are compared by naked eyes.

In the meantime, since the copy prevention mark needs to be generated in accordance with the printer pattern of a user which finally receives the electronic document, the copy prevention mark is not included in the packaging.

[Communication Client Application]

Hereinafter, the communication client application of the electronic document communication system according to the exemplary embodiment of the present invention as described above will be described in detail.

In order to allow the corporation or individuals to transmit/receive a document (information) based on the certified electronic mailing address, an application that provides a user interface (hereinafter, abbreviated as UI) that supports the transmission/reception is required. As a messaging engine that sends/receives a message, if the communication messaging server system serves as a mail server as compared with an email, the communication client application (hereinafter, abbreviated as APP) serves as a user application likes a mail client which is provided to allow the user to send/receive an email in connection with the mail server.

Figure 58:
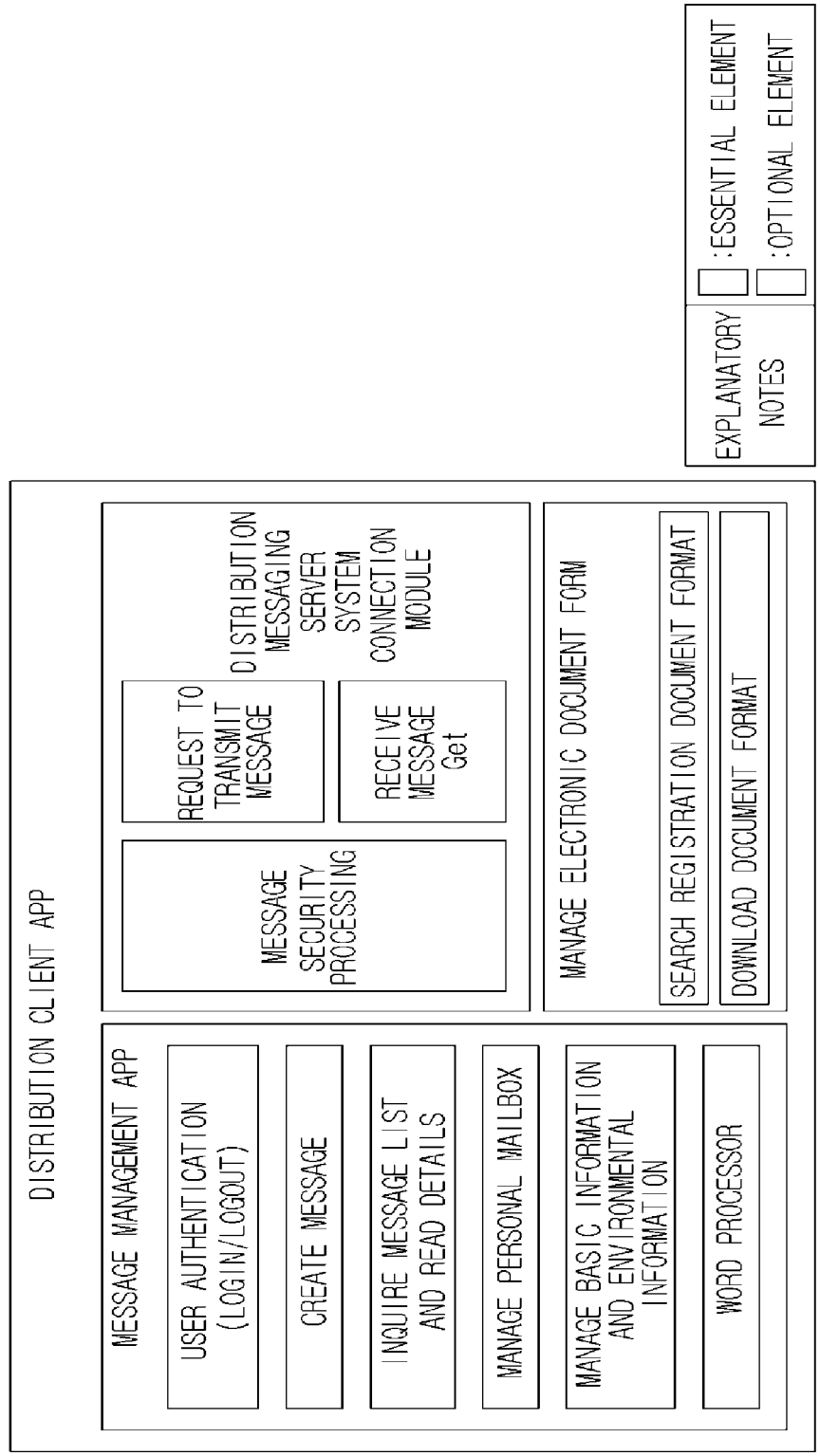
FIGS. 58 to 64 are views illustrating a communication client application according to another exemplary embodiment of the present invention. Especially.

FIG. 58 illustrates a structure diagram of the communication client APP. Referring to FIG. 58, as an application under a UI environment for a general user who wants to exchange a document using the communication messaging server system, the communication client APP basically includes "(1) user authentication", "(2) message creation", "(3) message list inquiring and detailed contents reading function", and "(4) communication messaging server system connection". In addition to the above basic functions, the client APP may provide a function of "(5) managing basic information and environmental information", "(6) managing a message folder", "(7) managing a document form, and "(8) a word processor" for transceiving a message and managing an application, which may be selectively provided by an application developer.

(1) User Authentication

Before the communication client APP is connected with the communication messaging server system, the communication messaging server system checks a user account and then receives login session information.

A user authentication method of the communication client APP includes user authentication based on a certificate (both public and private are allowed) and user authentication based on ID/PW.

(2) Message Creating Function

The communication client APP needs to provide a user interface that is capable of creating a new message and delivers the created document to the receiving party in connection with the communication messaging server system.

The message creating function is provided to input items other than a value which is set in advance by the environmental information among required basic information when a transmitting interface of the communication messaging server system is called to transmit a message.

(3) Message List Inquiring Function and Detailed Contents Reading Function

The messaging server system manages the message so as to be divided into a transmission message and a reception message. The communication client APP necessarily provides a function of inquiring a list of the messages corresponding to the user account and a function of reading all detailed information of the message including the attached documents when the user wants to view the details of the message in connection with the communication messaging server system based on the logged-in user account.

(4) Communication Messaging Server System Connection

The most important function of the communication client APP is a function of transceiving a message in connection with the communication messaging server system. The communication client APP transmits and receives the message based on the logged-in account through the message transmitting function and the received message reading interface provided by the communication messaging server system.

(5) Basic Information and Environmental Information Management

The client APP provides a function of managing environmental information basically required when transmitting a message. Since the communication client APP is not an independently existing application, the communication client may participate in the communication based infra in connection with the communication messaging server system. Therefore, communication messaging server system connection information (communication messaging server system address information) which is required to be basically connected with the communication messaging server system is basically set and managed.

Additionally, management of register server information for the connection with the document form register or management of additional information for system environment of the communication client APP may be defined to be provided in accordance with the development range of the application.

(6) Message Folder Management

The message managed by the communication messaging server system is basically divided into a transmission message and a reception message to be managed. The transmission and reception messages manage status information in accordance with the processing status. As the status information of each message, the transmission message manages the statuses such as before transmission, transmission completed, transmission failure, and reception completed by a person in charge. The reception message manages the statuses such as the verification error, before reception confirmation, and reading confirmation. The communication client APP manages the message folder based on the basic status information provided by the communication messaging server system to provide the message folder to the user.

The communication client APP divides the transmission message and the reception message based on the transceiving folder to basically notify the status of the messages to the user in accordance with the status information provided by the communication messaging server system. However, additionally, a deleted message mailbox such as a outbox or a trashcan is provided or a function of allowing a user to directly define and manage a folder is selectively provided by the application developer. Therefore, the description thereof will be omitted.

(7) Document Form Managing Function

The communication messaging server system does not limit a format of a document which is attached to the message to be transmitted. Therefore, the transceiving target document includes any kinds of files such as a general text file, an office file, an XML document, or a multimedia file. However, for the convenience for users to utilize the communication client APP in the task, a function of supporting to create a document based on the form may be additionally provided to the basic document form. The communication client APP may provide a function of searching and downloading a document form provided by the document form register through a standard interface of the register and then creating a document based on the downloaded document form to be attached to the message.

The communication client APP manages the document form in a connection with the document form register provided by the electronic document communication hub or independently builds a document form management system to manage the document in connection with this system. A method of searching and downloading the form in connection with the document form register provided by the electronic document communication hub will be described with reference to the description of [Electronic document form register] as described above.

(8) Word Processor

A word processor is a creating unit that allows the communication client APP to support the users to create a document based on a downloaded form through the document form managing function. The word processor is designed with reference to [electronic document form register] as described above when the document form register provided by the electronic document communication hub is used. If the document form management system is autonomously built, the word processor is designed in accordance with the form management system.

A basic process of the communication client APP includes "(1) a document transmitting process" and "(2) a document receiving process". As an additional process, "(3) a electronic document form downloading process" is provided. The communication client AP is connected with the communication server system serving as a server in order to transmit and receive a document. Further, the communication client APP is connected with the electronic document form register server in order to register a standard document form.

(1) Document Transmitting Process

Figure 59:
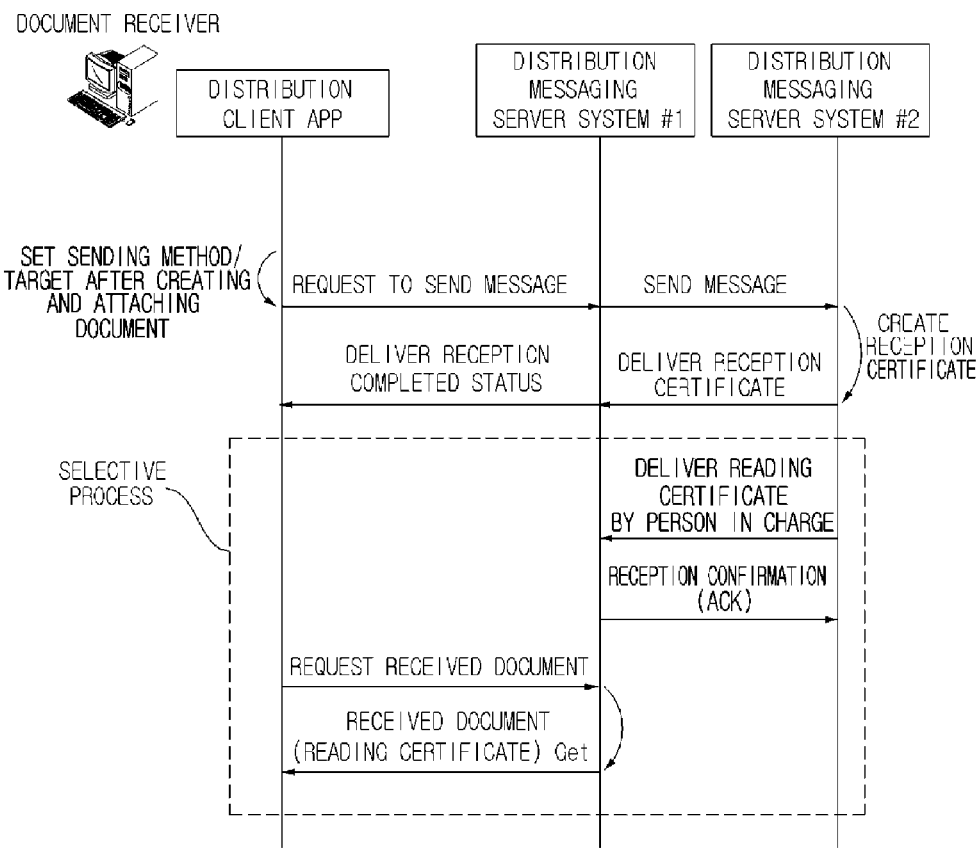

A step in which the communication client APP transmits an electronic document to other "transceiving entity" through the communication messaging server system connected with the communication client APP is illustrated in FIG. 59 and a processing procedure is as follows.

First, the communication client APP creates a message to be transmitted to the receiver. In this case, a document that is created in advance by the transmitter or a document that is created by the word processor provided by the communication client APP is attached and a receiver is designated and then a message is created.

Next, after inputting receiver address information, the transmitting interface of the communication messaging server system is called to request to transmit the message.

Next, the communication messaging server system of the transmitter transmits the message to the receiver in accordance with the transmitting process and then receives the response message (reception certificate or reception error) for the reception from the receiver.

Next, the communication messaging server system of the transmitter receives the response message for the reception and then delivers the response message to the communication client APP as a response for the transmission.

Here, the first to fourth steps are essential and the second to fourth steps are synchronously performed.

Next, if the communication messaging server system of the transmitter receives a message including a reading certificate that confirms the reading of a person in charge of reception from the receiver, the transmitting communication messaging server system returns the response message for reception and stores the received message in the mailbox of the user.

Next, the communication client APP of a first transmitter requests the connected communication messaging server system the received document.

Next, the communication messaging server system of the transmitter delivers the list of received documents stored in the mailbox to the communication client APP of a user who requests the received document.

Here, the fifth to seventh steps are selective and optional procedures which are performed only when the reading confirmation of a person in charge of reception is requested at the time of transmitting the first message.

(2) Document Receiving Process

Figure 60:
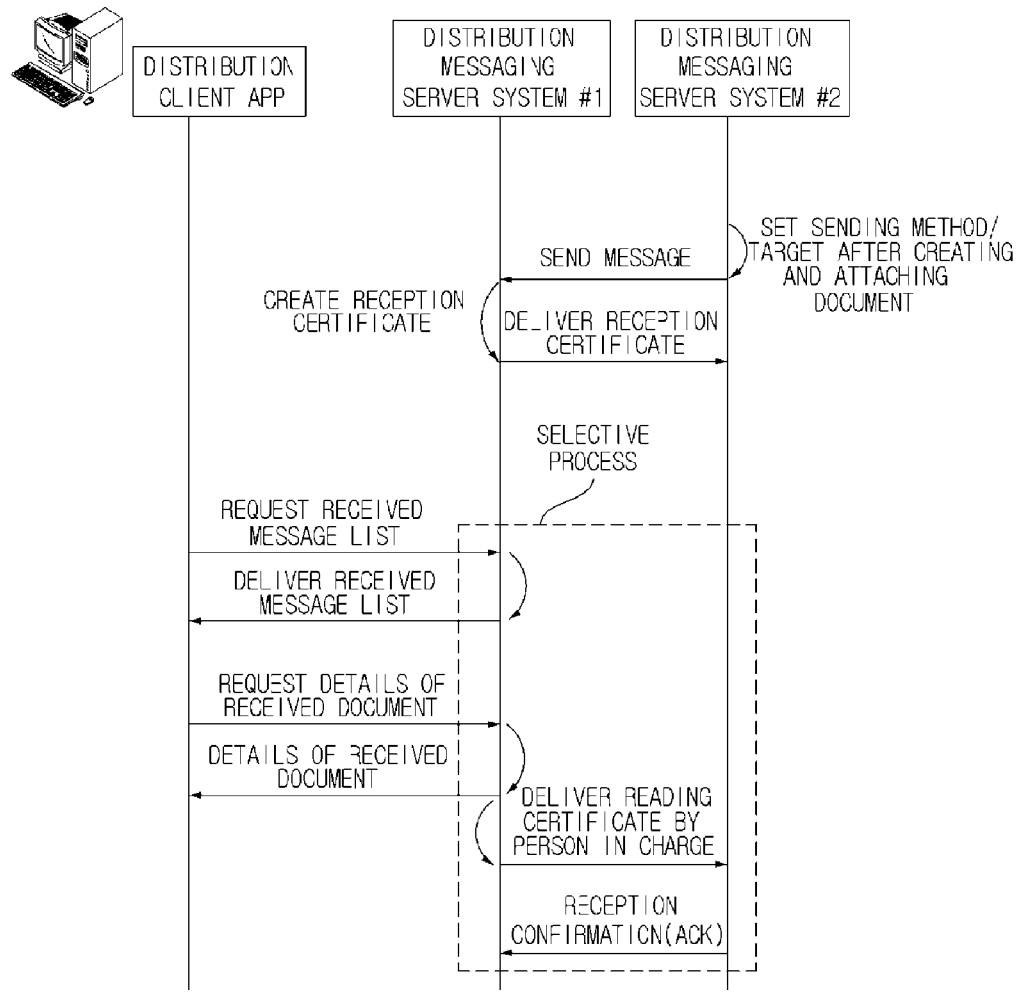

A process in which the communication client APP receives an electronic document from other "transceiving entity" is illustrated in FIG. 60 and the processing procedure thereof will be described as follows.

First, if the message is received, the communication messaging server system of the receiver returns the reception response message for the received message to the receiver and stores the received message in the mailbox of the user.

Next, the communication client APP of the receiver logs in the connected communication messaging server system to request the received document.

Next, the communication messaging server system of the receiver delivers the list of the received documents stored in the mailbox of a user who requests the received document Here, the second and third steps are synchronous.

Next, if the receiver requests to read detailed information of the message from the list of the received messages, the communication client APP delivers transmit the detailed information including the attached document of the corresponding message to the communication messaging server system.

Next, if an initial transmitter requests the reading confirmation of a person in charge of reception, the communication messaging server system of the receiver transmits a message including the reading certificate to the transmitter of the corresponding message at the time when the user request the detailed information for the received document.

Next, the communication messaging server system of the receiver receives the reception response message for the reading confirmation message (reading certificate) of a person in charge transmitted in the fifth step.

(3) Electronic Document Form Downloading Process

Figure 61:
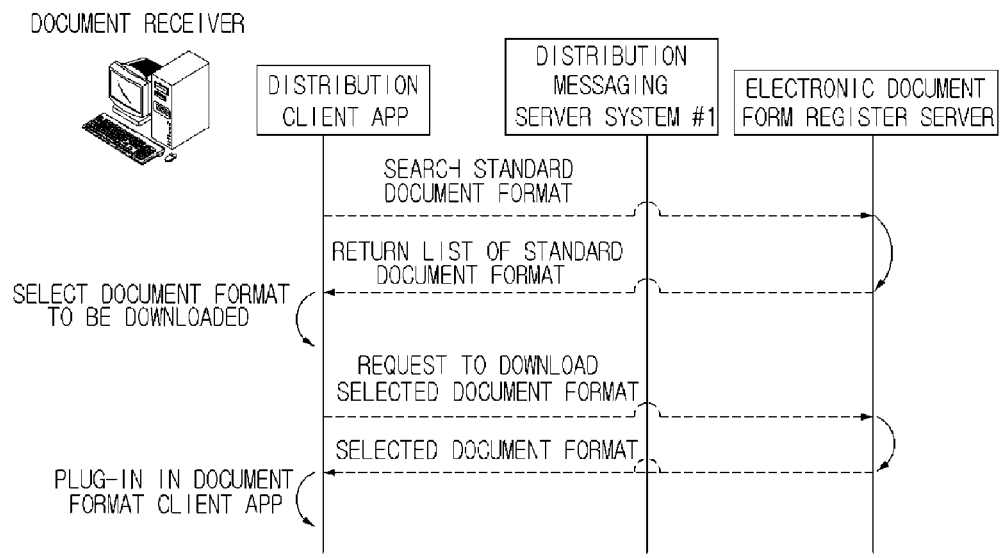

A process in which the communication client APP downloads the electronic document form is illustrated in FIG. 61 and the processing procedure thereof will be described as follows.

First, the communication client APP is directly connected with the electronic document form register server to request searching a document form. In this case, the connection is performed based on the standard connection interface provided by the electronic document form register server.

Next, the electronic document form register server returns information on the searched document form as a result.

Here, the first and second steps are synchronous.

Next, the communication client APP shows the searched form list to the user to select a form.

Next, the communication client APP requests the electronic document form register server to download the selected electronic document form.

Next, the electronic document form register server returns the requested form to the communication client APP.

Next, the communication client APP registers the downloaded electronic document form to be plugged-in so as to be used in the word processor.

A type of interfaces provided by the communication messaging server system for the above-mentioned communication client APP includes a user authentication (login), logout, message transmission request, received message Get, detailed message information request, and message deletion.

Connection methods (1) to (5) of the communication client APP and the communication messaging server system will be described as follows.

(1) Connection Protocol of Communication Messaging Server System

Figure 62:
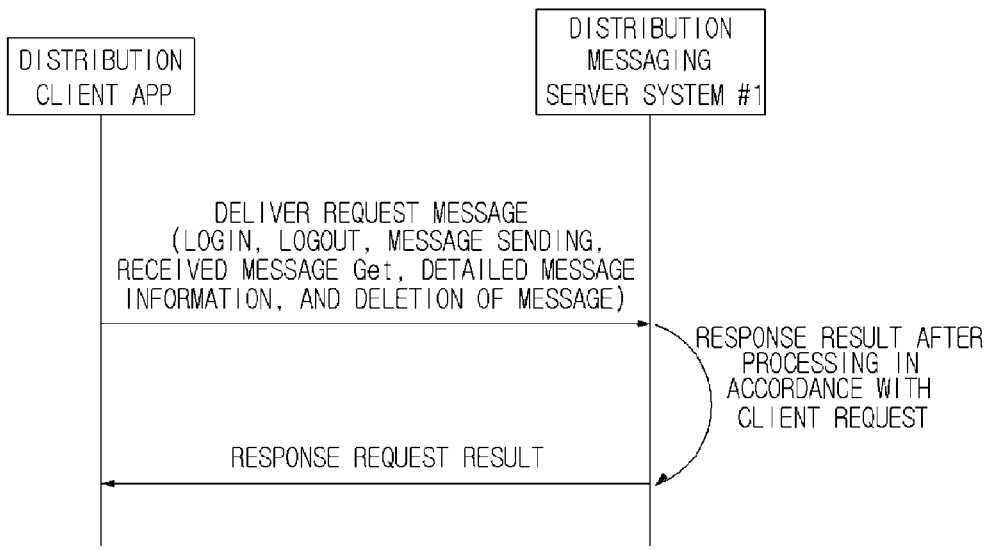

A connection interface which is provided by the communication messaging server system for the communication client APP is based on the same protocol as the transceiving protocol of the communication messaging server system. In this case, the communication client APP and the communication messaging server system provide one-way synchronous communication as illustrated in FIG. 62, which is different from the transmission/reception between the communication messaging server systems and the digital signature authentication or user authentication method for the message is used therebetween.

Figure 64:
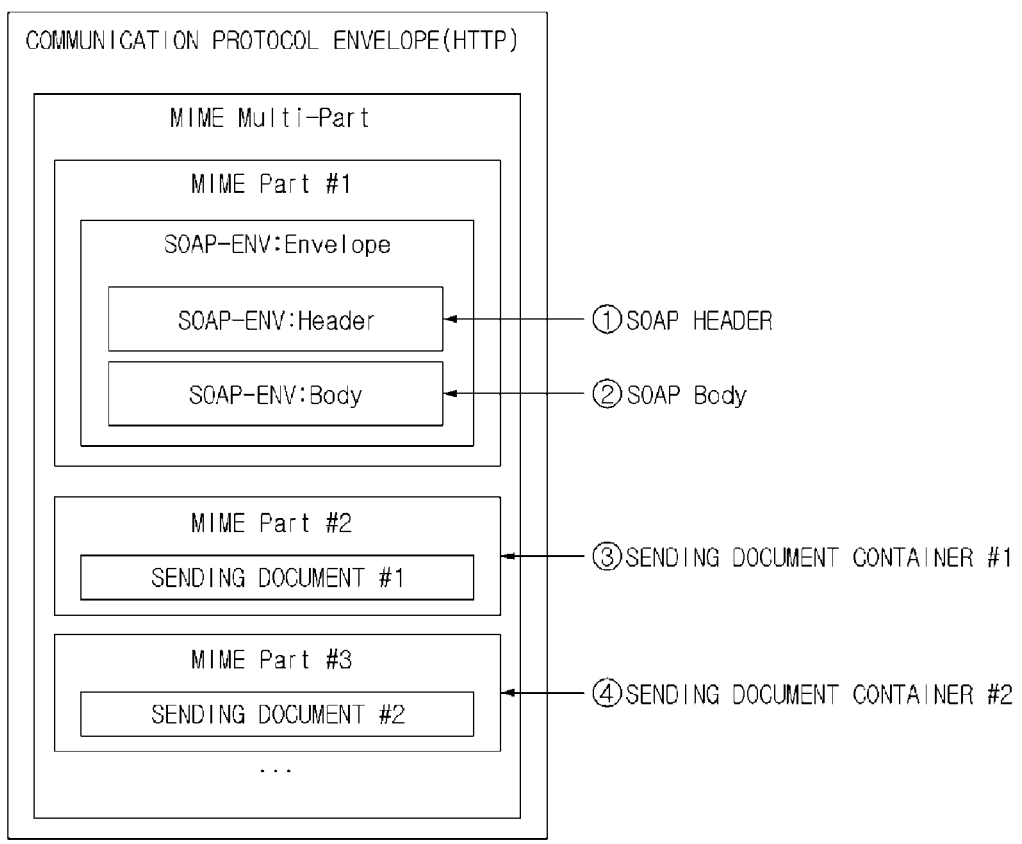

The transmission message uses the message structure of the communication messaging server system as it is and the user information and request and response messages are configured by the structure illustrated in FIG. 64. Detailed description thereof is as follows.

SOAP Header: the communication client APP and the communication messaging server system may serve as a transmitter or a receiver in accordance with the task type to be configured in accordance with [communication protocol] as described above. SOAP Header includes messageHeader and Signature information.

SOAP Body: includes Manifest element information and user login information defined in the above-described [communication protocol].

Transmission document container #1: includes message transmission request, received message Get, and a body document (contents) in case of receiving the detailed information of the message.

Transmission document container #2: includes message transmission request and an attached document in case of receiving the detailed information of the message from #2 sequentially.

A structure of SOAP Header will be described in the following Table 117 and a structure of MessageHeader will be described in the following Table 172, a structure of SOAP Body will be described in the following Table 173, and a structure of body message will be described in the following Table 174.

TABLE 171

| Name of item | Description | Number of repetition | Type | Length |
|---|---|---|---|---|
| MessageHeader | See following MessageHeader structure | 1 . . . 1 | | |
| SyncReply | Synchronous transmission See "communication protocol standard" | 1 . . . 1 | | |
| Signature | Digital signature element See "communication protocol standard | 1 . . . 1 | | |

TABLE 172

| Name of item | Description | | Number of repetition | Type | Length |
|---|---|---|---|---|---|
| From | message transmitter information | | 1 . . . 1 | | |
| | PartyId | Fixed value: "clientapp" | 1 . . . 1 | S | 9 |
| | Role | serve as transmitter fixed value at the time of usage: 'sender' | 0 . . . 1 | S | 6 |
| To | message receiver information | | 1 . . . 1 | | |
| | PartyId | fixed value: "openapt" | 1 . . . 1 | S | 7 |
| | Role | serves as receiver fixed value at the time of usage 'Receiver' | 0 . . . 1 | S | 8 |
| CPAId | ID of business cooperation protocol necessarily use clientapp-openapl value | | 1 . . . 1 | S | 17 |
| ConversationId | transceiving transaction identifier set arbitrary value with length of 256 or shorter using English ex> 2e2c2bl-4603-4919-9bef-ee435bc56cb3 | | 1 . . . 1 | S | Up to 256 |
| Service | message service defined in CPA necessarily use urn:ebxml:nipa:ClientToOa value | | 1 . . . 1 | S | 25 |
| Action | identifier of specific task process in Service document transmitting request: RequestSend response for document transmitting request: RespondSend document receiving request: RequestReceive response for document receiving request: RespondReceive receiving request for detailed | | 1 . . . 1 | S | 11 |

TABLE 172-continued

| Name of item | Description | | Number of repetition | Type | Length |
|---|---|---|---|---|---|
| | information of document: RequestDetailInfo response for receiving request for detailed information of document: RespondDetailInfo document deleting request: RequestDelete response for document deleting request: RespondDelete | | | | |
| MessageData | data for discriminating message | | 1...1 | | |
| | MessageId | unique identifier of one message set arbitrary value with length of 256 or shorter using English ex> 42e2c2bl-4603-4919-9bef-ee435bc56cb3 | 1...1 | S | 256 |
| | Timestamp | message creating time UTC type ex> 2008-07-31T06:29:39.724z | 1...1 | S | 24 |
| | RefToMessageId | Only response message MessageId of request message | 0...1 | S | Up to 256 |

TABLE 173

| Name of item | Description | | Number of repetition | Type | Length |
|---|---|---|---|---|---|
| Manifest | payload information existed only when there is an attached document (message transmission, received message Get, detailed message information reception) | | 0...1 | | |
| | Reference | necessarily existed if there is Manifest repeats as much as the number of payloads see "communication protocol standard" | 0...∞ | | |
| UserInfo | user information necessarily existed only in case of message transmission request, received message Get, and detailed message information reception | | 0...1 | | |
| | Id | necessarily existed when there is user information user ID registered in the communication messaging server | 0...1 | S | 20 |
| | Password | necessarily existed when there is user information password information set at the time of registering a user in the messaging server set after being encrypted with certificate of the communication messaging server | 0...1 | S | 15 |

TABLE 174

| Name of item | Description | Number of repetition | Type | Length |
|---|---|---|---|---|
| Content | detailed information of document in case of document Get, existed as many as the number of document lists | 1...∞ | S | 200 |
| Title | title of document existed only in document transmission request, document Get response, detailed document information response | 0...1 | S | 200 |

TABLE 174-continued

| Name of item | Description | Number of repetition | Type | Length |
|---|---|---|---|---|
| Text | user comment existed only in document transmission request, document Get response, detailed document information response | 0 ... 1 | S | 5000 |
| Sender | transmitter's reliable address existed only in document transmission request, document Get response, detailed document information response | 0 ... 1 | S | 256 |
| Receiver | receiver's reliable address existed only in document transmission request, document Get response, detailed document information response | 0 ... 1 | S | 256 |
| GetMessageID | detailed information request MessageId existed only in detailed information request | 0 ... 1 | S | 256 |
| DeleteMessageId | delete request MessageId existed only in deletion request | 0 ... 1 | S | 256 |

(2) Message Transmission Request

Basic information which is delivered by the communication client APP to the communication messaging server system at the time of transmitting a message will be described below. The transmission document which is stored in the mailbox after completely being transmitted has four steps of status information as described in the following Table 175.

TABLE 175

| Status | Description |
|---|---|
| In the process of transmitting | a state when no response has been received from the receiver after transmitting a document |
| Transmission completed | a state when a response message (reception certificate) is received from the receiver for reception confirmation |
| Transmission failed | when SOAP Fault message is returned due to an error occurring in the receiving communication messaging server system or a network error occurs in the transceiving process |
| Accepting completed | whether the reception user reads the details (including an attached file) of the received document |

(3) Received Message Get

An action of the communication client APP that reads the received message through a logged-in user account in connection with the communication messaging server system is separated from an action of deleting a message in the communication messaging server system. The following two steps of status information are managed in accordance with the processes of the message reception.

Whether the reception user reads the received document list in the mailbox

Whether the reception user reads the details of the received document (4) Detailed Message Information Request If the user wants to read the details based on the received document list, the communication client APP requests the detailed information of the message of the communication messaging server system. The communication messaging server system that receives the request of the detailed information delivers contents of all messages such as detailed attribute information of the message and the attached document of the message to the communication client APP as a response message.

(5) Message Deletion

If the user requests the deletion, the communication client APP delivers the deleting request of the document to the communication messaging server system and notifies the result to the user. When the user deletes a document, whether to give a temporary deleting function which is a concept of a trashcan is an additional function of the communication client APP rather than an action on the actual server. Therefore, a developer of the communication client APP may determine whether to provide the temporary deleting function but a function that requests the deletion to the communication messaging server system is necessarily provided.

[Recording Medium]

The electronic document communication method according to the present invention may be implemented in a general-purpose digital computer that operates a program using a computer readable recording medium which is created by a program which is executable in the computer. The computer readable recording medium includes a magnetic storage medium (for example, ROM, a floppy disk, a hard disk, or a magnetic tape), an optical reading medim (for example, CD-ROM, DVD, or an optical data storage device), and a carrier wave (for example, transmission through Internet).

Hereinafter, another embodiment of the address directory server in the present invention as described above will be described below.

[Address Directory Server]

All users need to receive an unique electronic mailing address in order to participate in reliable electronic document communication.

The electronic mailing address is represented by the following structure.

Electronic mailing address: internal separator+separation mark+unique registration address An example of the electronic mailing address is "gdhong#nipa.kr".

The internal separator of the electronic mailing address is selectively added by an owner of the unique registration address for the convenience of internal processing and if necessary, the internal separator may be omitted.

The separation mark of the electronic mailing address is a mark which is located prior to the unique registration address or present between the inter identifier and the unique registration address. For example, "#" may be used and if necessary, other marks may be used.

The unique registration address of the electronic mailing address is a unique ID value which is requested to be issued by the corporation/institution/individual and the unit of the unique registration address is a legal responsible unit for the transmission and reception. The unique registration address is a unique registration address which is issued after the transceiving entity autonomously builds the communication messaging server or through the electronic document third party communication agency and is an essential configuration of the electronic address.

The transceiving entity has an actual physical address (IP address) for its own communication messaging server system. However, the physical address does not correlation relationship with the electronic mailing address and the physical address and the electronic mailing address have 1:N relationship. One electronic mailing address does not have a plurality of physical addresses.

The corporation/institution/individual which is present next to the separation mark is responsible for legal reception of the information (electronic document) on the electronic mailing address and the communication by the internal identifier is divided for the convenience of the corporation/institution/individual. Therefore, the corporation/institution/individual is responsible therefor.

The meaning of the electronic mailing address in the electronic document communication system is represented as a relationship chart of the electronic document communication system participant illustrated in FIG. 3.

As described above, the electronic mailing address including the internal identifier and the unique registration address will be described again as follows.

(1) Internal Identifier

The internal identifier is autonomously issued and managed by the transceiving entity regardless of the address directory server.

The internal identifier is a unique value in the transceiving entity and may be omitted.

The corporation/institution/individual is basically responsible for a method of assigning the internal identifier and the communication of the electronic document by the internal identifier does not have an official meaning in the electronic document communication based infra system.

If the unique registered address is an entity which is officially registered in the address directory server such that the government/public sector/corporation/institution/group/individual that is responsible for the reception opens an account in a third party communicating transceiving entity, the internal identifier is used to communicate the electronic document for the convenience of the task of the corporation and is not registered in the address directory server but used only as information inside the corporation.

(2) Unique Registered Address

The government/public sector/corporation/institution/group/individual that participates in the electronic document communication system to communicate the electronic document autonomously builds the communication messaging server system and then receives the unique registered address as a transceiving entity or receives the unique registered address through a third party communication (communication by proxy) agency.

The uniqueness of the unique registered address is confirmed by the address directory server at the time of issuance so as not to be redanduntly issued.

The configuration method of the unique registered address of the government/public sector/corporation/institution/group/individual is determined by the policy of institution of the certified electronic mailing address management.

The electronic mailing address as described above is basically managed in two levels. At the highest part of the certified electronic mailing address, institution of the certified electronic mailing address chief manager (for example, National IP Industry Promotion Institution) that manages the address directory server is present and the certified electronic mailing address chief manager issues and manages the unique electronic mailing address for a lower transceiving entity. Among the lower transceiving entities of the certified electronic mailing address chief manager, a transceiving entity that is capable of performing the third party communication (communication by proxy) opens a registered address for a user who wants the third party communication and then registers the address information in the address directory server. In this case, in order to guarantee the uniqueness of the unique registered address value of the user, it is required to confirm the redundancy from the address directory server.

Among the electronic mailing addresses, an internal identifier which is not an official user but is internally issued and used for the convenience of the task is autonomously issued and managed by the transceiving entity regardless of the address directory server.

A system of issuing the electronic mailing address is illustrated in FIG. 4 and roles of the components illustrated in FIG. 4 will be described in the following Table 184.

TABLE 184

| Component | Role |
| --- | --- |
| National IP Industry Promotion Institution (electronic mailing address chief manager) | NIPI manages all certified electronic mailing address information as highest managing agent of certified electronic mailing address Issues unique ID for transceiving entity when certified electronic mailing address for user account is required to be registered, notifies whether to be newly registered, or change of an existing address when user account is newly registered, notifies whether the account ID is unique delivers result value for physical address information searching request of a user |

TABLE 184-continued

| Component | Role |
| --- | --- |
| Transceiving entity | basic unit of physical certified electronic mailing address issues and manages user account or internal identifier information for a plurality of users at the lower level of one certified electronic mailing address and guarantees the uniqueness of the user account or the internal identifier in one certified electronic mailing address |
| User (individual, corporation, or institution) account or ID for internal identifier | an actual user which participates in the electronic document communication and if ID is issued from the same transceiving entity, even though the physical certified electronic mailing address is identical, the user becomes a unit of an actual basis of the reliable communication user account is a legally responsible transceiving unit as an electronic mailing address open through a transceiving entity which is capable of third party communication and should be registered in the electronic mailing address directory server the internal identifier is information that is managed by the transceiving entity which is legally responsible for the transmission/reception for the convenience of the task and the transceiving entity which is at a higher level than the internal identifier has a legal responsibility and is not registered in the electronic mailing address directory server |

A process of issuing an electronic mailing address is illustrated in FIG. 5. The user (corporation) may directly access to a screen that is provided by the address directory server to register or edit the address or receives the electronic mailing address through a communication messaging server system (web site provided by the system) that issues the certified electronic mailing address by proxy.

The user that participates in the communication needs to know physical actual address information based on the electronic mailing address before transmitting a message to the other party and further acquires public key information of the receiver in order to encrypt the attached document.

A procedure of acquiring a physical address of the electronic mailing address in the electronic document communication process is an essential step and the transmitter inquires the address directory server in order to acquire the physical address information and the security information for the receiving party based on the address information of the receiver. If the transmitter delivers the transmission document to the receiver based on the physical address, the communication messaging server system of the receiver receives the transmission document to internally communicate the received document in accordance with the user account or the internal identifier based on the receiver address information.

Figure 7:
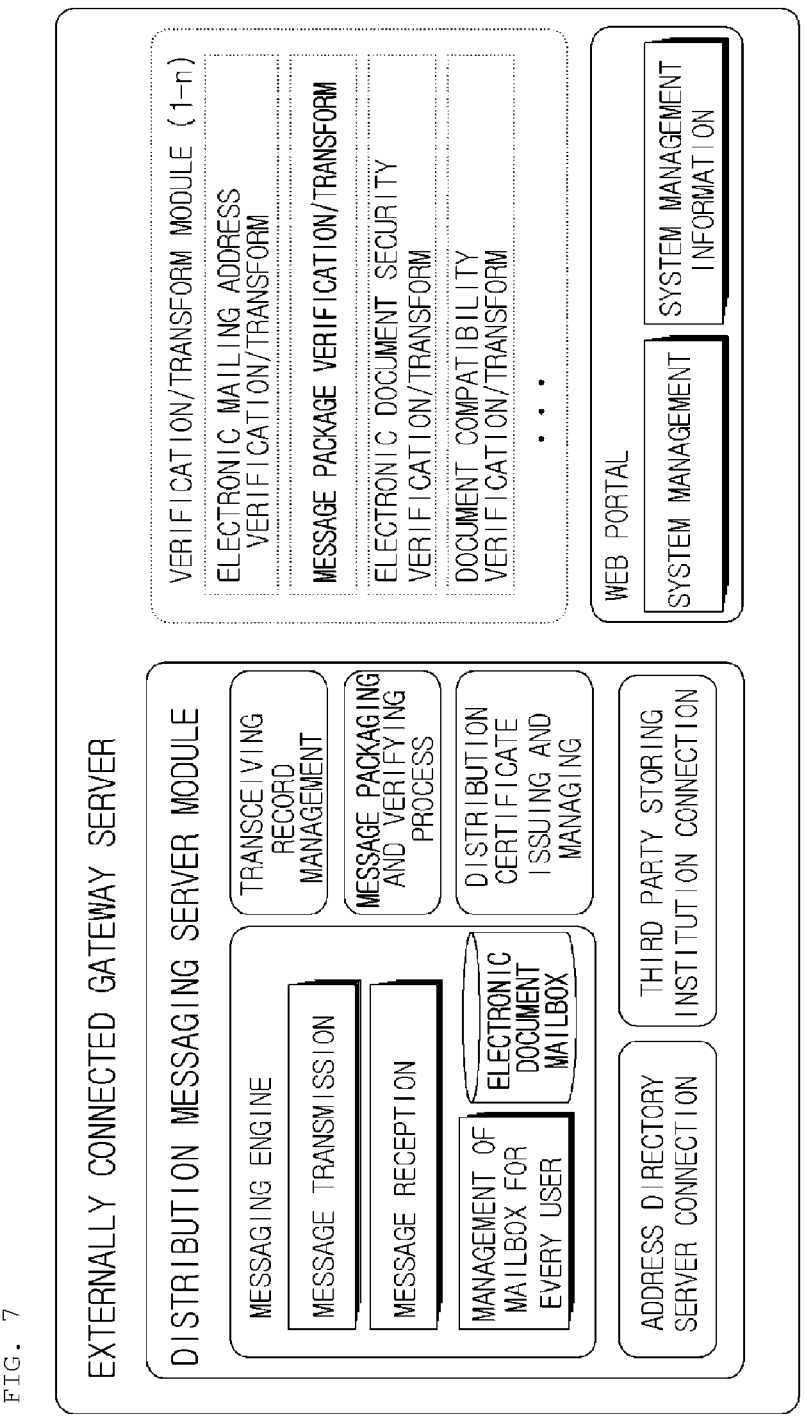
FIG. 7 is a view illustrating an externally connected gateway of FIGS. 1A and 1B.

A process of acquiring the physical address of the electronic mailing address and the security information is illustrated in FIG. 6. In order to transmit a document to the receiver based on the certified electronic mailing address in the electronic document communication, there are two methods as follows: (1) the communication client APP acquires necessary information in connection with the address directory server at the time of inputting address information of a receiving party and then requests the communication messaging server to transmit the document based on the searched actual physical address information and (2) the communication client APP requests the communication messaging server to transmit the document based on the certified electronic mailing address for the receiver and the communication messaging server acquires the physical address and the security information to the address directory server before the communication messaging server transmits the document and then transmits the document to the receiver. The procedure for the two methods are illustrated in FIG. 7.

The address directory server provides a remote service so that the communication messaging server system searches the address information or issues an address by proxy. The services provided by the address directory server include an address searching service, an address registering service, and address changing service and provides the following service interfaces based on the communication protocol standard.

The address searching service is a service that the address directory server returns the physical address information (for example, IP address and a Domain address) corresponding to the certified electronic mailing address and the public key information to the searching requestor. Generally, the address searching service is used to acquire the actual address information of the receiver and the security information for encryption before the transmitter transmits the document. In this case, the roles of the request message and the response message will be described in the following Table 185.

TABLE 185

| Component | Role |
| --- | --- |
| Request message | Whether receiver is individual, corporation/institution, unique ID of the receiver (resident registration number, business registration number, foreigner registration number), whether to request public key |
| Response message | Unique ID of receiver, receiver address, public key (optional if requested) |

The address registering service is a service that is provided to register the certified electronic mailing address of the user not only through the UI provided by the address directory server but from a remote location. The address directory server receives user information and certified electronic mailing address information as a request message to register the information and then receives the result as a response message. The request message for the address registering service needs to be delivered so as to include the digital signature information for the requester and the address director server verifies whether the user information included in the request message is identical to the certificate information used for the digital signature. In this case, the roles of the request message and the response message will be described in the following Table 186.

TABLE 186

| Component | Role |
| --- | --- |
| Request message | User unique ID, user additional information structure (user name, contact information) whether receiver is individual, corporation/institution, user address information, public key information (optional), structure that defines scope to open address information |
| Response message | User unique id, registration result value (successful, failed-request information error, failed-already registered, failed-not an authenticated transceiving entity, or address directory server error) |

The address changing service is a remote service that provides a function that allows the user to directly and remotely change the address information of the registered user. The address changing service transmits a changing request message to the address directory server together with information to be changed and receives the result as a response message. The request message for the address changing service needs to be delivered so as to include the digital signature information for the requester. The address director server verifies whether the user information included in the request message is identical to the certificate information used for the digital signature. In this case, the roles of the request message and the response message will be described in the following Table 187.

TABLE 187

| Component | Role |
|---|---|
| Request message | Only changed information among user unique ID and user additional information structure (user name, contact information) whether receiver is individual, corporation/institution, user address information, public key information (optional), structure that defines scope to open address information |
| Response message | User unique id, information changed result value (successful, failed-request information error, failed-unregistered user, failed-no changing authority, or address directory server error) |

The invention claimed is:

1. An electronic document communication system, comprising:
   a transceiving entity that transmits and receives a message based on an electronic mailing address and communicates the electronic document through a communication messaging server that issues and manages a communication certificate for message transmission/reception;
   a communication hub that registers/manages the electronic mailing address of the transceiving entity, sets an electronic document communication route between the transceiving entities, provides a standard form of the electronic document to the transceiving entity, transmits the message by proxy when an error occurs in the process of communication the electronic document between the transceiving entities and issues a communication certificate; and
   a reliable third party storing institution that receives and stores the communication certificate.

2. The electronic document communication system according to claim 1, wherein the communication messaging server of the transceiving entity stores the transceiving message in a mailbox so as to include status information for each of a plurality of users,
   stores a message transceiving record in a medium that is not allowed to edit and delete the message transceiving record for a predetermined period of time,
   issues the communication certificate for the message transmission/reception to request the third party storing institution to store the communication certificate,
   allows the transceiving entity to use function of registering, searching, editing, and deleting the electronic mailing address in connection with the address directory server of the communication hub, and
   moves messages which are stored for a predetermined period of time or longer to an external storage device to be stored.

3. The electronic document communication system according to claim 1, wherein the electronic mailing address includes:
   a user identification mark that is issued to the transceiving entity through the address directory server of the communication hub;
   an additional identification mark which is an unique value autonomously assigned by the transceiving entity if necessary and a unique value in the transceiving entity; and
   an identification mark disposed between the user identification mark and the additional identification mark.

4. The electronic document communication system according to claim 3, wherein a principal agent for the electronic document communication is a user that receives a unique registration address.

5. The electronic document communication system according to claim 3, wherein the identification mark is "#".

6. The electronic document communication system according to claim 1, wherein the communication hub includes an electronic document format register,
   the electronic document format register performing the management including registration, deletion of the electronic document standard form, and information edition, and
   wherein the electronic document format register classifies the electronic document standard form in accordance with a context and performs management including registration and edition of a context in which the electronic document standard form is used.

7. The electronic document communication system according to claim 6, wherein the electronic document form register includes a server engine that manages a document format and a standard interface that allows a user who uses the transceiving entity to search and download the document format to use the document format,
   the transceiving entity further includes a communication client application which is a user interface that allows the user who uses the transceiving entity to transmit/receive the message through the communication messaging server, and
   the user who uses the communication client application searches and downloads the document format through the standard interface of the electronic document form register and then creates an electronic document using the document format.

8. The electronic document communication system according to claim 1, wherein the communication hub includes a communication relay server that transmits a message by proxy when error occurs during the process of communication the electronic document between the transceiver entities and issues a communication certificate, and
   wherein, when the communication relay server is requested by the transceiving entity to transmit the message, the communication relay server issues a transmission certificate to the transceiving entity that requests the message transmission after transmitting the message by proxy and if the requested message transmission is failed, transmits an error message to the transceiving entity that requests the message transmission.

9. The electronic document communication system according to claim 1, wherein the communication hub includes an externally connected gateway server for connection with an external system, and
   the externally connected gateway server includes a communication messaging server that transmits/receives a message based on an electronic mailing address, provides an electronic mailing address verification/conversion function between the connected external system and the electronic document communication system, a message verification/conversion function between the connected external system and the electronic document communication system, a verification/conversion function of security which is applied to an electronic document between the connected external system and the electronic document communication system, and a function that verifies and transforms a compatibility of the electronic document between the connected external system and the electronic document communication system.

10. The electronic document communication system according to claim 1, further comprising:
a first interface which is used for an electronic mailing address registration agency to request the address directory server to register the electronic mailing address and receive the response, a second interface which is used for the electronic mailing address registration agency to request to change the electronic mailing address registered in the address directory server and receive the response, and a third interface which is used for the electronic mailing address registration agency to request to delete the electronic mailing address registered in the address directory server and receive the response,
wherein the electronic mailing address registration agency transmits the request message including electronic mailing address registrant information and electronic mailing address information through the first interface and then receives the registration result of the address directory server as a response message, transmits the request message including electronic mailing address registrant information and electronic mailing address information to be changed through the second interface and then receives the changing result of the address directory server as a response message, and transmits the request message including electronic mailing address registrant information and electronic mailing address information to be deleted through the third interface and then receives the deleting result of the address directory server as a response message.

11. The electronic document communication system according to claim 10, further comprising:
a fourth interface that is used for the electronic mailing address registration agency or the transceiving entity to request the address directory server for physical address information corresponding the certified electronic mailing address information of the receiver of the electronic document and certificate information for message secure processing and receive the response,
after transmitting the request message including the certified electronic mailing address of the receiver of the electronic document and whether to request the certificate, the electronic mailing address registration agency or the communication messaging server of the transceiving entity receives the physical address information of the receiver of the electronic document and the certificate information from the address directory server as a response message.

12. The electronic document communication system according to claim 1, wherein the communication messaging server of the transceiving entity and the communication messaging server of the electronic mailing address registration agency includes a fifth interface that is used to transmit a message, deliver the communication certificate, request to store the communication certificate, and deliver the storage result of the third party storing institution.

13. The electronic document communication system according to claim 1, wherein the user in the transceiving entity includes a communication client application which is a user interface,
the communication messaging server of the transceiving entity includes a sixth interface that provides a document transceiving function to the user in connection with the communication client application for a user who requests the electronic document communication, and
the sixth interface provides a function of requesting to transmit a message, requesting a list of the message, requesting detailed information of the message, reporting a spam message and searching the physical address information to the communication client user.

* * * * *